(12) United States Patent
Murakami et al.

(10) Patent No.: US 10,630,443 B2
(45) Date of Patent: Apr. 21, 2020

(54) RADIO TRANSMISSION APPARATUS AND METHODS

(71) Applicant: Wi-Fi One, LLC, Dallas, TX (US)

(72) Inventors: Yutaka Murakami, Osaka (JP);
Masayuki Orihashi, Kanagawa (JP);
Akihiko Matsuoka, Kanagawa (JP)

(73) Assignee: Wi-Fi One, LLC, Dallas, TX (US)

( * ) Notice: Subject to any disclaimer, the term of this patent is extended or adjusted under 35 U.S.C. 154(b) by 0 days.

(21) Appl. No.: 16/413,945

(22) Filed: May 16, 2019

(65) Prior Publication Data

US 2019/0273595 A1 Sep. 5, 2019

Related U.S. Application Data

(63) Continuation of application No. 15/494,666, filed on Apr. 24, 2017, now Pat. No. 10,341,071, which is a
(Continued)

(30) Foreign Application Priority Data

Nov. 13, 2001 (JP) .................. 2001-347029
Jan. 7, 2002 (JP) .................. 2002-000359
(Continued)

(51) Int. Cl.
*H04L 5/00* (2006.01)
*H04L 27/26* (2006.01)
(Continued)

(52) U.S. Cl.
CPC ............. *H04L 5/0048* (2013.01); *H04B 7/06* (2013.01); *H04B 7/0626* (2013.01);
(Continued)

(58) Field of Classification Search
CPC ...... H04B 7/06; H04B 7/0626; H04B 7/0689; H04B 7/0697; H04B 7/0413;
(Continued)

(56) References Cited

U.S. PATENT DOCUMENTS 5,280,537 A 1/1994 Sugiyama et al.
5,381,449 A 1/1995 Jasper et al.
(Continued)

FOREIGN PATENT DOCUMENTS

CN 1050293 3/2007
DE 19822276 12/1999
(Continued)

OTHER PUBLICATIONS

Garnier, C. et al., "Performance of OFDM-SDMA based system in a time varying multi-path channel," France, 2001, pp. 1686-1690.
(Continued)

*Primary Examiner* — Jenee Holland
(74) *Attorney, Agent, or Firm* — Nixon & Vanderhye P.C.

(57) ABSTRACT

A radio transmission apparatus determines information indicative of an estimated communications channel condition and generates a single modulation signal or a plurality of modulation signals based on the estimated communications channel condition information. The single modulation signal from a first antenna or the plurality of modulation signals is(are) transmitted from the first antenna and a second antenna. The plurality of modulation signals include different information from each other and are transmitted over an identical frequency band and at an identical temporal point. The single modulation signal and the plurality of modulation signals contain parameter information indicating a number of modulation signals transmitted at the same time.

8 Claims, 87 Drawing Sheets

Related U.S. Application Data continuation of application No. 14/535,365, filed on Nov. 7, 2014, now Pat. No. 9,647,856, which is a continuation of application No. 13/839,910, filed on Mar. 15, 2013, now Pat. No. 8,891,678, which is a continuation of application No. 13/153,731, filed on Jun. 6, 2011, now Pat. No. 8,428,182, which is a continuation of application No. 10/486,896, filed as application No. PCT/JP02/11825 on Nov. 13, 2002, now Pat. No. 7,974,371.

(30) Foreign Application Priority Data

| | | |
|---|---|---|
| Mar. 14, 2002 | (JP) | 2002-069716 |
| Nov. 8, 2002 | (JP) | 2002-325194 |

(51) Int. Cl.

| | |
|---|---|
| H04B 7/06 | (2006.01) |
| H04L 1/06 | (2006.01) |
| H04L 27/04 | (2006.01) |
| H04L 27/12 | (2006.01) |
| H04L 27/14 | (2006.01) |
| H04L 27/06 | (2006.01) |
| H04L 29/06 | (2006.01) |
| H04L 27/18 | (2006.01) |
| H04L 25/02 | (2006.01) |
| H04W 52/52 | (2009.01) |
| H04B 7/0413 | (2017.01) |
| H04B 7/08 | (2006.01) |
| H04W 72/04 | (2009.01) |

(52) U.S. Cl.

CPC ......... *H04B 7/0689* (2013.01); *H04B 7/0697* (2013.01); *H04L 1/0618* (2013.01); *H04L 5/003* (2013.01); *H04L 5/0023* (2013.01); *H04L 25/0204* (2013.01); *H04L 27/04* (2013.01); *H04L 27/06* (2013.01); *H04L 27/12* (2013.01); *H04L 27/14* (2013.01); *H04L 27/18* (2013.01); *H04L 27/2602* (2013.01); *H04L 27/2627* (2013.01); *H04L 27/2649* (2013.01); *H04L 27/2657* (2013.01); *H04L 27/2659* (2013.01); *H04L 27/2691* (2013.01); *H04L 27/2695* (2013.01); *H04L 69/22* (2013.01); *H04W 52/52* (2013.01); *H04B 7/0413* (2013.01); *H04B 7/0632* (2013.01); *H04B 7/0671* (2013.01); *H04B 7/082* (2013.01); *H04L 25/0206* (2013.01); *H04L 27/2601* (2013.01); *H04W 72/0453* (2013.01)

(58) Field of Classification Search

CPC .... H04B 7/0632; H04B 7/0671; H04B 7/082; H04L 5/00; H04L 1/0618; H04L 5/0023; H04L 5/003; H04L 5/0048; H04L 25/0204; H04L 25/0206; H04L 27/04; H04L 27/06; H04L 27/12; H04L 27/14; H04L 27/18; H04L 27/0453; H04L 27/2602; H04L 27/2627; H04L 27/2649; H04L 27/2657; H04L 27/2659; H04L 27/2691; H04L 27/2695; H04L 69/22; H04W 52/52; H04W 72/0453

See application file for complete search history.

(56) References Cited

U.S. PATENT DOCUMENTS

| | | |
|---|---|---|
| 5,533,013 A | 7/1996 | Leppanen |
| 5,563,909 A | 10/1996 | Nakazawa |
| 5,809,083 A | 9/1998 | Wright |
| 5,867,478 A | 2/1999 | Baum et al. |
| 5,867,792 A | 2/1999 | Ichiyoshi |
| 5,970,061 A | 10/1999 | Kokudo |
| 6,006,072 A | 12/1999 | Tsujimoto |
| 6,058,105 A | 5/2000 | Hochwald et al. |
| 6,069,884 A | 5/2000 | Hayashi |
| 6,097,768 A | 8/2000 | Janesch |
| 6,205,166 B1 | 3/2001 | Maruta et al. |
| 6,266,360 B1 | 7/2001 | Okamoto |
| 6,298,050 B1 | 10/2001 | Van Heeswyk et al. |
| 6,426,817 B1 | 7/2002 | Tomita |
| 6,473,467 B1 | 10/2002 | Wallace et al. |
| 6,519,300 B1 | 2/2003 | Ramesh |
| 6,522,898 B1 | 2/2003 | Kohno et al. |
| 6,608,868 B1 | 8/2003 | Murakami et al. |
| 6,625,111 B1 | 9/2003 | Sudo |
| 6,654,429 B1 | 11/2003 | Li |
| 6,738,430 B2 | 5/2004 | Murakami et al. |
| 6,748,023 B2 | 6/2004 | Murakami et al. |
| 6,810,020 B2 | 10/2004 | Cho et al. |
| 6,850,481 B2 | 2/2005 | Wu et al. |
| 6,853,631 B1 | 2/2005 | Nakamura et al. |
| 6,888,789 B1 | 5/2005 | Sakoda et al. |
| 6,888,903 B1 | 5/2005 | Stenstrom et al. |
| 6,937,557 B1 | 8/2005 | Sudo |
| 6,963,753 B1 | 11/2005 | Hamabe |
| 6,985,434 B2 | 1/2006 | Wu et al. |
| 6,993,092 B1 | 1/2006 | Murakami et al. |
| 7,009,931 B2 | 3/2006 | Ma et al. |
| 7,020,072 B1 | 3/2006 | Li et al. |
| 7,031,289 B1 | 4/2006 | Nakayama |
| 7,068,637 B2 | 6/2006 | Saito et al. |
| 7,099,265 B2 | 8/2006 | Kuwabara et al. |
| 7,139,237 B2 | 11/2006 | Nangia et al. |
| 7,174,178 B2 | 2/2007 | Bergel |
| 7,221,645 B2 | 5/2007 | Wang et al. |
| 7,233,625 B2 | 6/2007 | Ma et al. |
| 7,242,720 B2 | 7/2007 | Sugiyama et al. |
| 7,266,167 B2 | 9/2007 | Murakami et al. |
| 7,336,601 B2 | 2/2008 | Wu et al. |
| 7,359,454 B2 | 4/2008 | Murakami et al. |
| 7,359,457 B2 | 4/2008 | Murakami et al. |
| 7,403,570 B2 | 7/2008 | Ma et al. |
| 7,664,193 B2 | 2/2010 | Jalali et al. |
| 7,688,901 B2 | 3/2010 | Murakami et al. |
| 7,778,339 B2 | 8/2010 | Murakami et al. |
| 7,974,371 B2 | 7/2011 | Murakami et al. |
| 8,155,224 B2 | 4/2012 | Murakami et al. |
| 8,229,026 B2 | 7/2012 | Murakami et al. |
| 8,428,182 B2 | 4/2013 | Murakami et al. |
| 8,446,973 B2 | 5/2013 | Murakami et al. |
| 8,891,678 B2 | 11/2014 | Murakami et al. |
| 9,647,856 B2 | 5/2017 | Murakami et al. |
| 2001/0010587 A1 | 8/2001 | Miyazaki |
| 2001/0017896 A1 | 8/2001 | Murakami et al. |
| 2001/0028637 A1 | 10/2001 | Abeta et al. |
| 2001/0040874 A1 | 11/2001 | Saito et al. |
| 2001/0049295 A1 | 12/2001 | Matsuoka et al. |
| 2002/0003774 A1 | 1/2002 | Wang et al. |
| 2002/0018483 A1 | 2/2002 | Kwabara et al. |
| 2002/0065047 A1 | 5/2002 | Moose |
| 2002/0097804 A1 | 7/2002 | Perner |
| 2002/0102972 A1 | 8/2002 | Hirama |
| 2002/0118765 A1 | 8/2002 | Nangia et al. |
| 2002/0168941 A1 | 11/2002 | Useugi |
| 2002/0191535 A1 | 12/2002 | Sugiyama et al. |
| 2003/0035491 A1 | 2/2003 | Walton et al. |
| 2003/0043733 A1 | 3/2003 | Maeda |
| 2003/0043928 A1 | 3/2003 | Ling et al. |
| 2004/0037248 A1 | 2/2004 | Tamaki et al. |
| 2004/0213365 A1 | 10/2004 | Murakami et al. |
| 2004/0240571 A1 | 12/2004 | Murakami et al. |
| 2004/0259508 A1 | 12/2004 | Murakami et al. |
| 2006/0002288 A1 | 1/2006 | Okada |
| 2007/0036069 A1 | 2/2007 | Wu et al. |
| 2007/0165733 A1 | 7/2007 | Murakami et al. |
| 2008/0002568 A1 | 1/2008 | Wu et al. |
| 2010/0128758 A1 | 5/2010 | Murakami et al. |

(56) References Cited

U.S. PATENT DOCUMENTS

| | | | |
|---|---|---|---|
| 2010/0215119 A1 | 8/2010 | Murakami et al. | |
| 2011/0235752 A1 | 9/2011 | Murakami et al. | |
| 2012/0183101 A1 | 7/2012 | Murakami et al. | |
| 2012/0257688 A1 | 10/2012 | Murakami et al. | |

FOREIGN PATENT DOCUMENTS

| | | |
|---|---|---|
| EP | 419429 | 3/1991 |
| EP | 622911 | 11/1994 |
| EP | 675609 | 10/1995 |
| EP | 836288 | 4/1998 |
| EP | 905920 | 3/1999 |
| EP | 940934 | 9/1999 |
| EP | 0952684 | 10/1999 |
| EP | 1006668 | 6/2000 |
| EP | 1037303 | 9/2000 |
| EP | 1063789 | 12/2000 |
| EP | 1185048 | 3/2003 |
| JP | 55097746 | 7/1980 |
| JP | 58191537 | 11/1983 |
| JP | 59091740 | 5/1984 |
| JP | 4082424 | 3/1992 |
| JP | 4292023 | 10/1992 |
| JP | 5-48505 | 2/1993 |
| JP | 5153086 | 6/1993 |
| JP | 5327670 | 12/1993 |
| JP | 7038478 | 2/1995 |
| JP | 7131380 | 5/1995 |
| JP | 9172427 | 6/1997 |
| JP | 9214407 | 8/1997 |
| JP | 9247060 | 9/1997 |
| JP | 9312600 | 12/1997 |
| JP | 10107768 | 4/1998 |
| JP | 10163937 | 6/1998 |
| JP | 10229383 | 8/1998 |
| JP | 10276122 | 10/1998 |
| JP | 11205205 | 7/1999 |
| JP | 2000244223 | 9/2000 |
| JP | 2001036442 | 2/2001 |
| JP | 2001044901 | 2/2001 |
| JP | 2001069115 | 3/2001 |
| JP | 2001-177468 | 6/2001 |
| JP | 2001197138 | 7/2001 |
| JP | 2001251233 | 9/2001 |
| JP | 20011313685 | 11/2001 |
| JP | 2001345777 | 12/2001 |
| JP | 2002044051 | 2/2002 |
| JP | 2003060604 | 2/2003 |
| JP | 2005506757 | 3/2005 |
| JP | 4606407 | 10/2010 |
| KR | 20000062895 | 10/2000 |
| KR | 20010076891 | 8/2001 |
| WO | WO 9104615 | 4/1991 |
| WO | WO 9740594 | 10/1997 |
| WO | WO 9852300 | 11/1998 |
| WO | WO 9960707 | 11/1999 |
| WO | WO 0167633 | 9/2001 |
| WO | WO 0176110 | 10/2001 |
| WO | WO 03034614 | 4/2003 |
| WO | WO 03034642 | 4/2003 |

OTHER PUBLICATIONS

Heath, Jr. R., "Antenna Selection for Spatial Multiplexing Systems with Linear Receivers," IEEE Communications Letters 5(4), Apr. 2001, pp. 142-144.

Jianjun Li et al., "Space Time Spreading in Forward Links of the Multicarrier DS CDMA System," in Proceedings International Conferences on Info-Tech and Info-Net, IEEE, Beijing, China, Oct. 29-Nov. 1, 2001, vol. 2, pp. 285 and 290.

Satoshi, K., et al.. "100 Mbit/s SDM-COFDM over MIMO Channel for Broadband Mobile Communications," The Institute of Electronics, Information, and Communication Engineers, Technical Support of IEICE, A-P2001-96, RCS2001-135, Oct. 2001, pp. 37-42.

Siemens, "Description of the Eigenbeamformer Concept (update) and Performance Evaluation," in cooperation with the Institute of Circuit Theory and Signal Processing of Munich University of Technology, Germany, 3GPP TSG RAN WG1, Las Vegas, Nevada, Feb. 27-Mar. 2, 2001, pp. 1-9.

"Walsh Code," Wikipedia, http://en.wikipedia.org/wiki/Walsh_code, retrieved Apr. 19, 2007, 1 page.

RADIO TRANSMISSION APPARATUS AND METHODS

CROSS-REFERENCE TO RELATED APPLICATION

This application is a continuation of U.S. patent application Ser. No. 15/494,666, filed Apr. 24, 2017, which is a continuation of U.S. patent application Ser. No. 14/535,365, filed Nov. 7, 2014, which is a continuation of U.S. patent application Ser. No. 13/839,910, filed Mar. 15, 2013 (now U.S. Pat. No. 8,891,678), which is a continuation of U.S. patent application Ser. No. 13/153,731, filed Jun. 6, 2011 (Now U.S. Pat. No. 8,428,182), which is a continuation of U.S. patent application Ser. No. 10/486,896, filed Feb. 17, 2004 (Now U.S. Pat. No. 7,974,371), which application is incorporated herein by reference in its entirety and which is a U.S. National Phase Application of PCT International Application PCT/JP02/11825, filed Nov. 13, 2002.

TECHNICAL FIELD

The present invention relates to a transmission method for multiplexing modulation signals of a plurality of channels to the same frequency band, a transmission apparatus and a reception apparatus.

BACKGROUND ART

This kind of transmission method and reception method have been available such as the ones disclosed in Japanese Patent Application Non-Examined Publication No. 2002-44051. FIG. 87 illustrates the transmission method and the reception method disclosed in the foregoing publication.

In FIG. 87, first space-time encoder STE1 (8705) receives first data block b1 [n, k], and second space-time encoder STE2 (8707) receives second data block b2 [n, k], and two signals coded by encoders STE1 and STE 2 respectively are modulated by inverse fast Fourier transformers IFFT (8708-8711). Then the modulated signals are transmitted as OFDM (orthogonal frequency division multiplexing) signals by four transmitting antennas TA1 (8712)-TA4 (8715).

A plurality of receiving antennas RA1 (8701)-RAP (8703) receive those signals transmitted by antennas TA1 (8712)-TA4 (8715). Reception signals r1 [n, k] (8716)-rp (8718) are transformed by fast Fourier transformation (FET) sub-systems FFT1 (8719)-FFTp (8721) respectively, and supplied to space-time processor STP (8722). Processor STP (8722) detects signal information and supplies it to first and second space-time decoders STD1 (8723) and STD2 (8724). Channel parameter estimation unit CPE (8725) receives the transformed signal, and determines channel-parameter information, then supplies the information to the space-time processor STP (8722) for demodulating the signals.

However, the foregoing conventional structure gives no thought to the synchronization between channels in the same frequency band as well as a frequency offset. As a result, this structure encounters the difficulty of achieving the most important factor in order to demultiplex a multiplexed signal, namely, obtaining an accuracy of estimating channels.

DISCLOSURE OF THE INVENTION

The present invention aims to provide a communication method and a radio communication apparatus which allow estimating a channel accurately and with ease from a multiplexed modulation signal.

The radio communication apparatus of the present invention includes a plurality of antennas, receives modulation signals transmitted by a communication partner, estimates a radio-wave propagation environment of each one of the antennas, and transmits the information of the estimated environment to the communication partner.

The modulation signal transmitted by the communication partner and received by the radio communication apparatus of the present invention is transmitted from only one of the plurality of antennas at a plurality of times.

A radio communication apparatus of the present invention comprises the following elements:

a plurality of antennas for receiving modulation signals of a plurality of channels available in the same frequency band and transmitted from a plurality of antennas; and a received signal strength intensity estimation unit for estimating a radio wave propagation environment of the modulation signals corresponding to each one of the antennas. The communication apparatus then transmits the information of the estimated environment to a communication partner.

The radio communication apparatus of the present invention receives the modulation signals when a communication starts, then transmits the information of the estimated environment to the communication partner.

A radio communication apparatus of the present invention transmits or receives modulation signals of a plurality of channels available in the same frequency band from a plurality of antennas. The apparatus includes a transmission method determining unit that selects one of the following transmission methods based on information about a radio-wave propagation environment of each one of the antennas of the communication partner:

a method of transmitting modulation signals of a plurality of channels to the same frequency band from a plurality of antennas; or a method of transmitting a modulation signal of one channel from one antenna.

The radio-wave propagation information of the radio communication apparatus of the present invention is estimated from a modulation signal transmitted when a communication starts.

A radio communication apparatus of the present invention comprises the following elements:

a plurality of antennas for receiving modulation signals of a plurality of channels available in the same frequency band and transmitted from a plurality of antennas;

a received signal strength intensity estimation unit for estimating a radio wave propagation environment of the modulation signals corresponding to each one of the antennas and transmitting information of the estimated environment to a communication partner; and a transmission method determining unit for determining, based on the information of the radio wave propagation environment, a transmission method by which the communication partner transmits signals. The communication apparatus then transmits the information about a transmission method to the communication partner.

A modulation signal received by the radio communication apparatus of the present invention is transmitted by a communication partner from only one antenna out of a plurality of antennas at a plurality of times.

A radio communication apparatus of the present invention comprises the following elements:

a plurality of antennas for transmitting or receiving modulation signals of a plurality of channels available in the same frequency band and in accordance with a spread-spectrum communication method; and a received signal strength intensity estimation unit for estimating a radio-wave propagation environment of the modulation signal corresponding to each one of the antennas using a component of a control channel. The communication apparatus then transmits information of the estimated environment to a communication partner.

The radio communication apparatus of the present invention receives the modulation signal when a communication starts, and transmits the information of the estimated radio-wave propagation environment to the communication partner.

A radio communication apparatus of the present invention transmits or receives modulation signals of a plurality of channels, available in the same frequency band and in accordance with a spread-spectrum communication method, from a plurality of antennas. The apparatus includes a transmission method determining unit that selects one of the following transmission methods based on radio-wave propagation environment of each one of the antennas of the communication partner:

a method of transmitting modulation signals of data channels of a plurality of spread-spectrum communication methods to the same frequency band from a plurality of antennas; or a method of transmitting a modulation signal of a data channel of one spread-spectrum communication method from one antenna.

The radio-wave propagation information of the radio communication apparatus of the present invention is estimated from the modulation signal transmitted when the communication starts.

A communication method of the present invention transmits or receives modulation signals of a plurality of channels available in the same frequency band from a plurality of antennas. The communication method comprises the steps of:

transmitting a modulation signal;

a communication partner receiving the modulation signals, estimating a radio-wave propagation environment corresponding to each one of the antennas based on the modulation signal, then transmitting information of the estimated environment; and based on the information;

selecting one of transmission methods below:

a method of transmitting the modulation signals of the plurality of channels to the same frequency band from the plurality of antennas, or a method of transmitting a modulation signal of one channel from one antenna.

The communication method of the present invention transmits the modulation signal when the communication starts.

A communication method of the present invention transmits or receives modulation signals of a plurality of channels, available in the same frequency band and in accordance with a spread-spectrum communication method, from a plurality of antennas. The communication method comprising the steps of:

transmitting a modulation signal;

a communication partner receiving the modulation signal, estimating a radio-wave propagation environment corresponding to each one of the antennas based on the modulation signal, then transmitting the information of the estimated environment; and based on the information, selecting one of the transmission methods below:

a method of transmitting the modulation signals of data channels of a plurality of spread-spectrum communication methods to the same frequency band from the plurality of antennas, or a method of transmitting a modulation signal of a data channel of one spread-spectrum communication methods from one antenna.

The communication method of the present invention transmits the modulation signal when the communication starts.

A communication method of the present invention transmits or receives modulation signals of a plurality of channels, available in the same frequency band and in accordance with a spread-spectrum communication method, from a plurality of antennas. The communication method comprising the steps of:

transmitting a modulation signal;

a communication partner receiving the modulation signal, estimating a radio-wave propagation environment corresponding to each one of the antennas based on a reception signal of a control channel; and based on the information, transmitting information which requires one of transmission methods below:

a method of transmitting the modulation signal of data channels of a plurality of spread-spectrum communication methods to the same frequency band from the plurality of antennas, or a method of transmitting the modulation signal of a data channel of one spread-spectrum communication method from one antenna; and based on the requiring information, selecting one of the foregoing transmission methods.

The communication method of the present invention transmits the modulation signal when the communication starts.

The foregoing communication method allows multiplexing modulation signals of a plurality of channels to the same frequency band, thereby increasing the data transmission rate. At the same time, a transmission method is switched from/to transmitting the signals from one antenna to/from transmitting the signals from a plurality of antennas depending on a radio-wave propagation environment, thereby improving the quality of data transmission as well as the transmission rate of data. If this procedure is prepared at the time when a communication starts, an optimum communication method can be selected at the beginning.

A communication method of the present invention switches between the method of transmitting modulation signals of a plurality of channels from a plurality of antennas and the method of transmitting a modulation signal of a channel from an antenna.

The foregoing communication method allows multiplexing modulation signals of a plurality of channels to the same frequency band, thereby increasing the data transmission rate. At the same time, in the case of a bad radio-wave propagation environment, the modulation signals are transmitted through one channel, and in the case of a fine environment, a plurality of channels are used. The transmission method can be thus switched depending on the radio-wave propagation environment, so that the quality of data transmission is improved and the data transmission rate is increased.

At the beginning of starting a communication, the communication method of the present invention selects a transmission method of transmitting a modulation signal of one channel from one antenna.

The foregoing communication method can thus switch the case of transmitting the signals from a plurality of antennas to/from the case of transmitting the signals from one antenna, thereby improving the quality of data transmission as well as increasing the data transmission rate.

A reception apparatus of the present invention receives signals transmitted by the transmission method of the present invention, and has a function to select one of the following cases:

a case of receiving modulation signals of a plurality of channels transmitted from a plurality of antennas to the same frequency band; or a case of receiving modulation signals of one channel transmitted from one antenna.

The foregoing reception apparatus allows multiplexing modulation signals of a plurality of channels to the same frequency band, thereby increasing the data transmission rate. At the same time, in the case of a bad radio-wave propagation environment, the modulation signals are transmitted through one channel, and in the case of a fine environment, a plurality of channels are used. The reception apparatus thus switches between the foregoing two transmission methods depending on the radio-wave propagation environment, so that the quality of data transmission is improved and the data transmission rate is increased.

As discussed above, according to the present invention, when the communication method is used, which multiplexes modulation signals of a plurality of channels to the same frequency band, a receiver transmits the information of an estimated radio-wave propagation environment to a transmitter. The transmitter then selects a communication method based on the information. Multiplexing modulation signals of a plurality of channels to the same frequency band by using the foregoing method can increase the data transmission rate. At the same time, a radio communication apparatus of the present invention can advantageously demultiplex the multiplexed modulation signals received with ease.

DETAILED DESCRIPTION

Exemplary embodiments of the present invention are demonstrated hereinafter with reference to the accompanying drawings. In the following descriptions, "antenna" does not always mean a single antenna, but "antenna" means an antenna unit which is formed of a plurality of antennas.

Exemplary Embodiment 1

In a transmission method where modulation signals of a plurality of channels are multiplexed to the same frequency band, at the time when a demodulation symbol is inserted in a channel, in another channel symbol, the same phase and quadrature signals in the in-phase-quadrature plane are made to be zero signals. The foregoing method and a transmission apparatus as well as a reception apparatus employed in the method are described in this first embodiment.

Figure 1:
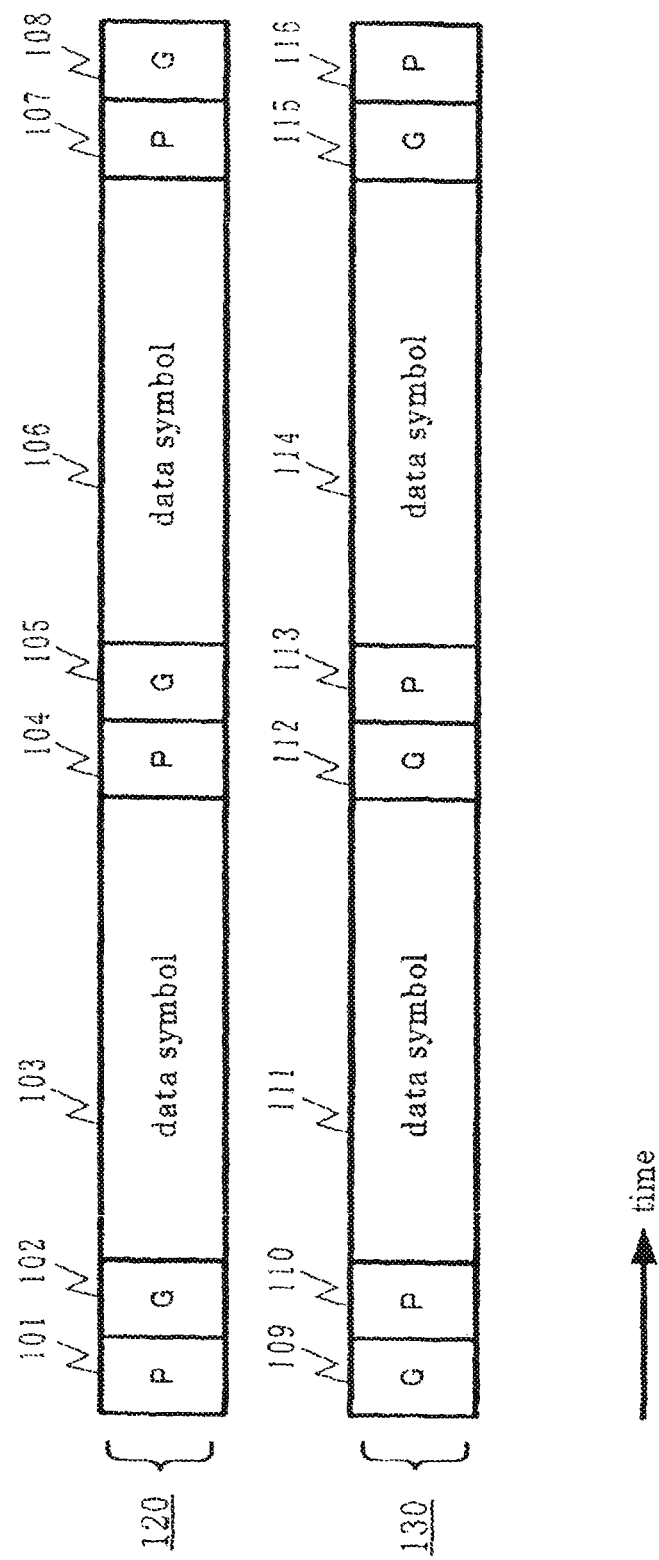
FIG. 1 shows frame structures of channel A and channel B in accordance with a first exemplary embodiment of the present invention.

FIG. 1 shows frame structure 120 of channel A and frame structure 130 of channel B along a time axis. Channel A has pilot symbols 101, 104, 107, guard symbols 102, 105, 108, and data symbol 103, 106. Data symbols, for instance, have undergone QPSK (quadrature phase shift keying) modulation. Channel B has guard symbols 109, 112, 115, pilot symbols 110, 113, 116, and data symbols 111, 114. Data symbols, for instance, have undergone QPSK modulation.

Pilot symbol 101 of channel A and guard symbol 109 of channel B are placed at an identical time, and the following combinations are placed at an identical time respectively:

guard symbol 102 of channel A and pilot symbol 110 of channel B;

data symbol 103 of channel A and data symbol 111 of channel B;

pilot symbol 104 of channel A and guard symbol 112 of channel B;

guard symbol 105 of channel A and pilot symbol 113 of channel B;

data symbol 106 of channel A and data symbol 114 of channel B;

pilot symbol 107 of channel A and guard symbol 115 of channel B;

guard symbol 108 of channel A and pilot symbol 116 of channel B.

Figure 2:
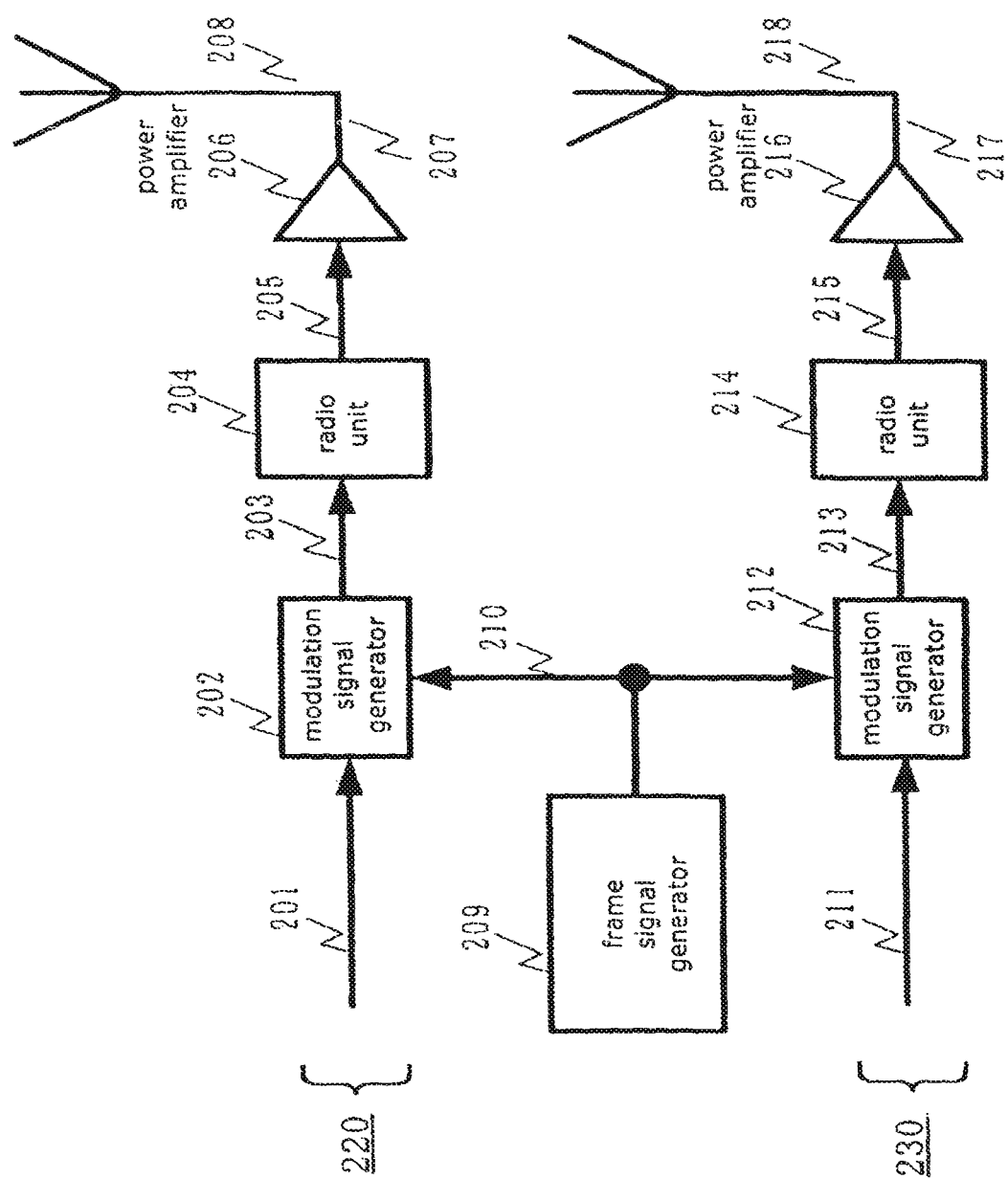
FIG. 2 shows a structure of a transmission apparatus in accordance with the first exemplary embodiment of the present invention.

FIG. 2 shows a structure of a transmission apparatus of this first embodiment, and the apparatus is formed of channel A transmitter 220, channel B transmitter 230, and frame structure signal generator 209. Channel A transmitter 220 is formed of modulation signal generator 202, radio unit 204, power amplifier 206, and antenna 208. Channel B transmitter 230 is formed of modulation signal generator 212, radio unit 214, power amplifier 216, and antenna 218.

Modulation signal generator 202 of channel A receives frame structure signal 210 and transmission digital signal 201 of channel A, and outputs modulation signal 203 in accordance with the frame structure.

Radio unit 204 of channel A receives modulation signal 203 of channel A, and outputs transmission signal 205 of channel A.

Power amplifier 206 of channel A receives transmission signal 205 of channel A, amplifies signal 205, and outputs transmission signal 207 of channel A as radio wave from antenna 208 of channel A.

Frame structure signal generator 209 outputs frame structure signal 210.

Modulation signal generator 212 of channel B receives frame structure signal 210 and transmission digital signal 211 of channel B, and outputs modulation signal 213 in accordance with the frame structure.

Radio unit 214 of channel B receives modulation signal 213 of channel B, and outputs transmission signal 215 of channel B.

Power amplifier 216 of channel B receives transmission signal 215 of channel B, amplifies signal 215, and outputs transmission signal 217 of channel B as radio wave from antenna 218 of channel B.

Figure 3:
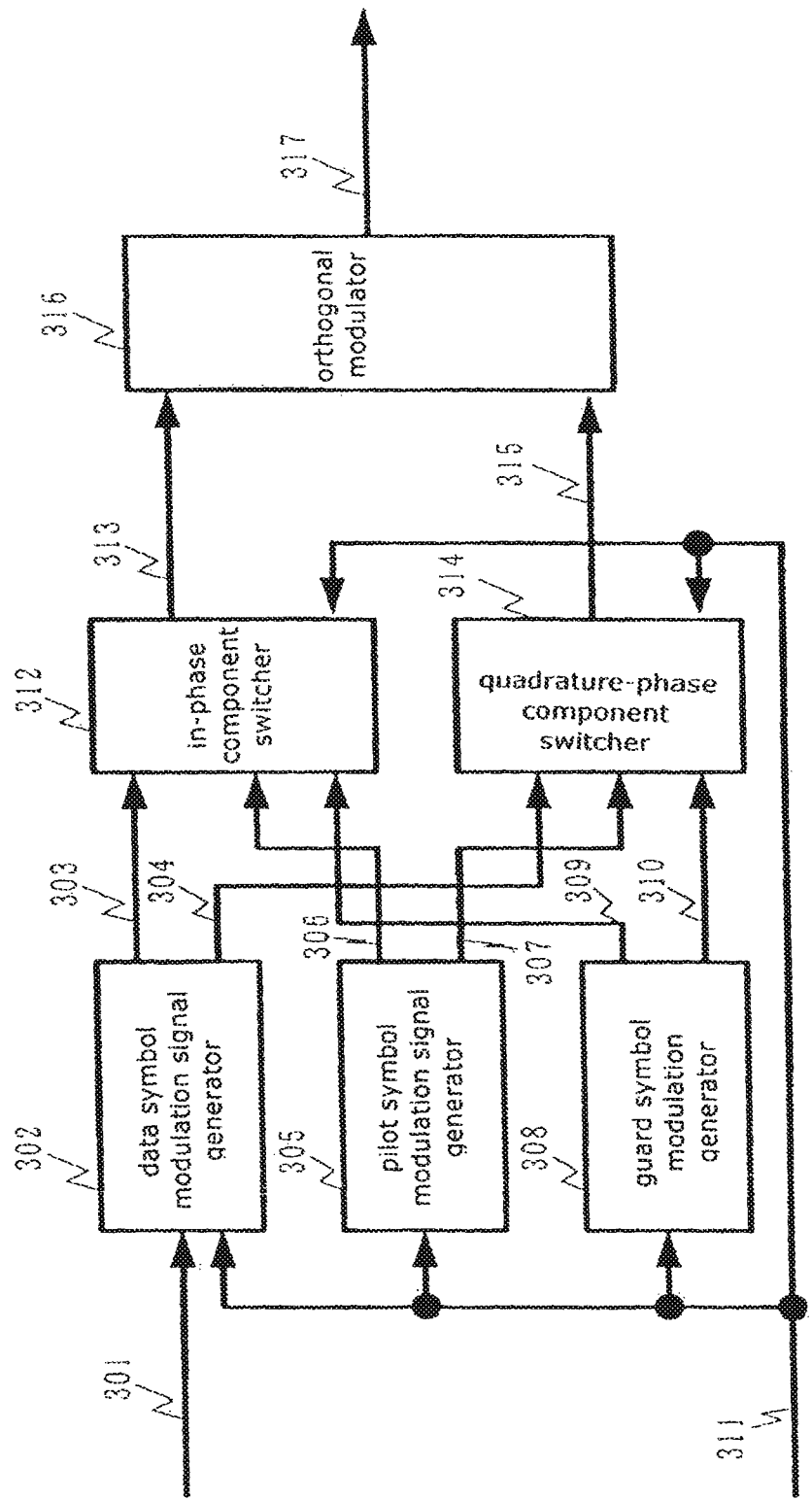
FIG. 3 shows a structure of a modulation signal generator in accordance with the first exemplary embodiment of the present invention.

FIG. 3 shows a detailed structure of modulation signal generators 202, 212 shown in FIG. 2. Data symbol modulation signal generator 302 receives transmission digital signal 301 and frame structure signal 311. When frame structure signal 311 indicates a data symbol, generator 302 provides signals 301 with QPSK modulation, and outputs in-phase component 303 and quadrature-phase component 304 of a transmission quadrature baseband signal of the data symbol.

Pilot symbol modulation signal generator 305 receives frame structure signal 311. When signal 311 indicates a pilot symbol, generator 305 outputs in-phase component 306 and quadrature-phase component 307 of a transmission quadrature baseband signal of the pilot symbol.

Guard symbol modulation generator 308 receives frame structure signal 311. When signal 311 indicates a guard symbol, generator 308 outputs in-phase component 309 and quadrature-phase component 310 of a transmission quadrature baseband signal of the guard symbol.

In-phase component switcher 312 receives in-phase components 303, 306, 309 and frame structure signal 311, then selects the in-phase component of transmission quadrature baseband signal corresponding to a symbol indicated by frame structure signal 311, and outputs the selected one as in-phase component 313 of the selected transmission quadrature baseband signal.

Quadrature-phase component switcher 314 receives quadrature-phase components 304, 307, 310, and frame structure signal 311, then selects a quadrature-phase component of a transmission quadrature baseband signal corresponding to a symbol indicated by frame structure signal 311, and outputs the selected one as quadrature-phase component 315 of the selected transmission quadrature baseband signal.

Orthogonal modulator 316 receives in-phase component 313 selected, quadrature-phase component 315 selected, then provides those components 313, 315 with orthogonal modulation, and outputs modulation signal 317.

Figure 4:
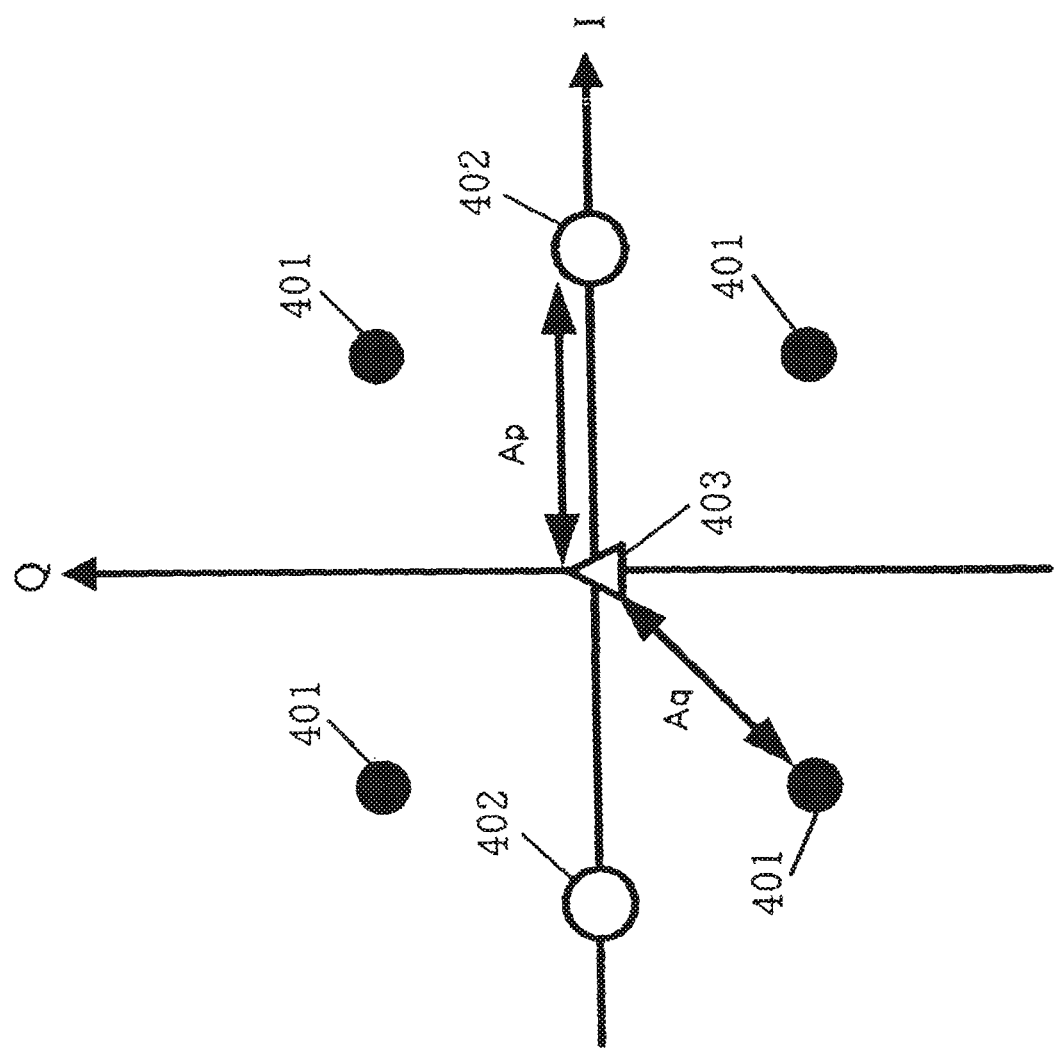
FIG. 4 shows a point mapping of signals in in-phase-quadrature plane in accordance with the first exemplary embodiment of the present invention.

FIG. 4 shows point-placement of signals of QPSK (data symbol), pilot symbol, guard symbol, such as QPSK signal-point 401, pilot symbol signal-point 402, and guard symbol signal-point 403.

Figure 5:
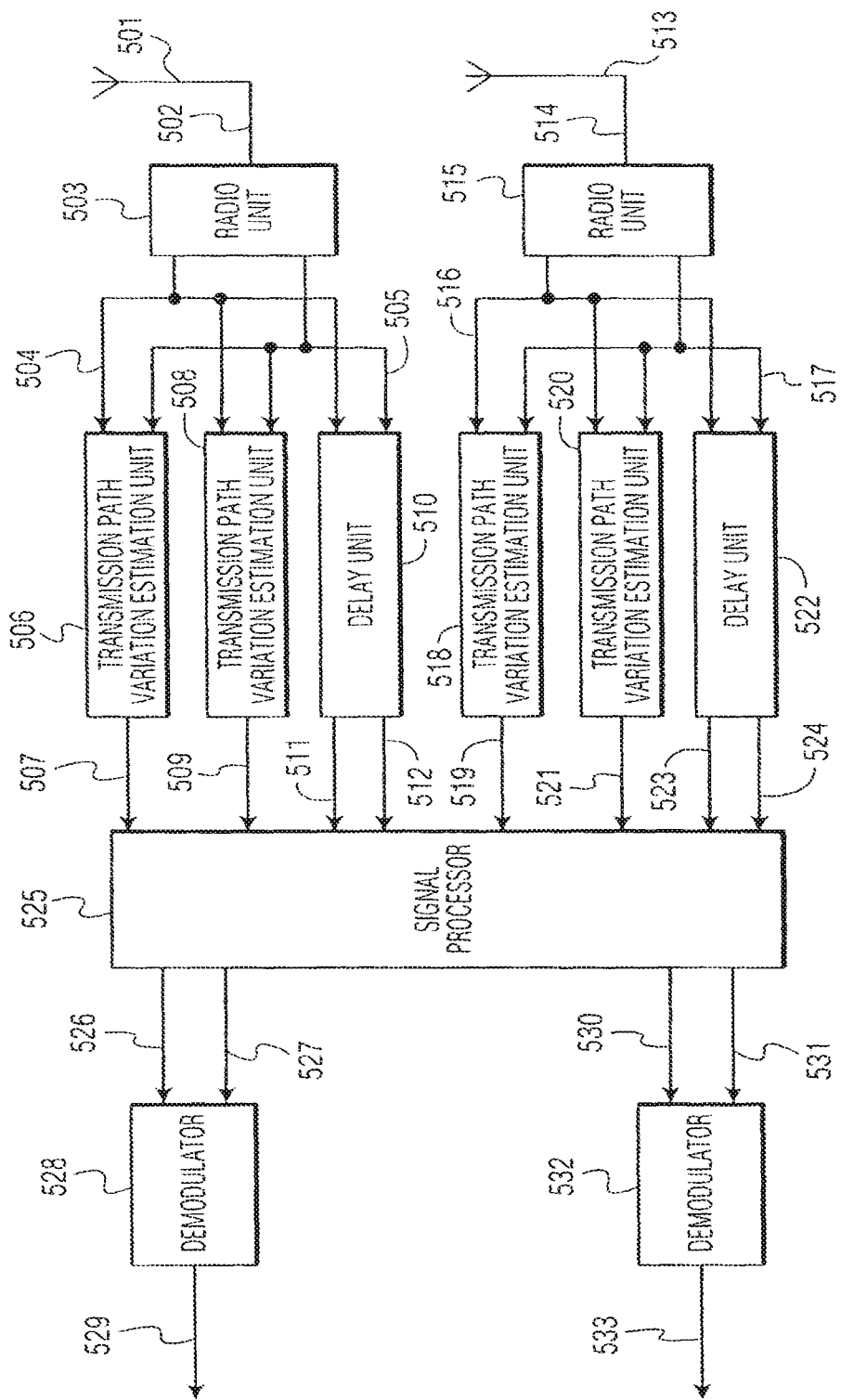
FIG. 5 shows a structure of a reception apparatus in accordance with the first exemplary embodiment of the present invention.

FIG. 5 shows a structure of a reception apparatus in accordance with the first embodiment. Radio unit 503 receives signal 502 received by antenna 501, and outputs in-phase component 504 and quadrature-phase component 505 of reception quadrature baseband signal.

Transmission path variation estimation unit 506 of channel A receives reception quadrature baseband signals 504, 505, then estimates a transmission path variation of channel A, and outputs transmission path variation estimation signal 507 of channel A.

Transmission path variation estimation unit 508 of channel B receives reception quadrature baseband signals 504, 505, then estimates a transmission path variation of channel B, and outputs transmission path variation estimation signal 509 of channel B.

Delay unit 510 receives in-phase component 504 and quadrature-phase component 505 of the reception quadrature baseband signal, and outputs in-phase component 511 and quadrature-phase component 512 of the reception quadrature baseband signal which delays by the time needed for obtaining transmission path variation estimation signals 507 and 509 of channel A and channel B.

Radio unit 515 receives signal 514 received by antenna 513, and outputs in-phase component 516 and quadrature-phase component 517 of the reception quadrature baseband signal.

Transmission path variation estimation unit 518 of channel A receives reception quadrature baseband signals 516 and 517, then estimates a transmission path variation of channel A, and outputs transmission path variation estimation signal 519 of channel A.

Transmission path variation estimation unit 520 of channel B receives reception quadrature baseband signals 516 and 517, then estimates a transmission path variation of channel B, and outputs transmission path variation estimation signal 521 of channel B.

Delay unit 522 receives in-phase component 516 and quadrature-phase component 517 of the reception quadrature baseband signal, and outputs in-phase component 523 and quadrature-phase component 524 of the reception quadrature baseband signal which delays by the time needed for obtaining transmission path variation estimation signals 519 and 521 of channel A and channel B.

Signal processor 525 receives the following signals:
transmission path variation estimation signal 507 of channel A;
transmission path variation estimation signal 509 of channel B;
in-phase component 511 and quadrature-phase component 512 of delayed reception quadrature baseband signal;
transmission path variation estimation signal 519 of channel A;
transmission path variation estimation signal 521 of channel B; and
in-phase component 523 and quadrature-phase component 524 of delayed reception quadrature baseband signal.

Then signal processor 525 outputs the following signals:
in-phase component 526 and quadrature-phase component 527 of reception quadrature baseband signal of channel A; and
in-phase component 530 and quadrature-phase component 531 of reception quadrature baseband signal of channel B.

Demodulator 528 receives in-phase component 526 and quadrature-phase component 527 of reception quadrature baseband signal of channel A, then demodulates those components, and outputs reception digital signal 529 of channel A.

Demodulator 532 receives in-phase component 530 and quadrature-phase component 531 of reception quadrature baseband signal of channel B, then demodulates those components, and outputs reception digital signal 533 of channel B.

Figure 6:
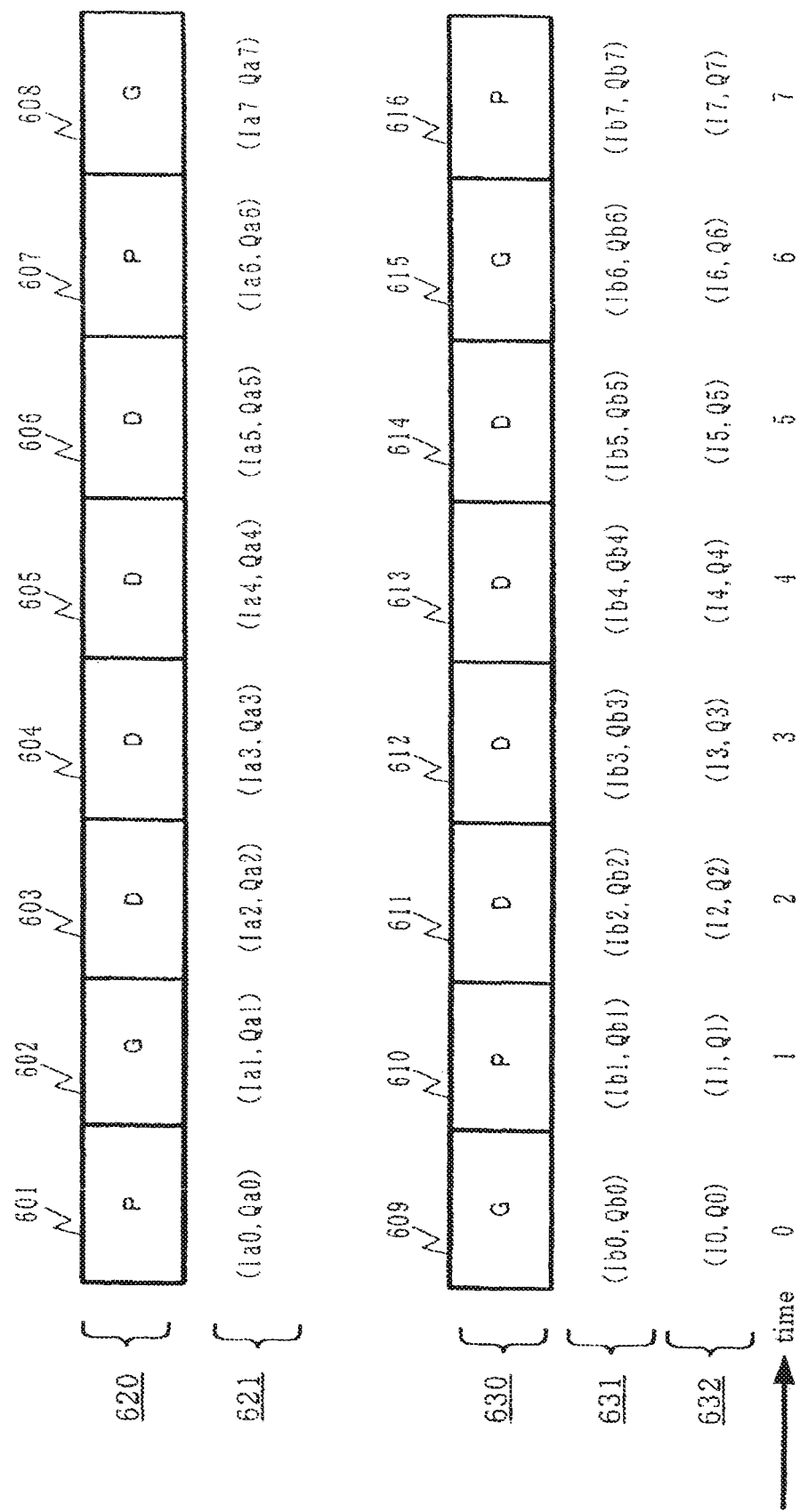
FIG. 6 shows relations between symbols, transmission path variations and reception quadrature baseband signals in accordance with the first exemplary embodiment of the present invention.

FIG. 6 shows relation between a frame structure 620 of channel A and a frame structure 630 of channel B, symbols 601-616 of each channel at certain times, transmission path variations 621 and 631 of channels A and B, and reception quadrature baseband signal 632. Channel A has the following symbols: pilot symbols 601, 607; guard symbols 602, 608; data symbols 603, 604, 605, and 606. Channel B has the following symbols: guard symbols 609, 615; pilot symbols 610, 616; data symbols 611, 612, 613, and 614.

Pilot symbol 601 of channel A and guard symbol 609 of channel B occur at time 0, and the following combinations occur at time 1, time 2, time 3, time 4, time 5, time 6, and time 7 respectively:

guard symbol 602 of channel A and pilot symbol 610 of channel B;
data symbol 603 of channel A and data symbol 611 of channel B;
data symbol 604 of channel A and data symbol 612 of channel B;
data symbol 605 of channel A and data symbol 613 of channel B;
data symbol 606 of channel A and data symbol 614 of channel B;
pilot symbol 607 of channel A and guard symbol 615 of channel B;
guard symbol 608 of channel A and pilot symbol 616 of channel B.

Figure 7:
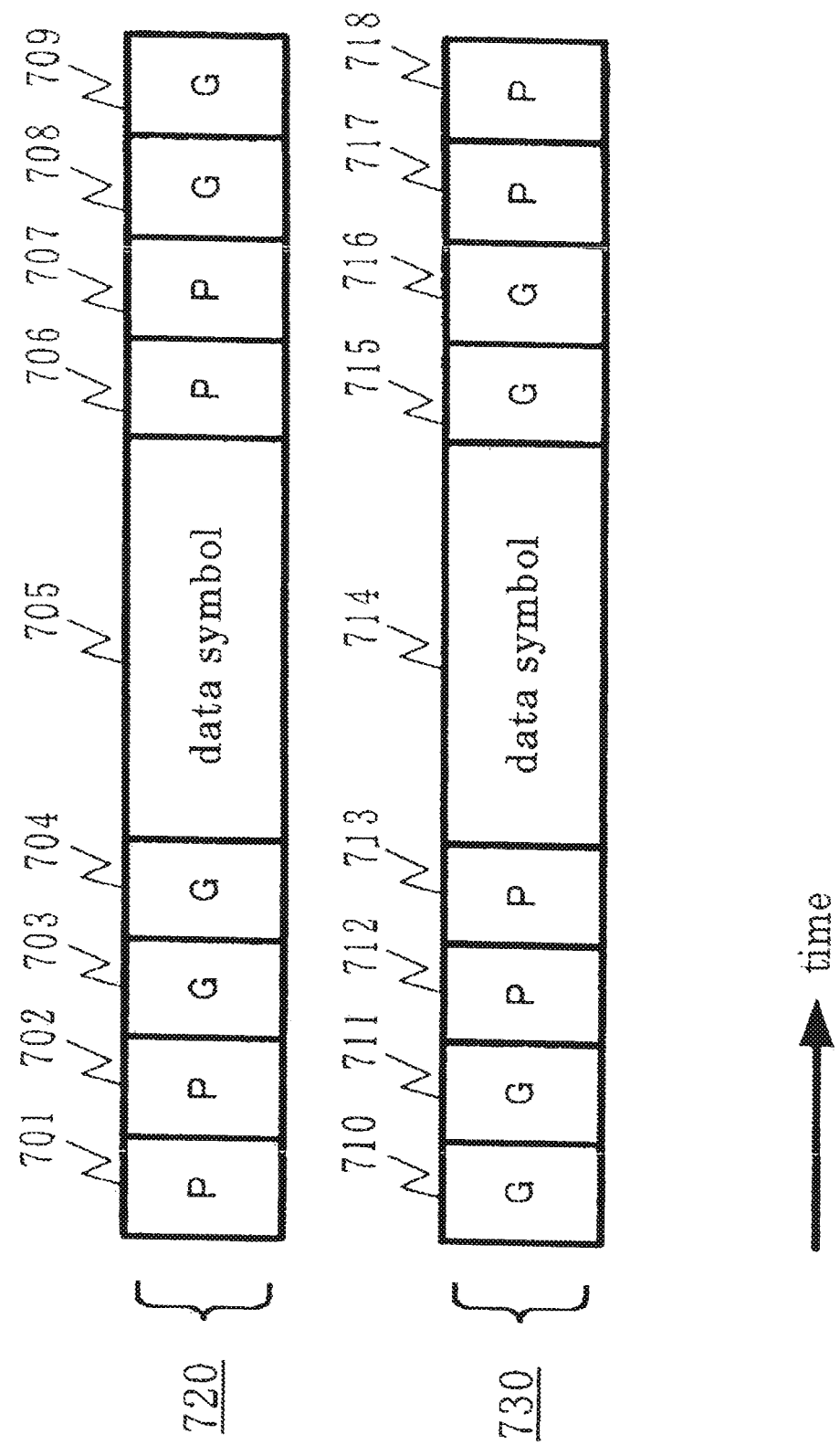
FIG. 7 shows frame structures of channel A and channel B in accordance with the first exemplary embodiment of the present invention.

FIG. 7 shows a structure of channel A frame 720 and a structure of channel B frame 730 along a time axis. Channel A has the following symbols: pilot symbols 701, 702, 706, 707; guard symbols 703, 704, 708, 709; and data symbol 705. Channel B has the following symbols: guard symbols 710, 711, 715, 716; pilot symbols 712, 713, 717, 718; and data symbol 714. Data symbol 705 of channel A and data symbol 714 of channel B have undergone QPSK modulation.

Pilot symbol 701 of channel A and guard symbol 710 of channel B occur at an identical time, and the following combinations occur at an identical time respectively:

pilot symbol 702 of channel A and guard symbol 711 of channel B;

guard symbol 703 of channel A and pilot symbol 712 of channel B;

guard symbol 704 of channel A and pilot symbol 713 of channel B;

data symbol 705 of channel A and data symbol 714 of channel B;

pilot symbol 706 of channel A and guard symbol 715 of channel B;

pilot symbol 707 of channel A and guard symbol 716 of channel B;

guard symbol 708 of channel A and pilot symbol 717 of channel B;

guard symbol 709 of channel A and pilot symbol 718 of channel B.

An operation of the transmission apparatus is demonstrated hereinafter with reference to FIG. 1 through FIG. 4. In FIG. 2, frame structure signal generator 209 outputs the information of the frame structure shown in FIG. 1 as frame structure signal 210. Modulation signal generator 202 of channel A receives frame structure signal 210 and transmission digital signal 201 of channel A, then outputs modulation signal 203 of channel A in accordance with the frame structure. Modulation signal generator 212 of channel B receives frame structure signal 210 and transmission digital signal 211 of channel B, then outputs modulation signal 213 of channel B in accordance with the frame structure.

An operation of modulation signal generators 202 and 212 in the process discussed above is described using transmitter 220 of channel A as an example with reference to FIG. 3.

Data symbol modulation signal generator 302 receives transmission digital signal 301, i.e. transmission digital signal 201 of channel A in FIG. 2, and frame structure signal 311, i.e. frame structure signal 210 in FIG. 2. When frame structure signal 311 indicates a data symbol, generator 302 provides signal 201 with QPSK modulation, and outputs in-phase component 303 and quadrature-phase component 304 of a transmission quadrature baseband signal of the data symbol.

Pilot symbol modulation signal generator 305 receives frame structure signal 311. When signal 311 indicates a pilot symbol, generator 305 outputs in-phase component 306 and quadrature-phase component 307 of a transmission quadrature baseband signal of the pilot symbol.

Guard symbol modulation signal generator 308 receives frame structure signal 311. When signal 311 indicates a guard symbol, generator 308 outputs in-phase component 309 and quadrature-phase component 310 of a transmission quadrature baseband signal of the guard symbol.

FIG. 4 shows signal-point placement of the respective symbols in an in-phase-quadrature plane of the foregoing operation. Points 401 in FIG. 4 indicate the signal-points of in-phase component 303 and quadrature-phase component 304 of the transmission quadrature baseband signal of the data symbol. Points 402 indicate the signal-points of in-phase component 306 and quadrature-phase component 307 of the transmission quadrature baseband signal of the pilot symbol. Point 403 indicates the signal-points of in-phase component 309 and quadrature-phase component 310 of the transmission quadrature baseband signal of the guard symbol.

In-phase component switcher 312 receives the following signals:

in-phase component 303 of data symbol transmission quadrature baseband signal;

in-phase component 306 of pilot symbol transmission quadrature baseband signal;

in-phase component 309 of guard symbol transmission quadrature baseband signal; and frame structure signal 311.

Switcher 312 then selects an in-phase component of a transmission quadrature baseband signal corresponding to the symbol indicated by frame structure signal 311, and outputs the selected one as in-phase component 313 of the selected transmission quadrature baseband signal.

Quadrature-phase component switcher 314 receives the following signals:

quadrature-phase component 304 of data symbol transmission quadrature baseband signal;

quadrature-phase component 307 of pilot symbol transmission quadrature baseband signal;

quadrature-phase component 310 of guard symbol transmission quadrature baseband signal; and frame structure signal 311.

Switcher 314 then selects a quadrature-phase component of a transmission quadrature baseband signal corresponding to the symbol indicated by frame structure signal 311, and outputs the selected one as quadrature-phase component 315 of the selected transmission quadrature baseband signal.

Orthogonal modulator 316 receives in-phase component 313 and quadrature-phase component 315 discussed above, then provides those components with an orthogonal modulation, and outputs modulation signal 317, i.e. signal 203 shown in FIG. 2.

An operation of the reception apparatus, in particular, of transmission path variation estimation unit 506 of channel A, transmission path variation estimation unit 508 of channel B, and signal processor 525, with reference to FIG. 5 and FIG. 6.

In-phase component 504 and quadrature-phase component 505 of reception quadrature baseband signal of the signal received by antenna 501 shown in FIG. 5 are taken as examples for description with reference to FIG. 6.

In FIG. 6, at time 0 (zero), pilot symbol 601 of channel A and guard symbol 609 of channel B are multiplexed together. Assume that in-phase component 504 and quadrature-phase component 505 of the reception quadrature baseband signal are I0 and Q0 respectively, and the transmission path variation of channel A and that of channel B are (Ia0, Qa0) and (Ib0, Qb0) respectively. Since the transmission apparatus transmits 0 (zero) at the guard symbol of channel B, in-phase component 504 and quadrature-phase component 505 of the reception quadrature baseband signal, namely, I0 and Q0, are formed of the component of pilot symbol 601 of channel A. Therefore, the transmission path variation of channel A, namely, (Ia0, Qa0) can be estimated as (I'0, Q'0) based on in-phase component 504 and quadrature-phase component 505, namely, I0 and Q0.

However, the estimation of the transmission path variation of channel A, namely, (Ia0, Qa0), is not limited to the case discussed above, but a pilot symbol of channel A at another time can be used for finding (Ia0, Qa0) of channel A at time 0.

In a similar manner to what is discussed above, at time 1, guard symbol 602 of channel A and pilot symbol 610 of channel B are multiplexed together. Assume that in-phase component 504 and quadrature-phase component 505 of the reception quadrature baseband signal are I1 and Q1 respectively, and the transmission path variation of channel A and that of channel B are (Ia1, Qa1) and (Ib1, Qb1) respectively. Since the transmission apparatus transmits 0 (zero) at the guard symbol of channel A, in-phase component 504 and quadrature-phase component 505 of the reception quadrature baseband signal, namely, I1 and Q1, are formed of the component of pilot symbol 610 of channel B. Therefore, the transmission path variation of channel B, namely, (Ib1, Qb1) can be estimated as (I'1, Q'1) based on in-phase component 504 and quadrature-phase component 505, namely, I1 and Q1. However, the estimation of the transmission path variation of channel B, namely, (Ib1, Qb1), is not limited to the case discussed above, but a pilot symbol of channel B at another time can be used for finding (Ib1, Qb1) of channel B at time 1.

In a similar manner to what is discussed above, at time 6, pilot symbol 607 of channel A and guard symbol 615 of channel B are multiplexed together. Assume that in-phase component 504 and quadrature-phase component 505 of the reception quadrature baseband signal are I6 and Q6 respectively, and the transmission path variation of channel A and that of channel B are (Ia6, Qa6) and (Ib6, Qb6). Since the transmission apparatus transmits 0 at the guard symbol of channel B, in-phase component 504 and quadrature-phase component 505 of the reception quadrature baseband signal, namely, I6 and Q6, are formed of the component of pilot symbol 607 of channel A.

Therefore, the transmission path variation of channel A, namely, (Ia6, Qa6) can be estimated as (I'6, Q'6) based on in-phase component 504 and quadrature-phase component 505, namely, I6 and Q6. However, the estimation of the transmission path variation of channel A, namely, (Ia6, Qa6), is not limited to the case discussed above, but a pilot symbol of channel A at another time can be used for finding (Ia6, Qa6) of channel A at time 6.

In a similar manner to what is discussed above, at time 7, guard symbol 608 of channel A and pilot symbol 616 of channel B are multiplexed together. Assume that in-phase component 504 and quadrature-phase component 505 of the reception quadrature baseband signal are I7 and Q7 respectively, and the transmission path variation of channel A and that of channel B are (Ia7, Qa7) and (Ib7, Qb7). Since the transmission apparatus transmits 0 (zero) at the guard symbol of channel A, in-phase component 504 and quadrature-phase component 505 of the reception quadrature baseband signal, namely, I7 and Q7, are formed of the component of pilot symbol 610 of channel B.

Therefore, the transmission path variation of channel B, namely, (Ib7, Qb7) can be estimated as (I'7, Q'7) based on in-phase component 504 and quadrature-phase component 505, namely, I7 and Q7. However, the estimation of the transmission path variation of channel B, namely, (Ib7, Qb7), is not limited to the case discussed above, but a pilot symbol of channel B at another time can be used for finding (Ib7, Qb7) of channel B at time 7.

Assume that the transmission path variations at time 2, time 3, time 4, and time 5 are (Ia2, Qa2), (Ia3, Qa3), (Ia4, Qa4), (Ia5, Qa5). Those values can be found using the estimations discussed above, i.e. (Ia0, Qa0)=(I'0, Q'0), (Ia6, Qa6)=(I'6, Q'6), by, e.g. calculation. However, in order to find (Ia2, Qa2), (Ia3, Qa3), (Ia4, Qa4), and (Ia5, Qa5), pilot symbols at another time of channel A can be used other than (Ia0, Qa0) and (Ia6, Qa6).

In a similar way to what is discussed above, assume the transmission path variation at time 2, time 3, time 4, and time 5 are (Ib2, Qb2), (Ib3, Qb3), (Ib4, Qb4), (Ib5, Qb5). Those values can be found using the estimations previously discussed, i.e. (Ib1, Qb1)=(I'1, Q'1), (Ib7, Qb7)=(I'7, Q'7), by, e.g. calculation. However, to find (Ib2, Qb2), (Ib3, Qb3), (Ib4, Qb4), and (Ib5, Qb5), pilot symbols at another time of channel B can be used other than (Ib1, Qb1) and (Ib7, Qb7).

The preparation discussed above allows transmission path variation estimation unit 506 of channel A to output, e.g. the foregoing (Ia0, Qa0), (Ia1, Qa1), (Ia2, Qa2), (Ia3, Qa3), (Ia4, Qa4), (Ia5, Qa5), (Ia6, Qa6), and (Ia7, Qa7) as transmission path variation estimation signals 507 of channel A.

In a similar way to the case of channel A, transmission path variation estimation unit 508 of channel B outputs, e.g. the foregoing (Ib0, Qb0), (Ib1, Qb1), (Ib2, Qb2), (Ib3, Qb3), (Ib4, Qb4), (Ib5, Qb5), (Ib6, Qb6), and (Ib7, Qb7) as transmission path variation estimation signals 509 of channel B.

The foregoing description expresses the transmission path variation in (I, Q); however, the distortion can be expressed in power and phase, so that estimation signals 507 and 509 can be expressed in power and phase.

In a similar way to what is discussed above, transmission path variation estimation unit 518 of channel A receives in-phase component 516 and quadrature-phase component 517 of a reception quadrature baseband signal of a signal received by antenna 513 shown in FIG. 5. Then estimation unit 518 outputs estimation signal 519 of channel A. Estimation unit 520 of channel B outputs estimation signal 521 of channel B.

Signal processor 525 receives the following signals:

transmission path variation estimation signal 507 of channel A;

transmission path variation estimation signal 509 of channel B;

transmission path variation estimation signal 519 of channel A;

transmission path variation estimation signal 521 of channel B;

in-phase component 511 and quadrature-phase component 512 of delayed reception quadrature baseband signal; and in-phase component 523 and quadrature-phase component 524 of delayed reception quadrature baseband signal.

Signal processor 525 carries out matrix calculations with those known signals, so that unknown signals such as a reception quadrature baseband signal of channel A and that of channel B can be found. Signal processor 525 thus outputs those unknown signals as in-phase component 526 and quadrature-phase component 527 of the reception quadrature baseband signal of channel A, and in-phase component 530 and quadrature-phase component 531 of that of channel B. As a result, modulation signals of channels A and B can be demultiplexed from each other, which allows demodulation.

In this embodiment, an accuracy of demultiplexing the modulation signals between channel A and channel B at the reception apparatus depends on a quality of the pilot symbol received. Thus stronger resistance of the pilot symbol to noise increases the accuracy of demultiplexing between the modulation signals of channel A and channel B. As a result, the quality of data received can be improved. The way of achieving this goal is described hereinafter.

In FIG. 4, assume that the pilot symbol has amplitude Ap from the origin, and QPSK has the greatest signal-point amplitude Aq from the origin. In this status, the relation of Ap>Aq increases the resistance to noise of the pilot symbol, so that the accuracy of demultiplexing the modulation signals of channel A from those of channel B. As a result, the quality of data received can be improved.

As shown in FIG. 7, the frame of channel A includes pilot symbols 701, 702, and 706, 707. The frame of channel B includes pilot symbol 712, 713, and 717, 718. Those pilot symbols are placed in series along the time axis, so that the pilot symbols become stronger to noises. Thus the accuracy of the demultiplexing the modulation signals between channel A and channel B. As a result, the quality of data received is improved. This is not limited to two symbols in series as shown in FIG. 7.

In this embodiment, the number of channels to be multiplexed are two; however, other numbers can be applicable to the embodiment. The frame structure is not limited to what is shown in FIG. 1, FIG. 6 or FIG. 7. The pilot symbol is taken as an example for demultiplexing the channels; however, other symbols as long as they are used for demodulation can be also applicable. In this case, the symbols for demodulation include, e.g. pilot symbol, unique word, synchronous symbol, preamble symbol, control symbol, tail symbol, control symbol, known PSK (phase shift keying) modulation symbol, and PSK modulation symbol added with data.

A modulation method of the data symbol is not limited to QPSK modulation, but respective channels can undergo different modulations. On the other hand, all the channels can use the spread spectrum communication method. The spread spectrum communication method can coexist with the other methods.

The structure of the transmission apparatus of this embodiment is not limited to what is shown in FIG. 2 or FIG. 3, and when the number of channels increase, elements 201 through 208 shown in FIG. 2 are added accordingly.

The structure of the reception apparatus of this embodiment is not limited to what is shown in FIG. 5, and when the number of channels increase, the number of channel estimation units increases accordingly.

The expression of "antenna" in the previous description does not always mean a single antenna, but "antenna" can mean an antenna unit which is formed of a plurality of antennas.

In this embodiment, the transmission path variation estimation unit of each channel estimates the transmission path variation; however, an estimation of transmission path fluctuation instead of distortion can achieve a similar advantage to what is discussed in this embodiment. In this case, a transmission path fluctuation estimation unit for estimating fluctuations of the transmission path is used instead of the distortion estimation unit. The output signal should be a fluctuation estimation signal accordingly.

According to the first embodiment discussed above, in a transmission method for transmitting modulation signals of a plurality of channels to the same frequency band, at the time when a demodulation symbol is inserted in a channel, in another channel symbol, both of the same phase signal and a quadrature signal in the in-phase-quadrature plane are made to be zero signals. Use of this method, a transmission apparatus and a reception apparatus to which this method is applicable, allows the transmission rate of data to increase, and allows the reception apparatus to demultiplex the multiplexed modulation signal with ease.

Exemplary Embodiment 2

In this second embodiment, a reception apparatus is described. The reception apparatus comprising the following elements:

a received signal strength intensity estimation unit for estimating a reception received signal strength intensity of a signal received by respective antennas and outputting an estimation signal of the reception received signal strength intensity of the reception signal;

a phase difference estimation unit for receiving a transmission path variation estimation signal of a channel of the respective antennas, finding a phase difference of the transmission path variation estimation signal between the respective antennas, and outputting a phase difference signal; and a signal selection unit for receiving a reception quadrature baseband signal of the respective antennas, a transmission path variation estimation signal of each channel of the respective antennas, a reception electric field estimation signal of the reception signal, the phase difference signal, then selecting the reception quadrature baseband signal and the transmission path variation estimation signal for isolating signals of the respective channels from the reception signal, and outputting the signals selected.

The description refers to the case as an example where the transmission apparatus shown in FIG. 2 transmits the modulation signals of the frame structure shown in FIG. 1 demonstrated in the first embodiment.

Figure 8:
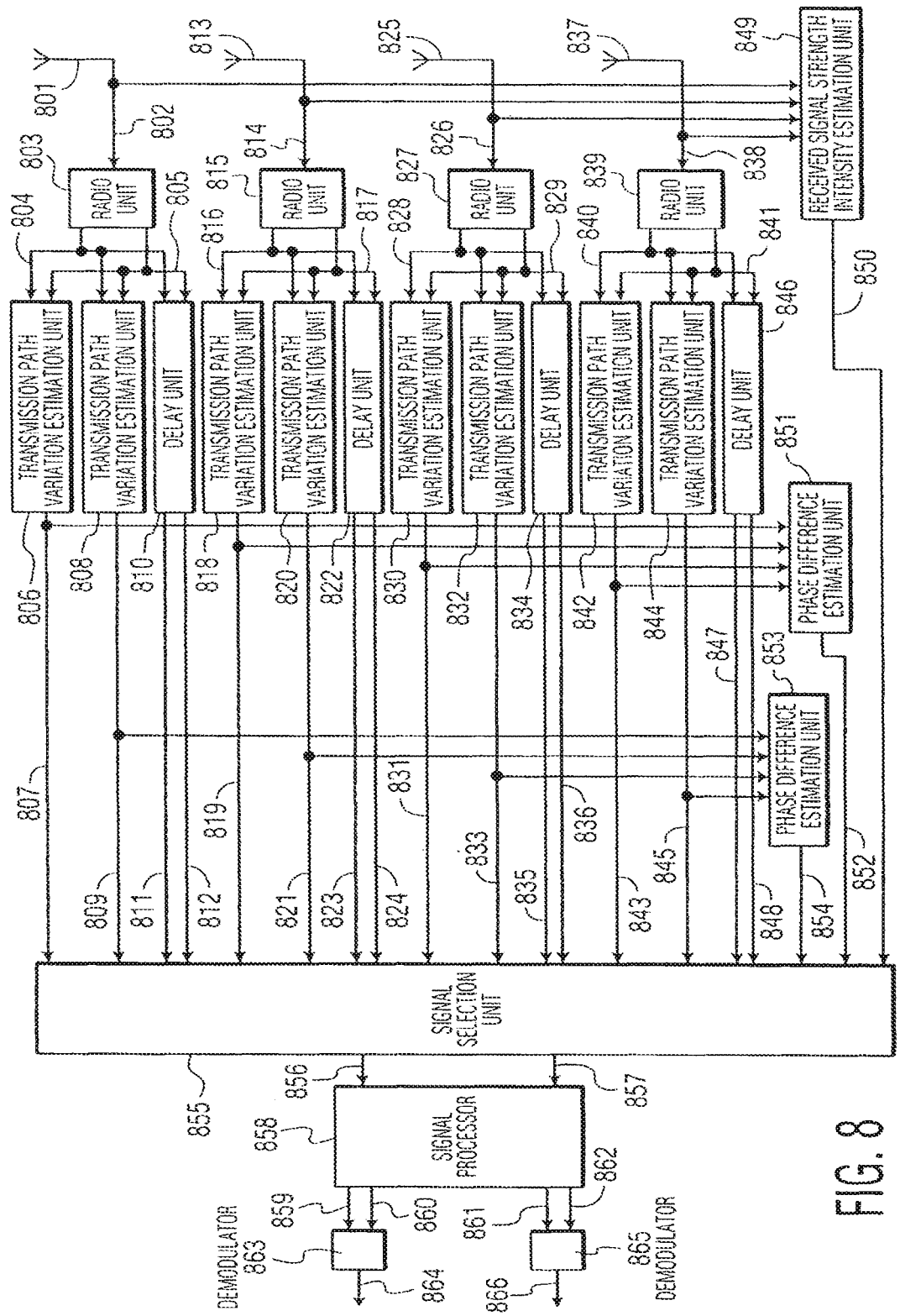
FIG. 8 shows a structure of a reception apparatus in accordance with a second exemplary embodiment of the present invention.

FIG. 8 shows a structure of the reception apparatus in accordance with the second embodiment. Radio unit 803 of this apparatus receives signal 802 received by antenna 801, and outputs in-phase component 804 and quadrature-phase component 805 of the reception quadrature baseband signal.

Transmission path variation estimation unit 806 of channel A receives in-phase component 804 and quadrature-phase component 805 of the reception quadrature baseband signal. Then estimation unit 806 operates, e.g. in a similar way to estimation unit 506 of channel A shown in FIG. 5 of the first embodiment, and outputs transmission path variation estimation signal 807 of channel A.

Transmission path variation estimation unit 808 of channel B receives in-phase component 804 and quadrature-phase component 805 of the reception quadrature baseband signal. Then estimation unit 808 operates, e.g. in a similar way to estimation unit 506 of channel A shown in FIG. 5 of the first embodiment, and outputs transmission path variation estimation signal 809 of channel B.

Delay unit 810 receives in-phase component 804 and quadrature-phase component 805 of the reception quadrature baseband signal, and outputs in-phase component 811 and quadrature-phase component 812 of the reception quadrature baseband signal which delays by the time needed for obtaining transmission path variation estimation signals 807 and 809 of channel A and channel B.

Radio unit 815 receives signal 814 received by antenna 813, and outputs in-phase component 816 and quadrature-phase component 817 of the reception quadrature baseband signal.

Transmission path variation estimation unit 818 of channel A receives in-phase component 816 and quadrature-phase component 817 of the reception quadrature baseband signal. Then estimation unit 818 operates, e.g. in a similar way to estimation unit 506 of channel A shown in FIG. 5 of the first embodiment, and outputs transmission path variation estimation signal 819 of channel A.

Transmission path variation estimation unit 820 of channel B receives in-phase component 816 and quadrature-phase component 817 of the reception quadrature baseband signal. Then estimation unit 820 operates, e.g. in a similar way to estimation unit 506 of channel A shown in FIG. 5 of the first embodiment, and outputs transmission path variation estimation signal 821 of channel B.

Delay unit 822 receives in-phase component 816 and quadrature-phase component 817 of the reception quadrature baseband signal, and outputs in-phase component 823 and quadrature-phase component 824 of the reception quadrature baseband signal which delays by the time needed for obtaining transmission path variation estimation signals 819 and 821 of channel A and channel B.

Radio unit 827 receives signal 826 received by antenna 825, and outputs in-phase component 828 and quadrature-phase component 829 of reception quadrature baseband signal.

Transmission path variation estimation unit 830 of channel A receives in-phase component 828 and quadrature-phase component 829 of the reception quadrature baseband signal. Then estimation unit 830 operates, e.g. in a similar way to estimation unit 506 of channel A shown in FIG. 5 of the first embodiment, and outputs transmission path variation estimation signal 831 of channel A.

Transmission path variation estimation unit 832 of channel B receives in-phase component 828 and quadrature-phase component 829 of the reception quadrature baseband signal. Then estimation unit 832 operates, e.g. in a similar way to estimation unit 506 of channel A shown in FIG. 5 of the first embodiment, and outputs transmission path variation estimation signal 833 of channel B.

Delay unit 834 receives in-phase component 828 and quadrature-phase component 829 of the reception quadrature baseband signal, and outputs in-phase component 835 and quadrature-phase component 836 of the reception quadrature baseband signal which delays by the time needed for obtaining transmission path variation estimation signals 831 and 833 of channel A and channel B.

Radio unit 839 receives signal 838 received by antenna 837, and outputs in-phase component 840 and quadrature-phase component 841 of reception quadrature baseband signal.

Transmission path variation estimation unit 842 of channel A receives in-phase component 840 and quadrature-phase component 841 of the reception quadrature baseband signal. Then estimation unit 842 operates, e.g. in a similar way to estimation unit 506 of channel A shown in FIG. 5 of the first embodiment, and outputs transmission path variation estimation signal 843 of channel A.

Transmission path variation estimation unit 844 of channel B receives in-phase component 840 and quadrature-phase component 841 of the reception quadrature baseband signal. Then estimation unit 844 operates, e.g. in a similar way to estimation unit 506 of channel A shown in FIG. 5 of the first embodiment, and outputs transmission path variation estimation signal 845 of channel B.

Delay unit 846 receives in-phase component 840 and quadrature-phase component 841 of the reception quadrature baseband signal, and outputs in-phase component 847 and quadrature-phase component 848 of the reception quadrature baseband signal which delays by the time needed for obtaining transmission path variation estimation signals 843 and 845 of channel A and channel B.

Received signal strength intensity estimation unit 849 receives reception signals 802, 814, 826, 838, then estimates the reception received signal strength intensity of the foregoing respective signals, and outputs the estimated values as reception received signal strength intensity estimation signal 850.

Phase difference estimation unit 851 receives transmission path variation estimation signals 807, 819, 831, 843 of channel A, then finds respective phase differences such as a phase difference between signals 807 and 819 in the in-phase-quadrature plane, and outputs the phase difference as phase difference estimation signal 852 of channel A.

In a similar way to what is done by estimation unit 851, phase difference estimation unit 853 receives transmission path variation estimation signals 809, 821, 833, 845 of channel B, then finds respective phase differences such as a phase difference between signals 809 and 821 in the in-phase-quadrature plane, and outputs the phase difference as phase difference estimation signal 854 of channel B.

Signal selection unit 855 receives the following signals:
transmission path variation estimation signal 807 of channel A;
transmission path variation estimation signal 809 of channel B;
in-phase component 811 and quadrature-phase component 812 of delayed reception quadrature baseband signal;
transmission path variation estimation signal 819 of channel A;
transmission path variation estimation signal 821 of channel B;
in-phase component 823 and quadrature-phase component 824 of delayed reception quadrature baseband signal;
transmission path variation estimation signal 831 of channel A;
transmission path variation estimation signal 833 of channel B;
in-phase component 835 and quadrature-phase component 836 of delayed reception quadrature baseband signal;
transmission path variation estimation signal 843 of channel A;
transmission path variation estimation signal 845 of channel B;
in-phase component 847 and quadrature-phase component 848 of delayed reception quadrature baseband signal;
received signal strength intensity estimation signal 850;
phase difference estimation signal 852 of channel A; and
phase difference estimation signal 854 of channel B;

Then signal selection unit 855 selects a group of signals supplied from the antenna, which can most accurately demultiplex channel A signals from channel B signals, out of received signal strength intensity estimation signal 850, phase difference estimation signal 852 of channel A, and phase difference estimation signal 854 of channel B. Signal selection unit 855 outputs signal groups 856 and 857.

The signal group here refers to, e.g. transmission path variation estimation signal 807 and estimation signal 809 of channel B estimated from the signal received by antenna 801, in-phase component 811 and quadrature-phase component 812 of the delayed reception quadrature baseband signal.

Signal processor 858 receives signal groups 856, 857, and operates in a similar way to signal processor 525 shown in FIG. 5 of the first embodiment. Signal processor 858 outputs in-phase component 859, quadrature-phase component 860 of the reception quadrature baseband signal of channel A as well as in-phase component 861, quadrature-phase component of the reception quadrature baseband signal 862 of channel B.

Demodulator 863 receives in-phase component 859 and quadrature-phase component 860 of the reception quadrature baseband signal of channel A, and outputs reception digital signal 864 of channel A.

Demodulator 865 receives in-phase component 861 and quadrature-phase component 862 of the reception quadrature baseband signal of channel B, and outputs reception digital signal 866 of channel B.

Figure 9:
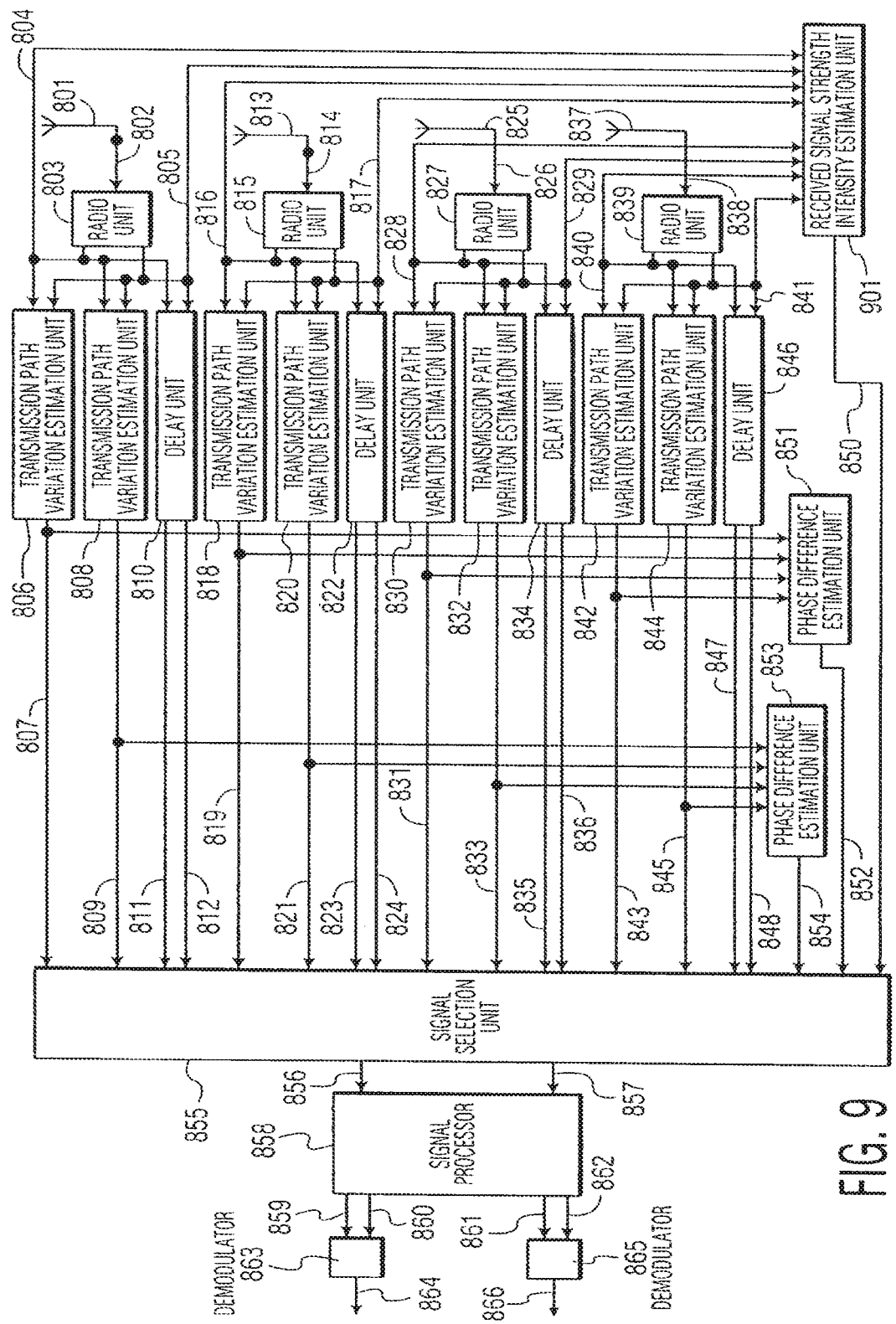
FIG. 9 shows a structure of a reception apparatus in accordance with the second exemplary embodiment of the present invention.

FIG. 9 shows a structure of the reception apparatus in accordance with the second embodiment, and the elements operating in a similar way to those shown in FIG. 8 have the same reference marks.

Received signal strength intensity estimation unit 901 receives the following signals:

in-phase component 804 and quadrature-phase component 805 of the reception quadrature baseband signal;

in-phase component 816 and quadrature-phase component 817 of the reception quadrature baseband signal:

in-phase component 828 and quadrature-phase component 829 of the reception quadrature baseband signal; and in-phase component 840 and quadrature-phase component 841 of the reception quadrature baseband signal.

Then estimation unit 901 estimates the reception received signal strength intensity of the foregoing respective components, and outputs reception received signal strength intensity estimation signal 850.

Figure 10:
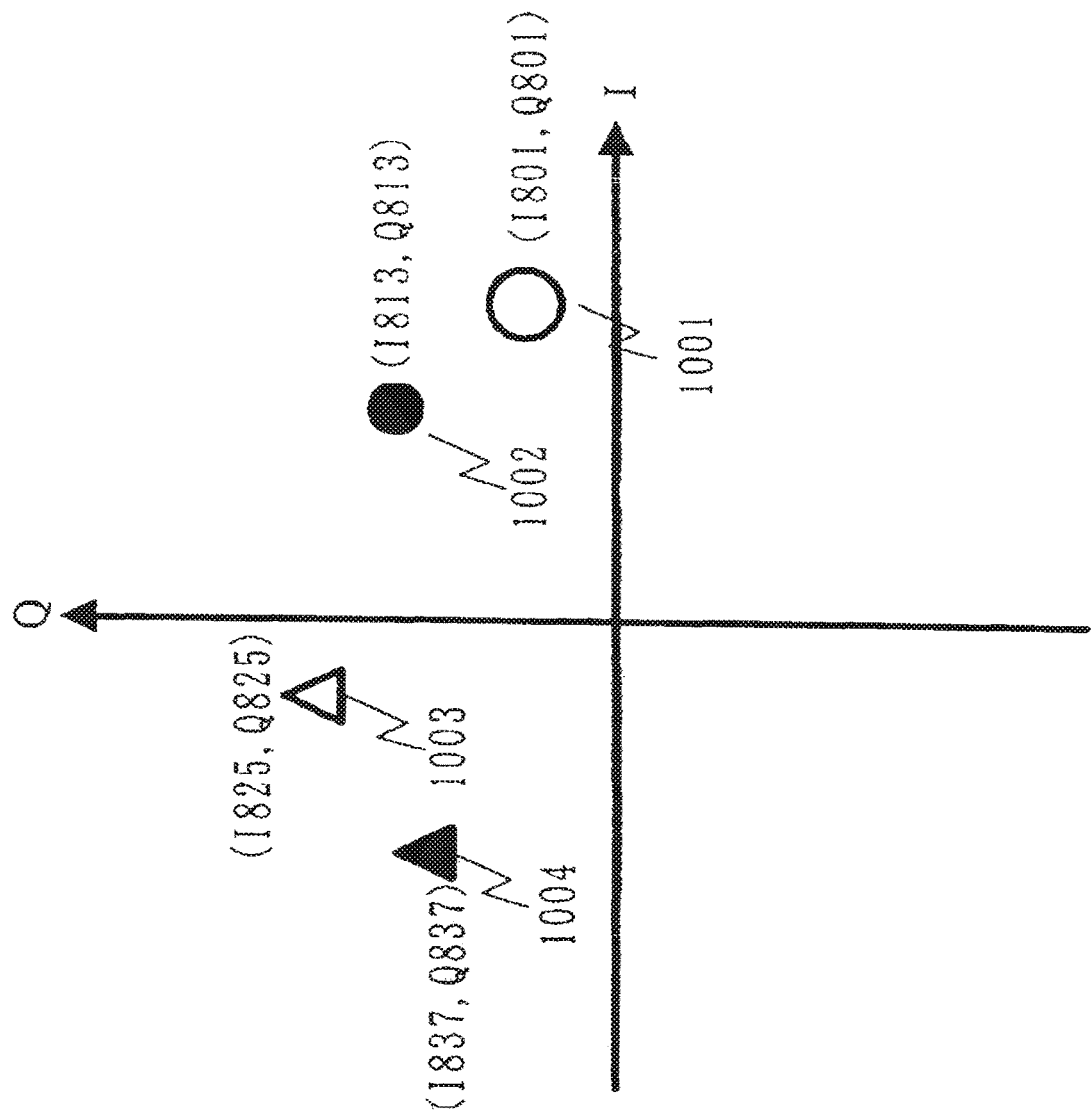
FIG. 10 shows a transmission path variation estimation signal in accordance with the second exemplary embodiment of the present invention.

FIG. 10 shows transmission path variation estimation signals of a channel in accordance with the second embodiment. The following four signals are mapped in FIG. 10:

transmission path variation estimation signal 1001 of a channel of a signal received by antenna 801, and expressed in (I801, Q801);

transmission path variation estimation signal 1002 of a channel of a signal received by antenna 813, and expressed in (I813, Q813);

transmission path variation estimation signal 1003 of a channel of a signal received by antenna 825, and expressed in (I825, Q825);

transmission path variation estimation signal 1004 of a channel of a signal received by antenna 837, and expressed in (I837, Q837);

Next, an operation of the reception apparatus, in particular of phase difference estimation unit 851 and signal selection unit 855, is demonstrated hereinafter with reference to FIGS. 8 and 10.

Assume that phase difference estimation unit 851 receives signal 1001, signal 1002, signal 1003 and signal 1004 in FIG. 10 as transmission path variation estimation signals 807, 819, 831, and 843 of channel A respectively. In this case, find the phase difference between (I801, Q801) and (I813, Q813) in I-Q plane. In a similar way to this, find the phase difference between the following combinations in I-Q plane: (I801, Q801) and (I825, Q825); (I801, Q801) and (I837, Q837); (I813, Q813) and (I825, Q825); (I813, Q813) and (I837, Q837). Then phase difference estimation unit 851 outputs phase difference estimation signal 852 of channel A. Phase difference estimation unit 853 outputs phase difference estimation signal 854 of channel B in a similar way to what is discussed above.

Next, an operation of signal selection unit 855 is demonstrated: Phase difference estimation signal 852 of channel A takes a value ranging from 0 to pi ($\pi$). In other words, the foregoing respective phase differences between (I801, Q801) and (I813, Q813); (I801, Q801) and (I825, Q825); (I801, Q801) and (I837, Q837); (I813, Q813) and (I825, Q825); (I813, Q813) and (I837, Q837) take a value ranging from 0 to pi ($\pi$). For instance, assume that the phase difference between (I801, Q801) and (I813, Q813) is $\theta$, find an absolute value of $\theta$, and find absolute values of each one of the phase differences.

In a similar way, determine whether or not phase difference estimation signal 854 of channel B has correlation.

Signal selection unit 855 selects an optimum antenna 2 system out of phase difference estimation signals 852, 854 of channels A, B supplied. A method of this selection is demonstrated hereinafter.

For instance, assume that a phase difference of channel A of signals received by antenna 801 and antenna 813 is 0 (zero) and that of channel B is also 0. At this time, it is prepared that the signals received by antennas 801 and 813 should not be selected as signal groups 856, 857. On the other hand, assume that a phase difference of channel A of signals received by antenna 801 and antenna 813 is 0 (zero) and that of channel B is pi ($\pi$). At this time, it is prepared that the signals received by antennas 801 and 813 should be selected as signal groups 856, 857.

Place signal 802 received by antenna 801, signal 814 by antenna 813, signal 826 by antenna 825, and signal 838 by antenna 837 in descending order of reception received signal strength intensity with received signal strength intensity estimation signal 850. Then select the signals having stronger electric field intensities as signal groups 856, 857.

As such, optimum signal groups are selected on a priority base using a phase difference or a reception received signal strength intensity, then the selected ones are output as signal groups 856, 857. For instance, the phase difference between a transmission path variation of channel A of antenna 801 and that of antenna 813 does not correlate with the phase difference between a transmission path variation of channel B of antenna 801 and that of antenna 813. The reception received signal strength intensity of antenna 801 and that of antenna 813 are stronger than those of other antennas. Then transmission path variation estimation signal 807 of channel A, variation estimation signal 809 of channel B, in-phase component 811 and quadrature-phase component 812 of the delayed reception orthogonal are output as signal group 856. Transmission path variation estimation signal 819 of channel A, variation estimation signal 821 of channel B, in-phase component 823 and quadrature-phase component 824 of the delayed reception orthogonal are output as signal group 857.

FIG. 9 has a structure of the received signal strength intensity estimation unit different from that shown in FIG. 8. Reception electric field estimation unit 901 of FIG. 9 differs from that of FIG. 8 in the following point: Estimation unit 901 finds reception received signal strength intensity from in-phase component 804 and quadrature-phase component 805 of the reception quadrature baseband signal. In a similar manner, estimation unit 901 finds the respective field intensity from in-phase component 816 and quadrature-phase component 817, from in-phase component 828 and quadrature-phase component 829, and from in-phase component 840 and quadrature-phase component 841.

In the descriptions discussed above, the frame structure of the transmission signal shown in FIG. 1 is taken as an example; however, this second embodiment is not limited to the example. Use of two channels as the number of channels in the descriptions does not limit this embodiment, and an increase of channels will increase the number of transmission path variation estimation units. Each channel can undergo a different modulation method from each other. On the other hand, all the channels can use the spread spectrum communication method. The spread spectrum communication method can coexist with the other methods.

Not less than four antennas installed in the reception apparatus can assure the better reception sensitivity. The expression of "antenna" in the previous description does not always mean a single antenna, but "antenna" can mean an antenna unit which is formed of a plurality of antennas.

According to the second embodiment discussed above, the reception apparatus comprises the following elements:

a received signal strength intensity estimation unit for estimating a reception received signal strength intensity of a signal received by respective antennas and outputting an estimation signal of the reception received signal strength intensity of the reception signal;

a phase difference estimation unit for receiving a transmission path variation estimation signal of a channel of the respective antennas, finding a phase difference of the transmission path variation estimation signal, and outputting a phase difference signal; and a signal selection unit for receiving a reception quadrature baseband signal of the respective antennas, a transmission path variation estimation signal of each channel of the respective antennas, a reception electric field estimation signal of the reception signal, the phase difference signal, then selecting the reception quadrature baseband signal and the transmission path variation estimation signal for demultiplexing signals of the respective channels from the reception signal, and outputting the signals selected. The foregoing structure allows the reception apparatus to demultiplex the multiplexed signals with accuracy.

Exemplary Embodiment 3

The third embodiment describes a transmission method, which handles the following frame structure of signals transmitted from respective antennas:

a symbol for estimating transmission path variation is inserted into the frame;

the symbols are multiplied by a code;

the symbols of the respective antennas are placed at an identical time; and the codes of the respective antennas are orthogonal to each other.

The third embodiment also describes a transmission apparatus and a reception apparatus both used in the foregoing transmission method.

Figure 11:
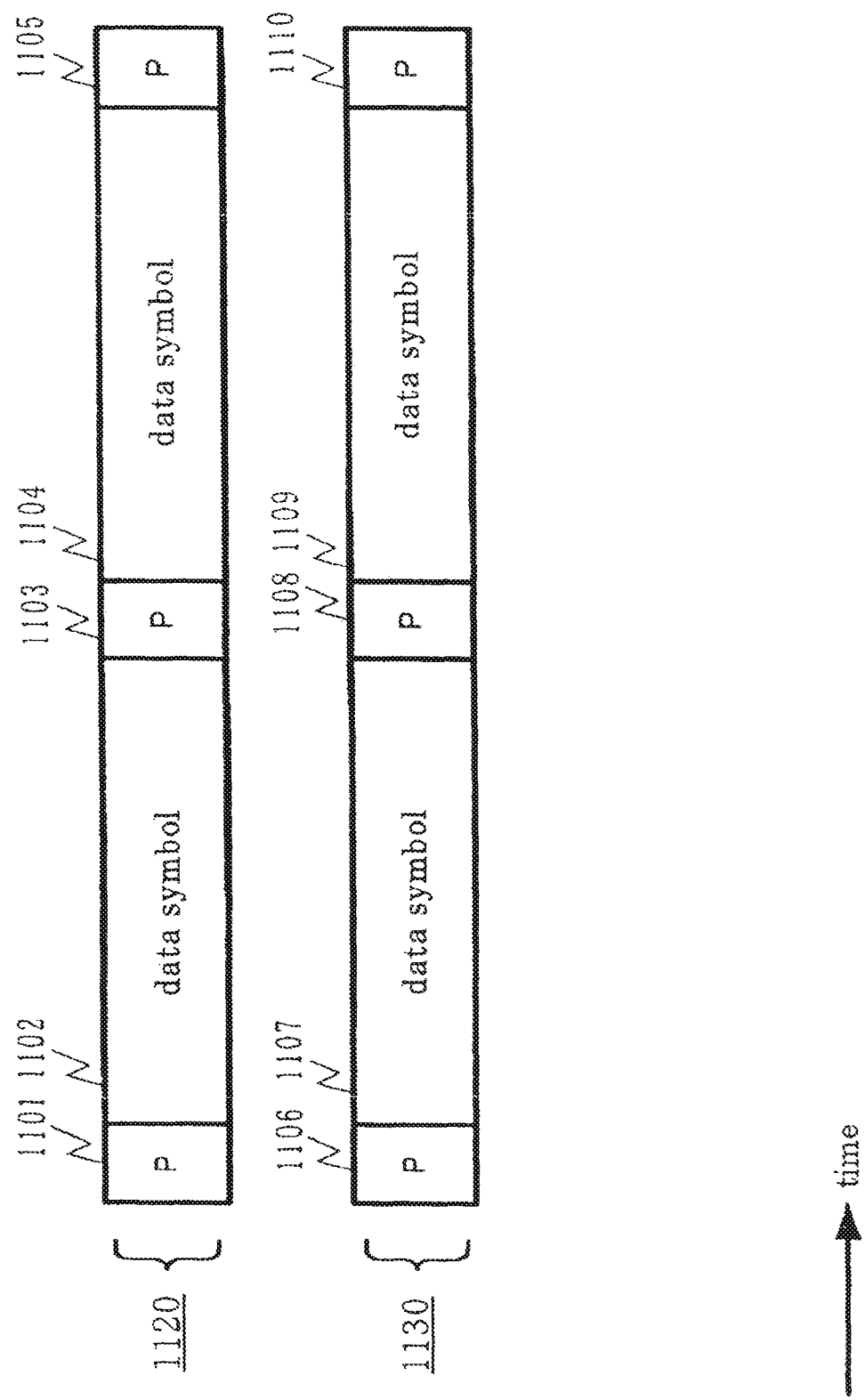
FIG. 11 shows frame structures of signals in accordance with a third exemplary embodiment of the present invention.

FIG. 11 shows frame structure 1120 in accordance with spread spectrum communication method A, and frame structure 1130 in accordance with spread spectrum communication method B. Pilot symbols 1101, 1103, 1105 of spread spectrum communication method A are multiplied by a code. Data symbols 1102, 1104 of spread spectrum communication method A are multiplied by a code.

Pilot symbols 1106, 1108, 1110 of spread spectrum communication method B are multiplied by a code. Data symbols 1107, 1109 of spread spectrum communication method B are multiplied by a code.

Pilot symbol 1101 of communication method A and pilot symbol 1106 of communication method B occur at an identical time. In the same manner, the following combinations occur at an identical time:

data symbol 1102 of method A and data symbol 1107 of method B;

pilot symbol 1103 of method A and pilot symbol 1108 of method B;

data symbol 1104 of method A and data symbol 1109 of method B; and pilot symbol 1105 of method A and pilot symbol 1110 of method B.

Figure 12:
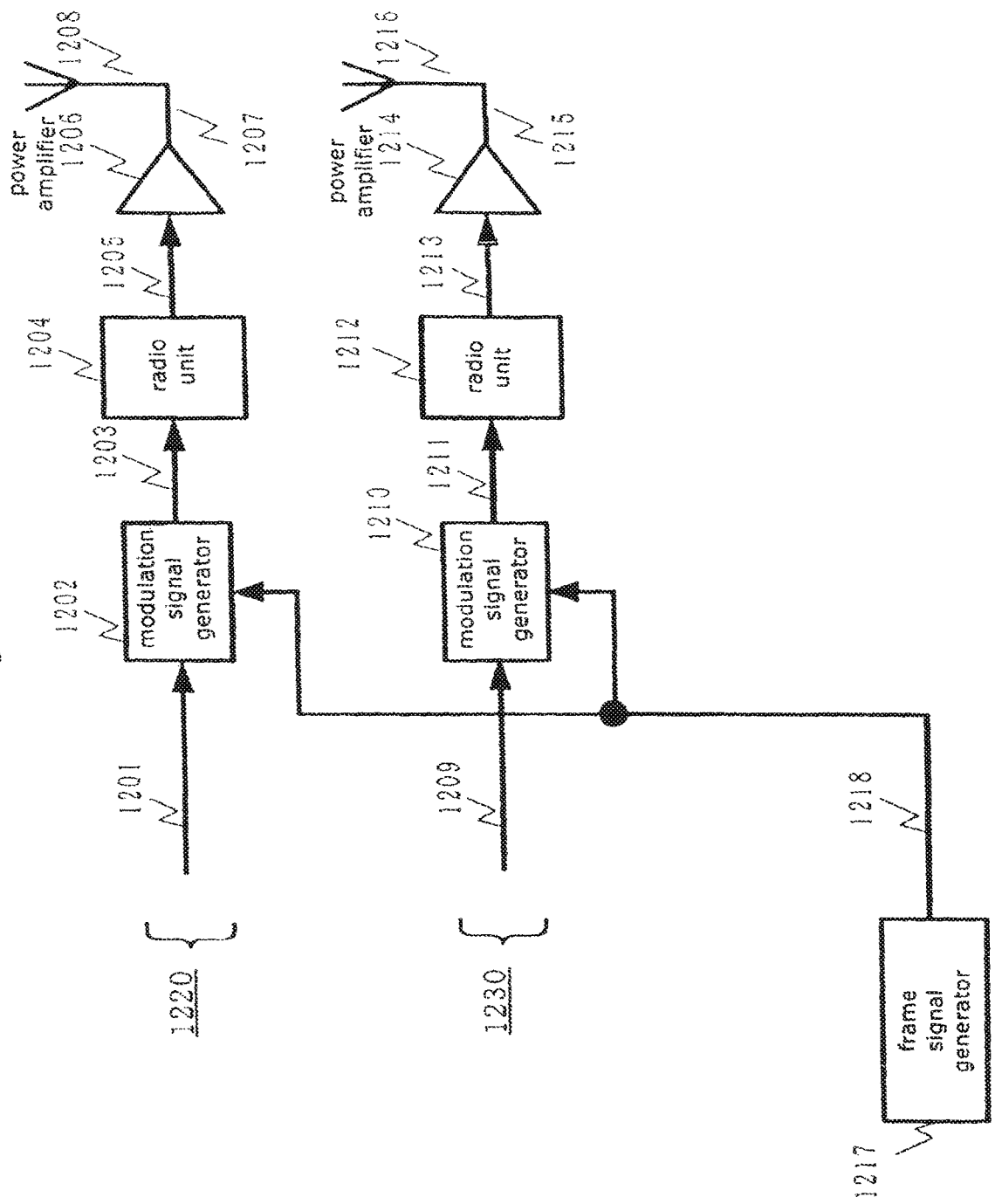
FIG. 12 shows a structure of a transmission apparatus in accordance with the third exemplary embodiment of the present invention.

FIG. 12 shows a structure of the transmission apparatus in accordance with this third embodiment, and the apparatus comprises transmission unit 1220 of spread spectrum communication method A, transmission unit 1230 of spread spectrum communication method B, and frame structure signal generator 1217.

Transmission unit 1220 of method A is formed of modulation signal generator 1202, radio unit 1204, power amplifier 1206, and antenna 1208. Transmission unit 1230 of method B is formed of modulation signal generator 1210, radio unit 1212, power amplifier 1214, and antenna 1216. Frame structure signal generator 1217 outputs the information about the frame structure shown in FIG. 11 as frame structure signal 1218.

Modulation signal generator 1202 of method A receives transmission digital signal 1201 of spread spectrum transmission method A and frame structure signal 1218, then outputs modulation signal 1203 of method A in accordance with the frame structure.

Radio unit 1204 of method A receives modulation signal 1203, then outputs transmission signal 1205 of method A.

Power amplifier 1206 of method A receives transmission signal 1205, amplifies it, then outputs the amplified signal as transmission signal 1207 from antenna 1208 in the form of radio wave.

Modulation signal generator 1210 of method B receives transmission digital signal 1209 of spread spectrum transmission method B and frame structure signal 1218, then outputs modulation signal 1211 of method B in accordance with the frame structure.

Radio unit 1212 of method B receives modulation signal 1211, then outputs transmission signal 1213 of method B.

Power amplifier 1214 of method B receives transmission signal 1213, amplifies it, then outputs the amplified signal as transmission signal 1215 from antenna 1216 in the form of radio wave.

Figure 13:
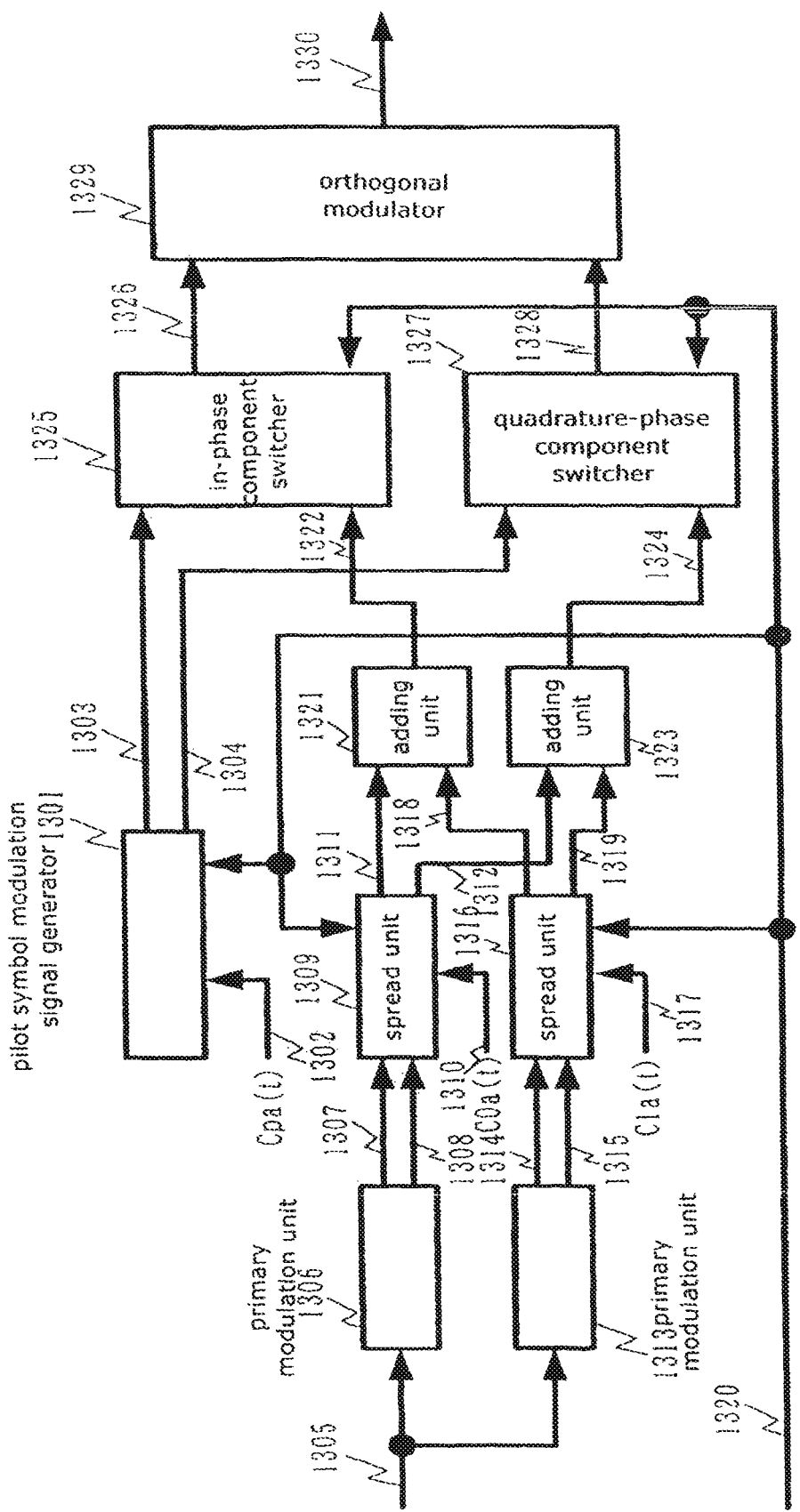
FIG. 13 shows a structure of a modulation signal generator in accordance with the third exemplary embodiment of the present invention.

FIG. 13 shows a structure of modulation signal generators 1202, 1210 shown in FIG. 12 of the third embodiment. Pilot symbol modulation signal generator 1301 receives code Cpa(t) 1302 for a pilot symbol, and multiplies the pilot symbol by code Cpa(t) 1302, then outputs in-phase component 1303 and quadrature-phase component 1304 of a transmission quadrature baseband signal of the pilot symbol.

Primary modulation unit 1306 receives transmission digital signal 1305, then outputs in-phase component 1307 and quadrature-phase component 1308 of the quadrature baseband signal of channel 0 undergone the primary modulation.

Spread unit 1309 receives in-phase component 1307 and quadrature-phase component 1308 of the quadrature baseband signal of channel 0 undergone the primary modulation, code C0a(t) 1310 for channel 0, frame structure signal 1320, then multiplies in-phase component 1307, quadrature-phase component 1308 and code C0a(t) 1310 based on the information about frame structure in the frame structure signal 1320, and outputs in-phase component 1311 and quadrature-phase component 1312 of a transmission quadrature baseband signal of channel 0.

Primary modulation unit 1313 receives transmission digital signal 1305, then outputs in-phase component 1314 and quadrature-phase component 1315 of the quadrature baseband signal of channel 1 undergone the primary modulation.

Spread unit 1316 receives in-phase component 1314 and quadrature-phase component 1315 of the quadrature baseband signal of channel 1 undergone the primary modulation, code C1a(t) 1317 for channel 1, frame structure signal 1320, then multiplies in-phase component 1314, quadrature-phase component 1315 and code C1a(t) 1317 based on the information about the frame structure in the frame structure signal 1320, and outputs in-phase component 1318 and quadrature-phase component 1319 of a transmission quadrature baseband signal of channel 1.

Adding unit 1321 receives in-phase component 1311 of the transmission quadrature baseband signal of channel 0 and in-phase component 1318 of that of channel 1, and adds component 1311 and component 1318 together, then outputs the added in-phase component 1322.

Adding unit 1323 receives quadrature-phase component 1312 of the transmission quadrature baseband signal of channel 0 and in-phase component 1319 of that of channel 1, and adds component 1312 and component 1319 together, then outputs the added quadrature-phase component 1324.

In-phase component switcher 1325 receives in-phase component 1303 of the pilot symbol transmission quadrature baseband signal 1303, added in-phase component 1322 and frame structure signal 1320, then selects in-phase component 1303 and added in-phase component 1322 based on the information about frame structure in the frame structure signal 1320, and outputs in-phase component 1326 of the selected transmission quadrature baseband signal.

Quadrature-phase component switcher 1327 receives quadrature-phase component 1304 of the pilot symbol transmission quadrature baseband signal, added quadrature-phase component 1324 and frame structure signal 1320, then selects quadrature-phase component 1304 and added quadrature-phase component 1324 based on the information about frame structure in the frame structure signal 1320, and outputs quadrature-phase component 1328 of the selected transmission quadrature baseband signal.

Orthogonal modulation unit 1329 receives in-phase component 1326 and quadrature-phase component 1328 of the selected transmission quadrature baseband signal, then provides the input with orthogonal modulation, and outputs modulation signal 1330.

Figure 14:
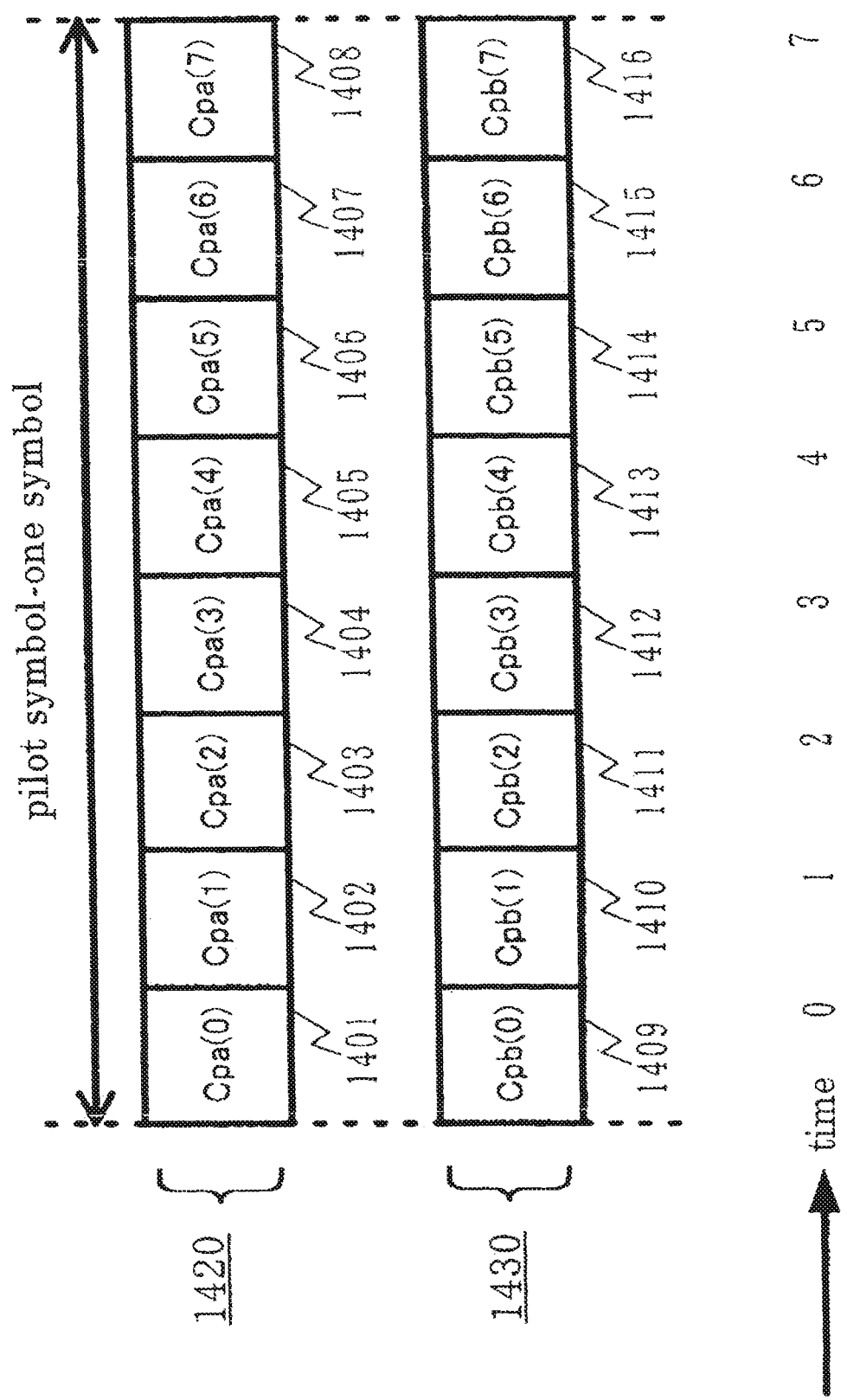
FIG. 14 shows relations between pilot symbols and codes to multiply in accordance with the third exemplary embodiment of the present invention.

FIG. 14 shows a relation between a pilot symbol and a code to be multiplied to the pilot symbols in pilot-symbol structure 1420 of spread-spectrum communication method A and in pilot-symbol structure 1430 of method B. Spread code 1401 of method A at time 0 is expressed as Cpa(0), and spread code 1402 of method A at time 1 is expressed as Cpa(1). The following codes are expressed in the same manner:

- code 1403 of method A at time 2 as Cpa(2);
- code 1404 of method A at time 3 as Cpa(3);
- code 1405 of method A at time 4 as Cpa(4);
- code 1406 of method A at time 5 as Cpa(5);
- code 1407 of method A at time 6 as Cpa(6); and
- code 1408 of method A at time 7 as Cpa(7).

Time 0-time 7 form one cycle of spread code Cpa.

In a similar manner to the spread codes of method A, spread codes of method B are expressed as follows:

- code 1409 of method B at time 0 as Cpb(0);
- code 1410 of method B at time 1 as Cpb(1);
- code 1411 of method B at time 2 as Cpb(2);
- code 1412 of method B at time 3 as Cpb(3);
- code 1413 of method B at time 4 as Cpb(4);
- code 1414 of method B at time 5 as Cpb(5);
- code 1415 of method B at time 6 as Cpb(6); and
- code 1416 of method B at time 7 as Cpb(7).

Time 0-time 7 form one cycle of spread code Cpb.

Figure 15:
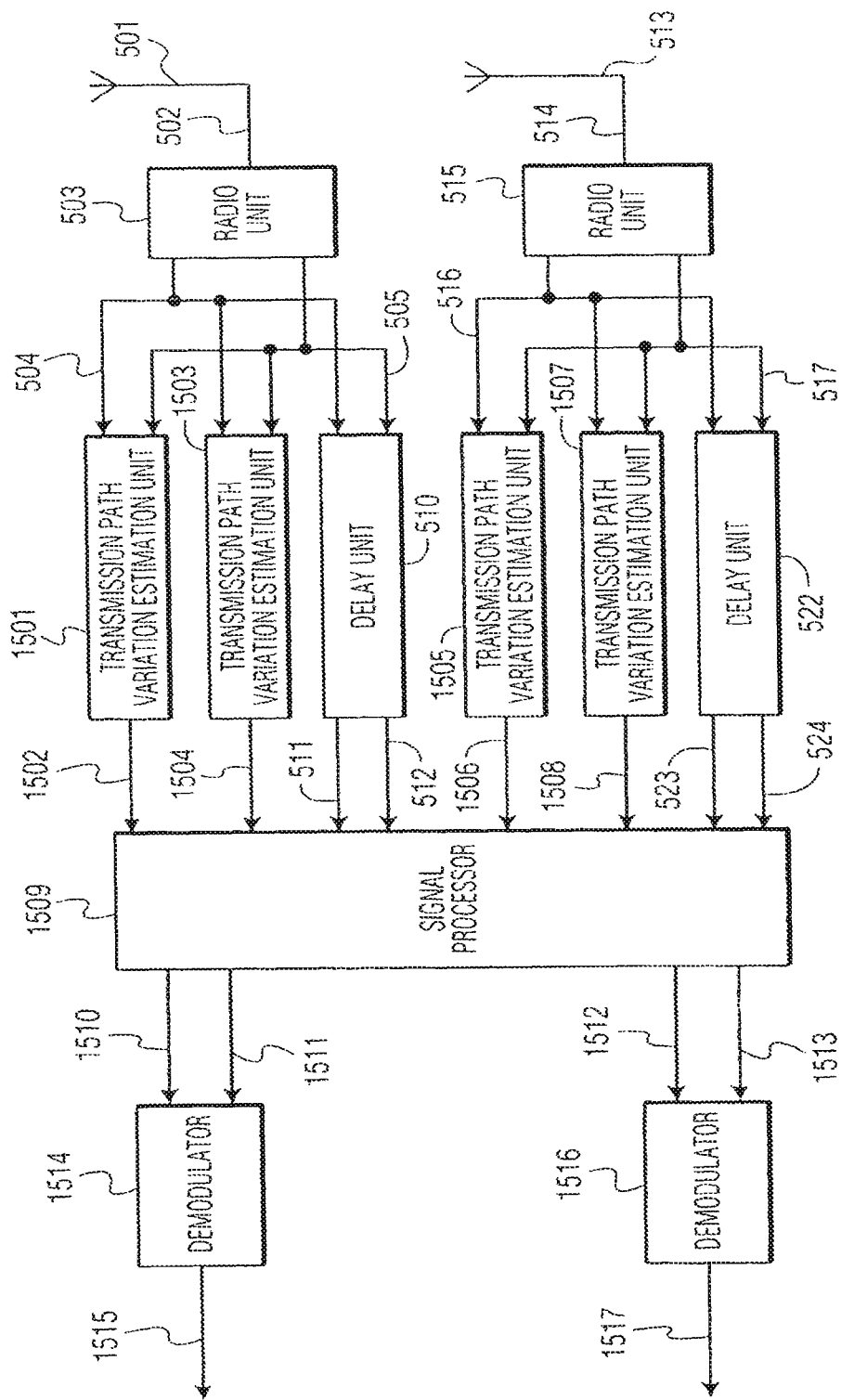
FIG. 15 shows a structure of a reception apparatus in accordance with the third exemplary embodiment of the present invention.

FIG. 15 shows a structure of the reception apparatus in accordance with the third embodiment. The elements operating in the same way as those in FIG. 5 have the same reference marks.

Transmission path variation estimation unit 1501 of spread-spectrum communication method A receives in-phase component 504 and quadrature-phase component 505 of the reception quadrature baseband signal. Then estimation unit 1501 estimates transmission-path distortion of method A, and outputs transmission path estimation signal 1502 of method A.

Transmission path variation estimation unit 1503 of spread-spectrum communication method B receives in-phase component 504 and quadrature-phase component 505 of the reception quadrature baseband signal. Then estimation unit 1503 estimates transmission-path distortion of method B, and outputs transmission path estimation signal 1504 of method B.

Transmission path variation estimation unit 1505 of spread-spectrum communication method A receives in-phase component 516 and quadrature-phase component 517 of the reception quadrature baseband signal. Then estimation unit 1505 estimates transmission-path distortion of method A, and outputs transmission path estimation signal 1506 of method A.

Transmission path variation estimation unit 1507 of spread-spectrum communication method B receives in-phase component 516 and quadrature-phase component 517 of the reception quadrature baseband signal. Then estimation unit 1507 estimates transmission-path distortion of method B, and outputs transmission path estimation signal 1508 of method B.

Signal processor 1509 receives the following signals:
- transmission path variation estimation signal 1502 of method A;
- transmission path variation estimation signal 1504 of method B;
- in-phase component 511 and quadrature-phase component 512 of delayed reception quadrature baseband signal;
- transmission path variation estimation signal 1506 of method A;
- transmission path variation estimation signal 1508 of method B; and
- in-phase component 523 and quadrature-phase component 524 of delayed reception quadrature baseband signal.

Then signal processor 1509 outputs the following signals:
- in-phase component 1510 and quadrature-phase component 1511 of reception quadrature baseband signal of method A; and
- in-phase component 1512 and quadrature-phase component 1513 of reception quadrature baseband signal of method B.

Demodulator 1514 of spread spectrum communication method A receives in-phase component 1510 and quadrature-phase component 1511 of reception quadrature baseband signal of method A, and outputs reception-digital signal group 1515 of method A.

Demodulator 1516 of spread spectrum communication method B receives in-phase component 1512 and quadrature-phase component 1513 of reception quadrature baseband signal of method B, and outputs reception-digital signal group 1517 of method B.

Figure 16:
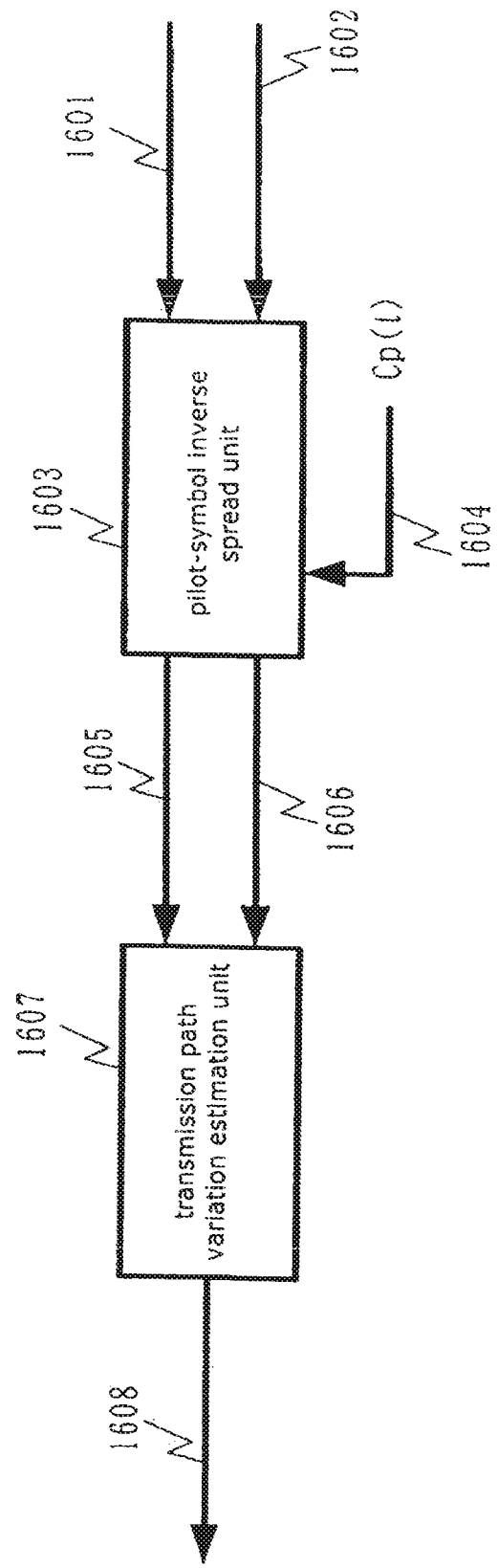
FIG. 16 shows a structure of a transmission path variation estimation unit in accordance with the third exemplary embodiment of the present invention.

FIG. 16 shows a structure of transmission path variation estimation units 1501, 1505 of spread-spectrum communication method A and distortion estimation units 1503, 1507 of method B, both shown in FIG. 15.

Pilot-symbol inverse spread unit 1603 receives in-phase component 1601 and quadrature-phase component 1602 of the reception quadrature baseband signal, and spread-code 1604, and outputs in-phase component 1605 and quadrature-phase component 1606 of the pilot symbol of the reception quadrature baseband signal undergone the inverse spread.

Transmission path variation estimation unit 1607 receives in-phase component 1605 and quadrature-phase component 1606, and outputs transmission path variation estimation signal 1608.

Figure 17:
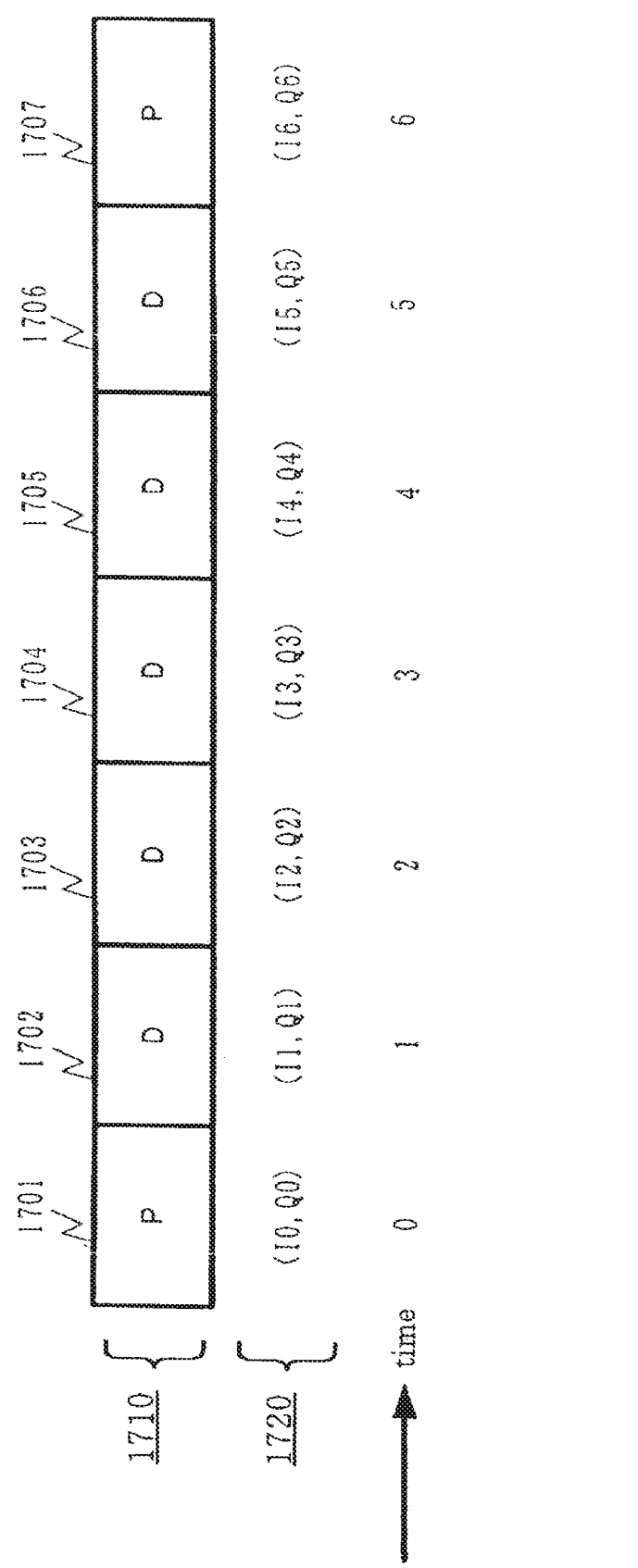
FIG. 17 shows amounts of fluctuation in a transmission path along the timing axis in accordance with the third exemplary embodiment of the present invention.

FIG. 17 shows frame structure 1710 and transmission path variation amount 1720 along a time axis. Pilot symbol 1701 and transmission path variation (I0, Q0) occur at time 0 (zero). In the same manner, following combinations occur at respective times:
- pilot symbol 1702 and transmission path variation (I1, Q1) at time 1;
- pilot symbol 1703 and transmission path variation (I2, Q2) at time 2;

pilot symbol 1704 and transmission path variation (I3, Q3) at time 3;

pilot symbol 1705 and transmission path variation (I4, Q4) at time 4;

pilot symbol 1706 and transmission path variation (I5, Q5) at time 5;

pilot symbol 1707 and transmission path variation (I6, Q6) at time 6.

An operation of the transmission apparatus is demonstrated hereinafter with reference to FIG. 11-FIG. 14. Structures of pilot symbol 1101 of communication method A and pilot symbol 1106 of method B, both occurring at the same time, are described with reference to FIG. 14.

FIG. 14 shows a structure of one pilot symbol. Pilot symbol 1101 of spread-spectrum communication method A shown in FIG. 11 is multiplied by code Cpa, and formed of, e.g. spread codes 1401, 1402, 1403, 1404, 1405, 1406, 1407, and 1408. In a similar way, pilot symbol 1106 of spread-spectrum communication method B shown in FIG. 11 is multiplied by code Cpb, and formed of, e.g. spread codes 1409, 1410, 1411, 1412, 1413, 1414, 1415, and 1416. Spread code Cpa multiplied to the pilot symbol of method A is orthogonal to spread code Cpb multiplied to the pilot symbol of method B.

Next, the operation of the transmission apparatus is demonstrated. In FIG. 12, frame structure signal generator 1217 outputs the information about the frame structure shown in FIG. 11 as frame structure signal 1218. Modulation signal generator 1202 of method A receives transmission digital signal 1201 of spread spectrum transmission method A and frame structure signal 1218, then outputs modulation signal 1203 of method A in accordance with the frame structure. Modulation signal generator 1210 of method B receives transmission digital signal 1209 of spread spectrum transmission method B and frame structure signal 1218, then outputs modulation signal 1211 of method B in accordance with the frame structure.

Operations of modulation signal generators 1202 and 1210 are demonstrated with reference to FIG. 13. At a transmitter of spread-spectrum communication method A, pilot-symbol transmission signal generator 1301 shown in FIG. 13 receives code 1302 for the pilot symbol and frame structure signal 1320. Then generator 1301 outputs, e.g. in-phase component 1303 and quadrature-phase component 1304 of a pilot symbol transmission quadrature baseband signal in accordance with the structure of the pilot symbol of communication method A shown in FIG. 14.

In a similar way to the foregoing transmitter, at a transmitter of spread-spectrum communication method B, pilot-symbol transmission signal generator 1301 shown in FIG. 13 receives code 1302 for the pilot symbol and frame structure signal 1320. Then generator 1301 outputs, e.g. in-phase component 1303 and quadrature-phase component 1304 of a pilot symbol transmission quadrature baseband signal in accordance with the structure of the pilot symbol of communication method B shown in FIG. 14.

As such, the pilot symbol of communication method A is orthogonal to the spread code of the pilot symbol of communication method B.

Next, an operation of the reception apparatus is demonstrated with reference to FIG. 15-FIG. 17. Antenna 501 shown in FIG. 15 receives signal 502 in which spread-spectrum communication methods A and B are mixed, and radio unit 503 outputs in-phase component 504 and quadrature-phase component 505, in which methods A and B are mixed, of a reception quadrature baseband signal.

Operations of transmission path variation estimation unit 1501 of method A and estimation unit 1503 of method B are demonstrated with reference to FIG. 16. Estimation unit 1501 of method A operates as follows: Pilot-symbol inverse-spread unit 1603 in FIG. 16 receives in-phase component 1601 and quadrature-phase component 1602 of the reception quadrature baseband signal, in which methods A and B are mixed, and spread code 1604 for the pilot symbol of method A. Then inverse-spread unit 1603 detects pilot symbols in in-phase component 1601 and quadrature-phase component 1602, and provides the detected pilot symbols with the inverse-spread using spread-code 1604. Finally, inverse-spread unit 1603 outputs in-phase component 1605 and quadrature-phase component 1606 undergone the inverse spread.

In the foregoing operation, the component of method B in the pilot symbol of in-phase component 1601 and quadrature-phase component 1602 can be removed by the inverse-spread because the code of method A is orthogonal to the code of method B.

Transmission path variation estimation unit 1607 is described with reference to FIG. 17. Transmission path variations (T0, Q0) and (I6, Q6) of the pilot symbol in FIG. 17 are found using in-phase component 1605 and quadrature-phase component 1606 of the reception quadrature baseband signal of the pilot symbol undergone the inverse-spread. Then transmission path variations (I1, Q1), (I2, Q2), (I3, Q3), (I4, Q4), and (I5, Q5) of data symbol are found using distortions (T0, Q0) and (I6, Q6) of the pilot symbol. Those distortions are output as transmission path variation estimation signal 1608.

In a similar way to what is discussed above, transmission path variation estimation unit 1503 of method B outputs estimation signal 1504 from reception signal 502 in which methods A and B are mixed. Distortion estimation unit 1505 of method A and estimation unit 1507 of method B output transmission variation estimation signal 1506 of method A and estimation signal 1508 of method B respectively from reception signal 514 in which methods A and B are mixed.

In the foregoing descriptions, the transmission path variation is expressed in (I, Q); however the distortion can be expressed in power or phase, so that the distortions expressed in power and phase can be output as variation estimation signals 1502, 1506 of method A, and signals 1506, 1508 of method B.

The structures and operations discussed above allow demultiplexing the modulation signals of spread-spectrum communication method A from those of method B, so that the signals can be demodulated.

In this embodiment, an accuracy of demultiplexing the modulation signals between channel A and channel B at the reception apparatus depends on a quality of the pilot symbol received. Thus stronger resistance of the pilot symbol to noise increases the accuracy of demultiplexing the modulation signals of channel A from channel B. As a result, the quality of data received can be improved. A greater transmission power to the pilot symbols than that to the data symbols increases the noise resistance of the pilot symbols, so that the accuracy of demultiplexing the modulation signals of spread-spectrum communication method A from method B increases. As a result, the quality of reception data can be improved.

In this third embodiment, two methods of spread-spectrum communication methods are multiplexed; however, the present invention is not limited to two methods. The present invention is not limited to the frame structures shown in FIGS. 11, 14, and 16. The transmission path variation can be estimated using the pilot symbol as an example; however other symbols can be used for this purpose as long as they can estimate distortions. Spread-spectrum communication methods A and B use two channels for multiplexing; however, it is not limited to two channels only.

The structure of the transmission apparatus in accordance with the third embodiment is not limited to what is shown in FIG. 12 or FIG. 13, and when the number of spread-spectrum communication methods increases, the number of sections formed of elements 1201-1208 shown in FIG. 12 increases accordingly. When the number of channels increases, the number of sections formed of elements 1306 and 1309 shown in FIG. 13 increases accordingly.

The structure of the reception apparatus in accordance with the third embodiment is not limited to what is shown in FIG. 15, and when the number of spread-spectrum communication methods increases, the number of distortion estimation units increases accordingly.

The expression of "antenna" in the previous description does not always mean a single antenna, but "antenna" can mean an antenna unit which is formed of a plurality of antennas.

According to the third embodiment discussed above, the transmission method handles the following frame structure of a signal transmitted from respective antenna:

a symbol for estimating transmission path variation is inserted into the frame;

the symbol is multiplied by a code;

the symbols of the respective antennas are arranged at an identical time; and the codes of the respective antennas are orthogonal to each other.

The third embodiment also uses the transmission apparatus and the reception apparatus in the foregoing transmission method. In this system, multiplexing modulation signals of a plurality of channels to the same frequency band increases the data transmission rate, and allows the reception apparatus to demultiplex the multiplexed modulation signal with ease.

Exemplary Embodiment 4

The fourth exemplary embodiment demonstrates a reception apparatus comprising the following elements:

a received signal strength intensity estimation unit for receiving a modulation signal of a spread-spectrum communication method transmitted to the same frequency band from respective transmission antennas, then estimating a reception received signal strength intensity of the signal received by respective antennas, and outputting an estimation signal of the reception received signal strength intensity of the reception signal;

a phase difference estimation unit for receiving a transmission path variation estimation signal of a spread-spectrum communication method of the respective antennas, finding a phase difference of the transmission path variation estimation signals of the spread-spectrum communication method between the respective antennas, and outputting a phase difference signal; and a signal selection unit for receiving a reception quadrature baseband signal of the respective antennas, the transmission path variation estimation signals of respective spread-spectrum communication methods of the respective antennas, the reception received signal strength intensity estimation signal of the reception signal, the phase difference signal, then selecting the reception quadrature baseband signal and the transmission path variation estimation signal for isolating signals of the respective methods from the reception signal, and outputting the signals selected.

The description of this fourth embodiment takes the case as an example, where the modulation signal having the frame structure shown in FIG. 11 is transmitted by the transmission apparatus shown in FIG. 12 and used in the third exemplary embodiment.

Figure 18:
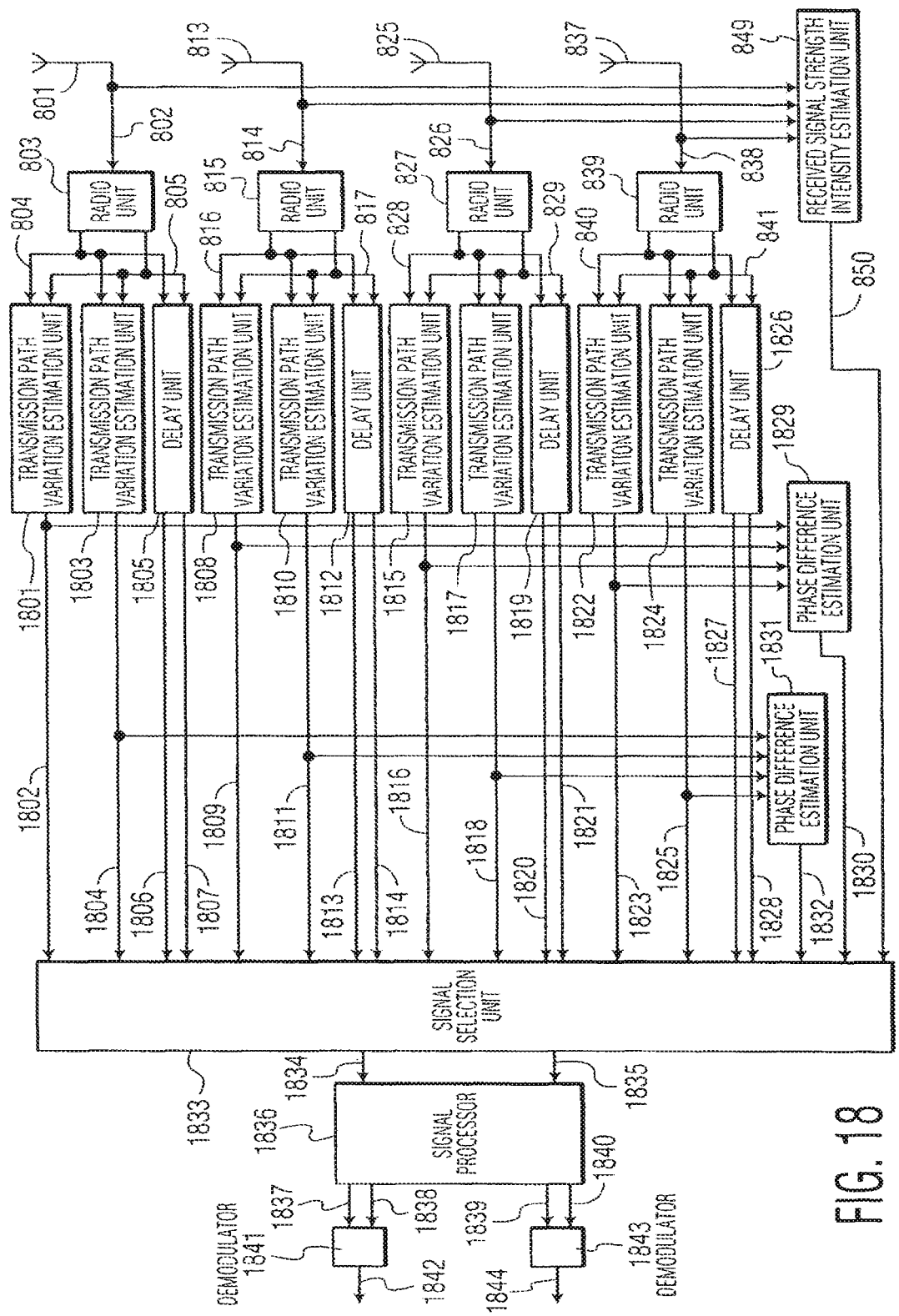
FIG. 18 shows a structure of a reception apparatus in accordance with a fourth exemplary embodiment of the present invention.

FIG. 18 shows a structure of a reception apparatus in accordance with the fourth embodiment. The elements operating in a similar way to those in FIG. 8 have the same reference marks.

Transmission path variation estimation unit 1801 of spread-spectrum communication method A receives in-phase component 804 and quadrature-phase component 805 of the reception quadrature baseband signal. Then estimation unit 1801 operates, e.g. in a similar way to estimation unit 1501 of method A shown in FIG. 15 of the third embodiment, and outputs transmission path variation estimation signal 1802 of method A.

Transmission path variation estimation unit 1803 of spread-spectrum communication method B receives in-phase component 804 and quadrature-phase component 805 of the reception quadrature baseband signal. Then estimation unit 1803 operates, e.g. in a similar way to estimation unit 1501 of method A shown in FIG. 15 of the third embodiment, and outputs transmission path variation estimation signal 1804 of method B.

Delay unit 1805 receives in-phase component 804 and quadrature-phase component 805 of the reception quadrature baseband signal, and outputs in-phase component 1806 and quadrature-phase component 1807 of the reception quadrature baseband signal which delays by the time needed for obtaining transmission path variation estimation signals 1802 and 1804 of method A and method B.

Transmission distortion estimation unit 1808 of method A receives in-phase component 816 and quadrature-phase component 817 of the reception quadrature baseband signal. Then estimation unit 1808 operates, e.g. in a similar way to estimation unit 1501 of the same method A shown in FIG. 15 of the third embodiment, and outputs transmission path variation estimation signal 1809 of method A.

Transmission path variation estimation unit 1810 of method B receives in-phase component 816 and quadrature-phase component 817 of the reception quadrature baseband signal. Then estimation unit 1810 operates, e.g. in a similar way to estimation unit 1501 of method A shown in FIG. 15 of the third embodiment, and outputs transmission path variation estimation signal 1811 of method B.

Delay unit 1812 receives in-phase component 816 and quadrature-phase component 817 of the reception quadrature baseband signal, and outputs in-phase component 1813 and quadrature-phase component 1814 of the reception quadrature baseband signal which delays by the time needed for obtaining transmission path variation estimation signals 1809 and 1811 of method A and method B.

Transmission distortion estimation unit 1815 of method A receives in-phase component 828 and quadrature-phase component 829 of the reception quadrature baseband signal. Then estimation unit 1815 operates, e.g. in a similar way to estimation unit 1501 of channel A shown in FIG. 15 of the third embodiment, and outputs transmission path variation estimation signal 1816 of method A.

Transmission path variation estimation unit 1817 of method B receives in-phase component 828 and quadrature-phase component 829 of the reception quadrature baseband signal. Then estimation unit 1817 operates, e.g. in a similar way to estimation unit 1501 of method A shown in FIG. 15 of the third embodiment, and outputs transmission path variation estimation signal 1818 of method B.

Delay unit 1819 receives in-phase component 828 and quadrature-phase component 829 of the reception quadrature baseband signal, and outputs in-phase, component 1820 and quadrature-phase component 1821 of the reception quadrature baseband signal which delays by the time needed for obtaining transmission path variation estimation signals 1816 and 1818 of method A and method B.

Transmission distortion estimation unit 1822 of method A receives in-phase component 840 and quadrature-phase component 841 of the reception quadrature baseband signal. Then estimation unit 1822 operates, e.g. in a similar way to estimation unit 1501 of method A shown in FIG. 15 of the third embodiment, and outputs transmission path variation estimation signal 1823 of method A.

Transmission path variation estimation unit 1824 of method B receives in-phase component 840 and quadrature-phase component 841 of the reception quadrature baseband signal. Then estimation unit 1824 operates, e.g. in a similar way to estimation unit 1501 of channel A shown in FIG. 15 of the third embodiment, and outputs transmission path variation estimation signal 1825 of method B.

Delay unit 1826 receives in-phase component 804 and quadrature-phase component 805 of the reception quadrature baseband signal, and outputs in-phase component 1827 and quadrature-phase component 1828 of the reception quadrature baseband signal which delays by the time needed for obtaining transmission path variation estimation signals 1823 and 1825 of method A and method B.

Phase difference estimation unit 1829 receives transmission path variation estimation signals 1802, 1809, 1816, 1823 of method A, then finds respective phase differences such as a phase difference between signals 1802 and 1809 in the in-phase-quadrature plane, and outputs the phase difference as phase difference estimation signal 1830 of method A.

In a similar way to what is done by estimation unit 1829, phase difference estimation unit 1831 receives transmission path variation estimation signals 1804, 1811, 1818, 1825 of method B, then finds respective phase differences such as a phase difference between signals 1804 and 1811 in the in-phase-quadrature plane, and outputs the phase differences as phase difference estimation signal 1832 of method B.

Signal selection unit 1833 receives the following signals:
transmission path variation estimation signal 1802 of method A;
transmission path variation estimation signal 1804 of method B;
in-phase component 1806 and quadrature-phase component 1807 of delayed reception quadrature baseband signal;
transmission path variation estimation signal 1809 of method A;
transmission path variation estimation signal 1811 of method B;
in-phase component 1813 and quadrature-phase component 1814 of delayed reception quadrature baseband signal;
transmission path variation estimation signal 1816 of method A;
transmission path variation estimation signal 1818 of method B;
in-phase component 1820 and quadrature-phase component 1821 of delayed reception quadrature baseband signal;
transmission path variation estimation signal 1823 of method A;
transmission path variation estimation signal 1825 of method B;

in-phase component 1827 and quadrature-phase component 1828 of delayed reception quadrature baseband signal;
received signal strength intensity estimation signal 850;
phase difference estimation signal 1830 of method A; and
phase difference estimation signal 1832 of method B.

Then signal selection unit 1833 selects a group of signals supplied from the antenna, which can most accurately isolate method A signals from method B signals, out of received signal strength intensity estimation signal 850, phase difference estimation signal 1830 of method A, and phase difference estimation signal 1832 of method B. Signal selection unit 1833 then outputs signal groups 1834 and 1835.

The signal group here refers to, e.g. transmission path variation estimation signal 1802 of method A, estimation signal 1804 of method B, in-phase component 1806 and quadrature-phase component 1807 of the delayed reception quadrature baseband signal of the signal received by antenna 801.

Signal processor 1836 receives signal groups 1834, 1835, and operates in a similar way to signal processor 1509 shown in FIG. 15 of the third embodiment. Signal processor 1836 outputs in-phase component 1837, quadrature-phase component 1838 of the reception quadrature baseband signal of method A as well as in-phase component 1839, quadrature-phase component of the reception quadrature baseband signal 1840 of method B.

Demodulator 1841 of spread-spectrum communication method A receives in-phase component 1837 and quadrature-phase component 1838 of the reception quadrature baseband signal of method A, and outputs reception digital signal 1842 of method A.

Demodulator 865 of spread-spectrum communication method B receives in-phase component 1839 and quadrature-phase component 1840 of the reception quadrature baseband signal of method B, and outputs reception digital signal 1844 of method B.

Figure 19:
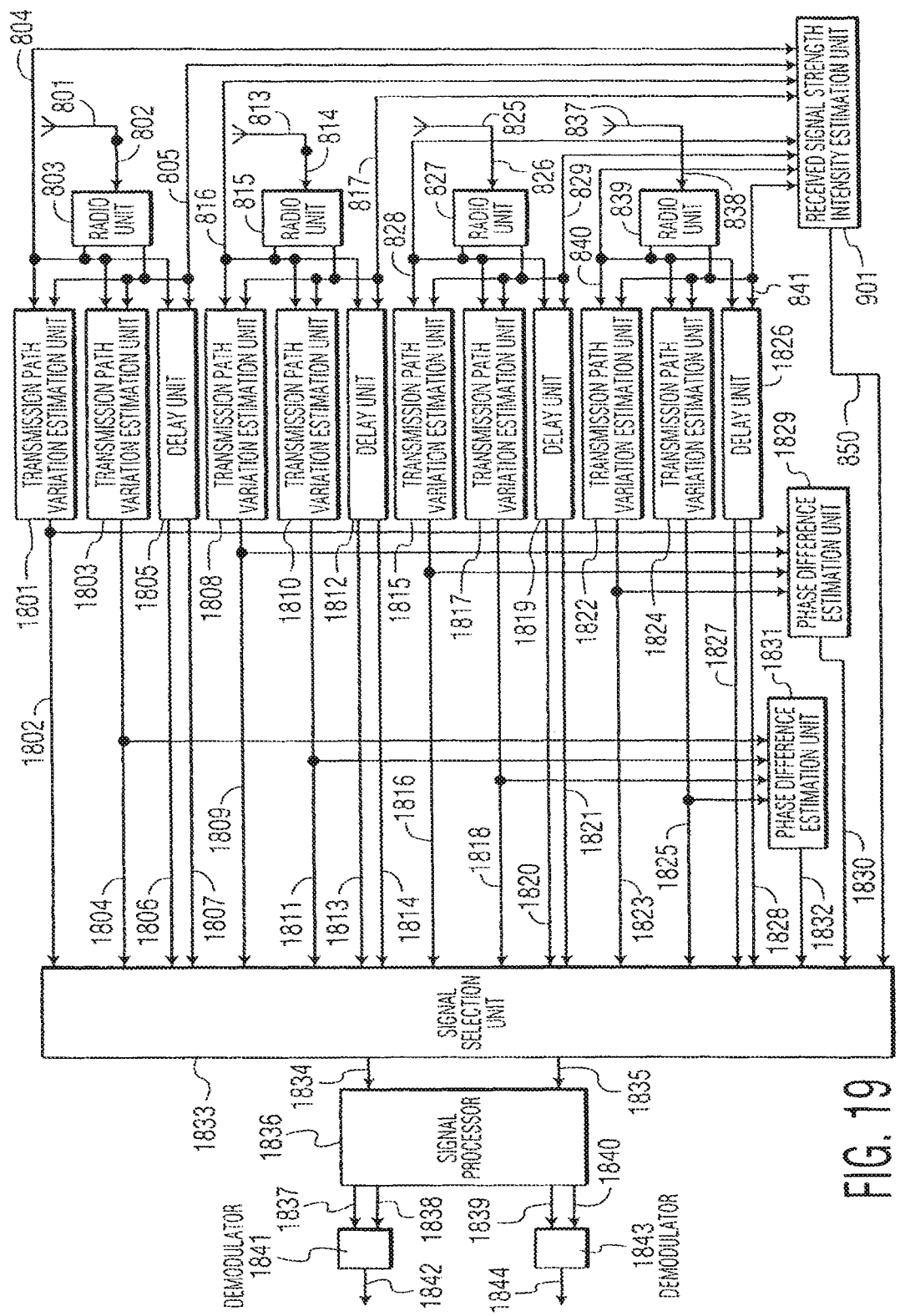
FIG. 19 shows a structure of a reception apparatus in accordance with the fourth exemplary embodiment of the present invention.

FIG. 19 shows a structure of the reception apparatus in accordance with this exemplary embodiment, and the elements operating in a similar way to those shown in FIGS. 8, 18 have the same reference marks.

FIG. 10 shows transmission path variation estimation signals of a spread-spectrum communication method in accordance with the fourth embodiment. The following four signals are mapped in FIG. 10:
transmission path variation estimation signal 1001 of a signal of a spread-spectrum communication method received by antenna 801, and expressed in (I801, Q801);
transmission path variation estimation signal 1002 of a signal of a spread-spectrum communication method received by antenna 813, and expressed in (I813, Q813);
transmission path variation estimation signal 1003 of a signal of a spread-spectrum communication method received by antenna 825, and expressed in (I825, Q825);
transmission path variation estimation signal 1004 of a signal of a spread-spectrum method received by antenna 837, and expressed in (I837, Q837);

Next, an operation of the reception apparatus, in particular operations of phase difference estimation unit 1829 and signal selection unit 1831, is demonstrated hereinafter with reference to FIGS. 1 and 18.

Assume that phase difference estimation unit 1829 receives signal 1001, signal 1002, signal 1003 and signal 1004 shown in FIG. 10 as transmission path variation estimation signals 1802, 1809, 1816, and 1823 of method A respectively. In this case, find the phase difference between (I801, Q801) and (I813, Q813) in I-Q plane. In a similar way to this, find the phase difference between the following combinations in I-Q plane: (I801, Q801) and (I825, Q825); (I801, Q801) and (I837, Q837); (I813, Q813) and (I825, Q825); (I813, Q813) and (I837, Q837). Then phase difference estimation unit 851 outputs phase difference estimation signal 852 of method A. Phase difference estimation unit 1831 outputs phase difference estimation signal 1832 of method B in a similar way to what is discussed above.

Next, an operation of signal selection unit 1833 is demonstrated: Phase difference estimation signal 1830 of method A takes a value ranging from 0 to pi ($\pi$). In other words, the foregoing respective phase differences between (I801, Q801) and (I813, Q813); (I801, Q801) and (I825, Q825); (I801, Q801) and (I837, Q837); (I813, Q813) and (I825, Q825); (I813, Q813) and (I837, Q837) take a value ranging from 0 to pi ($\pi$). For instance, assume that the phase difference between (I801, Q801) and (I813, Q813) is θ, find an absolute value of θ, and find absolute values of each one of the phase differences.

In a similar way, determine whether or not phase difference estimation signal 1832 of method B has correlation.

Signal selection unit 1833 selects optimum antenna system 2 based on phase difference estimation signals 1830, 1832 of spread-spectrum communication methods A, B supplied. A method of this selection is demonstrated hereinafter.

For instance, assume that a phase difference of method A of signals received by antenna 801 and antenna 813 is 0 (zero) and that of method B is also 0. At this time, it is prepared that the signals received by antennas 801 and 813 should not be selected as signal groups 856, 857. On the other hand, assume that a phase difference of method A of signals received by antenna 801 and antenna 813 is 0 (zero) and that of method B is pi ($\pi$). At this time, it is prepared that the signals received by antennas 801 and 813 should be selected as signal groups 1834, 1835.

Place signal 802 received by antenna 801, signal 814 by antenna 813, signal 826 by antenna 825, and signal 838 by antenna 837 in descending order of reception received signal strength intensity with electric field estimation signal 850, then select the signals having stronger received signal strength intensity as signal groups 856, 857.

As such, optimum signal groups are selected on a priority base using a phase difference or a reception received signal strength intensity, then the selected ones are output as signal groups 1834, 1835. For instance, the phase difference between a transmission path variation of method A of antenna 801 and that of antenna 813 does not correlate with the phase difference between a transmission path variation of method B of antenna 801 and that of antenna 813. The reception received signal strength intensity of antenna 801 and that of antenna 813 are stronger than those of other antennas. Then transmission path variation estimation signal 1802 of method A, variation estimation signal 1804 of method B, in-phase component 1806 and quadrature-phase component 1807 of the delayed reception orthogonal are output as signal group 1834. Transmission path variation estimation signal 1809 of method A, variation estimation signal 1811 of method B, in-phase component 1813 and quadrature-phase component 1814 of the delayed reception orthogonal are output as signal group 1835.

FIG. 19 shows a structure of the received signal strength intensity estimation unit different from that shown in FIG. 18. Reception received signal strength intensity estimation unit 901 of FIG. 19 differs from that of FIG. 18 in the following point: Estimation unit 901 finds reception received signal strength intensity from in-phase component 804 and quadrature-phase component 805 of the reception quadrature baseband signal. In a similar manner, estimation unit 901 finds the respective field intensity from in-phase component 816 and quadrature-phase component 817, from in-phase component 828 and quadrature-phase component 829, and from in-phase component 840 and quadrature-phase component 841.

In the descriptions discussed above, the frame structure of the transmission signal shown in FIG. 11 is taken as an example; however, this embodiment is not limited to the example. Use of two spread-spectrum communication methods as the number of communication methods in the descriptions does not limit this embodiment, and an increase of the methods will increase the number of transmission path variation estimation units. Method A and method B undergo multiplexing of two channels; however, the present invention is not limited to two-channels.

Not less than four antennas installed in the reception apparatus assure the better reception sensitivity. The expression of "antenna" in the previous description does not always mean a single antenna, but "antenna" can mean an antenna unit which is formed of a plurality of antennas.

As discussed above, the fourth exemplary embodiment has referred to the reception apparatus comprising the following elements:

a received signal strength intensity estimation unit for receiving a modulation signal of a spread-spectrum communication method transmitted to the same frequency band from respective transmission antennas, then estimating a reception received signal strength intensity of the signal received by respective antennas, and outputting an estimation signal of the reception received signal strength intensity of the reception signal;

a phase difference estimation unit for receiving a transmission path variation estimation signal of a spread-spectrum communication method of the respective antennas, finding a phase difference of the transmission path variation estimation signal of the spread-spectrum communication method between the respective antennas, and outputting a phase difference signal; and a signal selection unit for receiving a reception quadrature baseband signal of the respective antennas, a transmission path variation estimation signal of respective spread-spectrum communication methods of the respective antennas, a reception electric field estimation signal of the reception signal, and the phase difference signal, then selecting the reception quadrature baseband signal and the transmission path variation estimation signal for isolating signals of the respective methods from the reception signal, and outputting the signals selected.

The foregoing structure allows the reception apparatus to demultiplex a multiplexed signal with accuracy.

Exemplary Embodiment 5

The fifth exemplary embodiment describes the transmission method of transmitting modulation signals of a plurality of channels from a plurality of antennas to the same frequency band. More particularly, a demodulation symbol to be inserted into a channel is formed of a plurality of sequential symbols, and each one of demodulation symbols of respective channels is placed at the same time and orthogonal to each other. The fifth embodiment also describes a transmission apparatus and a reception apparatus to be used in the foregoing transmission method.

Figure 20:
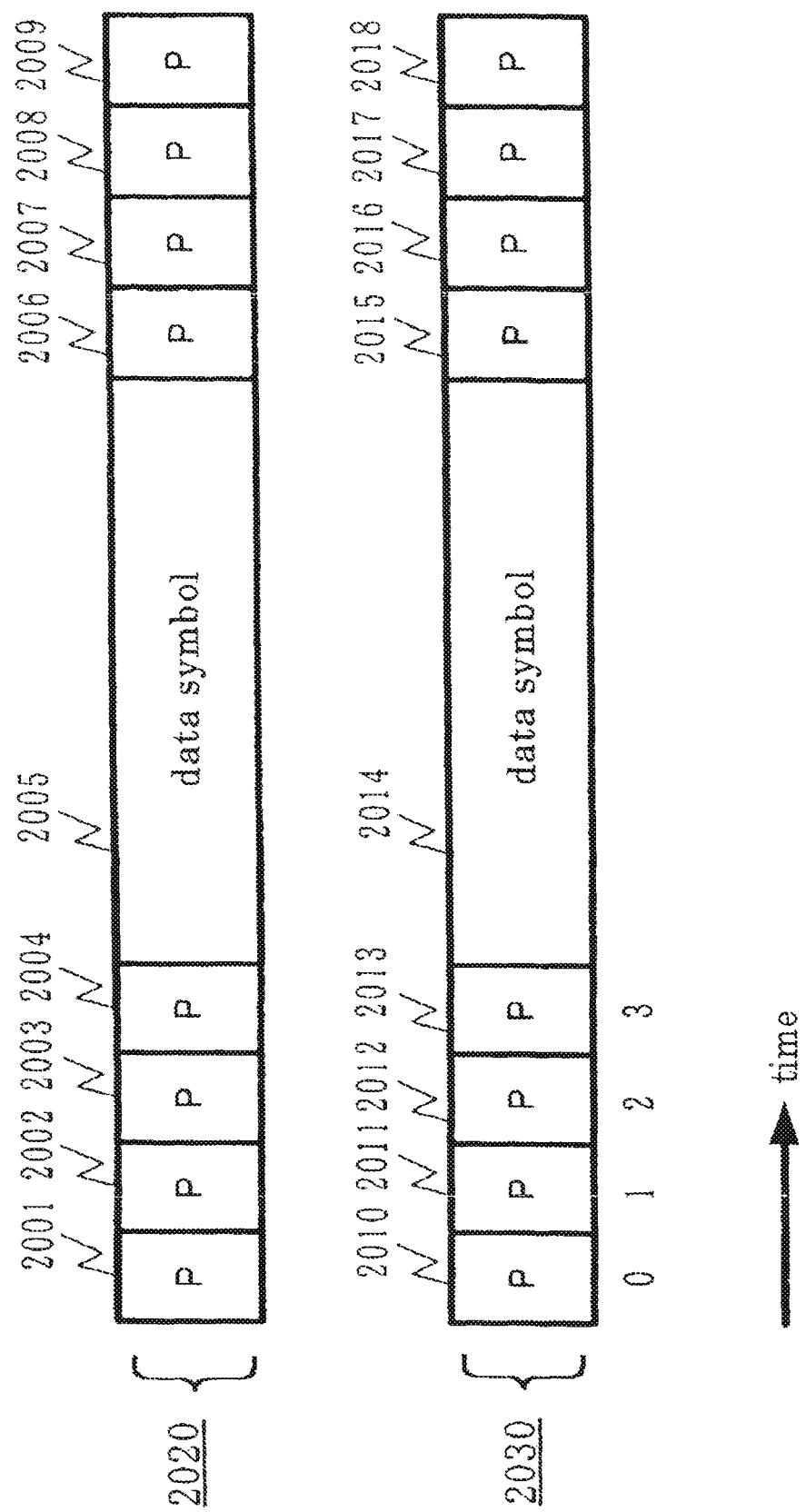
FIG. 20 shows a frame structure of a signal in accordance with a fifth exemplary embodiment of the present invention.

FIG. 20 shows frame structure 2020 of channel A and frame structure 2030 of channel B along a time axis. Frame structure 2020 includes pilot symbols 2001, 2002, 2003,

2004, 2006, 2007, 2008, 2009, and data symbol 2005. Frame structure 2030 includes pilot symbols 2010, 2011, 2012, 2013, 2015, 2016, 2017, 2018, and data symbol 2014.

Figure 21:
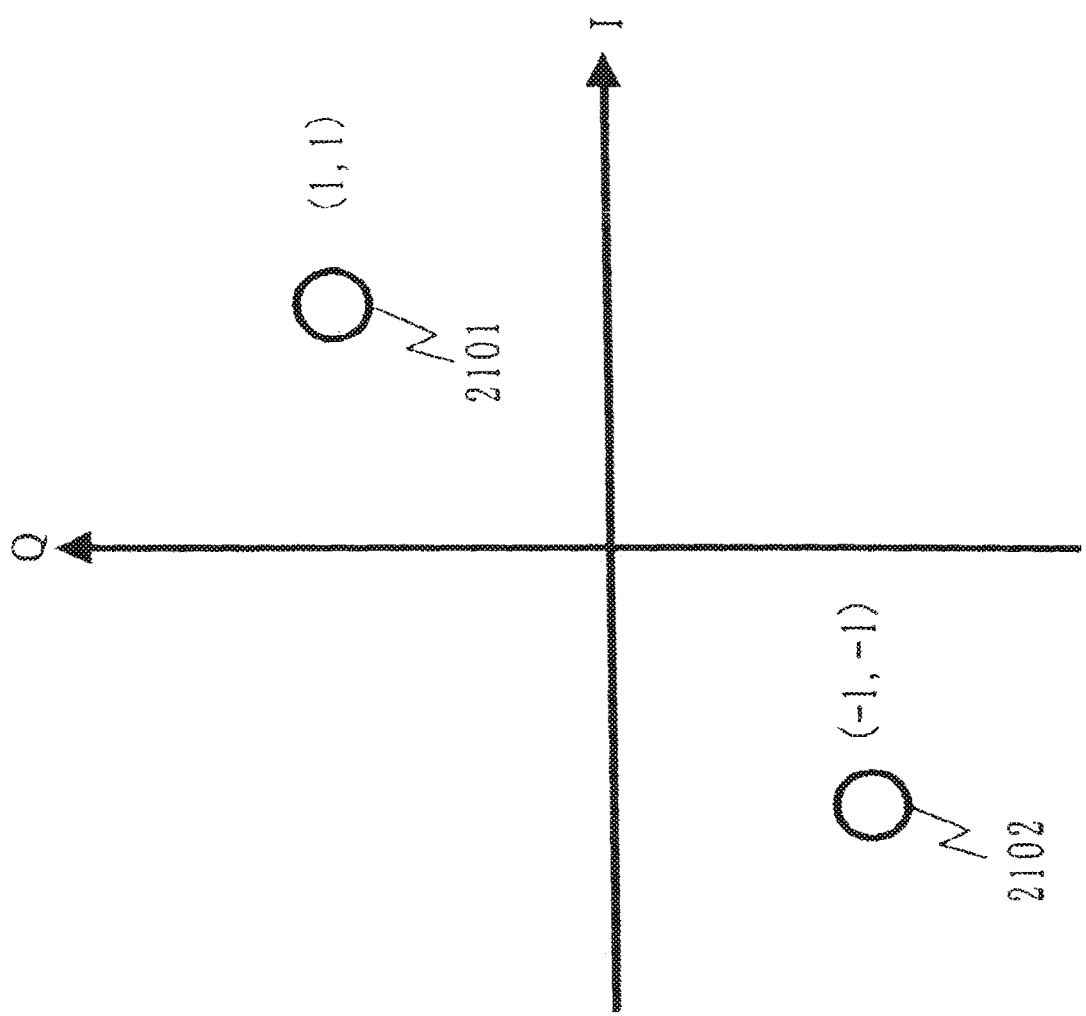
FIG. 21 shows a point mapping of signals in in-phase-quadrature (I-Q) plane in accordance with the fifth exemplary embodiment of the present invention.

FIG. 21 shows a placement of signal points of the pilot symbols of channels A and B in in-phase-quadrature (I-Q) plane, and signal points 2101 and 2102 indicate the pilot symbols.

FIG. 2 shows a structure of the transmission apparatus in accordance with the fifth embodiment.

Figure 22:
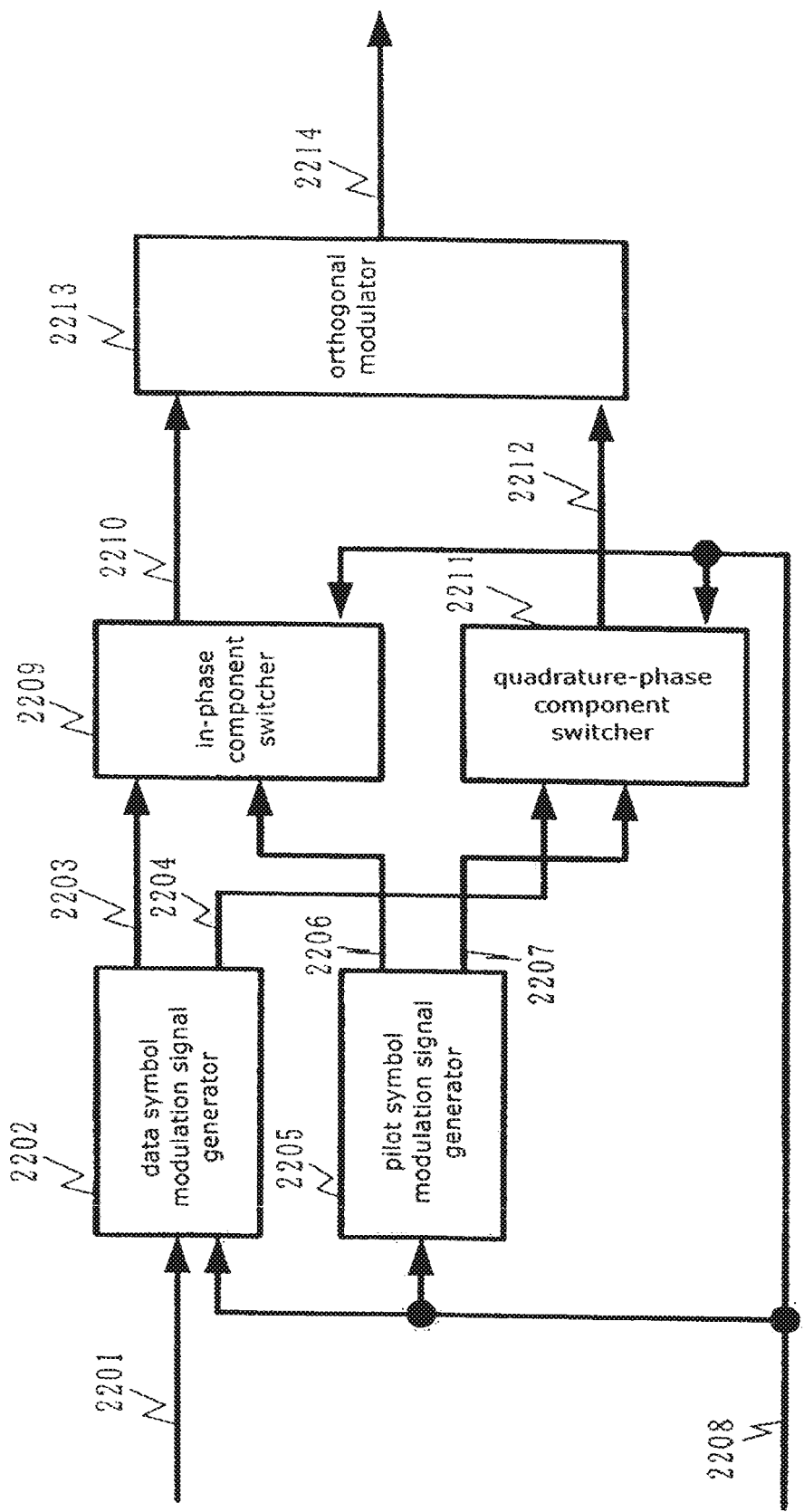
FIG. 22 shows a structure of a modulation signal generator in accordance with the fifth exemplary embodiment of the present invention.

FIG. 22 shows a detailed structure of modulation signal generators 202, 212. Data-symbol modulation signal generator 2202 receives transmission digital signal 2201, frame structure signal 2208. When frame structure signal 2208 indicates a data symbol, generator 2202 provides signals 2201 with, e.g. QPSK modulation, and outputs in-phase component 2203 and quadrature-phase component 2204 of a transmission quadrature baseband signal of the data symbol.

Pilot symbol modulation signal generator 2205 receives frame structure signal 2208. When signal 2208 indicates a pilot symbol, generator 2205 outputs in-phase component 2206 and quadrature-phase component 2207 of a transmission quadrature baseband signal of the pilot symbol.

In-phase component switcher 2209 receives in-phase components 2203, 2206 and frame structure signal 2208, then selects the in-phase component of transmission quadrature baseband signal corresponding to a symbol indicated by frame structure signal 2208, and outputs the selected one as in-phase component 2210 of the selected transmission quadrature baseband signal.

Quadrature-phase component switcher 2211 receives quadrature-phase components 2204, 2207 and frame structure signal 2208, then selects a quadrature-phase component of a transmission quadrature baseband signal corresponding to a symbol indicated by frame structure signal 2208, and outputs the selected one as quadrature-phase component 2212 of the selected transmission quadrature baseband signal.

Orthogonal modulator 2213 receives in-phase component 2210 selected, quadrature-phase component 2212 selected, then provides those components 2210, 2212 with orthogonal modulation, and outputs modulation signal 2214.

FIG. 5 shows a structure of the reception apparatus in accordance with this fifth embodiment.

FIG. 17 shows amounts of transmission path variation along a time axis. Transmission path variation (I0, Q0) 1701 at time 0 (zero) is found by correlation calculation. In the same manner, following combinations are found at respective times by correlation calculations:

data symbol 1702 and transmission path variation (I1, Q1) at time 1;
data symbol 1703 and transmission path variation (I2, Q2) at time 2;
data symbol 1704 and transmission path variation (I3, Q3) at time 3;
data symbol 1705 and transmission path variation (I4, Q4) at time 4;
data symbol 1706 and transmission path variation (I5, Q5) at time 5;
data symbol 1707 and transmission path variation (I6, Q6) at time 6.

Figure 23:
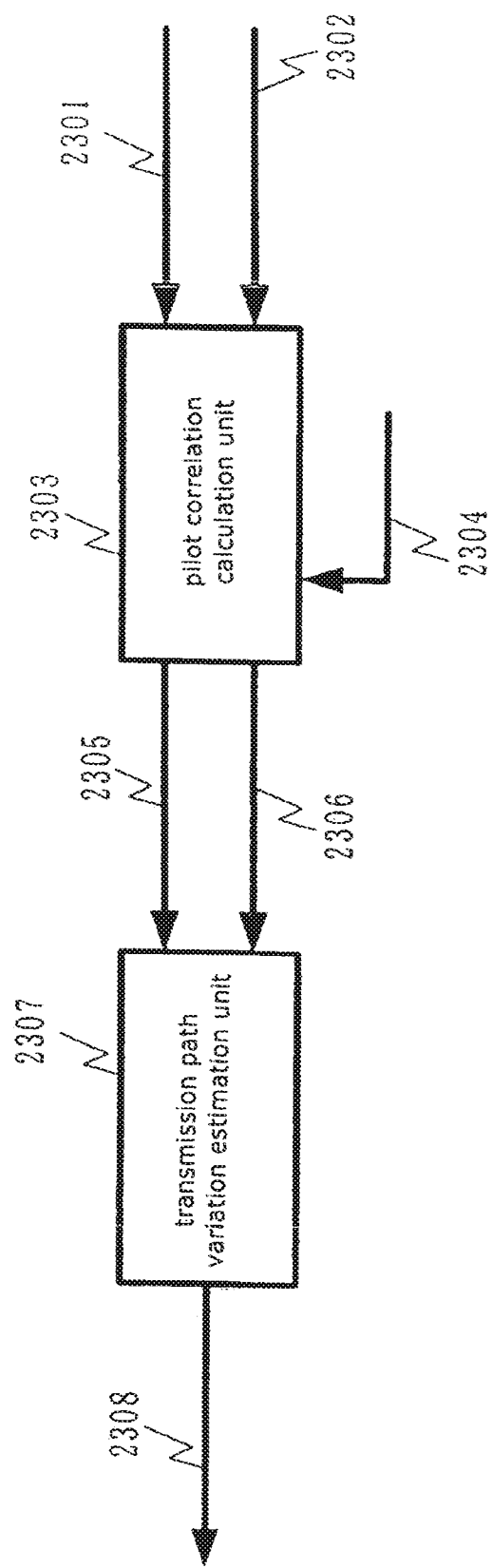
FIG. 23 shows a structure of a transmission path variation estimation unit in accordance with the fifth exemplary embodiment of the present invention.

FIG. 23 shows a structure of transmission path variation estimation units 506, 518 of channel A and estimation units 508, 520 of channel B shown in FIG. 5.

Pilot symbol correlation calculation unit 2303 receives in-phase component 2301, quadrature-phase component 2302 of a reception quadrature baseband signal, and pilot-symbol series 2304, then outputs in-phase component 2305, quadrature-phase component 2306 of the reception quadrature baseband signal of the pilot symbols undergone the correlation calculations.

Transmission path variation estimation unit 2307 receives in-phase component 2305 and quadrature-phase component 2306, and outputs transmission-path variation estimation signal 2308.

The transmission method in accordance with this fifth embodiment is demonstrated hereinafter with reference to FIGS. 20 and 21.

The signal point of pilot symbol 2001 of channel A at time 0 is placed at point 2101 (1, 1) in FIG. 21. The signal point of pilot symbol 2002 of channel A at time 1 is placed at point 2101 (1, 1) in FIG. 21. The signal point of pilot symbol 2003 of channel A at time 2 is placed at point 2101 (1, 1) in FIG. 21. The signal point of pilot symbol 2004 of channel A at time 3 is placed at point 2101 (1, 1) in FIG. 21.

The signal point of pilot symbol 2010 of channel B at time 0 is placed at point 2101 (1, 1) in FIG. 21. The signal point of pilot symbol 2011 of channel B at time 1 is placed at point 2101 (1, 1) in FIG. 21. The signal point of pilot symbol 2012 of channel B at time 2 is placed at point 2102 (−1, −1) in FIG. 21. The signal point of pilot symbol 2013 of channel B at time 3 is placed at point 2102 (−1, −1) in FIG. 21.

In a similar way to what is discussed above, the signal point of pilot symbol 2006 is placed at the same place as that of pilot symbol 2001. The signal points of pilot symbols 2007, 2008, 2009 are placed at the same places of pilot symbols 2002, 2003, 2004 respectively. In the same manner, the signal points of pilot symbols 2015, 2016, 2017, 2018 are placed at the same places of pilot symbols 2010, 2011, 2012, 2013 respectively.

As such, sequential pilot symbols 2001, 2002, 2003, 2004 of channel A has correlation of 0 (zero) with sequential pilot symbols 2010, 2011, 2012, 2013 of channel B.

Next, an operation of the transmission apparatus is demonstrated hereinafter with reference to FIG. 2 and FIG. 22.

In FIG. 2, frame structure signal generator 209 outputs the information of the frame structure shown in FIG. 20 as frame structure signal 210. Modulation signal generator 202 of channel A receives frame structure signal 210 and transmission digital signal 201 of channel A, then outputs modulation signal 203 of channel A in accordance with the frame structure. Modulation signal generator 212 of channel B receives frame structure signal 210 and transmission digital signal 211 of channel B, then outputs modulation signal 213 of channel B in accordance with the frame structure.

An operation of modulation signal generators 202 and 212 at the process discussed above is described using transmitter 220 of channel A as an example with reference to FIG. 22.

Data symbol modulation signal generator 2202 receives transmission digital signal 2201, i.e. transmission digital signal 201 of channel A in FIG. 2, and frame structure signal 2208, i.e. frame structure signal 210 in FIG. 2. When frame structure signal 2208 indicates a data symbol, generator 2202 provides signal 2201 with QPSK modulation, and outputs in-phase component 2203 and quadrature-phase component 2204 of a transmission quadrature baseband signal of the data symbol.

Pilot symbol modulation signal generator 2205 receives frame structure signal 2208. When signal 2208 indicates a pilot symbol, generator 2205 outputs in-phase component 2206 and quadrature-phase component 2207 of a transmission quadrature baseband signal of the pilot symbol.

In-phase component switcher 312 receives the following signals:

in-phase component 2203 of a data symbol transmission quadrature baseband signal;

in-phase component 2206 of a pilot symbol transmission quadrature baseband signal; and frame structure signal 2208.

Switcher 312 then selects an in-phase component of the transmission quadrature baseband signal corresponding to the symbol indicated by frame structure signal 2208, and outputs the selected one as in-phase component 2210 of the selected transmission quadrature baseband signal.

Quadrature-phase component switcher 2211 receives the following signals:

quadrature-phase component 2204 of data symbol transmission quadrature baseband signal;

quadrature-phase component 2207 of pilot symbol transmission quadrature baseband signal; and frame structure signal 2208.

Switcher 2211 then selects a quadrature-phase component of a transmission quadrature baseband signal corresponding to the symbol indicated by frame structure signal 2208, and outputs the selected one as quadrature-phase component 2212 of the selected transmission orthogonal base-band.

Orthogonal modulator 2213 receives in-phase component 2210 and quadrature-phase component 2212 discussed above, then provides those components with an orthogonal modulation, and outputs modulation signal 2214, i.e. signal 203 shown in FIG. 2.

Next, an operation of the reception apparatus, in particular, operations of transmission path variation estimation unit 506 of channel A, transmission path variation estimation unit 508 of channel B, and signal processor 525, with reference to FIG. 5 and FIG. 23. Estimation unit 506 of channel A is taken as an example for the description purpose.

Pilot correlation calculation unit 2303 shown in FIG. 23 receives in-phase component 2301, quadrature-phase component 2302 of a reception quadrature signal, in which channel A and channel B are mixed with each other, received by antenna 501, and pilot symbol series 2304 of channel A, then detects pilot symbols in in-phase component 2301 and quadrature-phase component 2302. Calculation unit 2303 then calculates correlation between the pilot symbol section detected and pilot-symbol series 2304, and outputs in-phase component 2305, quadrature-phase component 2306 undergone the correlation calculation.

The pilot-symbol series of channel A can be formed of the in-phase component and the quadrature-phase component. In such a case, channel B component of the pilot symbol in in-phase component 2301 and quadrature-phase component 2302 of the reception quadrature baseband signal can be removed by the correlation calculation because the pilot symbol series of channel A is orthogonal to the pilot symbols series of channel B.

Transmission path variation estimation unit 2307 is described with reference to FIG. 17. Distortions (I0, Q0) and (I6, Q6) in FIG. 17 are found by pilot-symbol correlation calculation unit 2303. Data-symbol transmission path variations (I1, Q1), (I2, Q2), (I3, Q3), (I4, Q4), (I5, Q5) are found from distortions (I0, Q0) and (I6, Q6), then estimation unit 2307 outputs those distortions as transmission path variation estimation signal 2308.

In a similar way to estimation unit 506 of channel A, transmission path variation estimation unit 508 of channel B outputs transmission path variation estimation signal 509 of reception signal 502 in which channel A and channel B are mixed with each other. Estimation unit 518 of channel A and estimation unit 520 of channel B output variation estimation signal 519 of channel A and variation estimation signal 521 of channel B respectively from reception signal 514 where channel A and channel B are mixed.

The foregoing description expresses the transmission path variation in (I, Q); however, the distortion can be expressed in power and phase, so that estimation signals 507, 519 of channel A and estimation signal 509, 521 of channel B can be expressed in power and phase.

The foregoing structure and operation allow the reception apparatus to demultiplex the modulation signals of channel A from those of channel B, so that the signals can be demodulated.

In this fifth embodiment, the number of channels to be multiplexed is two, however, the embodiment is not limited to two channels, and not limited to the frame structure shown in FIG. 20. The transmission path variation can be estimated using the pilot symbol as an example, and other symbols can be used for this purpose as long as they can estimate the distortion.

The expression of "antenna" in the previous description does not always mean a single antenna, but "antenna" can mean an antenna unit which is formed of a plurality of antennas.

The structure of the transmission apparatus of this embodiment is not limited to what is shown in FIG. 2 or FIG. 22, and when the number of channels increase, the structure formed of elements 201 through 208 shown in FIG. 2 is added accordingly.

The structure of the reception apparatus of this embodiment is not limited to what is shown in FIG. 5 or FIG. 23, and when the number of channels increase, the number of channel estimation units increases accordingly.

As discussed above, the fifth exemplary embodiment describes the transmission method of transmitting modulation signals of a plurality of channels from a plurality of antennas to the same frequency band. More particularly, a demodulation symbol to be inserted into a channel is formed of a plurality of sequential symbols, and each one of demodulation symbols of respective channels is placed at the same time and orthogonal to each other. The fifth embodiment also describes the transmission apparatus and the reception apparatus to be used in the foregoing transmission method. The foregoing transmission method, transmission apparatus and reception apparatus allow multiplexing modulation signals of a plurality of channels to the same frequency band. Through this operation, the transmission rate of data can be increased, at the same time, the demodulation symbol has resistance to noises, so that an accuracy of channel estimation in the reception apparatus is increased. As a result, transmission quality of data is improved.

Exemplary Embodiment 6

The sixth exemplary embodiment describes the transmission method which transmits modulation signals of a plurality of channels to the same frequency band from a plurality of antennas. More particularly, in this method, at the same time and sub-carrier(s) at which a demodulation symbol is inserted in a channel having a frame structure in accordance with OFDM method, in a symbol that is inserted in other such channel(s) both of an in-phase signal and a quadrature signal in the in-phase-quadrature plane are made to be zero signals. The sixth embodiment also describes a transmission apparatus and a reception apparatus to be used in the foregoing transmission method.

Figure 24:
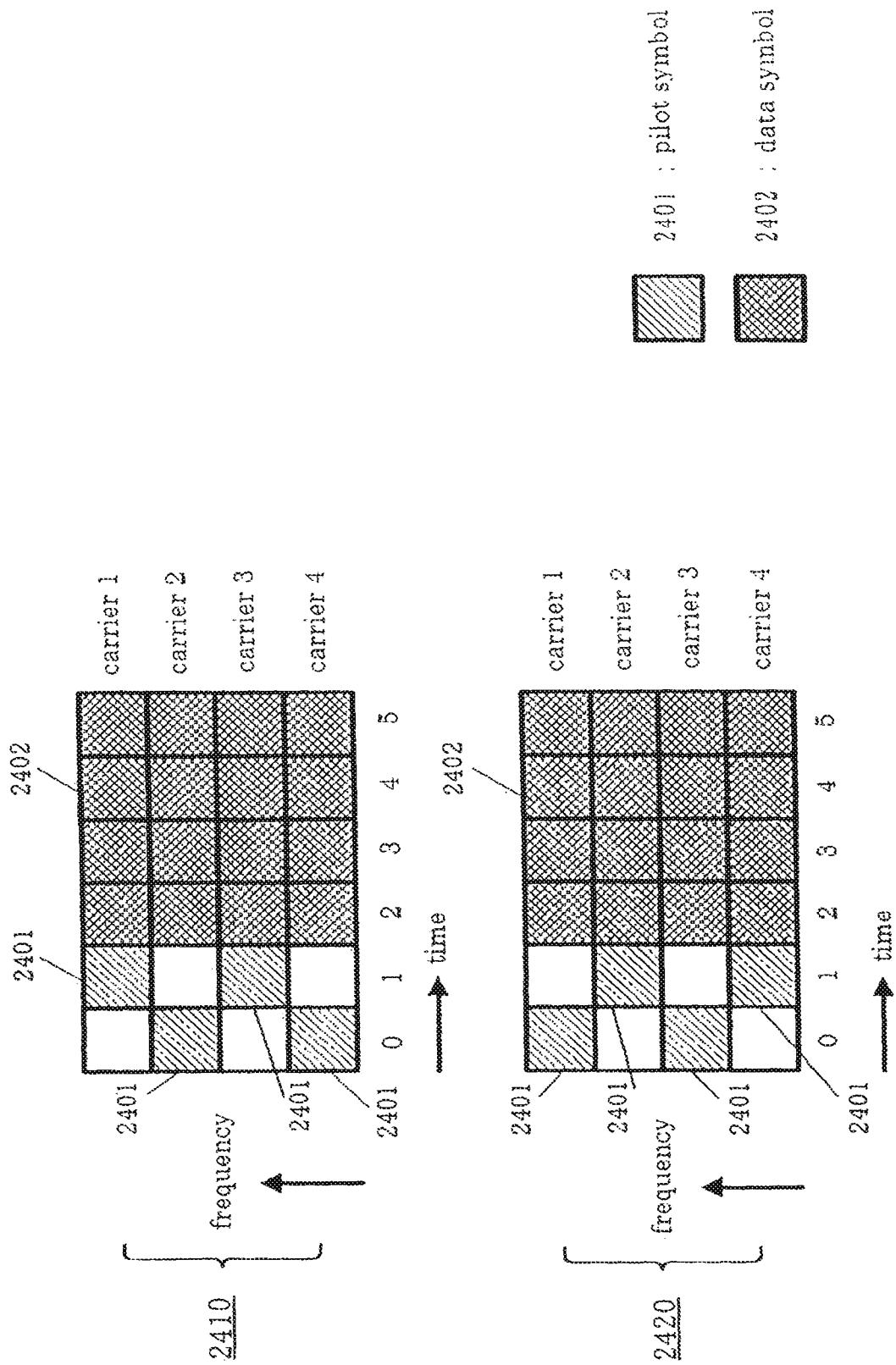
FIG. 24 shows frame structures of channel A and channel B in accordance with the fifth exemplary embodiment of the present invention.

FIG. 4 shows a placement of signal points in in-phase-quadrature (I-Q) plane. FIG. 24 shows examples of frame structure 2410 of channel A and frame structure 2420 of channel B along a frequency axis. Frame structure 2410 includes pilot symbol 2401 and data symbol 2402. As shown in FIG. 24, at time 0 of channel A, sub-carrier 2 is assigned as pilot symbol. At this time, assume that channel B has a symbol of (I, Q)=(0, 0). As such, assume that at a certain time and a certain frequency, when channel A shows a pilot symbol, channel B has a symbol of (I, Q)=(0, 0). On the contrary, when channel B shows a pilot symbol, channel A has a symbol of (I, Q)=(0, 0).

Figure 25:
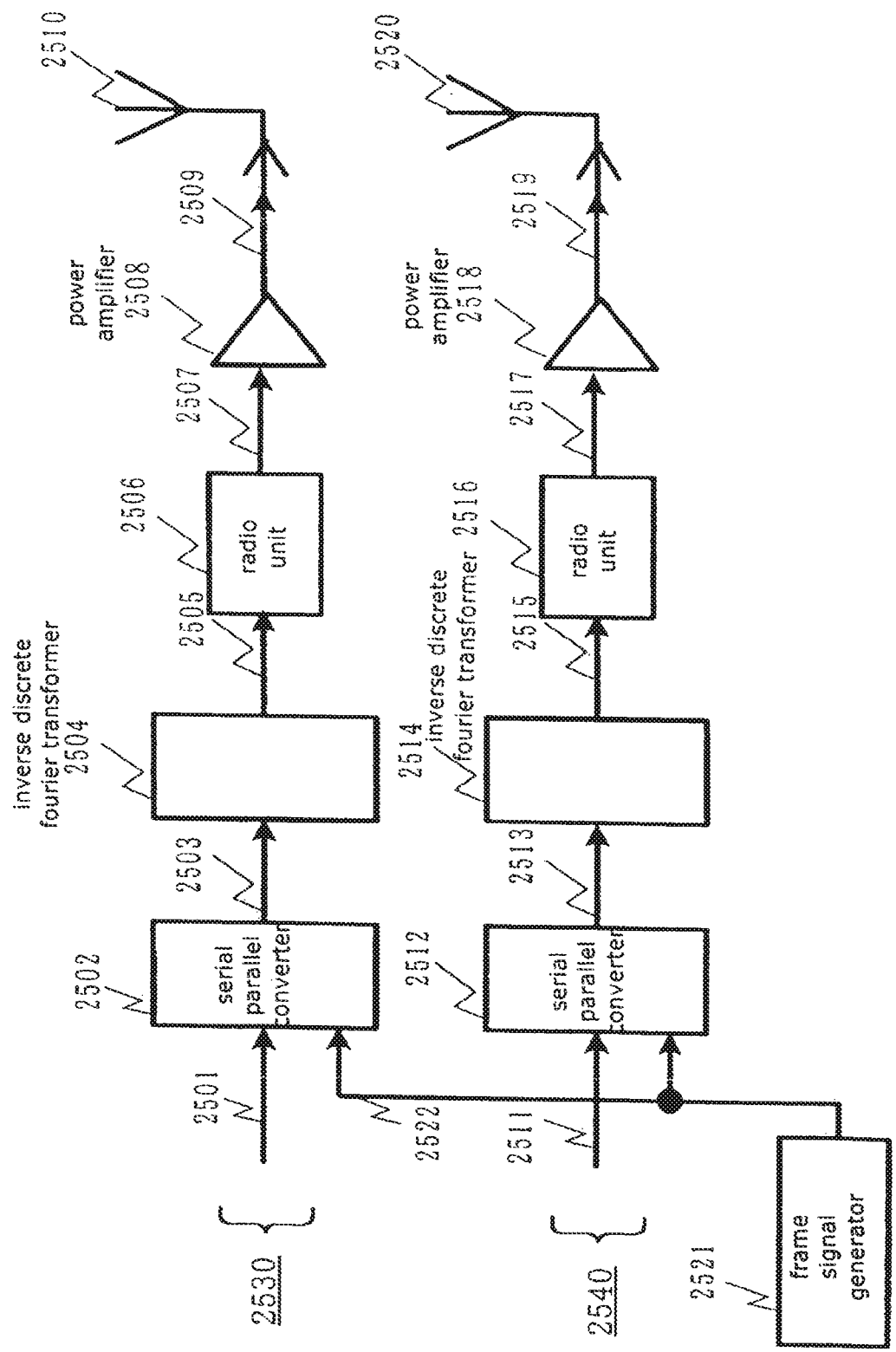
FIG. 25 shows a structure of a transmission apparatus in accordance with a sixth exemplary embodiment of the present invention.

FIG. 25 shows a structure of the transmission apparatus in accordance with the sixth embodiment, and the transmission apparatus is formed of channel A transmitter 2530, channel B transmitter 2540 and frame structure signal generator 2521.

Transmitter 2530 of channel A comprises serial-parallel converter 2502, inverse discrete Fourier transformer 2504, radio unit 2506, power amplifier 2508, and antenna 2510.

Transmitter 2540 of channel B comprises serial-parallel converter 2512, inverse discrete Fourier transformer 2514, radio unit 2516, power amplifier 2518, and antenna 2520.

Frame structure signal generator 2521 outputs the information of the frame structure as frame structure signal 2522.

Serial-parallel converter 2502 of channel A receives transmission digital signal 2501 of channel A and frame structure signal 2522, and outputs parallel signal 2503 of channel A in accordance with the frame structure.

Inverse discrete Fourier transformer 2504 of channel A receives parallel signal 2503, and outputs signal 2505 undergone the inverse discrete Fourier transformation of channel A.

Radio unit 2506 of channel A receives signal 2505, and outputs transmission signal 2507 of channel A.

Power amplifier 2508 of channel A receives and amplifies transmission signal 2507, and outputs transmission signal 2509 as radio-wave from antenna 2510 of channel A.

Serial-parallel converter 2512 of channel B receives transmission digital signal 2511 of channel B and frame structure signal 2522, and outputs parallel signal 2513 of channel B in accordance with the frame structure.

Inverse discrete Fourier transformer 2514 of channel B receives parallel signal 2513, and outputs signal 2515 undergone the inverse discrete Fourier transformation of channel B.

Radio unit 2516 of channel B receives signal 2515, and outputs transmission signal 2517 of channel B.

Power amplifier 2518 of channel B receives and amplifies transmission signal 2517, and outputs transmission signal 2519 as radio-wave from antenna 2520 of channel B.

Figure 26:
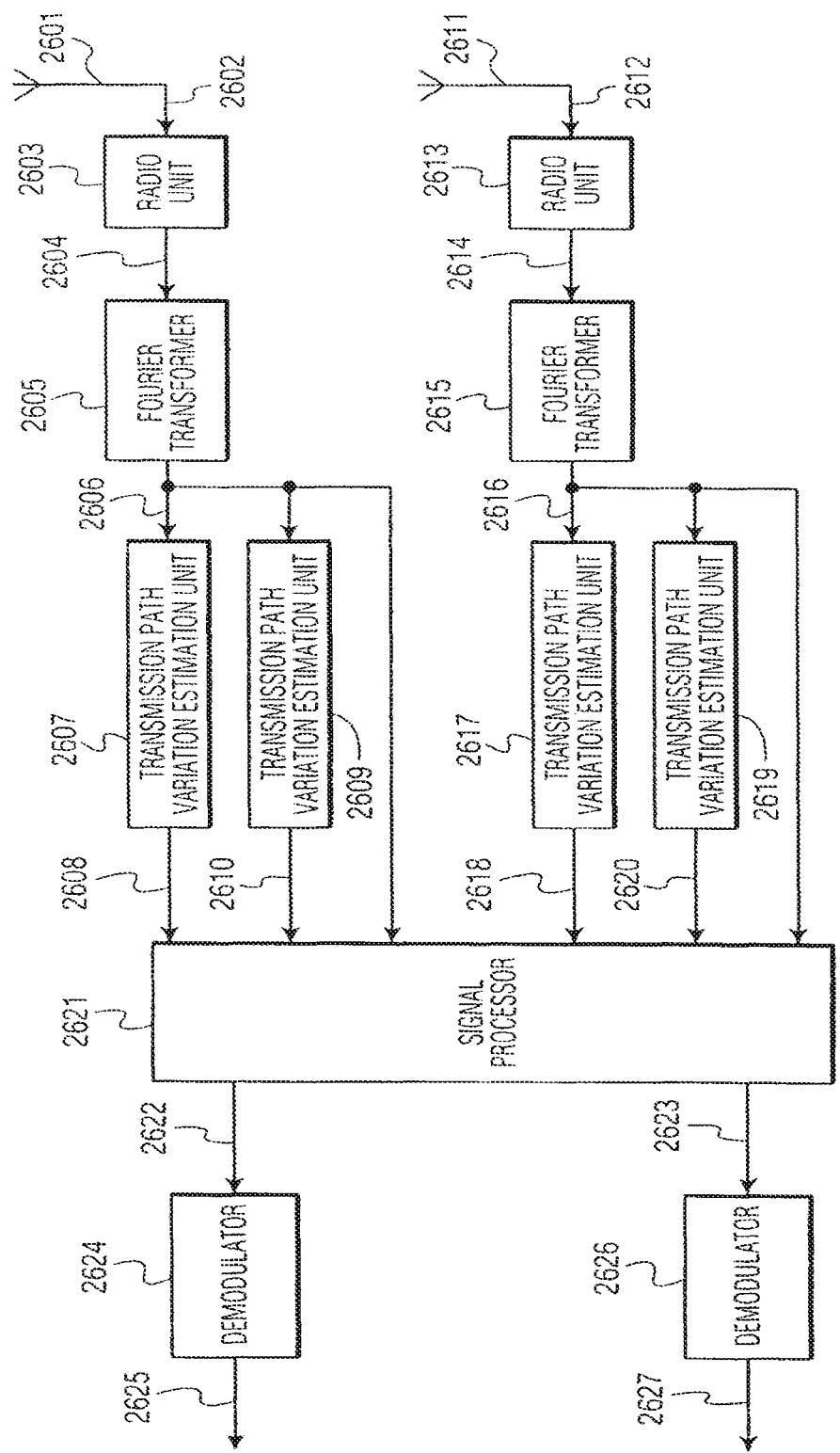
FIG. 26 shows a structure of a reception apparatus in accordance with the sixth exemplary embodiment of the present invention.

FIG. 26 shows a structure of the reception apparatus in accordance with this embodiment, and radio unit 2603 receives signal 2602 received by antenna 2601, then outputs a reception quadrature baseband signal 2604.

Fourier transformer 2605 receives quadrature baseband signal 2604, and outputs parallel signal 2606.

Transmission path variation estimation unit 2607 of channel A receives parallel signal 2606, and outputs transmission path variation parallel signal 2608 of channel A.

Transmission path variation estimation unit 2609 of channel B receives parallel signal 2606, and outputs transmission path variation parallel signal 2610 of channel B.

Radio unit 2613 receives signal 2612 received by antenna 2611, and outputs reception quadrature baseband signal 2614.

Fourier transformer 2615 receives signal 2614, and outputs parallel signal 2616.

Transmission path variation estimation unit 2617 of channel A receives parallel signal 2616, and outputs transmission path variation parallel signal 2618 of channel A.

Transmission path variation estimation unit 2619 of channel B receives parallel signal 2616, and outputs transmission path variation parallel signal 2620 of channel B.

Signal processor 2621 receives parallel signals 2606, 2616, transmission path variation parallel signals 2608, 2618 of channel A, and transmission path variation parallel signals 2610, 2620 of channel B, then demultiplexes the signals of channel A from those of channel B, and outputs parallel signal 2622 of channel A as well as parallel signal 2623 of channel B.

Demodulator 2624 of channel A receives parallel signal 2622 of channel A, and outputs reception digital signal 2625 of channel A.

Demodulator 2626 of channel B receives parallel signal 2623 of channel B, and outputs reception digital signal 2627 of channel B.

Figure 27:
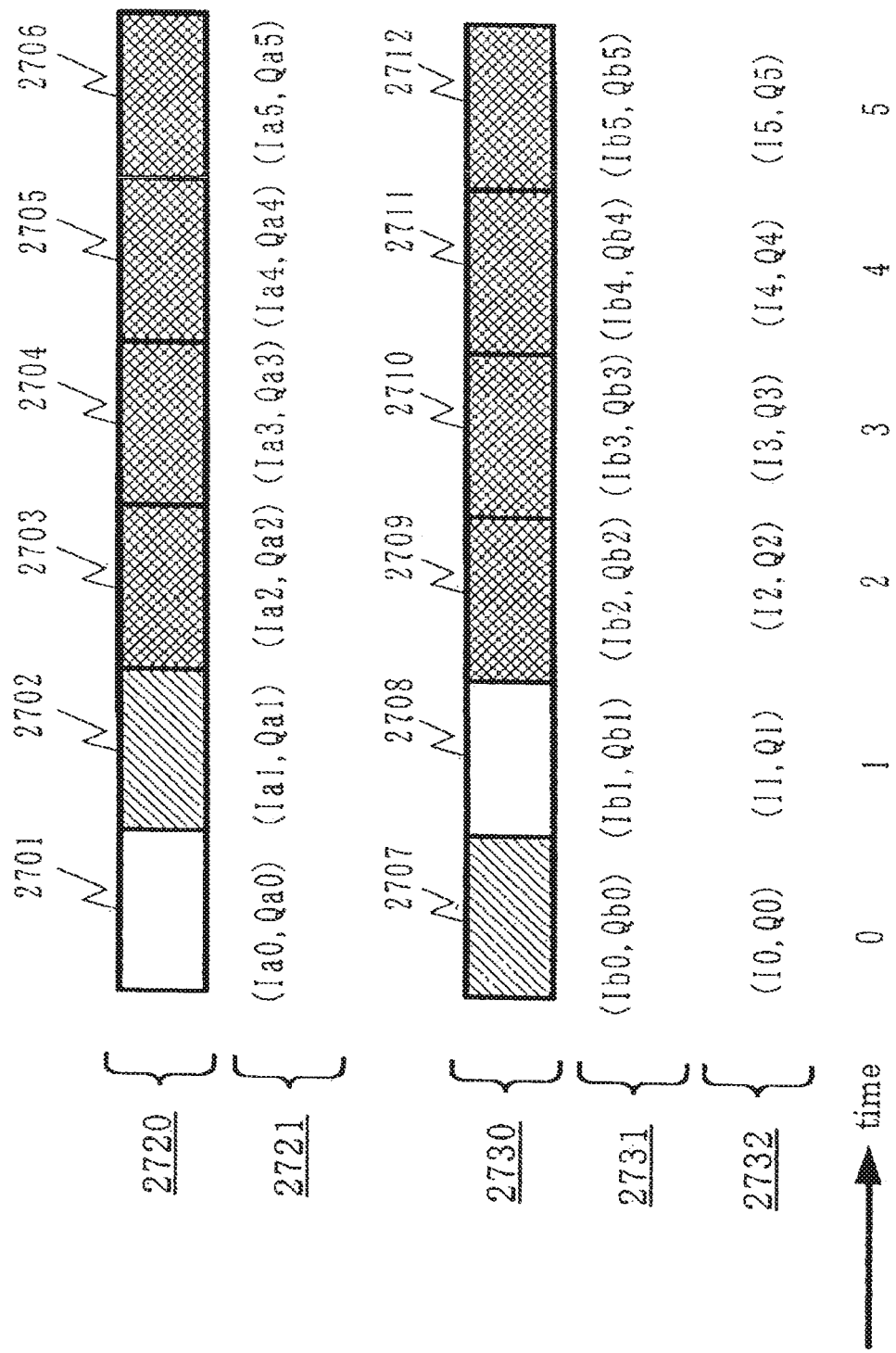
FIG. 27 shows distortions in transmission paths in accordance with the sixth exemplary embodiment of the present invention.

FIG. 27 shows a transmission path variation of a carrier along a time axis. Specifically, relations between frame structure 2720 of carrier 1 of channel A, transmission path variation 2721 of carrier 1 of channel A, frame structure 2730 of carrier 1 of channel B, transmission path variation 2731 of carrier 1 of channel B, and reception base-band signal 2732 of carrier 1.

Frame structure 2720 includes symbol 2701 of a carrier of channel A at time 0, symbol 2702 of a carrier of channel A at time 1, symbol 2703 of a carrier of channel A at time 2, symbol 2704 of a carrier of channel A at time 3, symbol 2705 of a carrier of channel A at time 4, symbol 2706 of a carrier of channel A at time 5. Frame structure 2730 includes symbol 2707 of a carrier of channel B at time 0, symbol 2708 of a carrier of channel B at time 1, symbol 2709 of a carrier of channel B at time 2, symbol 2710 of a carrier of channel B at time 3, symbol 2711 of a carrier of channel B at time 4, symbol 2712 of a carrier of channel B at time 5.

Figure 28:
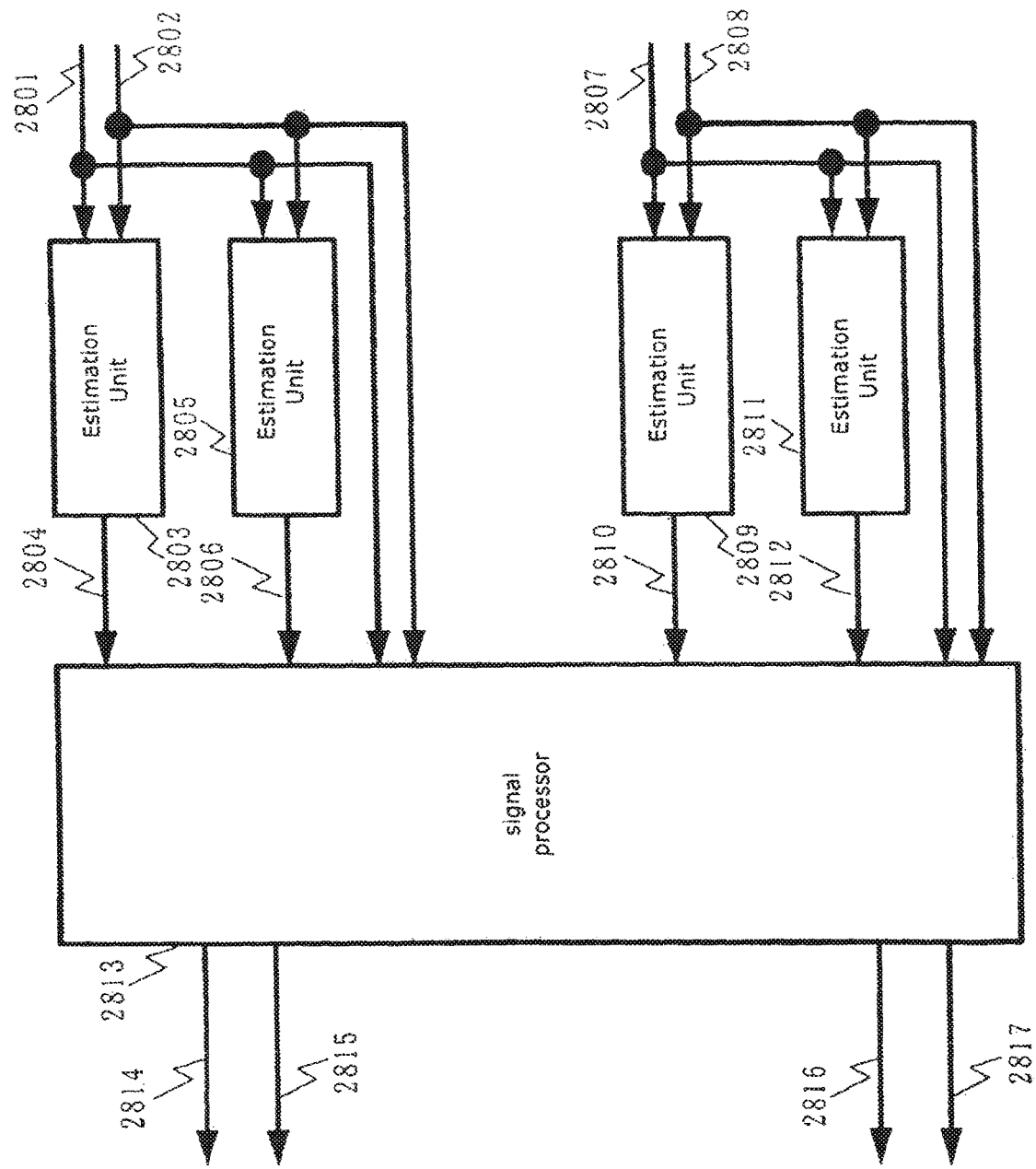
FIG. 28 shows structures of a transmission path variation estimation unit and a signal processor in accordance with the sixth exemplary embodiment of the present invention.

FIG. 28 shows a structure of transmission path variation estimation units and a signal processor of carrier 1.

Estimation unit 2803 of carrier 1 of channel A receives in-phase component 2801 and quadrature-phase component 2802 of carrier 1 of the parallel signal, and outputs transmission path variation estimation signal 2804 of carrier 1 of channel A.

Estimation unit 2805 of carrier 1 of channel B receives in-phase component 2801 and quadrature-phase component 2802 of carrier 1 of the parallel signal, and outputs transmission path variation estimation signal 2806 of carrier 1 of channel B.

Estimation unit 2809 of carrier 1 of channel A receives in-phase component 2807 and quadrature-phase component 2808 of carrier 1 of the parallel signal, and outputs transmission path variation estimation signal 2810 of carrier 1 of channel A.

Estimation unit 2811 of carrier 1 of channel B receives in-phase component 2807 and quadrature-phase component 2808 of carrier 1 of the parallel signal, and outputs transmission path variation estimation signal 2812 of carrier 1 of channel B.

Signal processor 2813 of carrier 1 receives the following signals:

in-phase component 2801 and quadrature-phase component 2802 of carrier 1 of the parallel signal;

transmission path variation estimation signal 2804 of carrier 1 of channel A;

transmission path variation estimation signal 2806 of carrier 1 of channel B;

in-phase component 2807 and quadrature-phase component 2808 of carrier 1 of the parallel signal;

transmission path variation estimation signal 2810 of carrier 1 of channel A; and transmission path variation estimation signal 2812 of carrier 1 of channel B.

Signal processor 2813 then demultiplexes the signals of channel A from channel B, and outputs in-phase component 2814, quadrature-phase component 2815 of carrier 1 of the parallel signal of channel A, and in-phase component 2816, quadrature-phase component 2817 of carrier 1 of the parallel signal of channel B.

An operation of the transmission apparatus is demonstrated hereinafter with reference to FIGS. 4, 24 and 25. In FIG. 24, the signal point of pilot symbol 2401 corresponds to signal point 402 shown in FIG. 4. The signal point of symbol of (I, Q)=(0, 0) corresponds to signal point 403 shown in FIG. 4.

In FIG. 25, frame structure signal generator 2521 outputs the information about the frame structure shown in FIG. 24 as frame structure signal 2522. Serial-parallel converter 2502 of channel A receives transmission digital signal 2501 of channel A, frame structure signal 2522, then outputs parallel signal 2503 of channel A in accordance with the frame structure shown in FIG. 24. In a similar way to converter 2502, serial-parallel converter 2512 of channel B receives transmission digital signal 2511 of channel B, frame structure signal 2522, then outputs parallel signal 2513 of channel B in accordance with the frame structure shown in FIG. 24.

Next, an operation of the reception apparatus is demonstrated, in particular, operations of transmission path variation estimation units 2607, 2617 of channel A, estimation units 2609, 2619 of channel B, and signal processor 2621 are demonstrated with reference to FIGS. 26, 27 and 28 using carrier 1 shown in FIG. 24 as an example.

FIG. 28 shows a structure where only the functions of carrier 1 are extracted from estimation units 2607, 2617 of channel A, estimation units 2609, 2619 of channel B, and signal processor 2621 shown in FIG. 26.

In FIG. 28, in-phase component 2801 and quadrature-phase component 2802 of carrier 1 of the parallel signal correspond to the component of carrier 1 of parallel signal 2606 shown in FIG. 26. A structure of transmission path variation estimation unit 2803 of carrier 1 of channel A shows the function of carrier 1 in estimation unit 2607 shown in FIG. 26. Estimation signal 2804 of channel A is a component of carrier 1 of parallel signal 2608 shown in FIG. 26. A structure of transmission path variation estimation unit 2805 of carrier 1 of channel B shows the function of carrier 1 in estimation unit 2609 shown in FIG. 26. Estimation signal 2806 of channel B is a component of carrier 1 of parallel signal 2610 shown in FIG. 26.

In-phase component 2807 and quadrature-phase component 2808 of carrier 1 of the parallel signal correspond to the component of carrier 1 of parallel signal 2616 shown in FIG. 26. A structure of transmission path variation estimation unit 2809 of carrier 1 of channel A shows the function of carrier 1 in estimation unit 2617 shown in FIG. 26. Estimation signal 2810 of channel A is a component of carrier 1 of parallel signal 2618 in FIG. 26. A structure of transmission path variation estimation unit 2811 of carrier 1 of channel B shows the function of carrier 1 in estimation unit 2619 shown in FIG. 26. Estimation signal 2812 of channel B is a component of carrier 1 of parallel signal 2620 in FIG. 26.

Signal processor 2813 of carrier 1 shows the function of carrier 1 in signal processor 2621. In-phase component 2814 and quadrature-phase component 2815 of carrier 1 of the parallel signal of channel A correspond to the component of carrier 1 of parallel signal 2622 of channel A shown in FIG. 26. In-phase component 2816 and quadrature-phase component 2817 of carrier 1 of the parallel signal of channel B correspond to the component of carrier 1 of parallel signal 2623 of channel B shown in FIG. 26.

Next, operations of transmission path variation estimation units 2803, 2809 of carrier 1 of channel A, and estimation units 2805, 2811 of carrier 1 of channel B shown in FIG. 28 are demonstrated using units 2803 and 2805 as examples.

In FIG. 27, assume that a reception base-band signal of carrier 1 at time 0 through time 5, i.e. in-phase component 2807 and quadrature-phase component 2808 of carrier 1 in the parallel signal, are (I0, Q0), (I1, Q1), (I2, Q2), (I3, Q3), (I4, Q4), and (I5, Q5).

Assume that the transmission path variation of carrier 1 of channel A at time 0 through time 5, i.e. transmission variation estimation signal 2804 of carrier 1 of channel A, are (Ia0, Qa0), (Ia1, Qa1), (Ia2, Qa2), (Ia3, Qa3), (Ia4, Qa4), and (Ia5, Qa5).

Assume that the transmission path variation of channel B of carrier 1 at time 0 through time 5, i.e. transmission variation estimation signal 2806 of channel B of carrier 1, are (Ib0, Qb0), (Ib1, Qb1), (Ib2, Qb2), (Ib3, Qb3), (Ib4, Qb4), and (Ib5, Qb5).

In the foregoing case, since (T0, Q0) has only a pilot component of channel B of carrier 1, (Ib0, Qb0)=(T0, Q0). Similarly, since (I1, Q1) has only a pilot component of channel A of carrier 1, (Ia1, Qa1)=Q1). For instance, (Ia0, Qa0)=(Ia1, Qa1)=(Ia2, Qa2)=(Ia3, Qa3)=(Ia4, Qa4)=(Ia5, Qa5), and (Ib0, Qb0)=(Ib1, Qb1)=(Ib2, Qb2)=(Ib3, Qb3)= (Ib4, Qb4)=(Ib5, Qb5) will find transmission path variation estimation signals 2804 and 2806 of channels A and B respectively of carrier 1.

A similar operation to what is discussed above will find transmission path variation estimation signals 2810 and 2812 of channels A and B respectively of carrier 1.

Signal processor 2813 of carrier 1 receives the following signals:

variation estimation signals 2804, 2810 of channel A;
variation estimation signals 2806, 2812 of channel B;
in-phase component 2801, quadrature-phase component 2802 of the parallel signal; and
in-phase component 2807, quadrature-phase component 2808 of the parallel signal.

Then processor 2813 carries out matrix calculations for demultiplexing the signals of channel A from channel B, and outputs the following signals:

in-phase component 2814 and quadrature-phase component 2815 of carrier 1 of the parallel signal of channel A; and in-phase component 2816 and quadrature-phase component 2817 of carrier 1 of the parallel signal of channel B.

As a result, modulation signals of channel A and channel B can be demultiplexed from each other, and the modulation signals can be demodulated.

The foregoing description expresses the transmission path variation in (I, Q); however, the distortion can be expressed in power and phase, so that estimation signals 2804, 2810 of channel A and estimation signal 2806, 2812 of channel B can be expressed in power and phase.

Signals of channel A and channel B of carriers 2, 3, and 4 can be demultiplexed from each other in a similar way to what is discussed above using the structure shown in FIG. 28.

A method of estimating a transmission path of carrier 2 is demonstrated hereinafter. The reception apparatus of this embodiment can estimate a fluctuation of the transmission path from a pilot symbol of carrier 2 at time 0 shown in FIG. 24. Also the reception apparatus can estimate the fluctuation of the transmission path of carrier 2 at time 1 from the pilot symbols of carrier 1 and carrier 3 at time 1. As such, the transmission path fluctuation of carrier 2 can be estimated by an estimated value of the transmission path fluctuation of carrier 2 estimated at time 0 and time 1. As a result, the transmission path fluctuation can be estimated with accuracy.

A method of estimating a transmission path of, e.g. carrier 2 shown in FIG. 24, is demonstrated hereinafter. The reception apparatus can estimate a fluctuation of the transmission path from a pilot symbol of carrier 2 at time 0 shown in FIG. 24. Also the reception apparatus can estimate the fluctuation of the transmission path of carrier 2 at time 1 from the pilot symbols of carrier 1 and carrier 3 at time 1. As such, the transmission path fluctuation of carrier 2 can be estimated by an estimated value of the transmission path fluctuation of carrier 2 estimated at time 0 and time 1. As a result, the transmission path fluctuation can be estimated with accuracy.

The expression of "antenna" in the previous description does not always mean a single antenna, but "antenna" can mean an antenna unit which is formed of a plurality of antennas.

In this embodiment, an accuracy of demultiplexing the modulation signals between channel A and channel B at the reception apparatus depends on a quality of the pilot symbol received. Thus stronger resistance of the pilot symbol to noise increases the accuracy of isolation between the modulation signals of channel A and channel B. As a result, the quality of data received can be improved. The way how to achieve this goal is described hereinafter.

In FIG. 4, assume that the pilot symbol has amplitude Ap from the origin, and QPSK has the greatest signal-point amplitude Aq from the origin. In this status, the relation of Ap>Aq increases the resistance to noise of the pilot symbol, so that the accuracy of demultiplexing the modulation signals of channel A from those of channel B. As a result, the quality of data received can be improved.

In this embodiment, the number of channels to be multiplexed are two; however, other numbers can be applicable to the embodiment. The frame structure is not limited to what is shown in FIG. 24. The pilot symbol is taken as an example for demultiplexing the channels; however, other symbols as long as they are used for demodulation can be also applicable. A modulation method of the data symbol is not limited to QPSK modulation, but respective channels can undergo different modulations.

The structure of the transmission apparatus of this embodiment is not limited to what is shown in FIG. 25, and when the number of channels increase, the structure formed of elements 2501 through 2510 shown in FIG. 25 is added accordingly.

The structure of the reception apparatus of this embodiment is not limited to what is shown in FIGS. 26, 28, and when the number of channels increase, the number of channel estimation units increases accordingly.

As discussed above, the sixth exemplary embodiment describes the transmission method which transmits modulation signals of a plurality of channels to the same frequency band from a plurality of antennas. More particularly, in this method, at the same time and sub-carrier(s) at which a demodulation symbol is inserted in a channel having a frame structure in accordance with OFDM method, in a symbol that is inserted in other such channel(s) both of an in-phase signal and a quadrature signal in the in-phase-quadrature plane are made to be zero signals. The sixth embodiment also describes the transmission apparatus and the reception apparatus to be used in the foregoing transmission method. The foregoing method and structure allow increasing the data transmission rate, and at the same time, the reception apparatus can demultiplex the multiplexed modulation signals with ease.

Exemplary Embodiment 7

The seventh exemplary embodiment describes a transmission method that switches between a method of transmitting modulation signals of a plurality of channels to the same frequency band from a plurality of antennas and a method of transmitting a modulation signal of one channel from an antenna. The embodiment also describes a transmission apparatus and a reception apparatus to be used in the foregoing transmission method.

Figure 29:
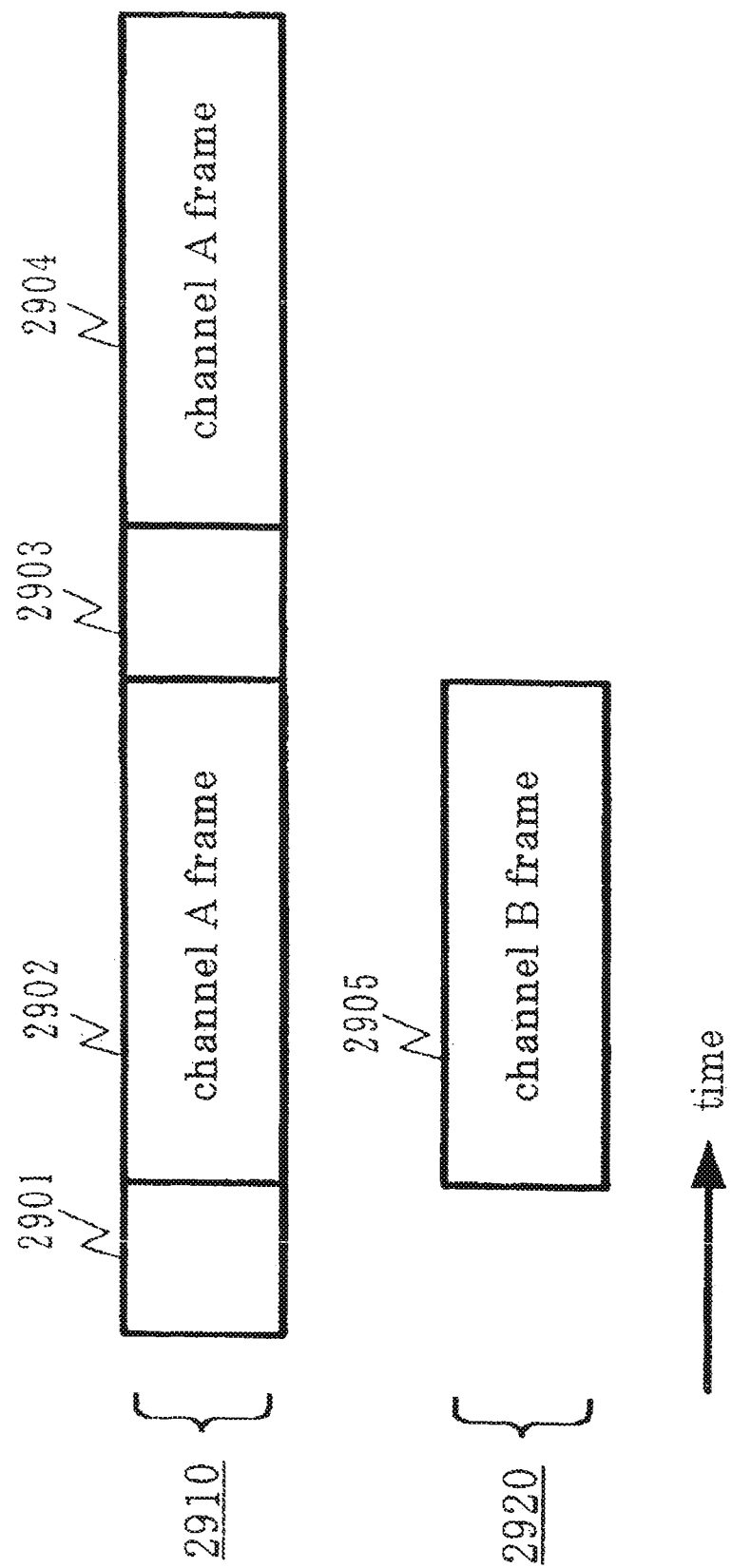
FIG. 29 shows frame structures of signals in accordance with a seventh exemplary embodiment of the present invention.

FIG. 29 shows a frame structure in accordance with the seventh embodiment, specifically, frame structure 2910 of channel A and frame structure 2920 of channel B. Frame structure 2910 includes multiplex information symbols 2901, 2903, and frame symbol groups 2902, 2904 of frame A. Structure 2920 includes frame symbol group 2905 of channel B.

In this case, multiplex information symbol 2901 includes the information that indicates that the frame symbol groups of channel A and channel B are transmitted simultaneously. Symbol group 2902 of channel A and symbol group 2905 of channel B are thus transmitted simultaneously.

Multiplex information symbol 2903 includes the information which indicates that only the frame symbol group of channel A is transmitted, so that only frame symbol group 2904 of channel A is transmitted.

Figure 30:
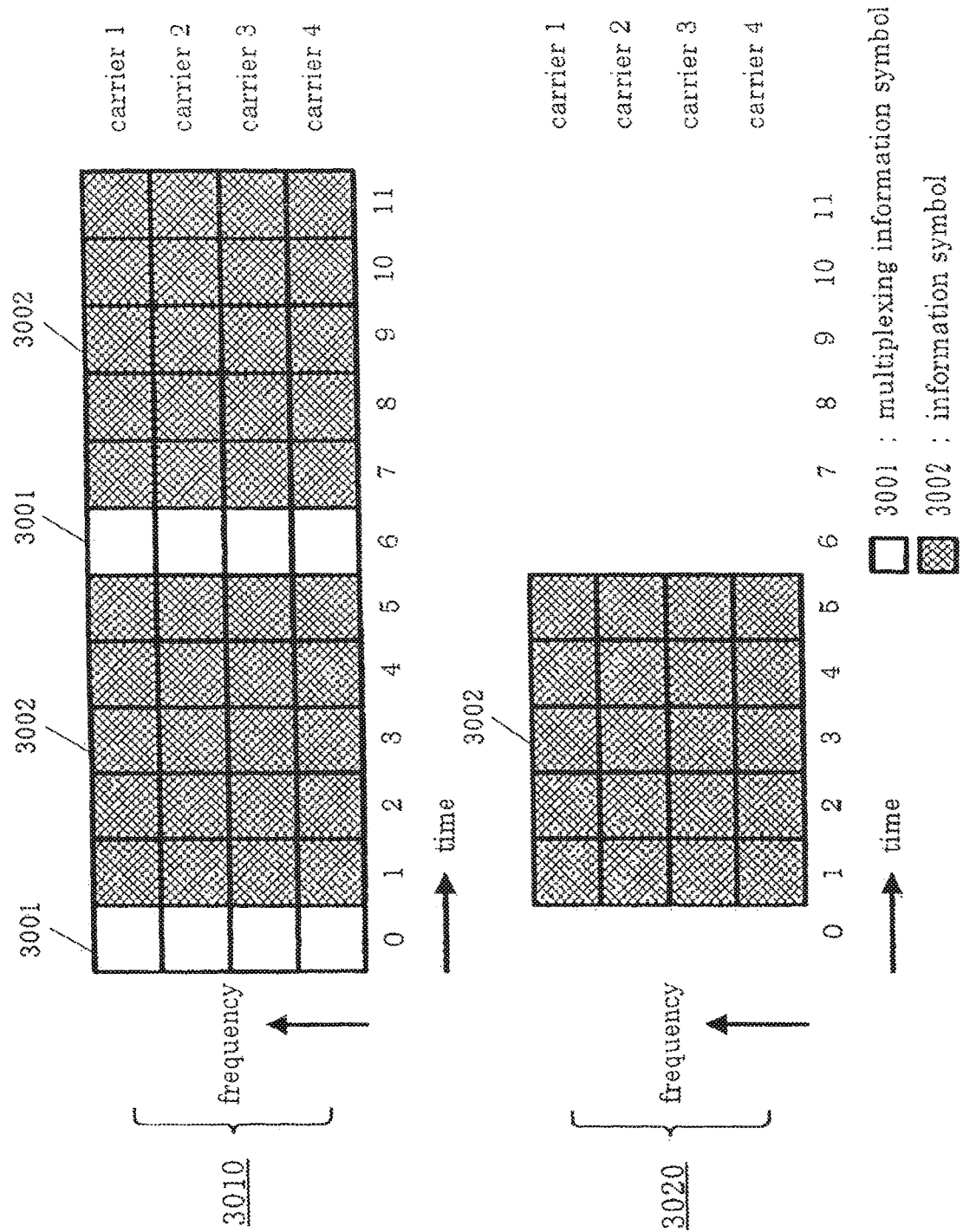
FIG. 30 shows frame structures of signals in accordance with the seventh exemplary embodiment of the present invention.

FIG. 30 shows a frame structure in accordance with the seventh embodiment, specifically, frame structure 3010 of channel A and frame structure 3020 of channel B. Structure 3010 includes multiplex information symbol 3001 and information symbol 3002.

In this case, the multiplex information symbol at time 0 includes the information which indicates that the information symbol of channel A and that of channel B are transmitted simultaneously at time 1 through time 5. Those symbols are thus transmitted simultaneously at time 1 through time 5.

The multiplex information symbol at time 6 includes the information which indicates that only the information of channel A is transmitted at time 7 through time 11.

Figure 31:
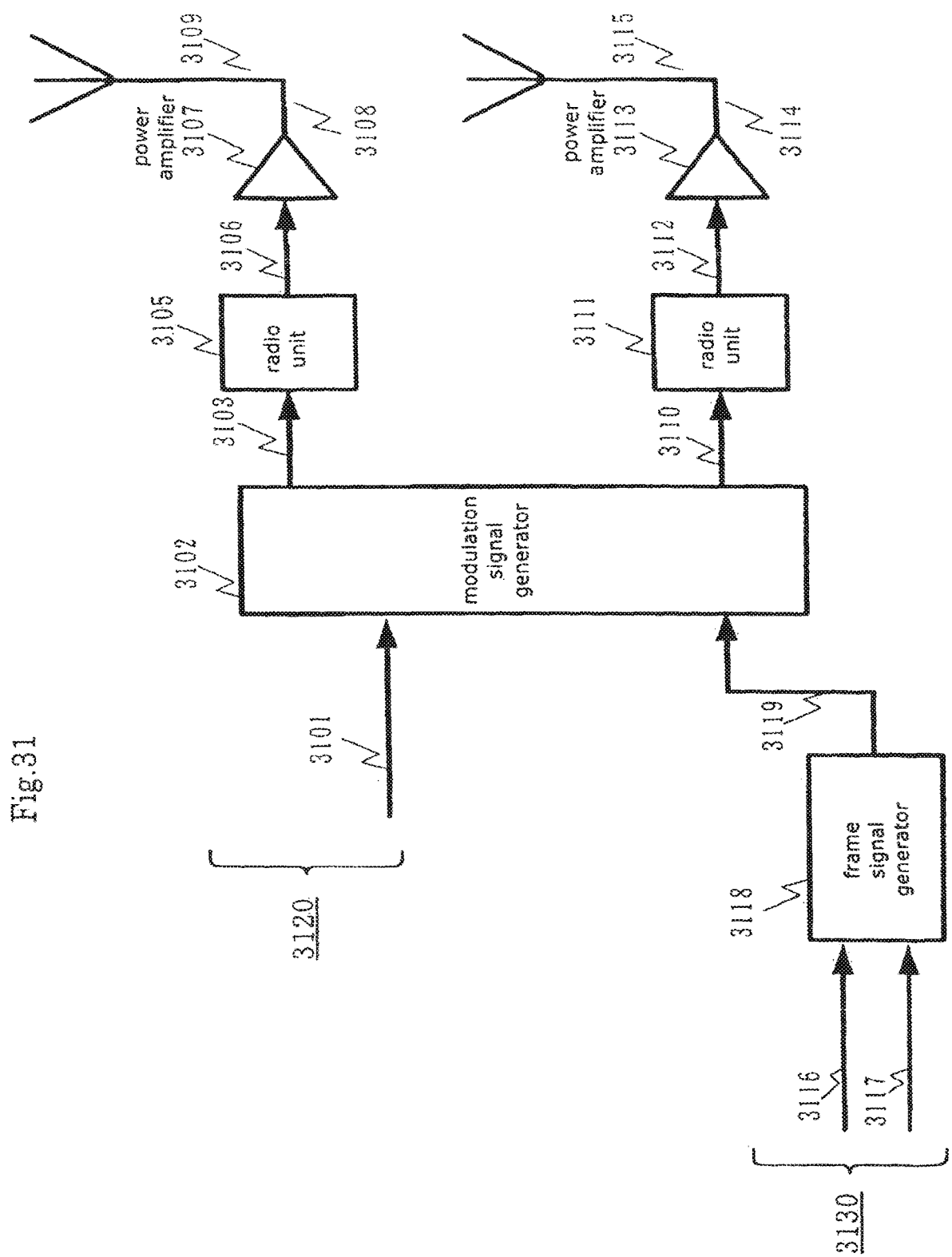
FIG. 31 shows a transmission apparatus at a base station in accordance with the seventh exemplary embodiment of the present invention.

FIG. 31 shows a structure of, e.g. a transmission apparatus at a base station, and the apparatus comprises channel A transmitter 3120, channel B transmitter 3130, and frame structure signal generator 3118. Transmitter 3120 comprises modulation signal generator 3102, radio unit 3105, power amplifier 3107, and antenna 3109. Transmitter 3130 comprises modulation signal generator 3102, radio unit 3111, power amplifier 3113, and antenna 3115.

Modulation signal generator 3102 receives transmission digital signal 3101, frame structure signal 3119, and outputs modulation signal 3103 of channel A and modulation signal 3110 of channel B in accordance with the frame structure.

Radio unit 3105 of channel A receives modulation signal 3103 of channel A, and outputs transmission signal 3106 of channel A.

Power amplifier 3107 of channel A receives transmission signal 3106 of channel A, then amplifies it, and outputs amplified transmission signal 3108 from antenna 3109 as radio wave.

Radio unit 3111 of channel B receives modulation signal 3110 of channel B, and outputs transmission signal 3112 of channel B.

Power amplifier 3113 of channel B receives transmission signal 3112 of channel B, then amplifies it, and outputs amplified transmission signal 3114 from antenna 3115 as radio wave.

Frame structure signal generator 3118 receives radio-wave propagation environmental information 3116, transmission data amount information 3117, then outputs frame structure signal 3119.

Figure 32:
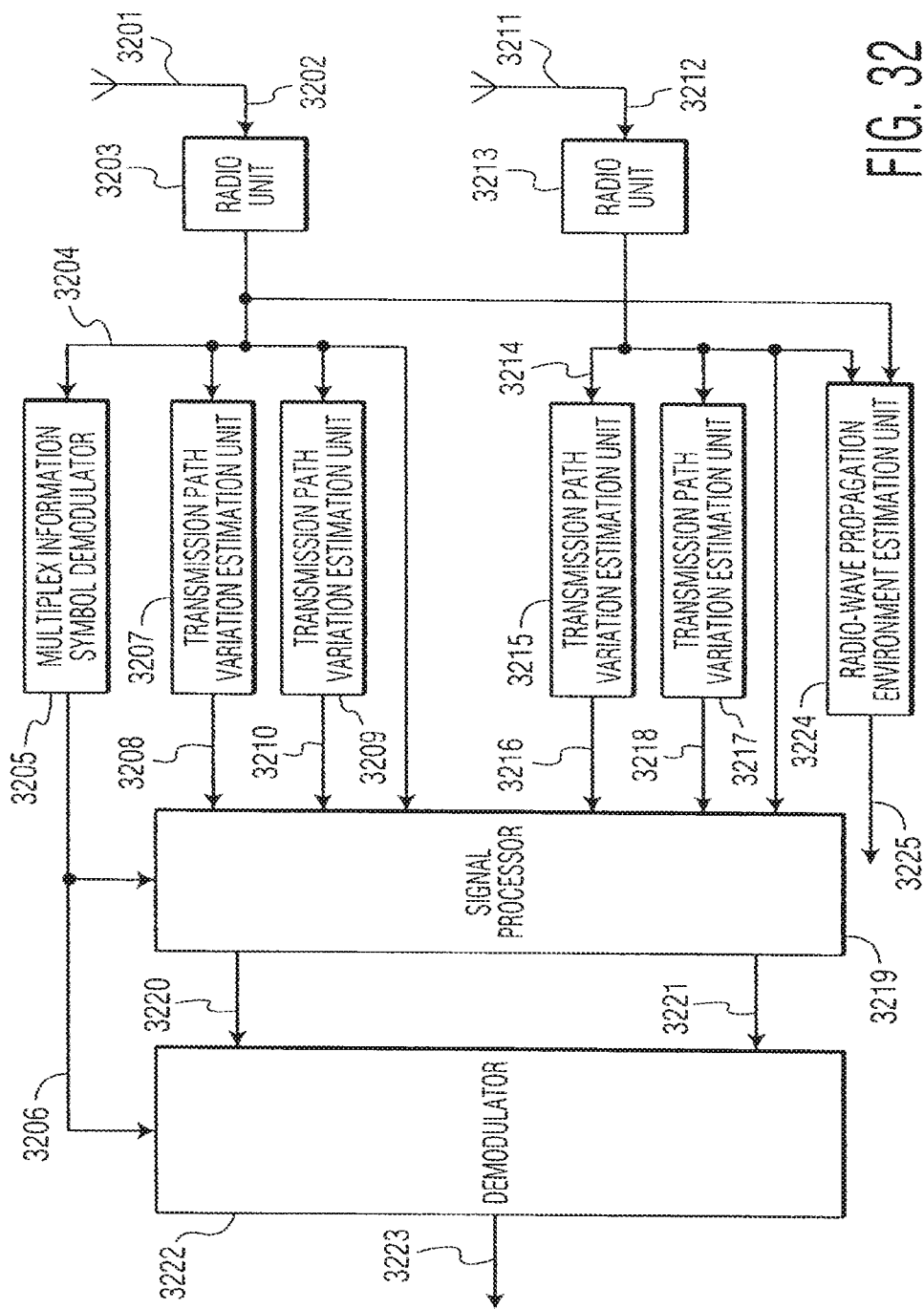
FIG. 32 shows a structure of a reception apparatus at a terminal in accordance with the seventh exemplary embodiment of the present invention.

FIG. 32 shows a structure of, e.g. a reception apparatus at a terminal in accordance with this embodiment. Radio unit 3203 receives signal 3202 received by antenna 3201, and outputs reception quadrature baseband signal 3204.

Multiplex information symbol demodulator 3205 receives base-band signal 3204, and multiplex information data 3206.

Transmission path variation estimation unit 3207 of channel A receives base-band signal 3204, and outputs variation estimation signal 3208. Transmission path variation estimation unit 3209 of channel B receives base-band signal 3204, and outputs variation estimation signal 3210.

Radio unit 3213 receives signal 3212 received by antenna 3211, and outputs reception quadrature baseband signal 3214. Transmission path variation estimation unit 3215 of channel A receives base-band signal 3214, and outputs variation estimation signal 3216. Transmission path variation estimation unit 3209 of channel B receives base-band signal 3214, and outputs variation estimation signal 3218.

Signal processor 3219 receives the following signals:
transmission path variation estimation signals 3208, 3216 of channel A;
transmission path variation estimation signals 3210, 3218 of channel B;
reception quadrature baseband signals 3204, 3214; and multiplex information data 3206.

Signal processor 3219 then outputs signal 3220 of channel A and signal 3221 of channel B based on multiplex information data 3206.

Demodulator 3222 receives signals 3220, 3221, data 3206, and based on data 3206, outputs reception digital signal 3223.

Radio-wave propagation environment estimation unit 3224 receives base-band signal 3204, 3214, then estimates the radio-wave propagation environment, e.g. a received signal strength intensity or a spatial correlation of the radio-wave propagation environment, and outputs radio-wave propagation environment estimation signal 3225.

The transmission apparatus of, e.g. a base station, in accordance with the embodiment with reference to FIGS. 29, 31 and 32.

The reception apparatus shown in FIG. 32 includes radio-wave propagation environment estimation unit 3224 which receives reception quadrature baseband signal 3204, 3214. Estimation unit 3224 then estimates the radio-wave propagation environment, e.g. a received signal strength intensity or a spatial correlation of the radio-wave propagation environment, and outputs radio wave propagation environment estimation signal 3225. The information of signal 3225 is transmitted as data from a transmitter of the terminal, and the base station receives and demodulates it for obtaining the information corresponding to signal 3225. This information corresponds to radio-wave propagation environmental information 3116 shown in FIG. 31.

Frame structure signal generator 3118 receives information 3116, transmission data amount information 3117, and outputs frame structure signal 3119 that includes, e.g. the following information as shown in FIG. 29:

Multiplex information symbol 2901 indicates that the frame symbol groups of channels A and B are simultaneously transmitted;

Frame symbol group 2902 of channel A and frame symbol group 2905 of channel B indicate that both of them are transmitted simultaneously;

Multiplex information symbol 2903 of channel A indicates that only the frame symbol groups of channel A are transmitted; and Multiplex information symbol 2904 of channel A indicates that only the frame symbol groups of channel A are transmitted.

Modulation signal generator 3102 shown in FIG. 31 receives transmission digital signal 3101, frame structure signal 3119, and outputs modulation signal 3103 of channel A and modulation signal 3110 of channel B.

The reception apparatus of the terminal in accordance with the seventh embodiment is described with reference to FIG. 29 and FIG. 32. Multiplex information symbol decoder 3205 receives reception quadrature baseband signal 3204, then demodulates the multiplex information symbol shown in FIG. 29. When decoder 3205 decodes, e.g. multiplex information symbol 2901, decoder 3205 outputs the following information as multiplex information data 3206: the information indicating that the frame symbol groups of channels A and B are transmitted simultaneously. When decoder 3205 decodes, e.g. multiplex information symbol 2903, decoder 3205 outputs the following information as multiplex information data 3206: the information indicating that the frame symbol group of only channel A is transmitted.

Signal processor 3219 receives the following signals:
transmission path variation estimation signals 3208, 3216 of channel A;
transmission path variation estimation signals 3210, 3218 of channel B;
reception quadrature baseband signals 3204, 3214; and multiplex information data 3206.

When data 3206 indicates that the frame symbol groups of channels A and B are transmitted simultaneously, processor 3219 carries out inverse matrix calculations from estimation signals 3208, 3216 of channel A, estimation signals 3210, 3218 of channel B, base-band signals 3204, 3214. Then processor 3219 demultiplexes the signals of channel A from those of channel B, and outputs signal 3220 of channel A and signal 3221 of channel B. When multiplex information data 3206 indicates that the frame symbol group of only channel A is transmitted, processor 3219 outputs only signal 3220 of channel A.

Demodulator 3222 receives signal 3220 of channel A, signal 32210 of channel B, and multiplex information data 3206. When data 3206 indicates that the frame symbol groups of channels A and B are simultaneously transmitted, decoder 3222 decodes signals 3220, 3221. When data 3206 indicates that the frame symbol group of only channel A is transmitted, demodulator 3222 demodulates signal 3220 of channel A. Then demodulator 3222 outputs reception digital signal 3223.

In the case of orthogonal frequency multiplexing (OFDM) system, a similar way to what is discussed above is applicable. The transmitter of the base station, for instance, in accordance with the seventh embodiment is demonstrated hereinafter with reference to FIGS. 30, 31, 32.

The reception apparatus shown in FIG. 32 includes radio-wave propagation environment estimation unit 3224 which receives reception quadrature baseband signal 3204, 3214. Estimation unit 3224 then estimates the radio-wave propagation environment, e.g. received signal strength intensity or spatial correlation of the radio-wave propagation environment, and outputs radio wave propagation environment estimation signal 3225. The information of signal 3225 is transmitted as data from a transmitter of the terminal, and the base station receives and demodulates it for obtaining the information corresponding to signal 3225. This information corresponds to radio-wave propagation environmental information 3116 shown in FIG. 31.

Frame structure signal generator 3118 receives information 3116, transmission data amount information 3117, and outputs frame structure signal 3119 that includes, e.g. the following information as shown in FIG. 30:

multiplex information symbol at time 0 indicating that the information symbols of channels A and B are simultaneously transmitted at time 1-time 5, and showing the frame structure where both of information symbols of channel A and channel B are transmitted simultaneously at time 1-time 5;

multiplex information symbol at time 6 indicating that only the information of channel A is transmitted at time 7-time 11, and showing the frame structure where the information of only channel A is transmitted at time 7-time 11.

Generator 3118 outputs the foregoing information as frame structure signal 3119. Modulation signal generator 3102 receives transmission digital signal 3101, frame structure signal 3119, and outputs modulation signal 3103 of channel A and modulation signal 3110 of channel B in accordance with the frame structure.

Next, a reception apparatus of a terminal in accordance with the seventh embodiment is described with reference to FIG. 30 and FIG. 32.

Multiplex information symbol demodulator 3205 receives base-band signal 3204, and demodulates the multiplex information symbol shown in FIG. 30. When, for instance, demodulator 3205 demodulates the multiplex information symbol at time 0, demodulator 3205 outputs the information indicating that the frame symbol groups of channels A and B are transmitted simultaneously. When demodulator 3205 demodulates the symbol at time 6, demodulator 3205 outputs the information indicating that the frame symbol group of only channel A is transmitted. As such, the information of either one of the foregoing cases is output as multiplex information data 3206.

Signal processor 3219 receives the following signals:

transmission path variation estimation signals 3208, 3216 of channel A;

transmission path variation estimation signals 3210, 3218 of channel B;

reception quadrature baseband signals 3204, 3214; and multiplex information data 3206.

When data 3206 indicates that the frame symbol groups of channels A and B are transmitted simultaneously, processor 3219 carries out inverse matrix calculations from estimation signals 3208, 3216 of channel A, estimation signals 3210, 3218 of channel B, base-band signal 3204, 3214. Then processor 3219 demultiplexes the signals of channel A from those of channel B, and outputs signal 3220 of channel A and signal 3221 of channel B. When multiplex information data 3206 indicates that the frame symbol group of only channel A is transmitted, processor 3219 outputs only signal 3220 of channel A.

Demodulator 3222 receives signal 3220 of channel A, signal 32210 of channel B, and multiplex information data 3206. When data 3206 indicates that the frame symbol groups of channels A and B are simultaneously transmitted, decoder 3222 decodes signals 3220, 3221. When data 3206 indicates that the frame symbol group of only channel A is transmitted, demodulator 3222 demodulates signal 3220 of channel A. Then demodulator 3222 outputs reception digital signal 3223.

In this embodiment, the number of channels to be multiplexed are two; however, other numbers can be applicable to this embodiment. The frame structure is not limited to what is shown in FIG. 29 or FIG. 30.

The structure of the transmission apparatus of this embodiment is not limited to what is shown in FIG. 31, and when the number of channels increase, the structure formed of elements 3103 through 3109 shown in FIG. 31 is added accordingly. The structure of the reception apparatus of this embodiment is not limited to what is shown in FIG. 32.

The expression of "antenna" in the previous description does not always mean a single antenna, but "antenna" can mean an antenna unit which is formed of a plurality of antennas.

The seventh exemplary embodiment as discussed above describes the transmission method that switches between the method of transmitting modulation signals of a plurality of channels to the same frequency band from a plurality of antennas and the method of transmitting a modulation signal of one channel from an antenna. The embodiment also describes the transmission apparatus and the reception apparatus used in the foregoing transmission method. Multiplexing the transmission signals of a plurality of channels to the same frequency band allows the method and the apparatuses to increase the data transmission rate, and allows the reception apparatus to demultiplex the multiplexed modulation signals received with ease.

Exemplary Embodiment 8

The eighth exemplary embodiment describes a transmission method of multiplexing modulation signals of a plurality of channels to the same frequency band, more particularly, a method of transmitting a synchronous symbol for the foregoing transmission method. This embodiment also describes a transmission apparatus as well as a reception apparatus to be used in the foregoing transmission method.

FIG. 2 shows a structure of the transmission apparatus in accordance with the eighth embodiment.

FIG. 4 shows a placement of signal points in the in-phase-quadrature plane in accordance with this embodiment.

Figure 33:
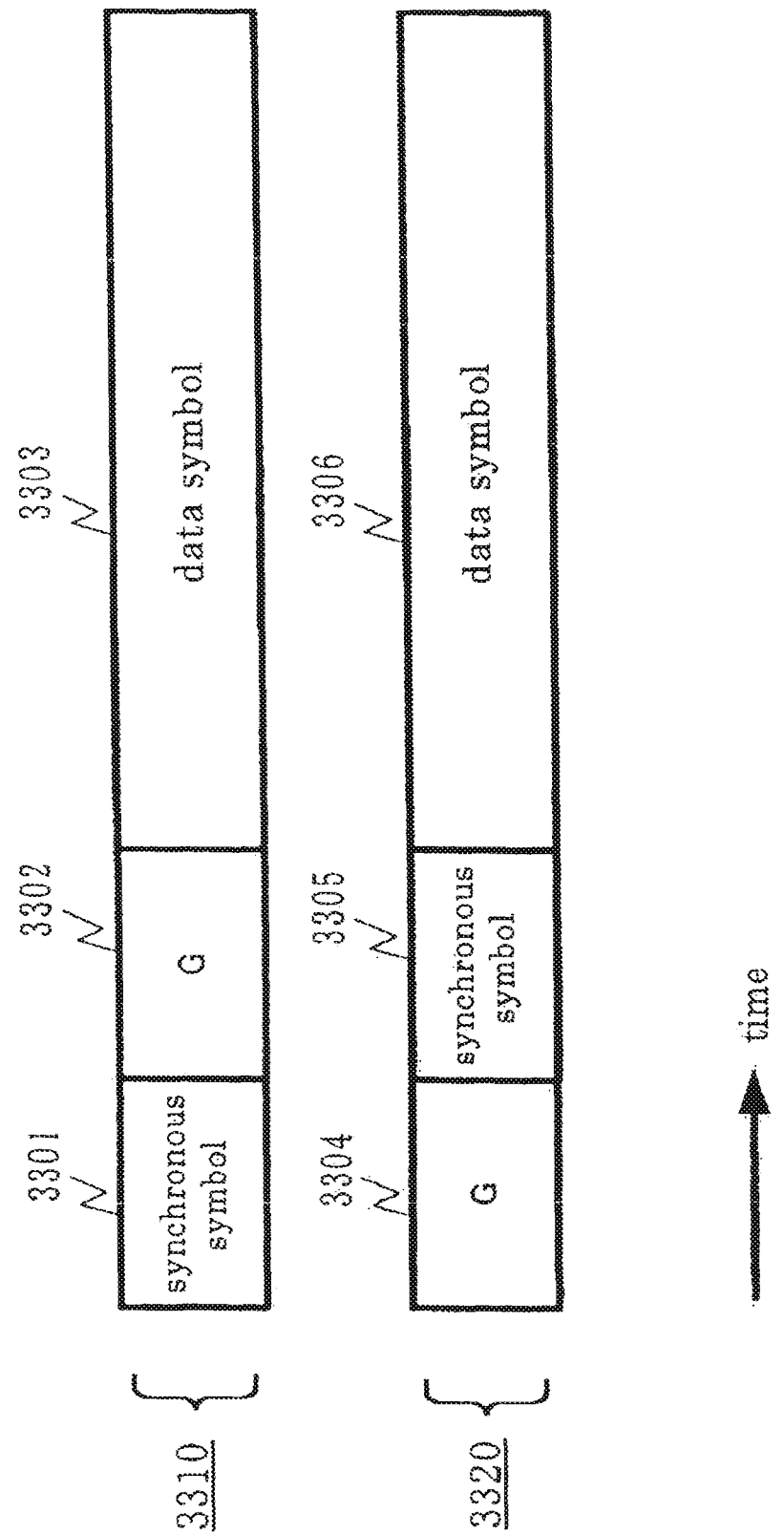
FIG. 33 shows a frame structure along a time axis in accordance with an eighth exemplary embodiment of the present invention.

FIG. 33 shows a frame structure along a time-axis in accordance with this embodiment, and to be more specific, it shows frame structure 3310 of channel A and frame structure 3320 of channel B. Frame structures 3310, 3320 include synchronous symbols 3301, 3305, guard symbols 3302, 3304, and data symbols 3303, 3306.

Figure 34:
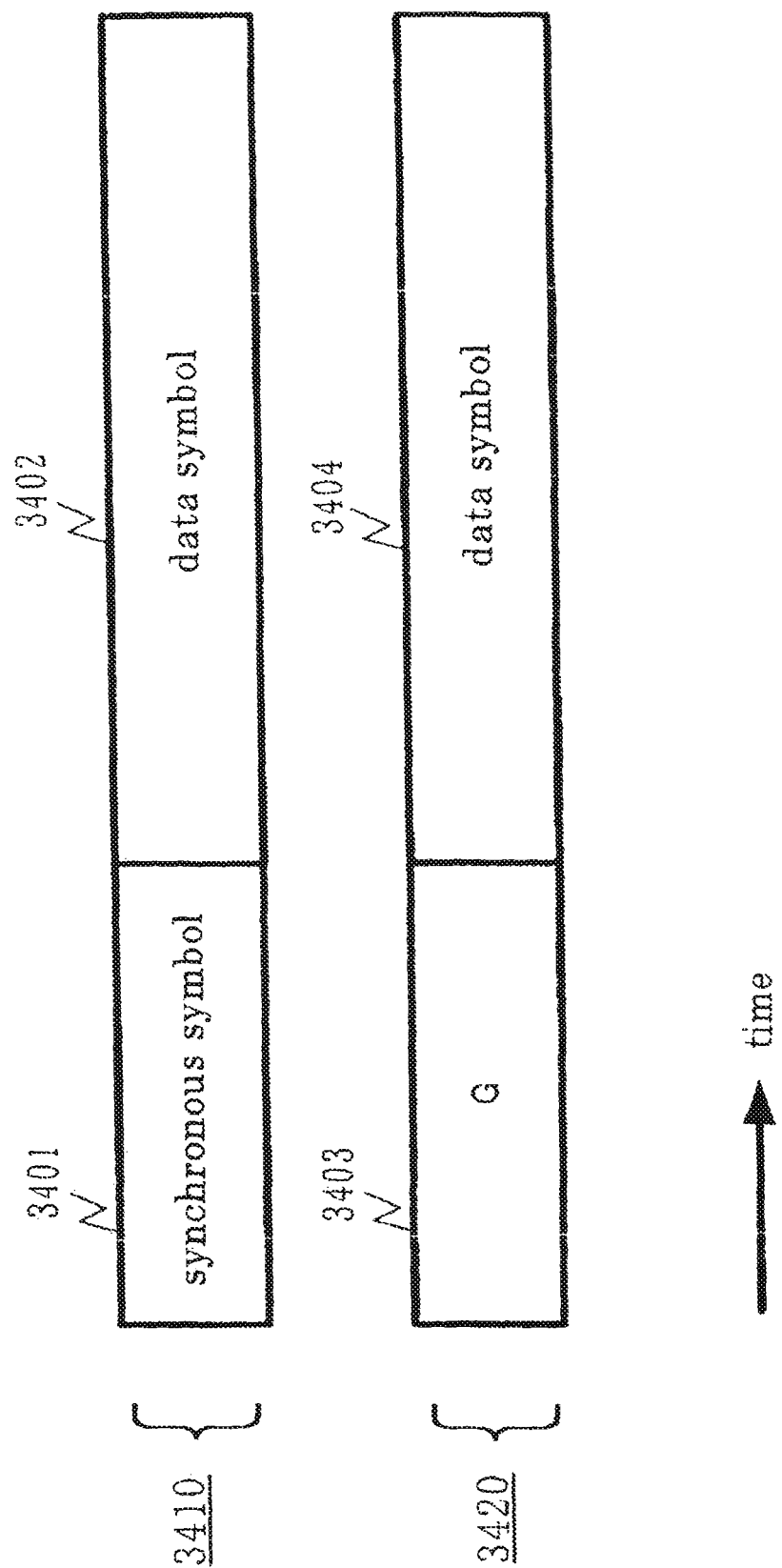
FIG. 34 shows a frame structure along a time axis in accordance with the eighth exemplary embodiment of the present invention.

FIG. 34 shows a frame structure along a time axis in accordance with this embodiment, specifically, frame structure 3410 of channel A and frame structure 3420 of channel B. Structures 3410, 3420 include synchronous symbols 3401, data symbols 3402, 3404, and guard symbol 3403.

Figure 35:
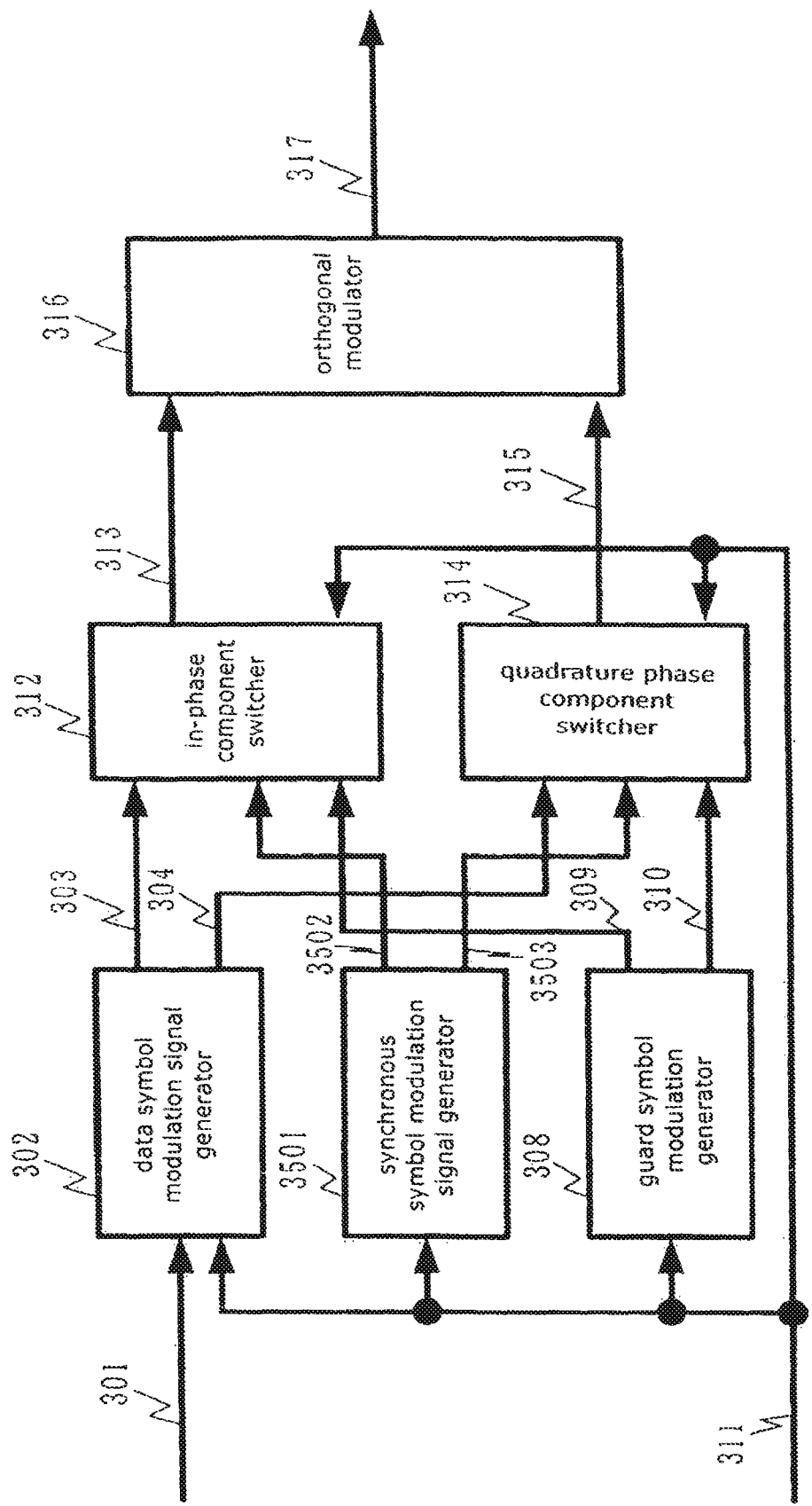
FIG. 35 shows a structure of a modulation signal generator in accordance with the eighth exemplary embodiment of the present invention.

FIG. 35 shows a structure of modulation signal generators 202, 212, and the elements operating in a similar way to those in FIG. 3 have the same reference marks. Synchronous symbol modulation signal generator 3501 receives frame structure signal 311, and outputs in-phase component 3502 and quadrature-phase component 3503 of the transmission quadrature baseband signal of the synchronous symbol when frame structure signal 311 indicates the synchronous symbol.

In-phase component switcher 312 receives the following signals:

in-phase component 303 of a data symbol transmission quadrature baseband signal;

in-phase component 3502 of the synchronous symbol transmission quadrature baseband signal;

in-phase component 309 of a guard symbol transmission quadrature baseband signal, and frame structure signal 311, then switcher 312 selects the in-phase component of transmission quadrature baseband signal corresponding to a symbol indicated by frame structure signal 311, and outputs the selected one as in-phase component 313 of the selected transmission quadrature baseband signal.

Quadrature-phase component switcher 314 receives the following signals:

quadrature-phase component 304 of a data symbol transmission quadrature baseband signal;

quadrature-phase component 3503 of the synchronous symbol transmission quadrature baseband signal;

quadrature-phase component 310 of a guard symbol transmission quadrature baseband signal, and frame structure signal 311, then selects a quadrature-phase component of a transmission quadrature baseband signal corresponding to a symbol indicated by frame structure signal 311, and outputs the selected one as quadrature-phase component 315 of the selected transmission quadrature baseband signal.

Figure 36:
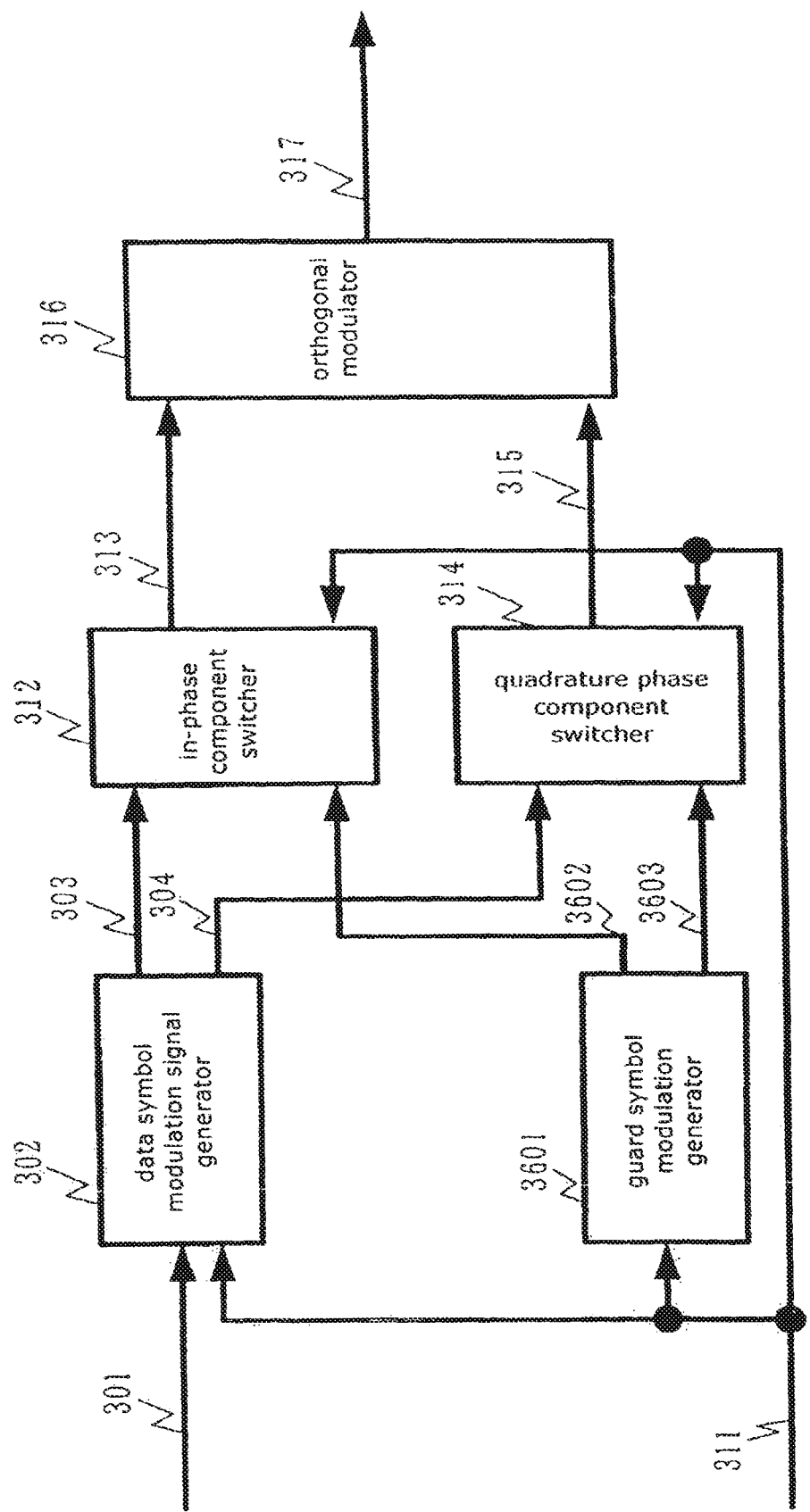
FIG. 36 shows a structure of a modulation signal generator in accordance with the eighth exemplary embodiment of the present invention.

FIG. 36 shows a structure of modulation signal generators 202, 212 shown in FIG. 2. Guard symbol or synchronous symbol transmission signal generator 3601 receives frame structure signal 311, and outputs in-phase component 3602, quadrature-phase component 3603 of the transmission quadrature baseband signal of the guard symbol or the synchronous symbol.

Figure 37:
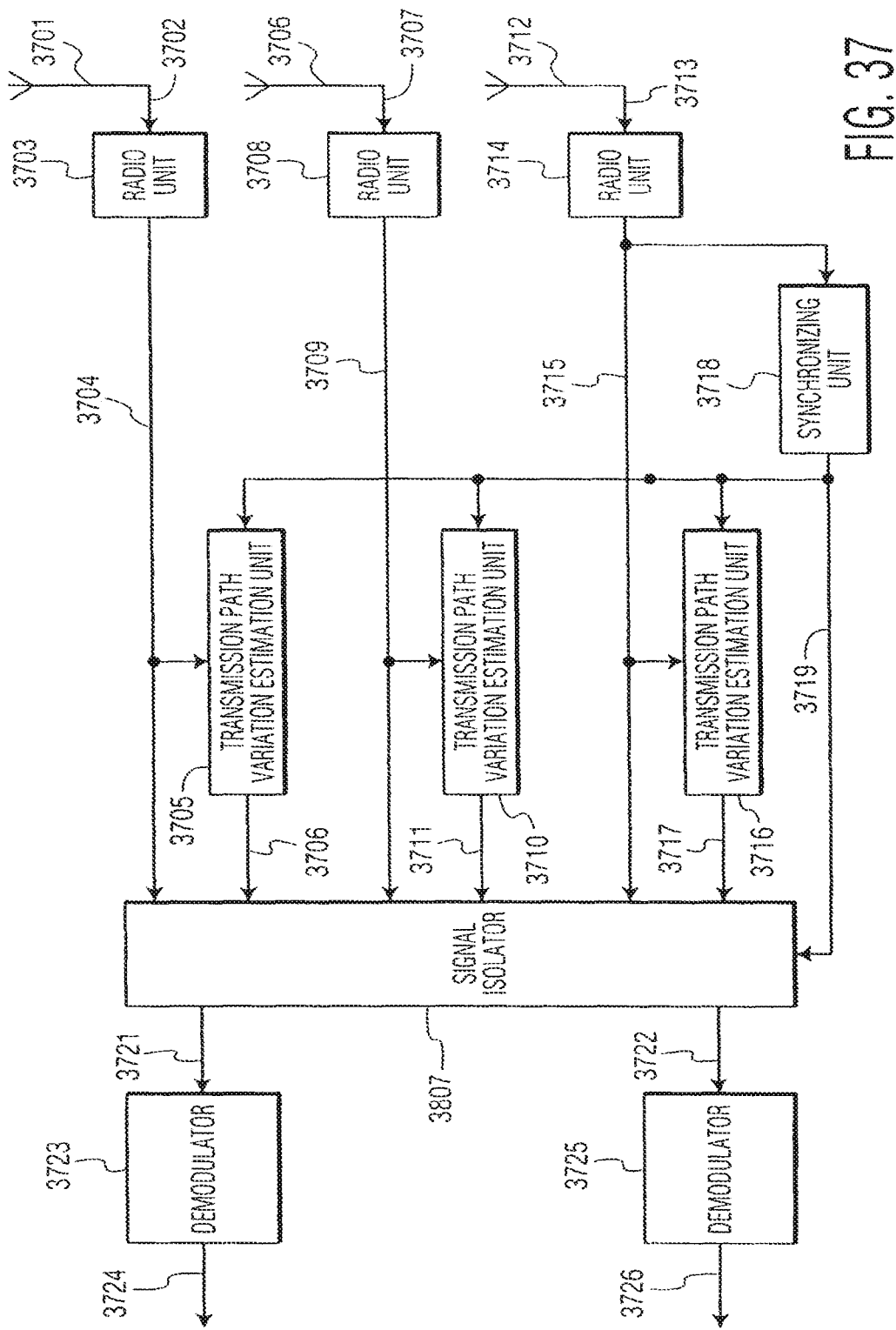
FIG. 37 shows a structure of a reception apparatus in accordance with the eighth exemplary embodiment of the present invention.

FIG. 37 shows a structure of the reception apparatus in accordance with the eighth embodiment, and its radio unit 3703 receives signal 3702 received by antenna 3701, then outputs reception quadrature baseband signal 3704.

Transmission path variation estimation unit 3705 receives base-band signal 3704 and timing signal 3719, then outputs transmission path variation estimation signal 3706.

Radio unit 3708 receives signal 3707 received by antenna 3706, then outputs reception quadrature baseband signal 3709.

Transmission path variation estimation unit 3710 receives base-band signal 3709 and timing signal 3719, then outputs transmission path variation estimation signal 3711.

Radio unit 3714 receives signal 3713 received by antenna 3712, then outputs reception quadrature baseband signal 3715.

Transmission path variation estimation unit 3716 receives base-band signal 3715 and timing signal 3719, then outputs transmission path variation estimation signal 3717.

Synchronizing unit 3717 receives base-band signal 3715, and searches for a synchronous symbol transmitted by the transmission apparatus to synchronize with the transmission apparatus, then outputs timing signal 3719.

Signal isolator 3720 receives the following signals:
reception quadrature baseband signals 3704, 3709, 3715;
transmission path variation estimation signals 3706, 3711, 3717; and
timing signal 3719.

Signal isolator 3720 then outputs reception quadrature baseband signal 3721 of channel A and quadrature baseband signal 3722 of channel B.

Demodulator 3723 receives signal 3721 of channel A, and outputs reception digital signal 3724. Demodulator 3725 receives signal 3722 of channel B, and outputs reception digital signal 3725.

Figure 38:
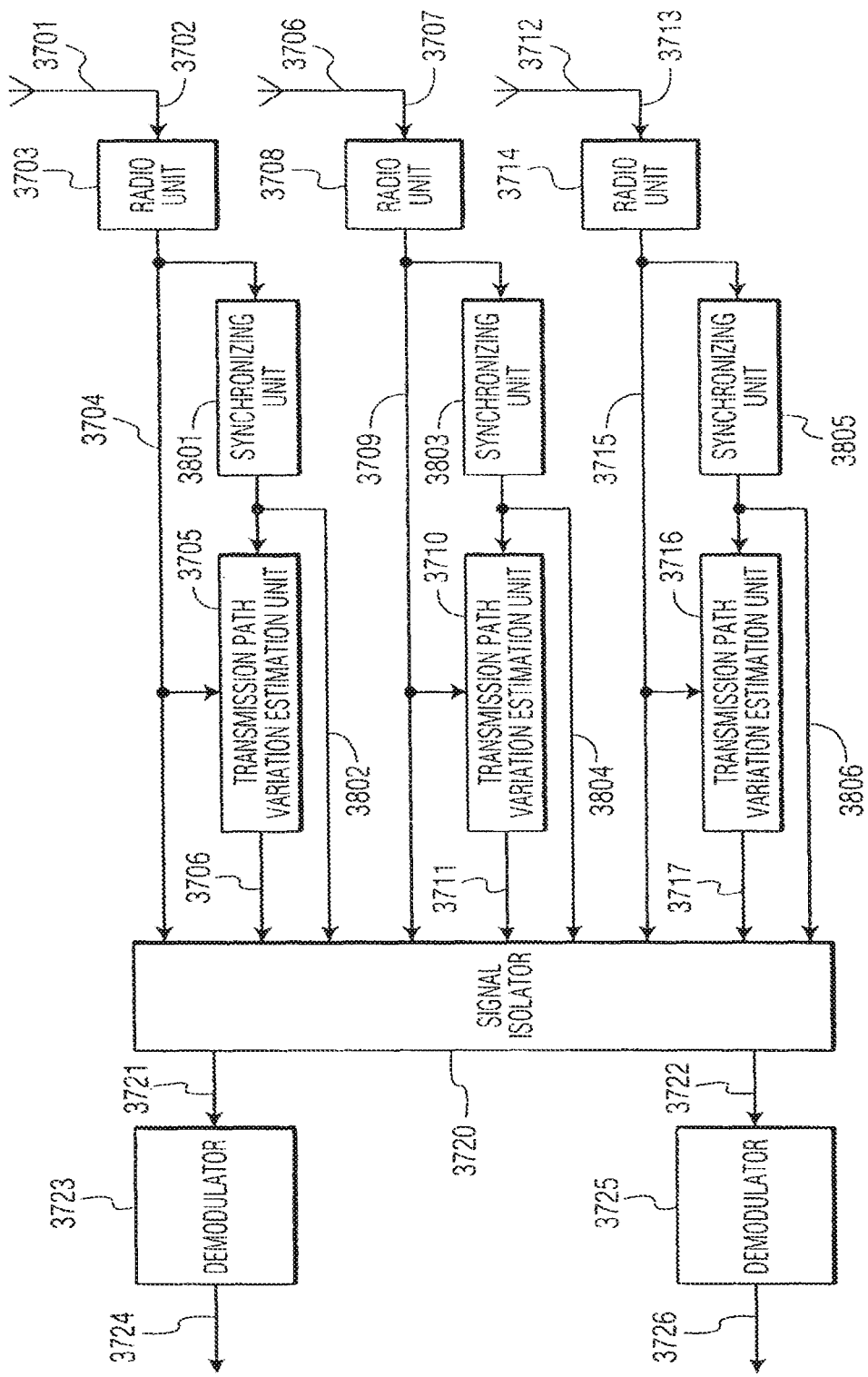
FIG. 38 shows a structure of a reception apparatus in accordance with the eighth exemplary embodiment of the present invention.

FIG. 38 shows a structure of the reception apparatus in accordance with the eighth embodiment, and the elements operating in a similar way to those in FIG. 37 have the same reference marks.

Synchronizing unit 3801 receives reception quadrature baseband signal 3704, and searches for a synchronous symbol transmitted by the transmission apparatus to synchronize with the transmission apparatus, then outputs timing signal 3802.

Transmission path variation estimation unit 3705 receives base-band signal 3704 and timing signal 3802, then outputs transmission path variation estimation signal 3706.

Synchronizing unit 3803 receives reception quadrature baseband signal 3709, and searches for a synchronous symbol transmitted by the transmission apparatus to synchronize with the transmission apparatus, then outputs timing signal 3804.

Transmission path variation estimation unit 3710 receives reception quadrature baseband signal 3709 and timing signal 3804, then outputs transmission path variation estimation signal 3711.

Synchronizing unit 3805 receives reception quadrature baseband signal 3715, and searches for a synchronous symbol transmitted by the transmission apparatus to synchronize with the transmission apparatus, then outputs timing signal 3806.

Transmission path variation estimation unit 3716 receives reception quadrature baseband signal 3715 and timing signal 3806, then outputs transmission path variation estimation signal 3717.

Figure 39:
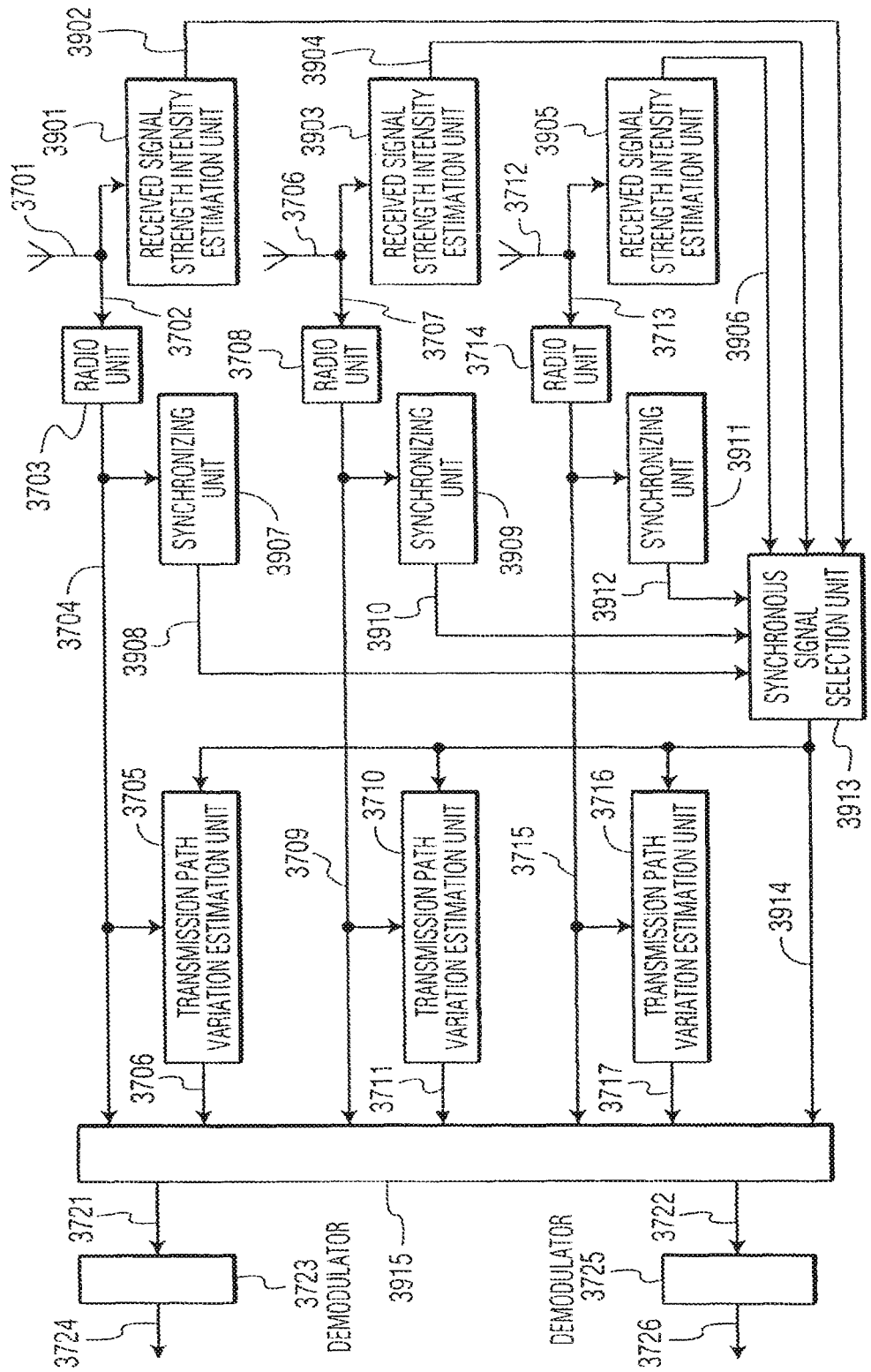
FIG. 39 shows a structure of a reception apparatus in accordance with the eighth exemplary embodiment of the present invention.

FIG. 39 shows a structure of the reception apparatus in accordance with the eighth embodiment, and the elements operating in a similar way to those in FIG. 37 have the same reference marks.

Received signal strength intensity estimation unit 3901 receives signal 3702, then estimates the received signal strength intensity, and outputs received signal strength intensity estimation signal 3902.

Received signal strength intensity estimation unit 3903 receives signal 3707, then estimates the received signal strength intensity, and outputs received signal strength intensity estimation signal 3904.

Figure 40:
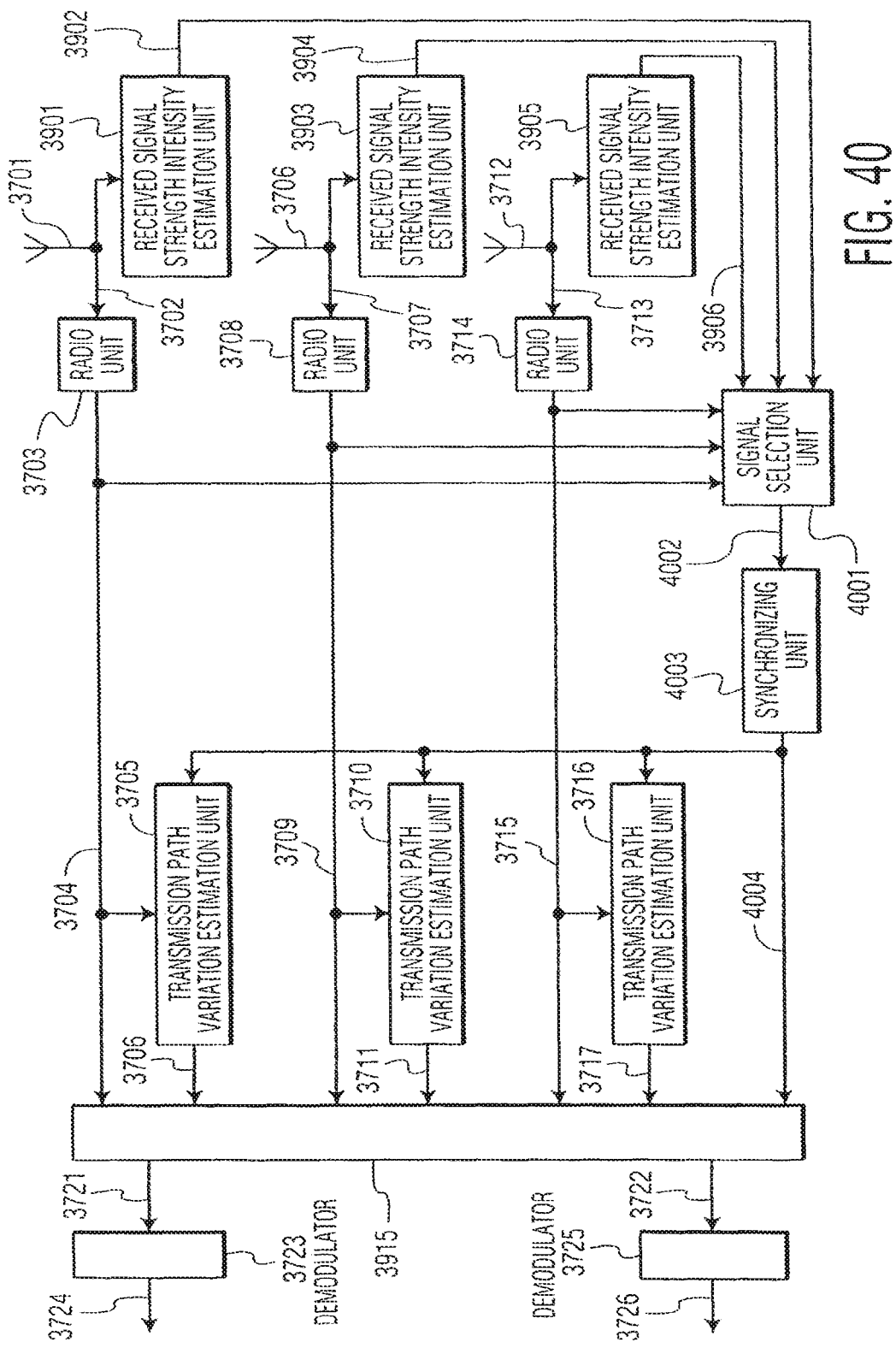
FIG. 40 shows a structure of a reception apparatus in accordance with the eighth exemplary embodiment of the present invention.

FIG. 40 shows a structure of the reception apparatus in accordance with the eighth embodiment, and the elements operating in a similar way to those in FIG. 37 or FIG. 39 have the same reference marks.

Signal selection unit 4001 receives the following signals:
received signal strength intensity estimation signals 3902, 3904, 3906; and
reception quadrature baseband signal 3704, 3709, 3715,
then unit 4001 selects, e.g. the reception quadrature baseband signal supplied from the antenna that receives the signal having the best electric field among the received signal strength intensity estimation signals, and outputs it as reception quadrature baseband signal 4002.

Synchronizing unit 4003 receives reception quadrature baseband signal 4002 selected, and searches for a synchronous symbol transmitted by the transmission apparatus to synchronize with the transmission apparatus, then outputs timing signal 4004.

Figure 41:
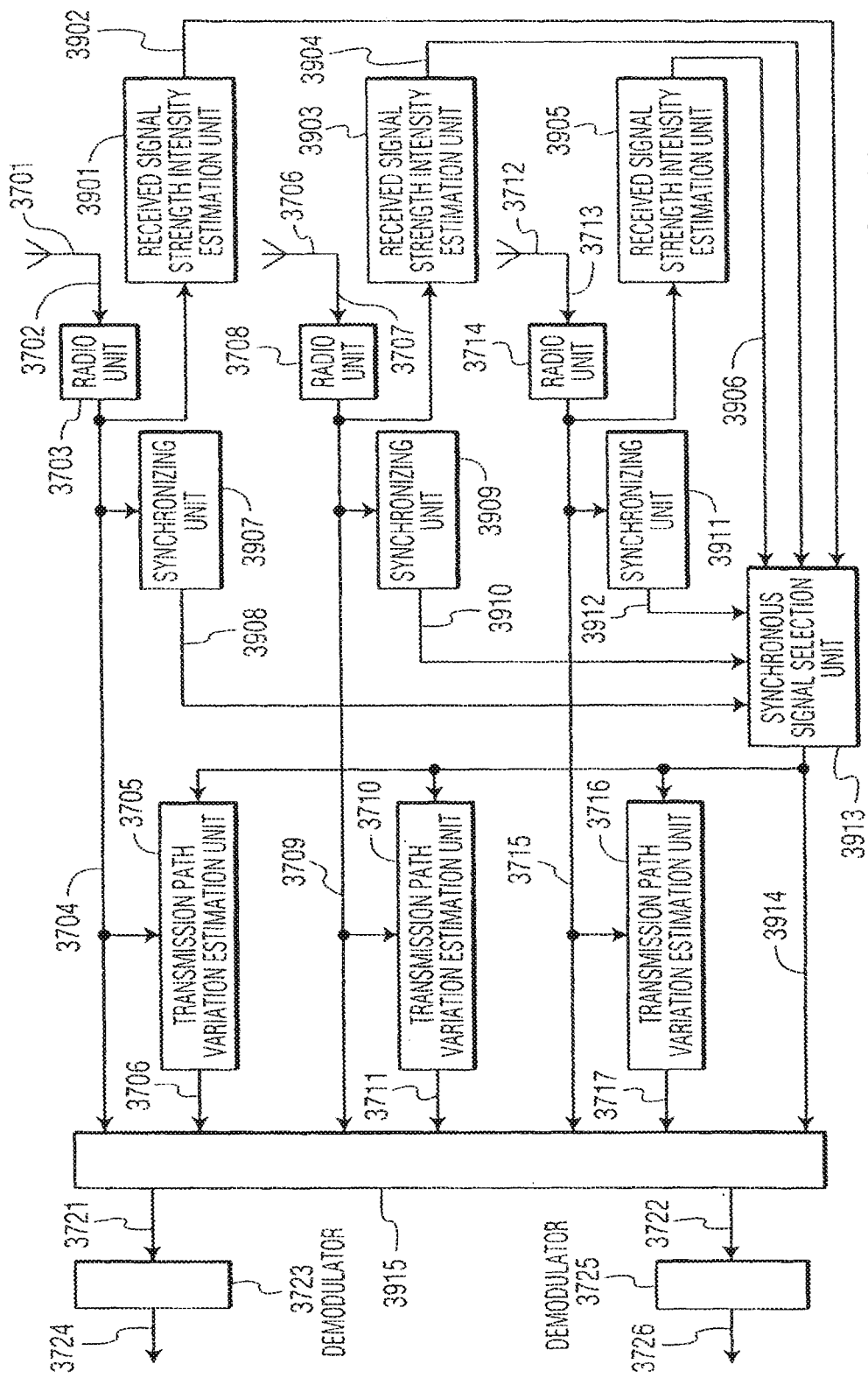
FIG. 41 shows a structure of a reception apparatus in accordance with the eighth exemplary embodiment of the present invention.

FIG. 41 shows a structure of the reception apparatus in accordance with the eighth embodiment, and the elements operating in a similar way to those in FIG. 39 or FIG. 40 have the same reference marks.

An operation of the transmission apparatus is demonstrated hereinafter with reference to FIGS. 2, 4, 33, 34, 35 and 36.

Frame structure signal generator 209 outputs the information of the frame structure shown in FIG. 33 or FIG. 34 as frame structure signal 210. Modulation signal generator 202 of channel A receives frame structure signal 210 and transmission digital signal 201 of channel A, then outputs modulation signal 203 of channel A in accordance with the frame structure. Modulation signal generator 212 of channel B receives frame structure signal 210 and transmission digital signal 211 of channel B, then outputs modulation signal 213 of channel B in accordance with the frame structure.

Next, an operation of modulation signal generators 202 and 212 in accordance with the frame structure shown in FIG. 33 is described with reference to FIG. 35 using a transmitter of channel A as an example.

Data symbol modulation signal generator 302 receives transmission digital signal 301, i.e. transmission digital signal 201 of channel A in FIG. 2, and frame structure signal 311, i.e. frame structure signal 210 in FIG. 2. When frame structure signal 311 indicates a data symbol, generator 302 outputs in-phase component 303 and quadrature-phase component 304 of a transmission quadrature baseband signal of the data symbol.

Synchronous symbol modulation signal generator 3501 receives frame structure signal 311. When frame structure signal 311 indicates the synchronous symbol, generator 3501 outputs in-phase component 3502 and quadrature-phase component 3503 of the transmission quadrature baseband signal of the synchronous symbol.

Guard symbol modulation signal generator 308 receives frame structure signal 311. When signal 311 indicates a guard symbol, generator 308 outputs in-phase component 309 and quadrature-phase component 310 of a transmission quadrature baseband signal of the guard symbol.

FIG. 4 shows the signal-point placement of the respective symbols in an in-phase-quadrature plane of the foregoing operation. Points 401 in FIG. 4 indicate the signal-points of in-phase component 303 and quadrature-phase component 304 of the transmission quadrature baseband signal of the data symbol. Points 402 indicate the signal-points of in-phase component 3502 and quadrature-phase component 3503 of the transmission quadrature baseband signal of the synchronous symbol. Point 403 indicates the signal-points of in-phase component 309 and quadrature-phase component 310 of the transmission quadrature baseband signal of the guard symbol.

In-phase component switcher 312 receives the following signals:

in-phase component 303 of data symbol transmission quadrature baseband signal;
in-phase component 3502 of synchronous symbol transmission quadrature baseband signal;
in-phase component 309 of guard symbol transmission quadrature baseband signal; and
frame structure signal 311.

Switcher 312 then selects an in-phase component of a transmission quadrature baseband signal corresponding to the symbol indicated by frame structure signal 311, and outputs the selected one as in-phase component 313 of the selected transmission quadrature baseband signal.

Quadrature-phase component switcher 314 receives the following signals:

quadrature-phase component 304 of data symbol transmission quadrature baseband signal;
quadrature-phase component 3503 of synchronous symbol transmission quadrature baseband signal;
quadrature-phase component 310 of guard symbol transmission quadrature baseband signal; and
frame structure signal 311.

Switcher 314 then selects a quadrature-phase component of a transmission quadrature baseband signal corresponding to the symbol indicated by frame structure signal 311, and outputs the selected one as quadrature-phase component 315 of the selected transmission quadrature baseband signal.

Orthogonal modulator 316 receives in-phase component 313 and quadrature-phase component 315 discussed above, then provides those components with an orthogonal modulation, and outputs modulation signal 317, i.e. signal 203 shown in FIG. 2.

An operation of modulation signal generators 202, 212 at frame structure 34 is demonstrated with reference to FIG. 36.

An operation of generator 202 is demonstrated hereinafter. Data symbol modulation signal generator 302 receives transmission digital signal 301, i.e. transmission digital signal 201 of channel A in FIG. 2, and frame structure signal 311, i.e. frame structure signal 210 in FIG. 2. When frame structure signal 311 indicates a data symbol, generator 302 outputs in-phase component 303 and quadrature-phase component 304 of a transmission quadrature baseband signal of the data symbol.

Synchronous symbol modulation signal generator 3601 receives frame structure signal 311, and outputs in-phase component 3602 and quadrature-phase component 3603 of the transmission quadrature baseband signal of the synchronous symbol when frame structure signal 311 indicates the synchronous symbol.

FIG. 4 shows the signal-point placement of the respective symbols in an in-phase-quadrature plane of the foregoing operation. Points 401 in FIG. 4 indicate the signal-points of in-phase component 303 and quadrature-phase component 304 of the transmission quadrature baseband signal of the data symbol. Points 402 indicate the signal-points of in-phase component 3602 and quadrature-phase component 3603 of the transmission quadrature baseband signal of the synchronous symbol.

In-phase component switcher 312 receives the following signals:

in-phase component 303 of data symbol transmission quadrature baseband signal;
in-phase component 3602 of synchronous symbol transmission quadrature baseband signal, and frame structure signal 311.

Switcher 312 then selects an in-phase component of a transmission quadrature baseband signal corresponding to the symbol indicated by frame structure signal 311, and outputs the selected one as in-phase component 313 of the selected transmission quadrature baseband signal.

Quadrature-phase component switcher 314 receives the following signals:

quadrature-phase component 304 of data symbol transmission quadrature baseband signal;

quadrature-phase component 3603 of synchronous symbol transmission quadrature baseband signal, and frame structure signal 311.

Switcher 314 then selects a quadrature-phase component of a transmission quadrature baseband signal corresponding to the symbol indicated by frame structure signal 311, and outputs the selected one as quadrature-phase component 315 of the selected transmission quadrature baseband signal.

Orthogonal modulator 316 receives in-phase component 313 and quadrature-phase component 315 discussed above, then provides those components with an orthogonal modulation, and outputs modulation signal 317, i.e. signal 203 shown in FIG. 2.

An operation of generator 212 is demonstrated hereinafter. Data symbol modulation signal generator 302 receives transmission digital signal 301, i.e. transmission digital signal 211 of channel B in FIG. 2, and frame structure signal 210, i.e. frame structure signal 311 in FIG. 36. When frame structure signal 210 indicates a data symbol, generator 302 outputs in-phase component 303 and quadrature-phase component 304 of a transmission quadrature baseband signal of the data symbol.

Guard symbol modulation signal generator 3601 receives frame structure signal 311. When signal 311 indicates a guard symbol, generator 3601 outputs in-phase component 3602 and quadrature-phase component 3603 of a transmission quadrature baseband signal of the guard symbol.

FIG. 4 shows the signal-point placement of the respective symbols in an in-phase-quadrature plane of the foregoing operation. Points 401 in FIG. 4 indicate the signal-points of in-phase component 303 and quadrature-phase component 304 of the transmission quadrature baseband signal of the data symbol. Points 403 indicate the signal-points of in-phase component 3602 and quadrature-phase component 3603 of the transmission quadrature baseband signal of the guard symbol.

In-phase component switcher 312 receives the following signals:

in-phase component 303 of the data symbol transmission quadrature baseband signal;

in-phase component 3602 of the guard symbol transmission quadrature baseband signal, and frame structure signal 311.

Switcher 312 then selects an in-phase component of a transmission quadrature baseband signal corresponding to the symbol indicated by frame structure signal 311, and outputs the selected one as in-phase component 313 of the selected transmission quadrature baseband signal.

Quadrature-phase component switcher 314 receives the following signals:

quadrature-phase components 304 of a data symbol transmission quadrature baseband signal;

quadrature-phase component 3603 of the guard symbol transmission quadrature baseband signal, and frame structure signal 311, then selects a quadrature-phase component of a transmission quadrature baseband signal corresponding to a symbol indicated by frame structure signal 311, and outputs the selected one as quadrature-phase component 315 of the selected transmission quadrature baseband signal.

Orthogonal modulator 316 receives in-phase component 313 and quadrature-phase component 315 selected as discussed above, then provides those components with an orthogonal modulation, and outputs modulation signal 317, i.e. signal 213 shown in FIG. 2.

An operation of the reception apparatus is demonstrated hereinafter with reference to FIG. 37 through FIG. 42. First, the operation is demonstrated with reference to FIG. 37.

Radio unit 3714 receives signal 3713 received by antenna 3712, then outputs reception quadrature baseband signal 3715.

Synchronizing unit 3718 receives base-band signal 3715, and detects a synchronous symbol among the signals transmitted by the transmission apparatus, then outputs timing signal 3719 which synchronizes with the transmission apparatus time-wise. Signal 3719 is used as a timing signal at the respective units in the reception apparatus.

Next, an operation of the reception apparatus is demonstrated with reference to FIG. 38.

Radio unit 3703 receives signal 3702 received by antenna 3701, then outputs reception quadrature baseband signal 3704.

Synchronizing unit 3801 receives base-band signal 3704, and detects a synchronous symbol among the signals transmitted by the transmission apparatus, then outputs timing signal 3802 which synchronizes with the transmission apparatus time-wise. Signal 3802 is, e.g. supplied to transmission path variation estimation unit 3705 and signal isolator 3807. Signal 3802 then extracts a signal from base-band signal 3704 by timing to itself for signal processing.

Radio unit 3708 receives signal 3707 received by antenna 3706, then outputs reception quadrature baseband signal 3709.

Synchronizing unit 3803 receives base-band signal 3709, and detects a synchronous symbol among the signals transmitted by the transmission apparatus, then outputs timing signal 3804 which synchronizes with the transmission apparatus time-wise. Signal 3804 is, e.g. supplied to transmission path variation estimation unit 3710 and signal isolator 3807. Signal 3802 then extracts a signal from base-band signal 3709 by timing to itself for signal processing.

Radio unit 3714 receives signal 3713 received by antenna 3712, then outputs reception quadrature baseband signal 3715.

Synchronizing unit 3805 receives base-band signal 3715, and detects a synchronous symbol among the signals transmitted by the transmission apparatus, then outputs timing signal 3806 which synchronizes with the transmission apparatus time-wise. Signal 3806 is, e.g. supplied to transmission path variation estimation unit 3716 and signal isolator 3807. Signal 3802 then extracts a signal from base-band signal 3715 by timing to itself for signal processing.

Next, an operation of the reception apparatus is demonstrated with reference to FIG. 39.

Received signal strength intensity estimation unit 3901 receives signal 3702 received by antenna 3701, then estimates the reception received signal strength intensity, and outputs received signal strength intensity estimation signal 3902.

In a similar way to what is discussed above, received signal strength intensity estimation unit 3903 receives signal 3707 received by antenna 3706, then estimates the reception received signal strength intensity, and outputs received signal strength intensity estimation signal 3904. Received signal strength intensity estimation unit 3905 receives signal 3713 received by antenna 3712, then estimates the reception received signal strength intensity, and outputs received signal strength intensity estimation signal 3906.

Synchronizing unit 3907 receives reception quadrature baseband signal 3704, and detects a synchronous symbol among the signals transmitted by the transmission apparatus, then outputs timing signal 3908 which synchronizes with the transmission apparatus time-wise.

In a similar way to what is discussed above, synchronizing unit 3909 receives reception quadrature baseband signal 3709, and detects a synchronous symbol among the signals transmitted by the transmission apparatus, then outputs timing signal 3910 which synchronizes with the transmission apparatus time-wise. Synchronizing unit 3911 receives reception quadrature baseband signal 3715, and detects a synchronous symbol among the signals transmitted by the transmission apparatus, then outputs timing signal 3912 which synchronizes with the transmission apparatus time-wise.

Synchronous signal selection unit 3913 receives received signal strength intensity estimation signals 3902, 3904, 3906, and timing signals 3908, 3910, 3912. When the electric field of the signal received by, e.g. antenna 3701 is the strongest among others, timing signal 3908 is selected from the foregoing estimation signals. Selection unit 3913 then outputs timing signal 3908 selected as timing signal 3914. As such, the timing signal found from the reception signal that has the best electric field is used as the timing signal of the reception apparatus.

Next, an operation of the reception apparatus is demonstrated with reference to FIG. 40.

Signal selection unit 4001 receives the following signals:
received signal strength intensity estimation signals 3902, 3904, 3906; and
reception quadrature baseband signals 3704, 3709, 3715.

When the electric field of the signal received by, e.g. antenna 3701 is the strongest among others, base-band signal 3704 is selected from the foregoing base-band signals. Then unit 4001 outputs signal 3704 as reception quadrature baseband signal 4002.

Synchronizing unit 4003 receives reception quadrature baseband signal 4002 selected, and searches for a synchronous symbol transmitted by the transmission apparatus, then outputs timing signal 4004 which synchronizes with the transmission apparatus. As such, the timing signal found from the reception signal that has the best electric field is used as the timing signal of the reception apparatus.

Next, an operation of the reception apparatus is demonstrated with reference to FIG. 41. The operation shown in FIG. 41 differs from that of FIG. 39 in finding the received signal strength intensity by using a reception quadrature baseband signal.

Received signal strength intensity estimation unit 3901 receives reception quadrature baseband signal 3704, then estimates the reception received signal strength intensity, and outputs received signal strength intensity estimation signal 3902.

In a similar way to what is discussed above, received signal strength intensity estimation unit 3903 receives reception quadrature baseband signal 3709, then estimates the reception received signal strength intensity, and outputs received signal strength intensity estimation signal 3904. Received signal strength intensity estimation unit 3905 receives reception quadrature baseband signal 3715, then estimates the reception received signal strength intensity, and outputs received signal strength intensity estimation signal 3906.

Figure 42:
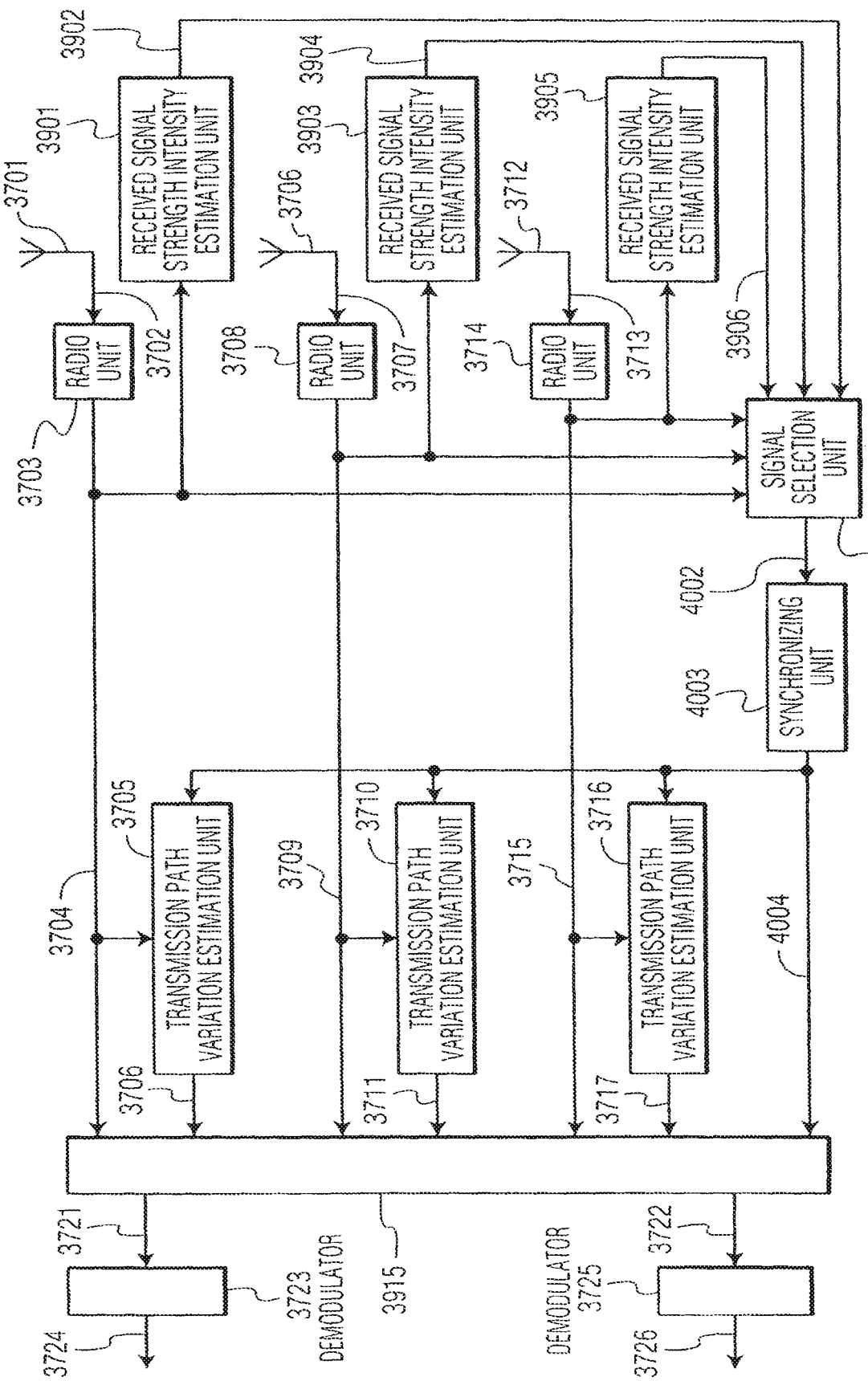
FIG. 42 shows a structure of a reception apparatus in accordance with the eighth exemplary embodiment of the present invention.

The operation shown in FIG. 42 differs from that of FIG. 40 in finding the received signal strength intensity by using a reception quadrature baseband signal.

In the foregoing discussion, the received signal strength intensity is used as an example of a parameter of the radio-wave propagation environment; however, this embodiment is not limited to this example, and Doppler frequency or the number of paths of multi-path can be used as the parameter.

The foregoing discussion proves that the transmission apparatus can be synchronized with the reception apparatus time-wise.

In this embodiment, the number of channels to be multiplexed are two; however, other numbers can be applicable to the embodiment. The frame structure is not limited to what is shown in FIG. 33, or FIG. 34. A modulation method of the data symbol is not limited to QPSK modulation, but respective channels can undergo different modulations. On the other hand, all the channels can use the spread spectrum communication method. The spread spectrum communication method can coexist with the other methods.

The synchronous symbols shown in FIGS. 33, 34 are used for time-synchronizing the reception apparatus with the transmission apparatus; however, the symbols are not limited to this usage, and they can be used for, e.g. estimating a frequency offset between the reception apparatus and the transmission apparatus.

The structure of the transmission apparatus of this embodiment is not limited to what is shown in FIGS. 2, 35, 36, and when the number of channels increases, the structure formed of elements 201 through 208 shown in FIG. 31 is added accordingly.

The structure of the reception apparatus of this embodiment is not limited to what is shown in FIG. 37 through FIG. 42; but the number of antennas can be increased.

The expression of "antenna" in the previous description does not always mean a single antenna, but "antenna" can mean an antenna unit which is formed of a plurality of antennas.

The eighth exemplary embodiment, as discussed above, describes the transmission method of multiplexing modulation signals of a plurality of channels to the same frequency band, more particularly, the method of transmitting a synchronous symbol in the foregoing transmission method. This embodiment also describes the transmission apparatus and the reception apparatus to be used in the foregoing transmission method. The method and the apparatuses can increase the transmission rate of data, and synchronize the transmission apparatus with the reception apparatus time-wise.

Exemplary Embodiment 9

The ninth exemplary embodiment describes a transmission method of transmitting modulation signals of a plurality of channels to the same frequency band from a plurality of antennas, more particularly, a method of transmitting a synchronous symbol in the spread-spectrum transmission method. The ninth embodiment also describes a transmission apparatus and a reception apparatus to be used in the foregoing transmission method.

FIG. 4 shows a placement of signal points in the in-phase-quadrature plane in accordance with this embodiment.

FIG. 12 shows a structure of the transmission apparatus in accordance with the eighth embodiment.

Figure 43:
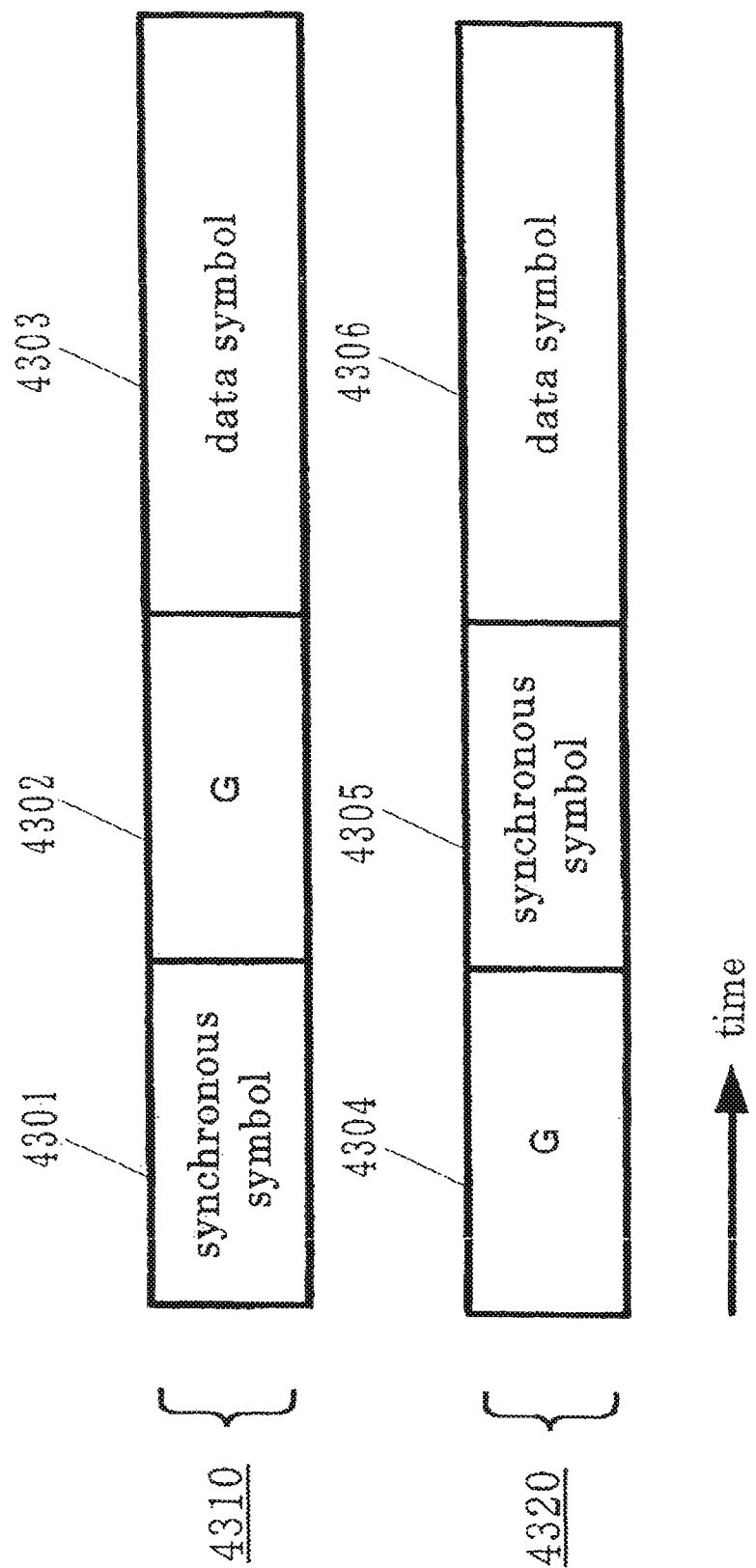
FIG. 43 shows a frame structure along a time axis in accordance with a ninth exemplary embodiment of the present invention.

FIG. 43 shows a frame structure along a time-axis in accordance with this embodiment, and to be more specific, it shows frame structure 4310 of spread-spectrum communication method A and frame structure 4320 of method B. Frame structures 4310, 4320 include synchronous symbols 4301, 4305, guard symbols 4302, 4304, and data symbols 4303, 4306.

Figure 44:
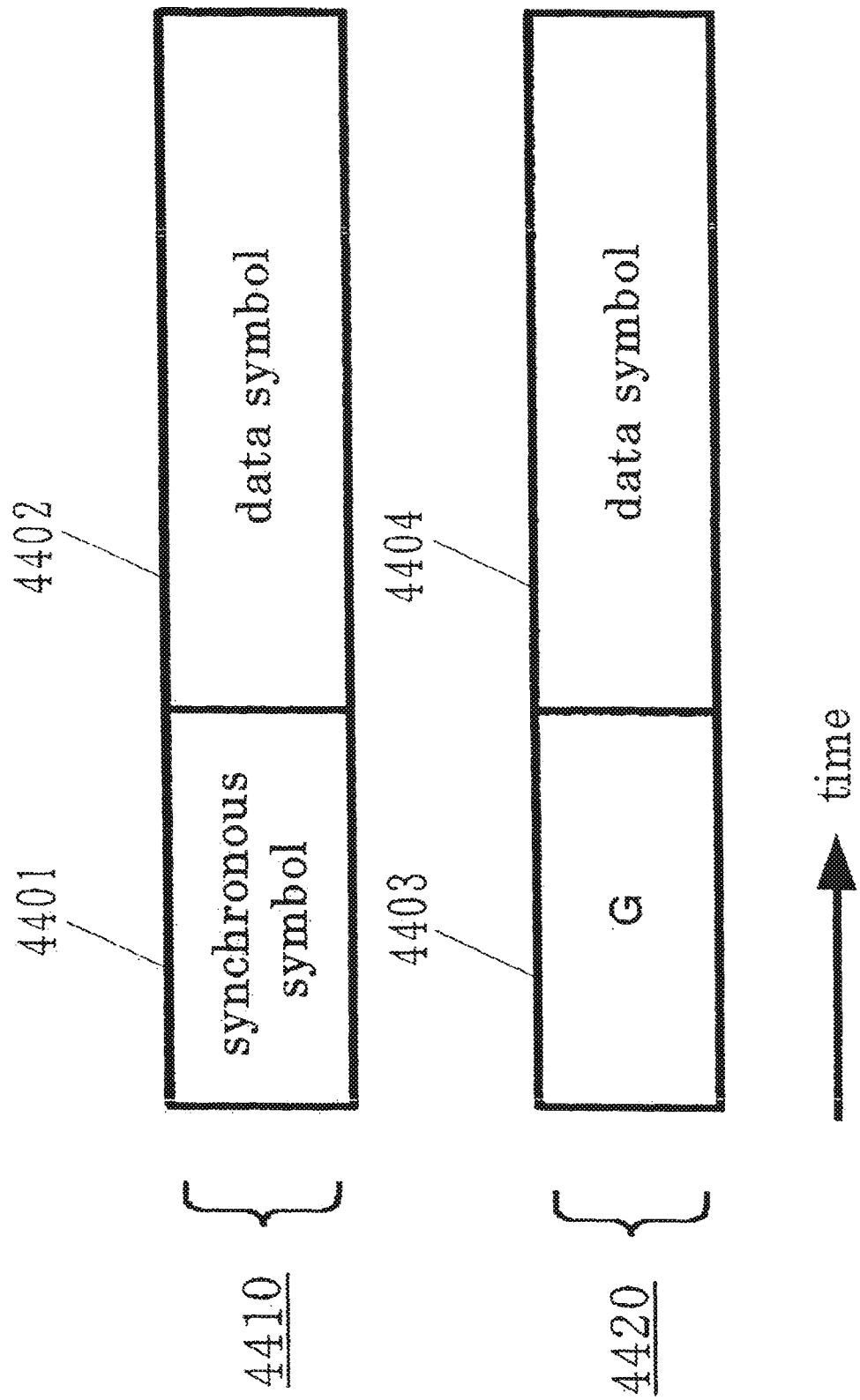
FIG. 44 shows a frame structure along a time axis in accordance with the ninth exemplary embodiment of the present invention.

FIG. 44 shows a frame structure along a time axis in accordance with this embodiment, specifically, frame structure 4410 of method A and frame structure 4420 of method B. Structures 4410, 4420 include synchronous symbols 3401, data symbols 3402, 3404, and guard symbol 4403.

Figure 45:
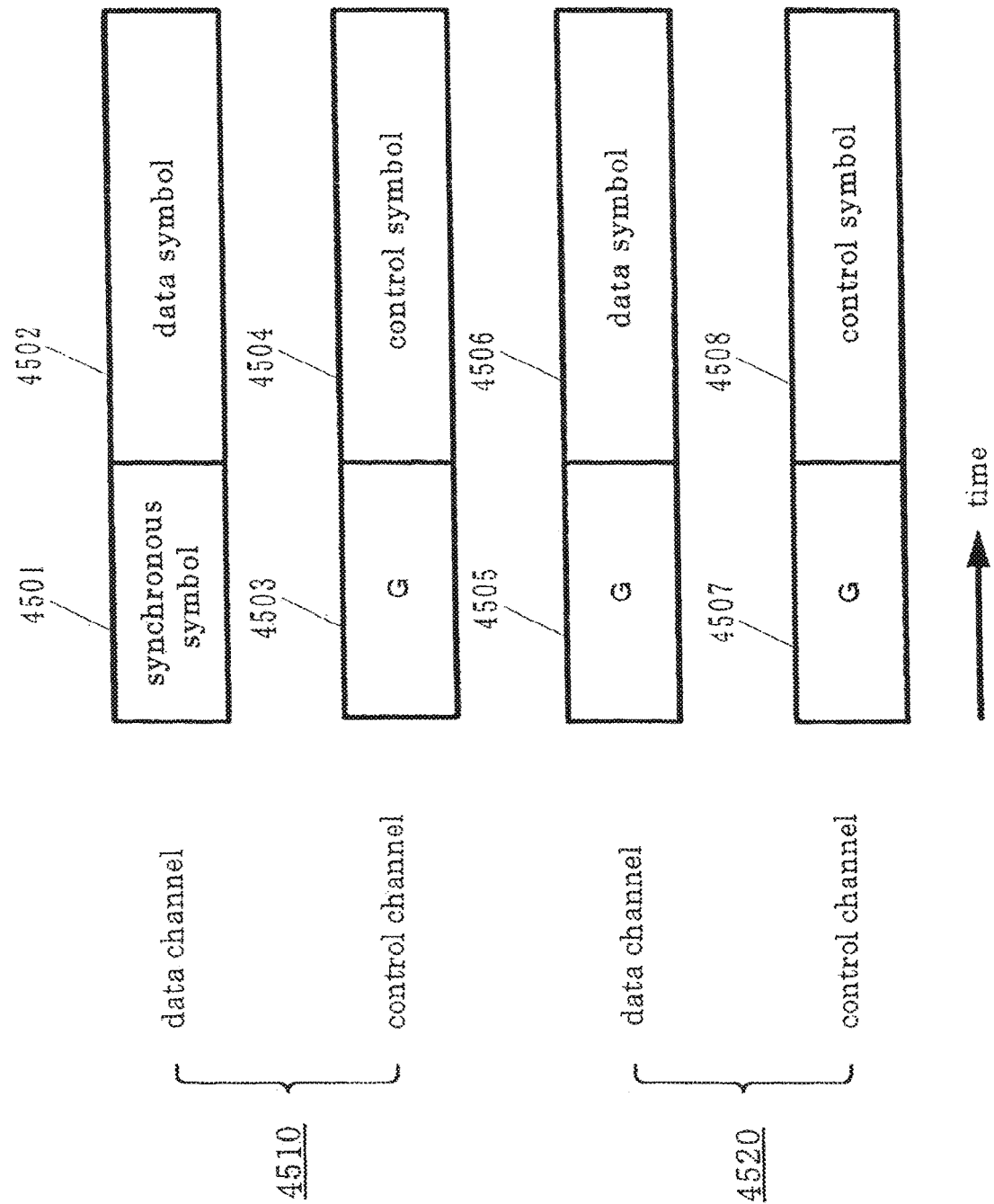
FIG. 45 shows a frame structure along a time axis in accordance with the ninth exemplary embodiment of the present invention.

FIG. 45 shows a frame structure along a time axis in accordance with this embodiment, specifically, frame structure 4510 of method A and frame structure 4520 of method B. Structures 4510, 4520 include guard symbols 4503, 4505, 4507, data symbols 4502, 4504, 4506, 4508 and synchronous symbol 4501.

Figure 46:
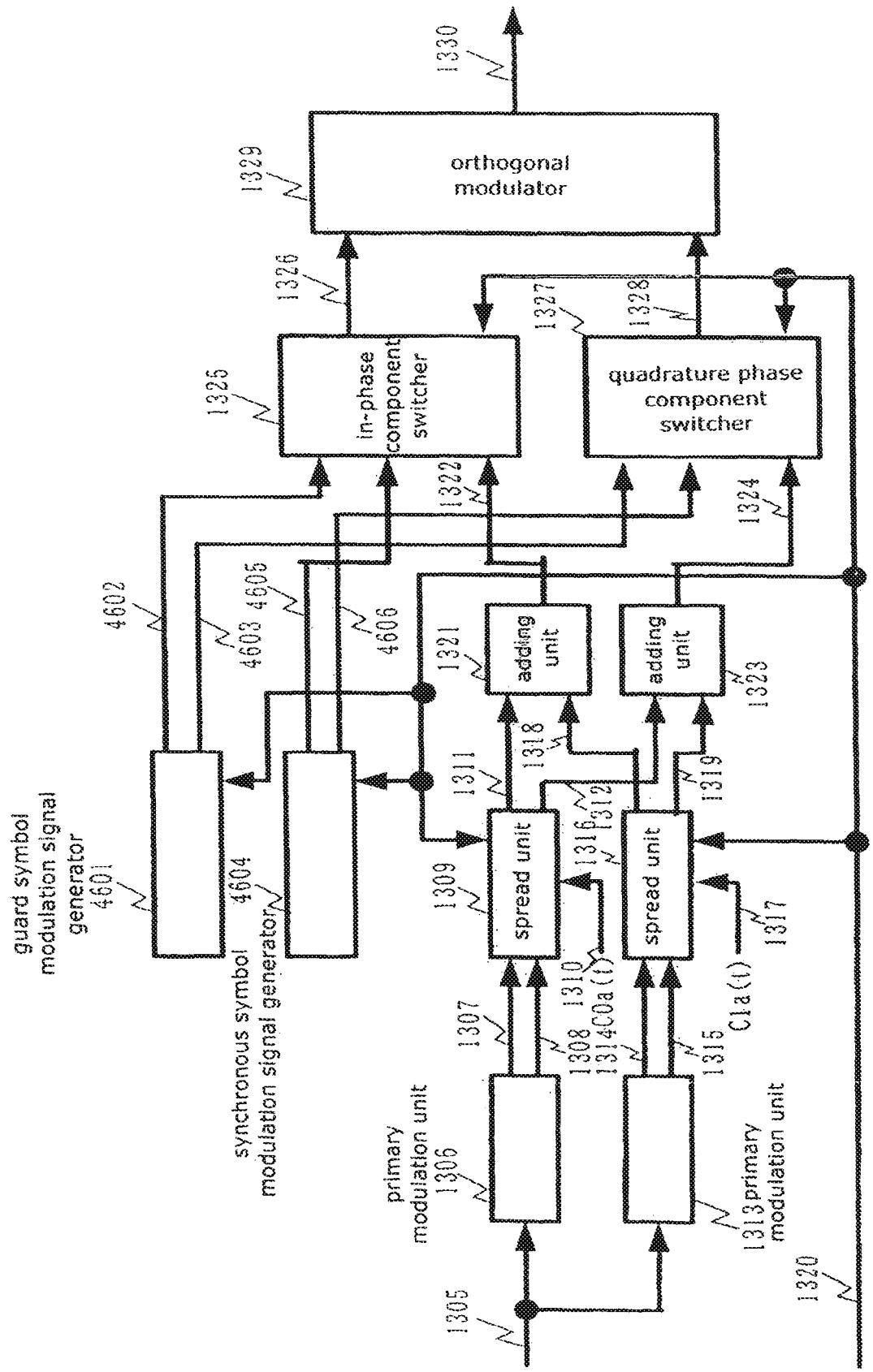
FIG. 46 shows a structure of a modulation signal generator in accordance with the ninth exemplary embodiment of the present invention.

FIG. 46 shows a structure of modulation signal generators 1202, 1210, and the elements operating in a similar way to those in FIG. 13 have the same reference marks.

Guard symbol modulation signal generator 4601 receives frame structure signal 1320. When signal 1320 indicates a guard symbol, generator 4601 outputs in-phase component 4602 and quadrature-phase component 4603 of a transmission quadrature baseband signal of the guard symbol.

Synchronous symbol modulation signal generator 4604 receives frame structure signal 1320, and outputs in-phase component 4605 and quadrature-phase component 4606 of the transmission quadrature baseband signal of the synchronous symbol when frame structure signal 1320 indicates the synchronous symbol.

Figure 47:
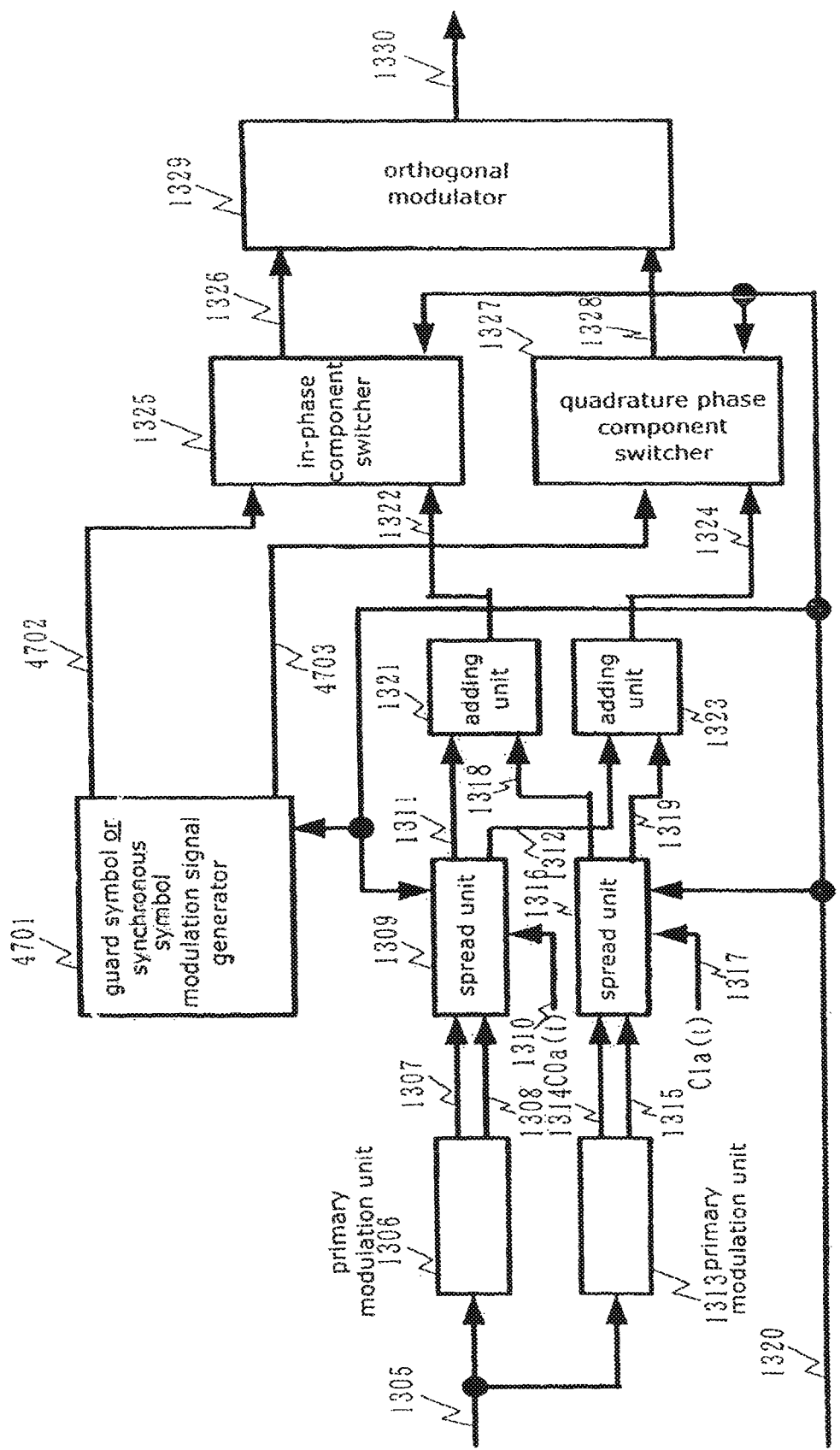
FIG. 47 shows a structure of a modulation signal generator in accordance with the ninth exemplary embodiment of the present invention.

FIG. 47 shows a structure of modulation signal generators 1202, 1210 shown in FIG. 12, and the elements operating in a similar way to those in FIG. 13 have the same reference marks.

Guard symbol or synchronous symbol modulation signal generator 4701 receives frame structure signal 1320, and outputs in-phase component 4702, quadrature-phase component 4703 of a transmission quadrature baseband signal of the guard symbol or the synchronous symbol.

Figure 48:
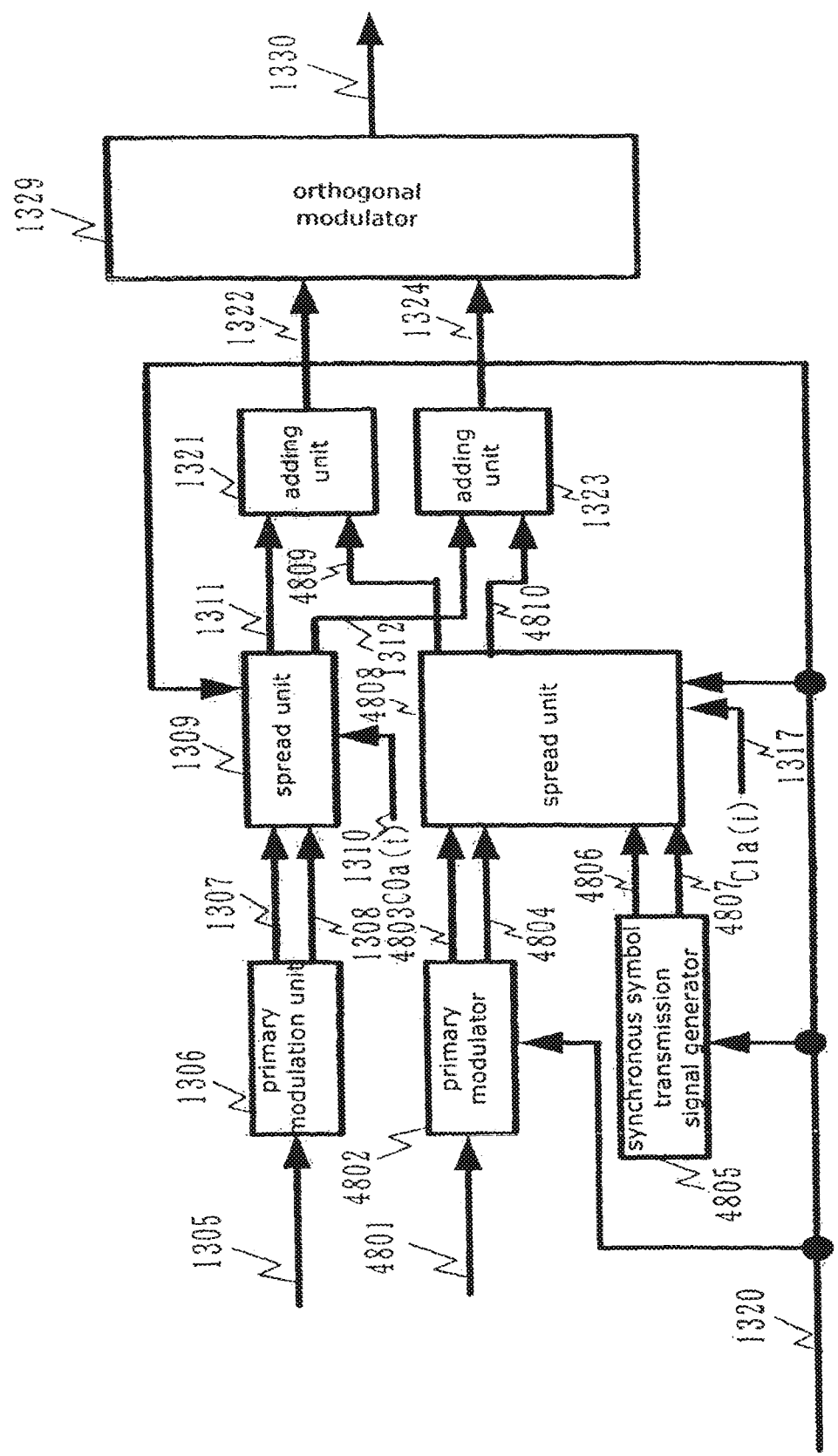
FIG. 48 shows a structure of a modulation signal generator in accordance with the ninth exemplary embodiment of the present invention.

FIG. 48 shows a structure of modulation signal generators 1202, 1210 shown in FIG. 12, and the elements operating in a similar way to those in FIG. 13 have the same reference marks.

Primary modulator 4802 receives control information 4801 and frame structure signal 1320, and outputs in-phase component 4803, quadrature-phase component 4804 of the transmission quadrature baseband signal undergone the primary modulation.

Synchronous symbol transmission signal generator 4805 receives frame structure signal 1320, and outputs in-phase component 4806, quadrature-phase component 4807 of the transmission quadrature baseband signal of the synchronous symbol.

Spread unit 4808 receives the following signals:
in-phase component 4803 and quadrature-phase component 4804 of the transmission quadrature baseband signal undergone the primary modulation;
in-phase component 4806, quadrature-phase component 4807 of the synchronous symbol transmission quadrature baseband signal;
spread code 1317; and
frame structure signal 1320.

Spread unit 4808 then outputs in-phase component 4809 and quadrature-phase component 4810 of a transmission quadrature baseband signal corresponding to frame structure signal 1320 and undergone the spread of the symbol.

Figure 49:
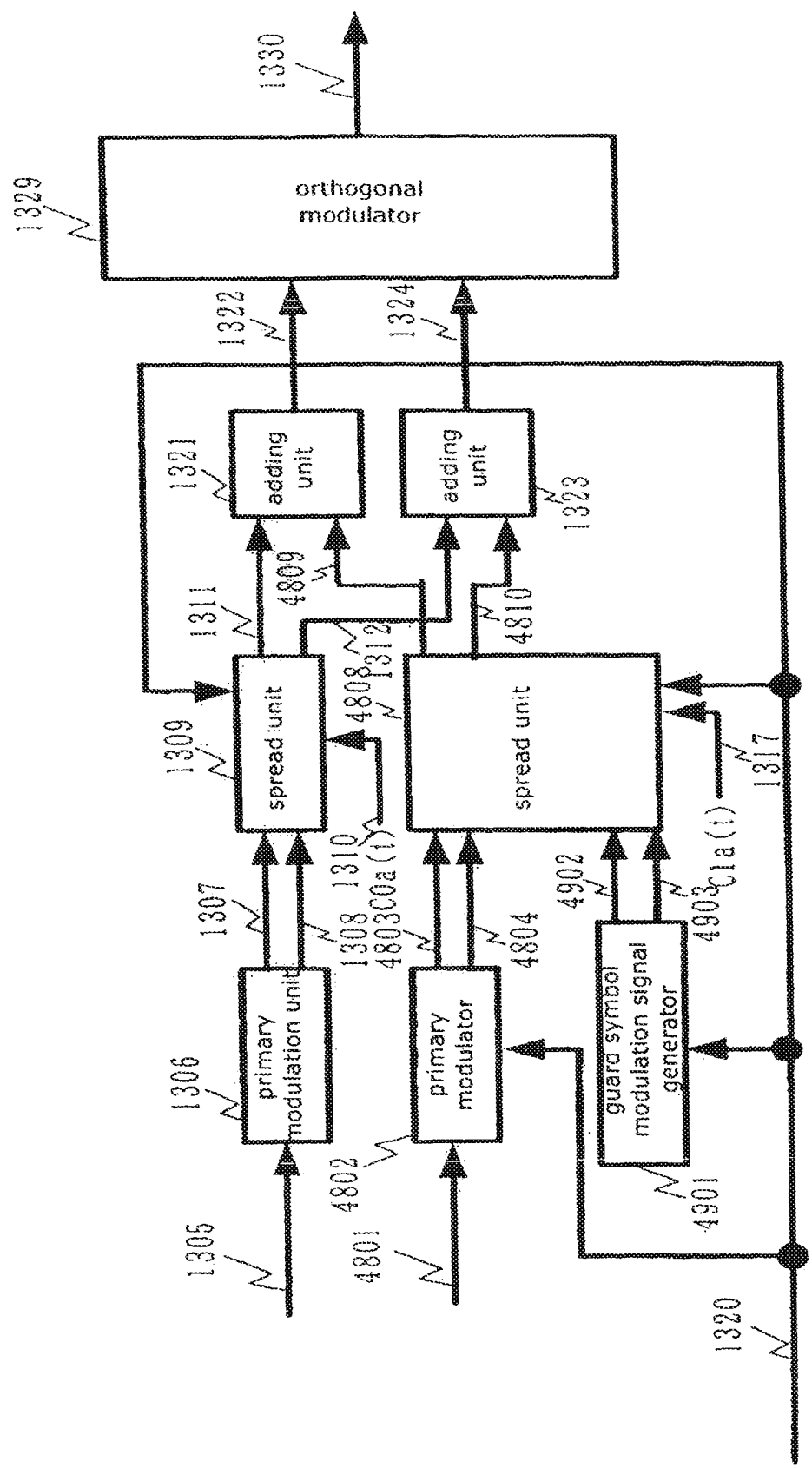
FIG. 49 shows a structure of a modulation signal generator in accordance with the ninth exemplary embodiment of the present invention.

FIG. 49 shows a structure of modulation signal generators 1202, 1210 shown in FIG. 12, and the elements operating in a similar way to those in FIG. 13 or FIG. 48 have the same reference marks.

Guard symbol modulation signal generator 4901 receives frame structure signal 1320, then outputs in-phase component 4902 and quadrature-phase component 4903 of a transmission quadrature baseband signal of the guard symbol.

Spread unit 4808 receives the following signals:
in-phase component 4803 and quadrature-phase component 4804 of the transmission quadrature baseband signal undergone the primary modulation;
in-phase component 4902, quadrature-phase component 4903 of the synchronous symbol transmission quadrature baseband signal;
spread code 1317; and
frame structure signal 1320.

Spread unit 4808 then outputs in-phase component 4809 and quadrature-phase component 4810 of a transmission quadrature baseband signal corresponding to frame structure signal 1320 and undergone the spread of the symbol.

FIG. 37 shows a structure of a reception apparatus in accordance with this exemplary embodiment.

FIG. 38 shows a structure of a reception apparatus in accordance with this exemplary embodiment.

FIG. 39 shows a structure of a reception apparatus in accordance with this exemplary embodiment.

FIG. 40 shows a structure of a reception apparatus in accordance with this exemplary embodiment.

FIG. 41 shows a structure of a reception apparatus in accordance with this exemplary embodiment.

FIG. 42 shows a structure of a reception apparatus in accordance with this exemplary embodiment.

An operation of the transmission apparatus is demonstrated with reference to FIGS. 4, 12, and FIG. 43 through FIG. 49.

In FIG. 12, frame structure signal generator 1217 outputs the information about the frame structure shown in FIG. 43, FIG. 44, or FIG. 45 as frame structure signal 1218. Modulation signal generator 1202 of spread-spectrum communication method A receives frame structure signal 1218 and transmission digital signal 1201 of spread spectrum transmission method A, then outputs modulation signal 1203 of method A in accordance with the frame structure. Modulation signal generator 1210 of method B receives frame structure signal 1218 and transmission digital signal 1209 of spread spectrum transmission method B, then outputs modulation signal 1211 of method B in accordance with the frame structure.

Operations of modulation signal generators 1202 and 1210 in the case of the frame structure shown in FIG. 43 are demonstrated with reference to FIG. 46. At a transmitter of spread-spectrum communication method A, guard-symbol transmission signal generator 4601 shown in FIG. 46 receives frame structure signal 1320. When signal 1320 indicates the guard symbol, generator 4601 outputs in-phase component 4602 and quadrature-phase component 4603 of the guard symbol transmission quadrature baseband signal.

Synchronous symbol transmission signal generator 4604 receives frame structure signal 1320. When signal 1320 indicates the synchronous symbol, generator 4604 outputs in-phase component 4605, quadrature-phase component 4606 of the transmission quadrature baseband signal of the synchronous symbol.

FIG. 4 shows the signal-point placement of the respective symbols in an in-phase-quadrature plane of the foregoing operation. Points 401 in FIG. 4 indicate the signal-points of in-phase components 1311, 1318 and quadrature-phase component 1312, 1319 of the transmission quadrature baseband signal of the data symbol. Points 402 indicate the signal-points of in-phase component 4605 and quadrature-phase component 4606 of the transmission quadrature baseband signal of the synchronous symbol. Point 403 indicates the signal-points of in-phase component 4602 and quadrature-phase component 4603 of the transmission quadrature baseband signal of the guard symbol.

Operations of modulation signal generators 1202, 1210 in the case of the frame structure shown in FIG. 44 are demonstrated with reference to FIG. 47 taking the transmitters of spread spectrum communication methods A and B as examples.

FIG. 47 shows a detailed structure of modulation signal generator 1202 at the transmitter of method A. Guard symbol or synchronous symbol modulation signal generator 4701 receives frame structure signal 1320, and outputs in-phase component 4702, quadrature-phase component 4703 of a transmission quadrature baseband signal of the guard symbol or the synchronous symbol when signal 1320 indicates the synchronous symbol.

FIG. 47 shows a detailed structure of modulation signal generator 1202 at the transmitter of method B. Guard symbol or synchronous symbol modulation signal generator 4701 receives frame structure signal 1320, and outputs in-phase component 4702, quadrature-phase component 4703 of a transmission quadrature baseband signal of the guard symbol or the synchronous symbol when signal 1320 indicates the guard symbol.

FIG. 4 shows the signal-point placement of the respective symbols in an in-phase-quadrature plane of the foregoing operation. Points 401 in FIG. 4 indicate the signal-points of in-phase components 1311, 1318 and quadrature-phase component 1312, 1319 of the transmission quadrature baseband signal of the data symbol. Points 402 indicate the signal-points of the in-phase component and the quadrature-phase component of the transmission quadrature baseband signal of the synchronous symbol. Point 403 indicates the signal-points of the in-phase component and the quadrature-phase component of the transmission quadrature baseband signal of the guard symbol.

Operations of modulation signal generators 1202, 1210 in the case of the frame structure shown in FIG. 45 are demonstrated with reference to FIGS. 48, 49 taking the transmitters of spread spectrum communication methods A and B as examples.

FIG. 48 shows a detailed structure of modulation signal generator 1202 at the transmitter of method A. Primary modulator 4802 shown in FIG. 48 receives control information 4801, frame structure signal 1320, and outputs in-phase component 4803, quadrature-phase component 4804 of a transmission quadrature baseband signal of the control information.

Synchronous symbol transmission signal generator 4805 receives frame structure signal 1320. When signal 1320 indicates the synchronous symbol, generator 4805 outputs in-phase component 4806, quadrature-phase component 4807 of the transmission quadrature baseband signal of the synchronous symbol.

Spread unit 4808 receives in-phase component 4803 and quadrature-phase component 4804 of the quadrature baseband signal of the control information, in-phase component 4806, quadrature-phase component 4807 of the transmission quadrature baseband signal of the synchronous symbol, spread code 1317, frame structure signal 1320. Spread unit 4808 then multiplies code 1317 by the transmission quadrature baseband signal of the symbol indicated by frame structure signal 1320, and outputs in-phase component 4809 and quadrature-phase component 4810 of a transmission quadrature baseband signal of a control channel undergone the spread.

FIG. 49 shows a detailed structure of guard symbol modulation signal generator 1212 at the transmitter of method B. Guard symbol modulation signal generator 4901 receives frame structure signal 1320. When signal 1320 indicates the guard symbol, generator 4901 outputs in-phase component 4902, quadrature-phase component 4903 of a transmission quadrature baseband signal of the guard symbol.

Spread unit 4808 receives the following signals:

in-phase component 4803 and quadrature-phase component 4804 of the transmission quadrature baseband signal;

in-phase component 4902, quadrature-phase component 4903 of the guard symbol transmission quadrature baseband signal;

spread code 1317; and frame structure signal 1320.

Spread unit 4808 then multiplies spread code 1317 by the transmission quadrature baseband signal of the symbol indicated by frame structure signal 1320, and outputs in-phase component 4809 and quadrature-phase component 4810 of a transmission quadrature baseband signal of the control channel.

FIG. 4 shows the signal-point placement of the respective symbols in an in-phase-quadrature plane of the foregoing operation. Points 401 in FIG. 4 indicate the signal-points of in-phase components and quadrature-phase components of the data symbol and the control symbol. Points 402 indicate the signal-points of the in-phase component and the quadrature-phase component of the transmission quadrature baseband signal of the synchronous symbol. Point 403 indicates the signal-points of the in-phase component and the quadrature-phase component of the transmission quadrature baseband signal of the guard symbol.

An operation of the reception apparatus is demonstrated with reference to FIG. 37 through FIG. 42, in those drawings, demodulators 3723, 3725 carries out demodulation following the spread-spectrum communication method, namely, carries out inverse spread, then carries out demodulation.

In the foregoing discussion, the received signal strength intensity is used as an example of a parameter of the radio-wave propagation environment; however, this embodiment is not limited to this example, and Doppler frequency or the number of paths of multi-path can be used as the parameter.

The foregoing discussion proves that the transmission apparatus can be synchronized with the reception apparatus time-wise.

In this embodiment, the number of channels to be multiplexed are two; however, other numbers can be applicable to the embodiment. The frame structure is not limited to what is shown in FIG. 43, FIG. 44, or FIG. 45. Both of spread-spectrum communication methods A and B use two channels multiplied; however, they are not limited to the two channels.

The synchronous symbols shown in FIGS. 43, 44 and 45 are used for time-synchronizing the reception apparatus with the transmission apparatus; however, the symbols are not limited to this usage, and they can be used for, e.g. estimating a frequency offset between the reception apparatus and the transmission apparatus.

The structure of the transmission apparatus of this embodiment is not limited to what is shown in FIGS. 12, 13, and when the number of spread-spectrum communication methods increases, the structure formed of elements 1201 through 1208 shown in FIG. 12 are added accordingly.

When the number of channels increases, elements 1306, 1309 in FIG. 13 increase accordingly.

The expression of "antenna" in the previous description does not always mean a single antenna, but "antenna" can mean an antenna unit which is formed of a plurality of antennas.

The ninth exemplary embodiment, as discussed above, describes the transmission method of transmitting modulation signals of a plurality of channels to the same frequency band from a plurality of antennas, more particularly, the method of transmitting the synchronous symbol in the spread-spectrum transmission method. The ninth embodiment also describes the transmission apparatus and the reception apparatus to be used in the foregoing transmission method. The foregoing structure and operation allows increasing the data transmission rate, and synchronizing the transmission apparatus with the reception apparatus time-wise.

Exemplary Embodiment 10

The tenth exemplary embodiment describes a transmission method of transmitting modulation signals of a plurality of channels to the same frequency band from a plurality of antennas, more particularly, a method of transmitting a synchronous symbol in accordance with OFDM method. The tenth embodiment also describes a transmission apparatus and a reception apparatus to be used in the foregoing method.

FIG. 4 shows a placement of signal points in the in-phase-quadrature plane in accordance with this embodiment.

FIG. 25 shows a structure of the transmission apparatus in accordance with this embodiment.

Figure 50:
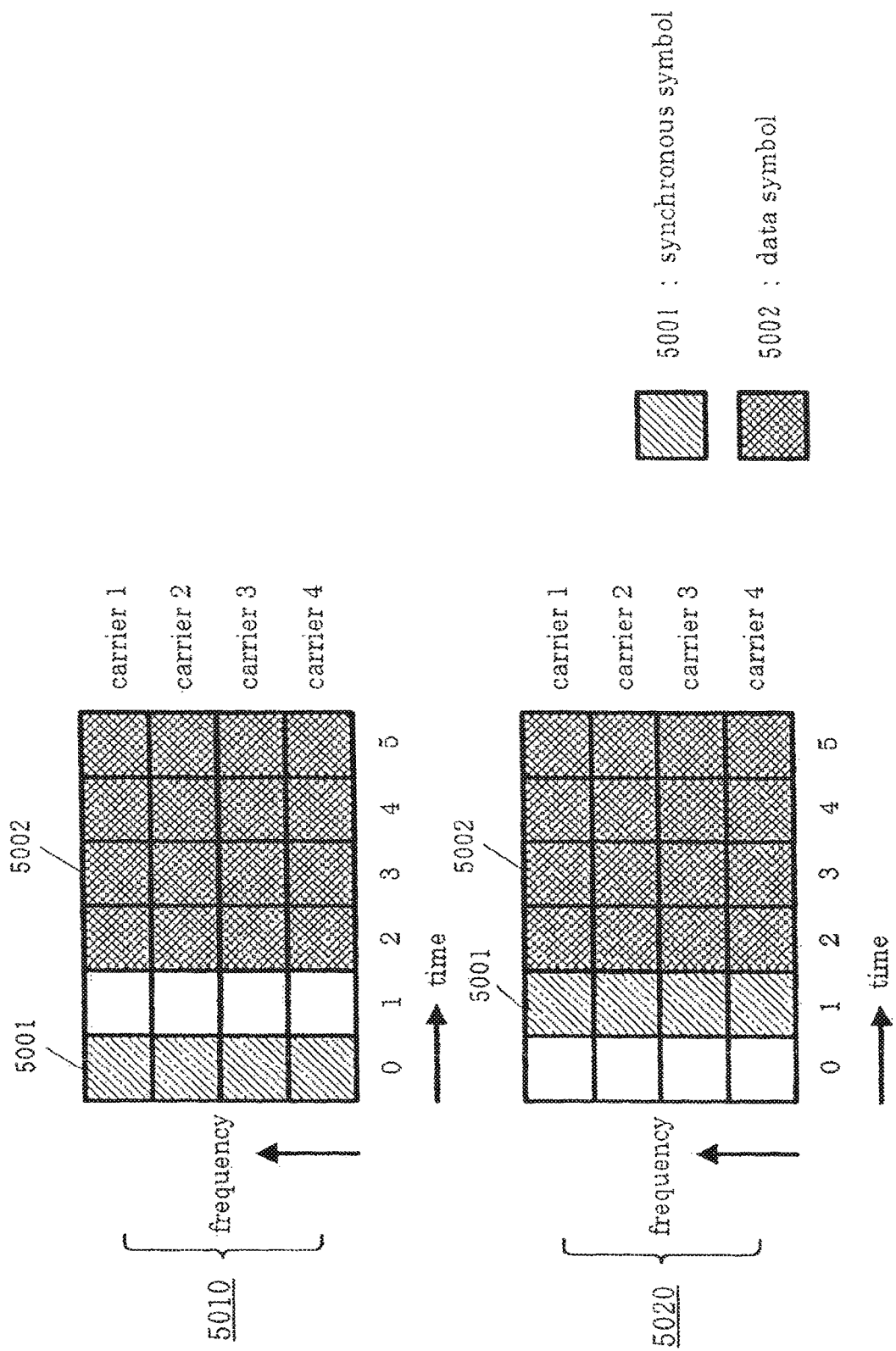
FIG. 50 shows a frame structure along a time axis and a frequency axis in accordance with a tenth exemplary embodiment of the present invention.

FIG. 50 shows a frame structure along a frequency-axis in accordance with this embodiment, and to be more specific, it shows frame structure 5010 of channel A and frame structure 5020 of channel B. Frame structures 5010, 5020 include synchronous symbol 5001, data symbols 5002.

Figure 51:
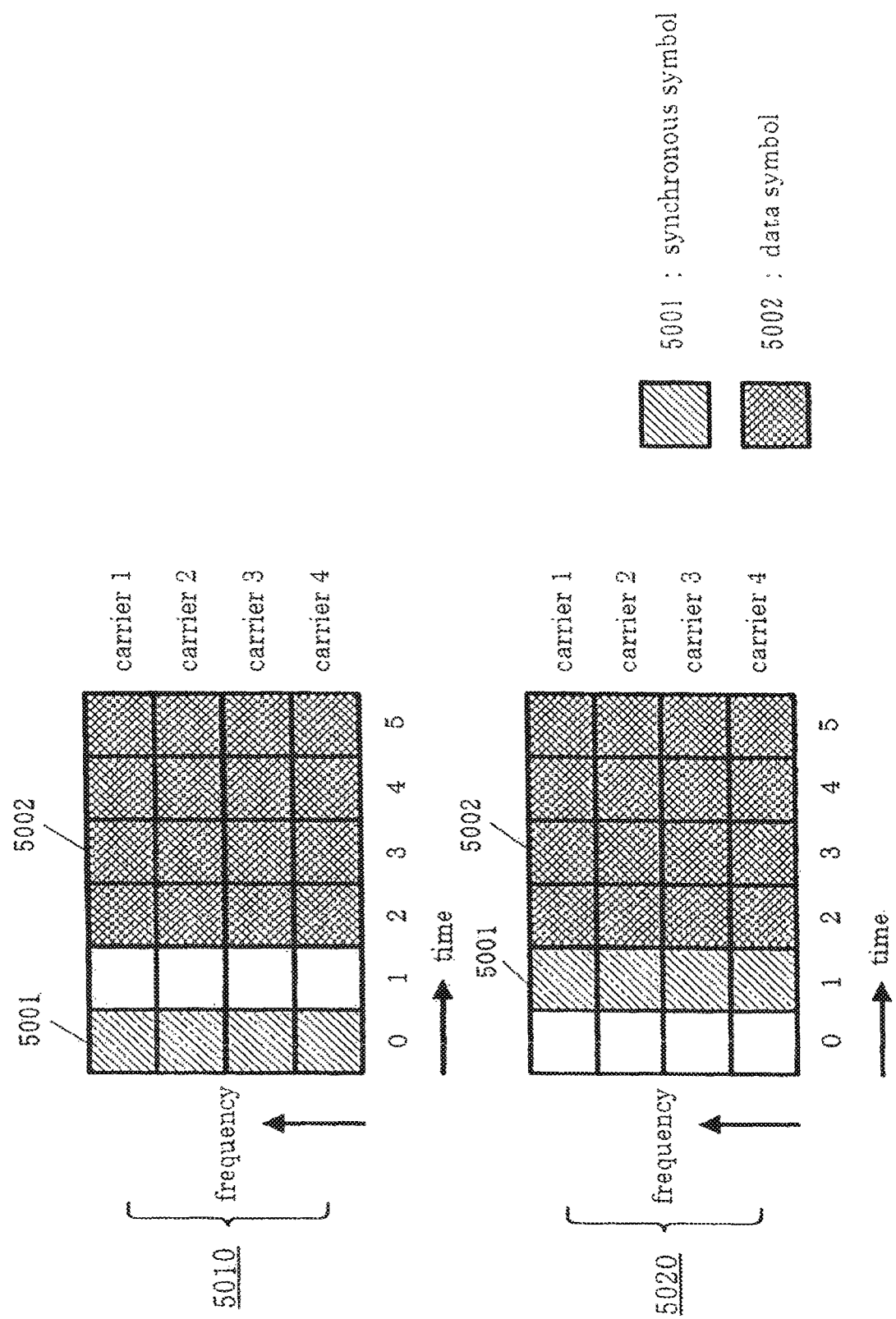
FIG. 51 shows a frame structure along a time axis and a frequency axis in accordance with the tenth exemplary embodiment of the present invention.

FIG. 51 shows a frame structure along a frequency-axis in accordance with this embodiment, and to be more specific, it shows frame structure 5110 of channel A and frame structure 5120 of channel B. Frame structures 5110, 5120 include synchronous symbol 5101, data symbols 5102.

Figure 52:
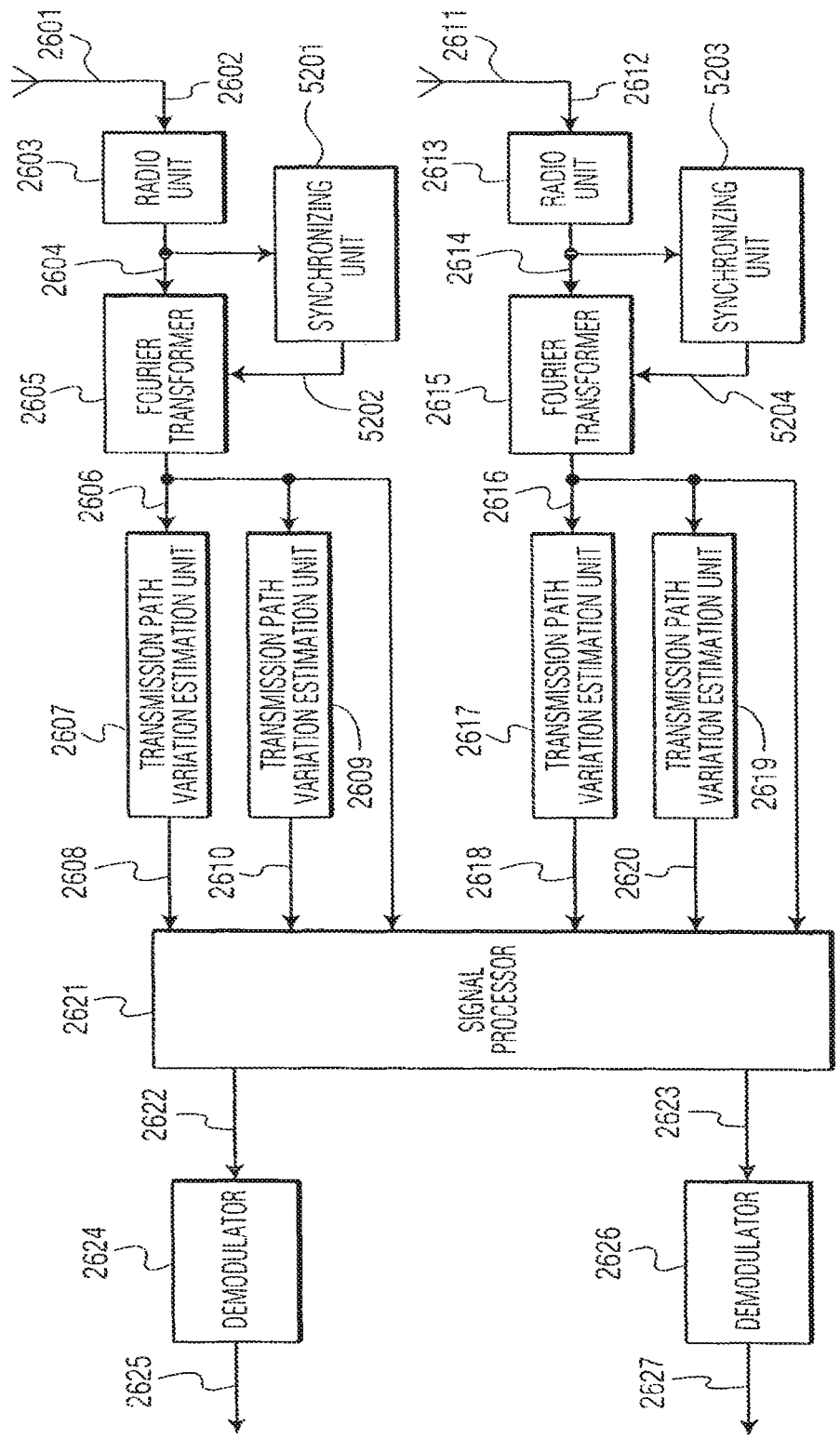
FIG. 52 shows a structure of a reception apparatus in accordance with the tenth exemplary embodiment of the present invention.

FIG. 52 shows a structure of the reception apparatus in accordance with this embodiment, and the elements operating in a similar way to those in FIG. 26 have the same reference marks.

Synchronizing unit 5201 receives reception quadrature baseband signal 2604, then synchronizes with the transmission apparatus time-wise, and outputs timing signal 5204.

Synchronizing unit 5203 receives reception quadrature baseband signal 2614, then synchronizes with the transmission apparatus time-wise, and outputs timing signal 5204.

Figure 53:
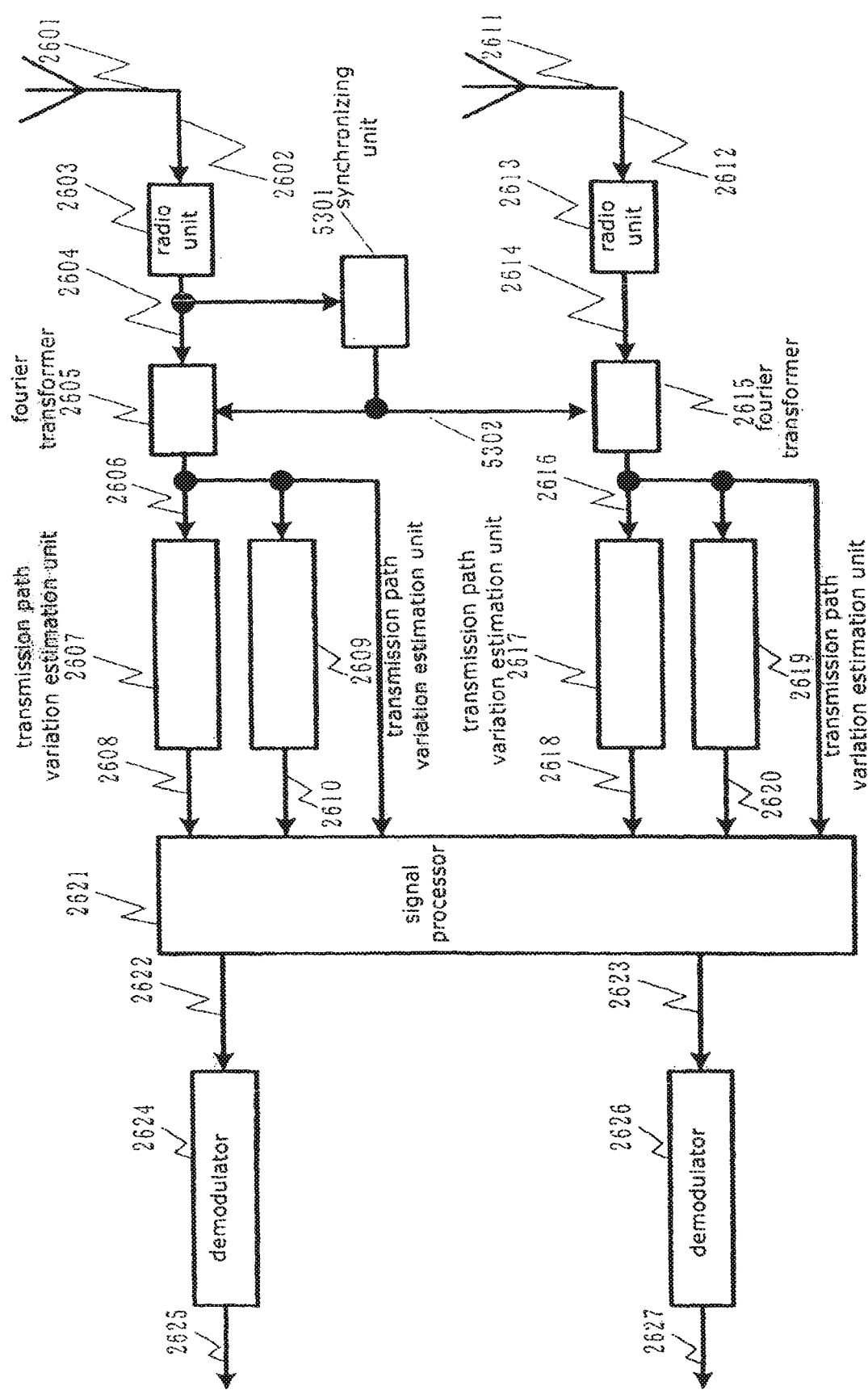
FIG. 53 shows a structure of a reception apparatus in accordance with the tenth exemplary embodiment of the present invention.

FIG. 53 shows a structure of the reception apparatus in accordance with this embodiment, and the elements operating in a similar way to those in FIG. 26 have the same reference marks.

Synchronizing unit 5301 receives reception quadrature baseband signal 2604, then synchronizes with the transmission apparatus time-wise, and outputs timing signal 5302.

Figure 54:
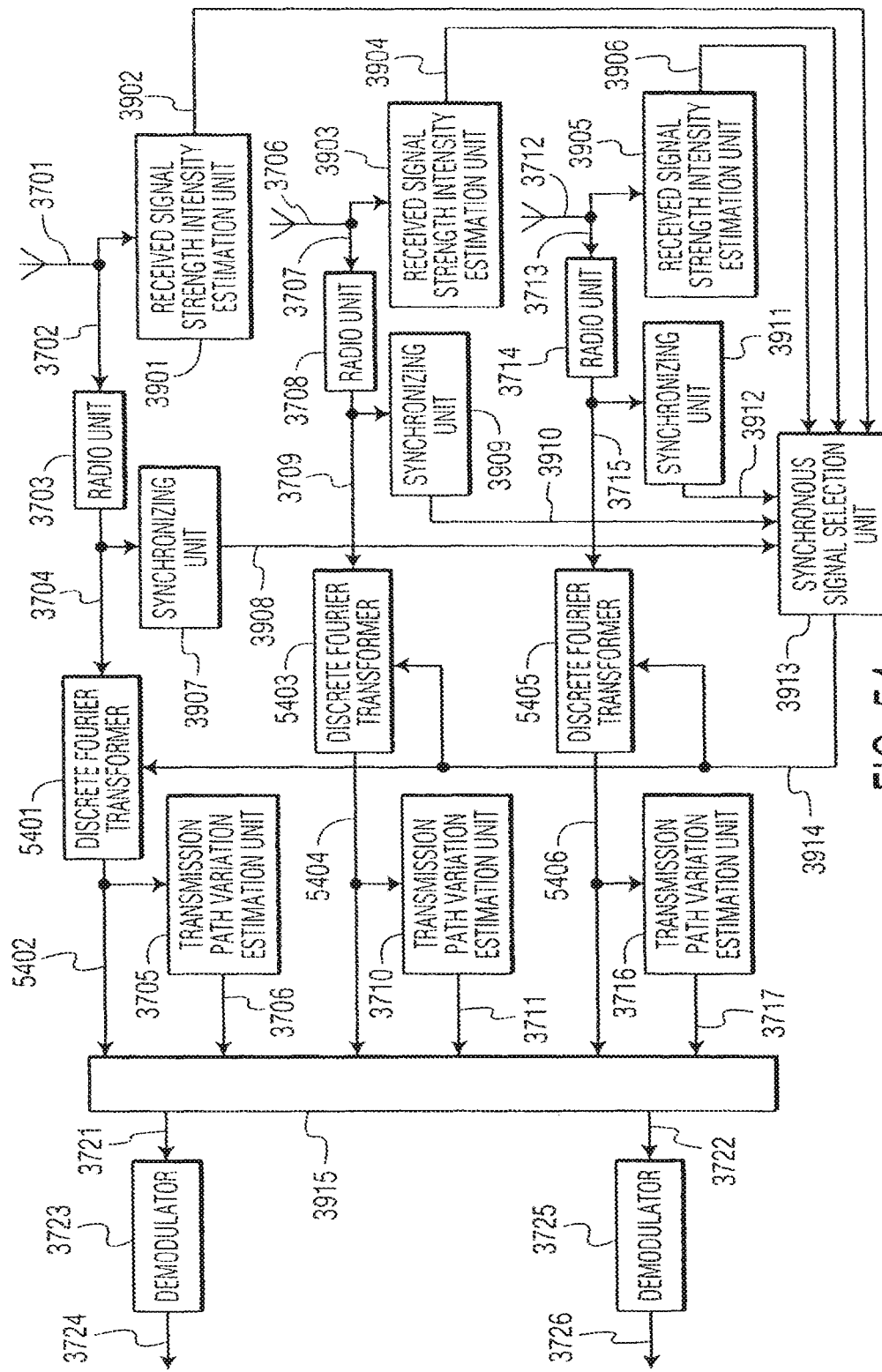
FIG. 54 shows a structure of a reception apparatus in accordance with the tenth exemplary embodiment of the present invention.

FIG. 54 shows a structure of the reception apparatus in accordance with this embodiment, and the elements operating in a similar way to those in FIG. 37, or FIG. 39 have the same reference marks.

Discrete Fourier transformer 5401 receives reception quadrature baseband signal 3704, timing signal 3914 selected, then outputs signal 5402 undergone the discrete Fourier transformation.

In a similar way, discrete Fourier transformer 5403 receives reception quadrature baseband signal 3709, timing signal 3914 selected, then outputs signal 5404 undergone the discrete Fourier transformation.

Discrete Fourier transformer 5405 receives reception quadrature baseband signal 3715, timing signal 3914 selected, then outputs signal 5406 undergone the discrete Fourier transformation.

Figure 55:
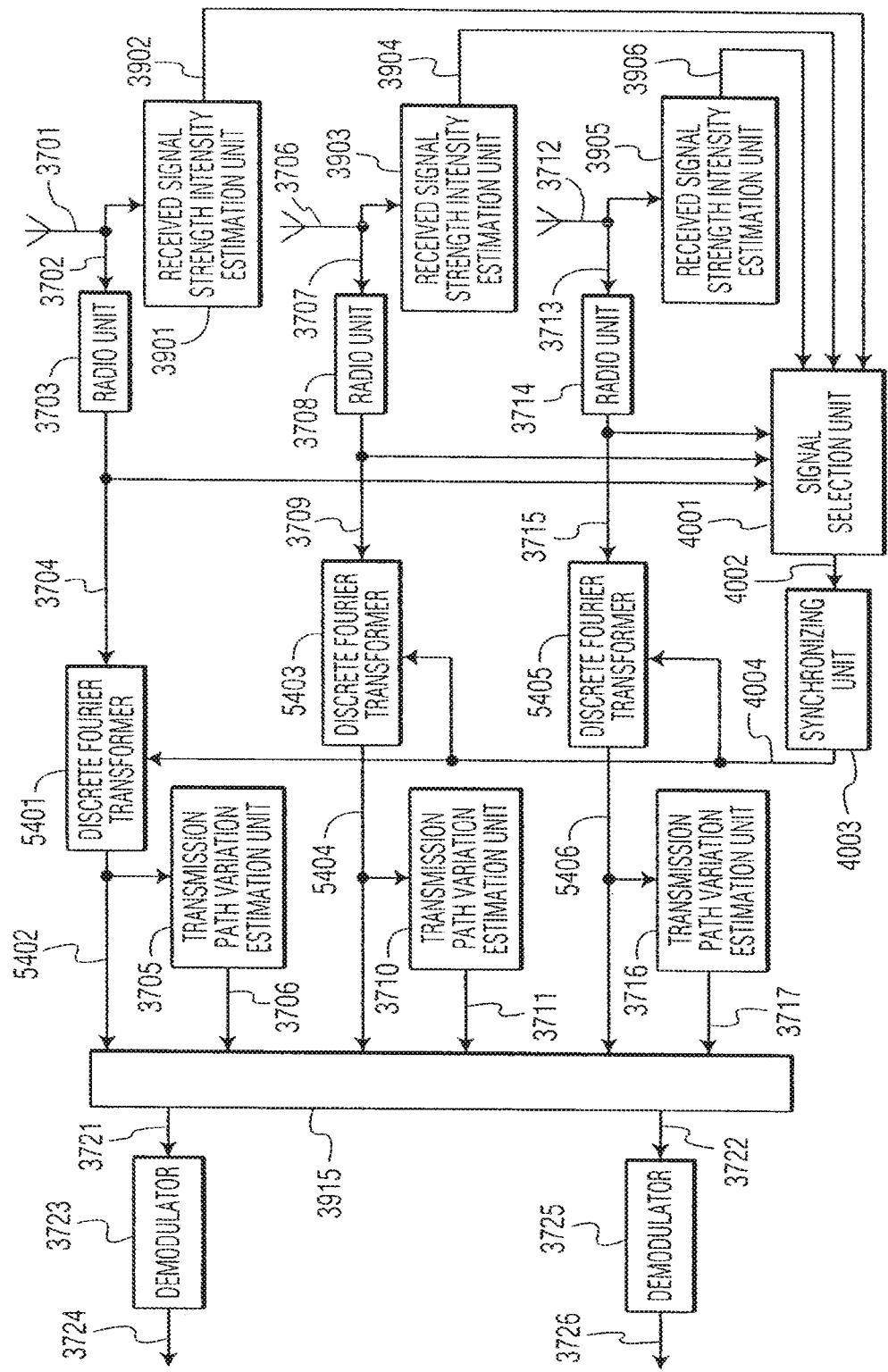
FIG. 55 shows a structure of a reception apparatus in accordance with the tenth exemplary embodiment of the present invention.

FIG. 55 shows a structure of the reception apparatus in accordance with this embodiment, and the elements operating in a similar way to those in FIG. 37, FIG. 39, FIG. 40 or FIG. 50 have the same reference marks.

Figure 56:
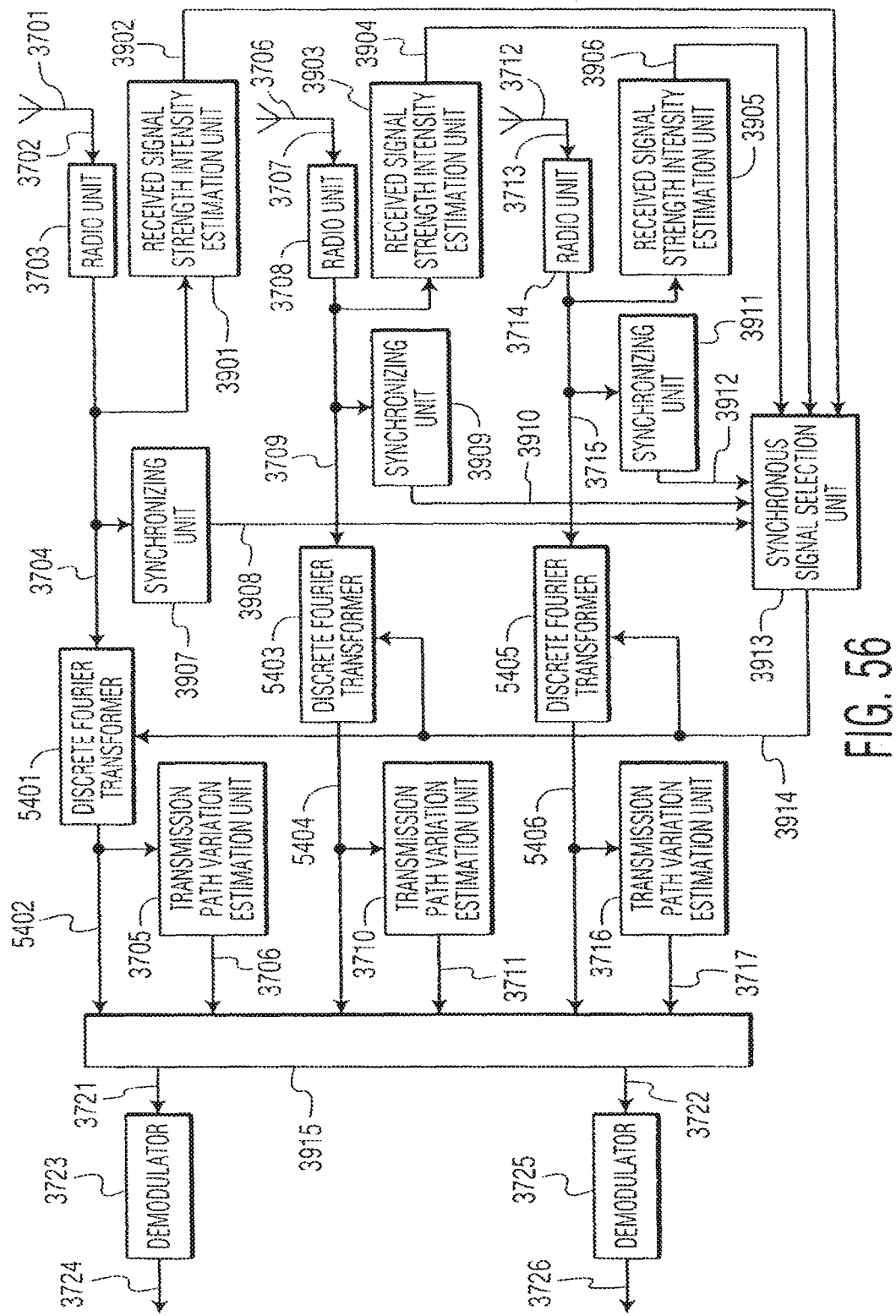
FIG. 56 shows a structure of a reception apparatus in accordance with the tenth exemplary embodiment of the present invention.

FIG. 56 shows a structure of the reception apparatus in accordance with this embodiment, and the elements operating in a similar way to those in FIG. 37, FIG. 39, or FIG. 54 have the same reference marks.

Figure 57:
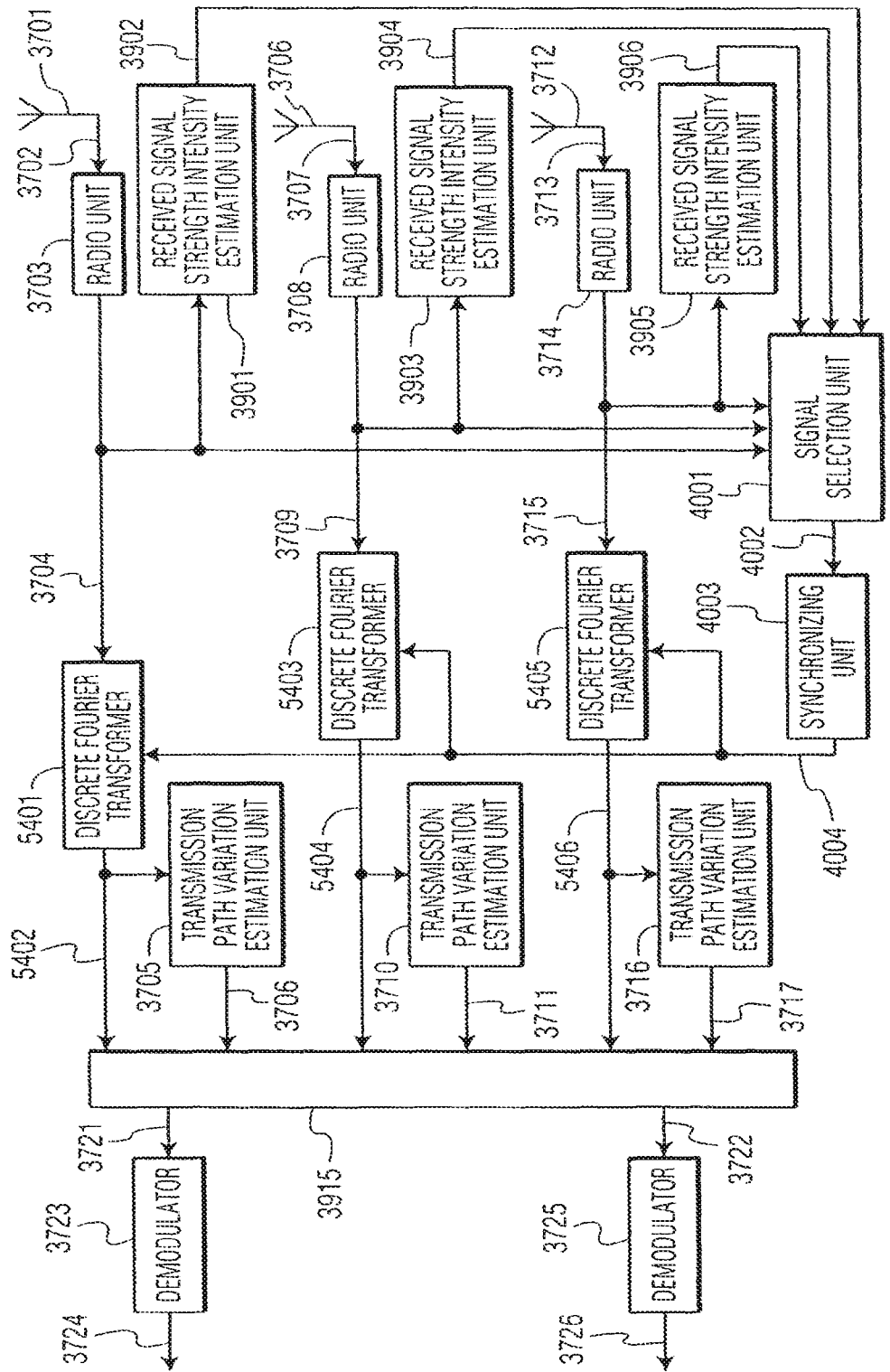
FIG. 57 shows a structure of a reception apparatus in accordance with the tenth exemplary embodiment of the present invention.

FIG. 57 shows a structure of the reception apparatus in accordance with this embodiment, and the elements operating in a similar way to those in FIG. 37, FIG. 39, FIG. 40 or FIG. 54 have the same reference marks.

An operation of the transmission apparatus is demonstrated hereinafter with reference to FIGS. 4, 25, 50 and 51. First, the transmission apparatus that transmits modulation signals having the frame structure shown in FIG. 25 is described.

Frame structure signal generator 2521 shown in FIG. 25 outputs the information about the frame structure shown in FIG. 50 as frame structure signal 2522.

In FIG. 50, a synchronous symbol is transmitted through channel A at time 0, no signal is transmitted through channel B, in other words, the signal is indicated by signal point 403 shown in FIG. 4. In a similar manner, when a synchronous symbol is transmitted through channel B at time 1, no signal is transmitted through channel A, in other words, the signal is indicated by signal point 403 shown in FIG. 4.

An operation of the transmission apparatus, which transmits a modulation signal having the frame structure shown in FIG. 51, is demonstrated hereinafter. Frame structure signal generator 2521 shown in FIG. 25 outputs the information about the frame structure shown in FIG. 51 as frame structure signal 2522. In FIG. 55, a synchronous symbol is transmitted through channel A at time 0, no signal is transmitted through channel B, in other words, the signal is indicated by signal point 403 shown in FIG. 4.

Next, an operation of the reception apparatus in accordance with this embodiment is demonstrated with reference to FIG. 50 through FIG. 57.

In FIG. 52, synchronizing unit 5201 receives reception quadrature baseband signal 2604, then detects the synchronous symbol transmitted as shown in FIG. 50 or FIG. 51 for synchronizing with the transmission apparatus time-wise, and outputs timing signal 5202.

Discrete Fourier transformer 2605 receives reception quadrature baseband signal 2604, timing signal 5202, then provides base-band signal 2604 with discrete Fourier transformation based on timing signal 5202, and outputs signal 2606 undergone the discrete Fourier transformation.

Synchronizing unit 5203 receives reception quadrature baseband signal 2614, then detects the synchronous symbol transmitted as shown in FIG. 50 or FIG. 51 for synchronizing with the transmission apparatus time-wise, and outputs timing signal 5204.

Discrete Fourier transformer 2615 receives reception quadrature baseband signal 2614, timing signal 5204, then provides base-band signal 2614 with discrete Fourier transformation based on timing signal 5204, and outputs signal 2616 undergone the discrete Fourier transformation.

In FIG. 53, synchronizing unit 5301 receives reception quadrature baseband signal 2604, then detects the synchronous symbol transmitted as shown in FIG. 50 or FIG. 51 for synchronizing with the transmission apparatus time-wise, and outputs timing signal 5302.

Discrete Fourier transformer 2605 receives reception quadrature baseband signal 2604, timing signal 5302, then provides base-band signal 2604 with discrete Fourier transformation based on timing signal 5302, and outputs signal 2606 undergone the discrete Fourier transformation.

Discrete Fourier transformer 2615 receives reception quadrature baseband signal 2614, timing signal 5302, then provides base-band signal 2614 with discrete Fourier transformation based on timing signal 5302, and outputs signal 2616 undergone the discrete Fourier transformation.

In FIG. 54, discrete Fourier transformer 5401 receives reception quadrature baseband signal 3704, timing signal 3914 received by the antenna having the best electric field, then provides base-band signal 3704 with discrete Fourier transformation based on timing signal 3914, and outputs signal 5402 undergone the discrete Fourier transformation.

In a similar way to what is discussed above, discrete Fourier transformer 5403 receives reception quadrature baseband signal 3709, timing signal 3914 received by the antenna having the best electric field, then provides base-band signal 3709 with discrete Fourier transformation based on timing signal 3914, and outputs signal 5404 undergone the discrete Fourier transformation.

Discrete Fourier transformer 5405 receives reception quadrature baseband signal 3715, timing signal 3914 received by the antenna having the best electric field, then provides base-band signal 3715 with discrete Fourier transformation based on timing signal 3914, and outputs signal 5406 undergone the discrete Fourier transformation.

In FIG. 55, discrete Fourier transformer 5401 receives reception quadrature baseband signal 3704, timing signal 4004 received by the antenna having the best electric field, then provides base-band signal 3704 with discrete Fourier transformation based on timing signal 4004, and outputs signal 5402 undergone the discrete Fourier transformation.

In a similar way to what is discussed above, discrete Fourier transformer 5403 receives reception quadrature baseband signal 3709, timing signal 4004 received by the antenna having the best electric field, then provides base-band signal 3709 with discrete Fourier transformation based on timing signal 4004, and outputs signal 5404 undergone the discrete Fourier transformation.

Discrete Fourier transformer 5405 receives reception quadrature baseband signal 3715, timing signal 4004 received by the antenna having the best electric field, then provides base-band signal 3715 with discrete Fourier transformation based on timing signal 4004, and outputs signal 5406 undergone the discrete Fourier transformation.

In a similar way to what is discussed above, discrete Fourier transformer 5403 receives reception quadrature baseband signal 3709, timing signal 3914 received by the antenna having the best electric field, then provides base-band signal 3709 with discrete Fourier transformation based on timing signal 3914, and outputs signal 5404 undergone the discrete Fourier transformation.

Discrete Fourier transformer 5405 receives reception quadrature baseband signal 3715, timing signal 3914 received by the antenna having the best electric field, then provides base-band signal 3715 with discrete Fourier transformation based on timing signal 3914, and outputs signal 5406 undergone the discrete Fourier transformation.

In FIG. 57, discrete Fourier transformer 5401 receives reception quadrature baseband signal 3704, timing signal 4004 received by the antenna having the best electric field, then provides base-band signal 3704 with discrete Fourier transformation based on timing signal 4004, and outputs signal 5402 undergone the discrete Fourier transformation.

In a similar way to what is discussed above, discrete Fourier transformer 5403 receives reception quadrature baseband signal 3709, timing signal 4004 received by the antenna having the best electric field, then provides base-band signal 3709 with discrete Fourier transformation based on timing signal 4004, and outputs signal 5404 undergone the discrete Fourier transformation.

Discrete Fourier transformer 5405 receives reception quadrature baseband signal 3715, timing signal 4004 received by the antenna having the best electric field, then provides base-band signal 3715 with discrete Fourier transformation based on timing signal 4004, and outputs signal 5406 undergone the discrete Fourier transformation.

In the foregoing discussion, the received signal strength intensity is used as an example of a parameter of the radio-wave propagation environment; however, this embodiment is not limited to this example, and Doppler frequency or the number of paths of multi-path can be used as the parameter.

The foregoing discussion proves that the transmission apparatus can be synchronized with the reception apparatus time-wise.

In this embodiment, two transmission antennas are used for the description purpose; however, this embodiment is not limited to the two antennas, and two channels are multiplexed for the description purpose; however, this embodiment is not limited to the two channels. Frame structures are not limited to those shown in FIG. 50 and FIG. 51.

The synchronous symbols shown in FIGS. 50, 51 are used for time-synchronizing the reception apparatus with the transmission apparatus; however, the symbols are not limited to this usage, and they can be used for, e.g. estimating a frequency offset between the reception apparatus and the transmission apparatus.

The structure of the transmission apparatus of this embodiment is not limited to the one shown in FIG. 25, and the structure of the reception apparatus of this embodiment is not limited to the ones shown in FIG. 52 through FIG. 57.

The expression of "antenna" in the previous description does not always mean a single antenna, but "antenna" can mean an antenna unit which is formed of a plurality of antennas.

The tenth exemplary embodiment, as discussed above, describes the transmission method of transmitting modulation signals of a plurality of channels to the same frequency band from a plurality of antennas, more particularly, the method of transmitting a synchronous symbol in accordance with OFDM method. The tenth embodiment also describes the transmission apparatus and the reception apparatus to be used in the foregoing method. The structure and the operation discussed above allows increasing the data transmission rate, and synchronizing the transmission apparatus with the reception apparatus time-wise.

Exemplary Embodiment 11

The 11th exemplary embodiment describes a transmission method of transmitting modulation signals of a plurality of channels to the same frequency band from a plurality of antennas, more particularly, a reception apparatus which is applicable to a method of transmitting a signal including a control symbol.

Figure 58:
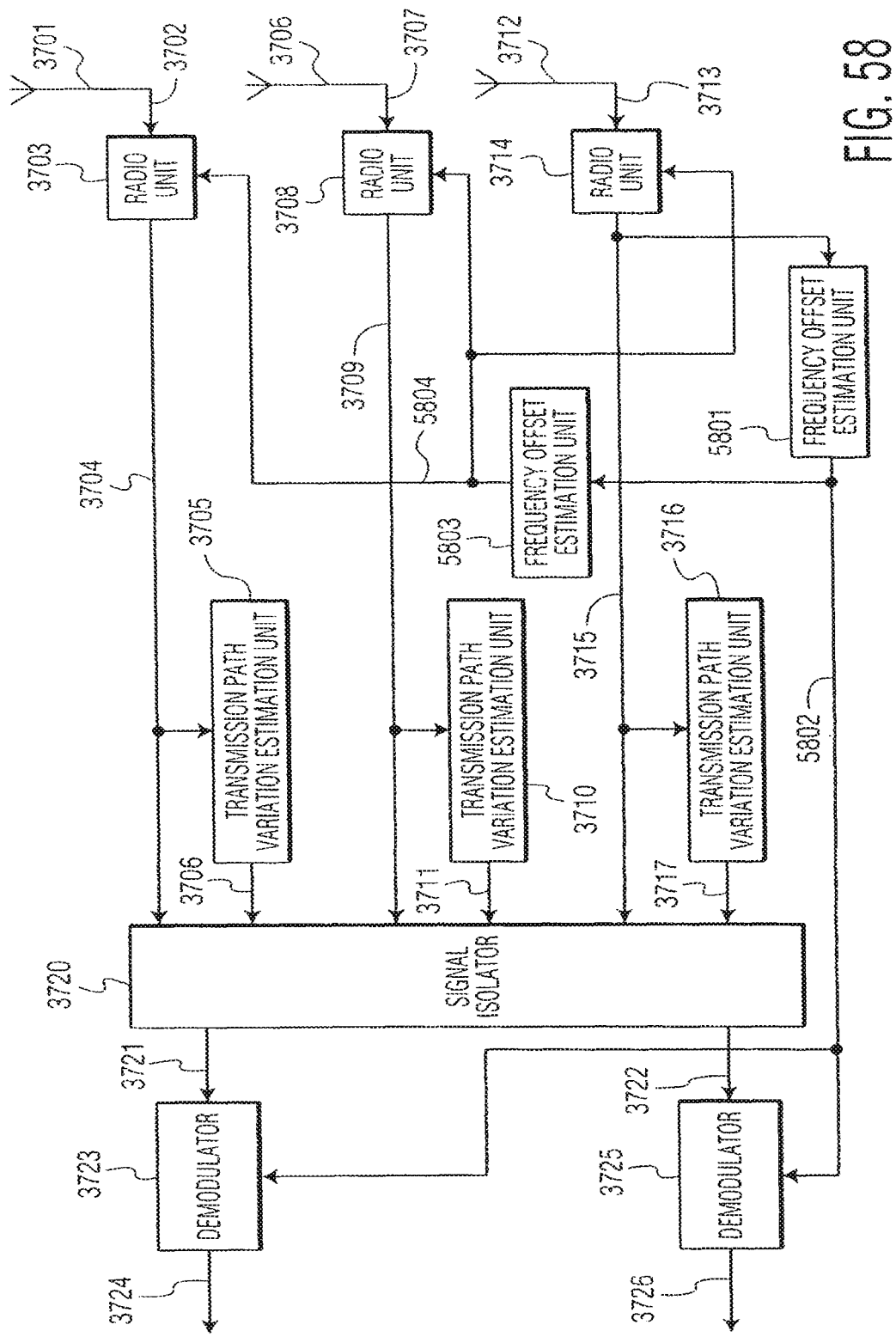
FIG. 58 shows a structure of a reception apparatus in accordance with an eleventh exemplary embodiment of the present invention.

FIGS. 33, 34, FIGS. 43-45, and FIGS. 50, 51 show a frame structure in accordance with this embodiment. FIG. 58 shows a structure of the reception apparatus in accordance with the 11th embodiment, and the elements operating in a similar way to those in FIG. 37 have the same reference marks.

Frequency offset estimation unit 5801 receives reception quadrature baseband signal 3715, then estimates a frequency offset with respect to a transmission apparatus, and outputs frequency offset estimation signal 5802.

Frequency offset estimation unit 5803 receives reception quadrature baseband signal 5802, then provides signal 5802 with frequency control, and outputs, e.g. signal 5802 which becomes a source signal of a radio unit.

Figure 59:
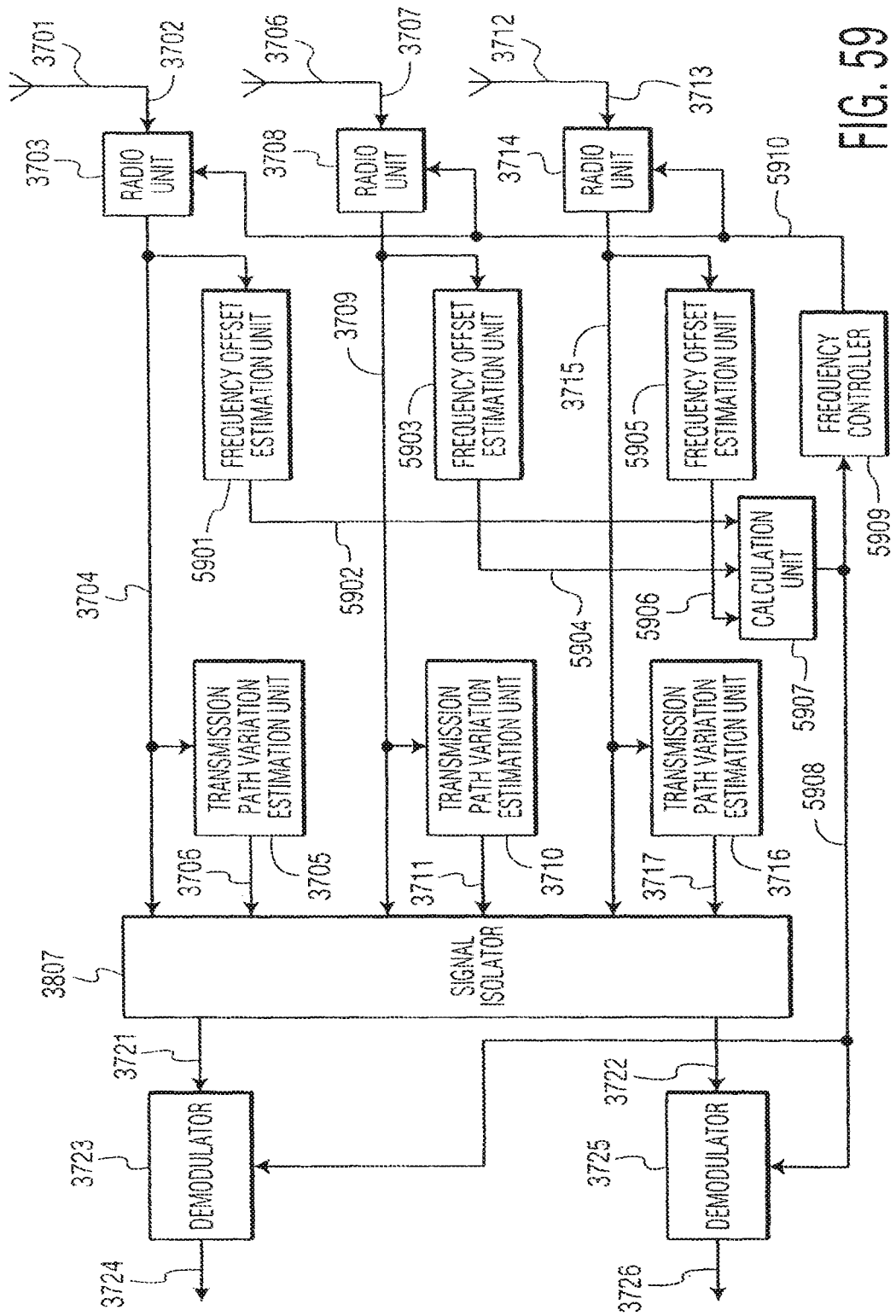
FIG. 59 shows a structure of a reception apparatus in accordance with the eleventh exemplary embodiment of the present invention.

FIG. 59 shows a structure of the reception apparatus in accordance with this embodiment, and the elements operating in a similar way to those in FIG. 37 have the same reference marks.

Frequency offset estimation unit 5901 receives reception quadrature baseband signal 3704, then estimates a frequency offset, and outputs frequency offset estimation signal 5902.

Frequency offset estimation unit 5903 receives reception quadrature baseband signal 3709, then estimates a frequency offset, and outputs frequency offset estimation signal 5904.

Frequency offset estimation unit 5905 receives reception quadrature baseband signal 3715, then estimates a frequency offset, and outputs frequency offset estimation signal 5906.

Calculation unit 5907 receives frequency offset signals 5902, 5904, 5906, then, e.g. averages those signals, and outputs frequency offset estimation signal 5908 averaged.

Frequency controller 5909 receives averaged signal 5908, then outputs, e.g. signal 5910 to be a source signal of the radio unit.

Figure 60:
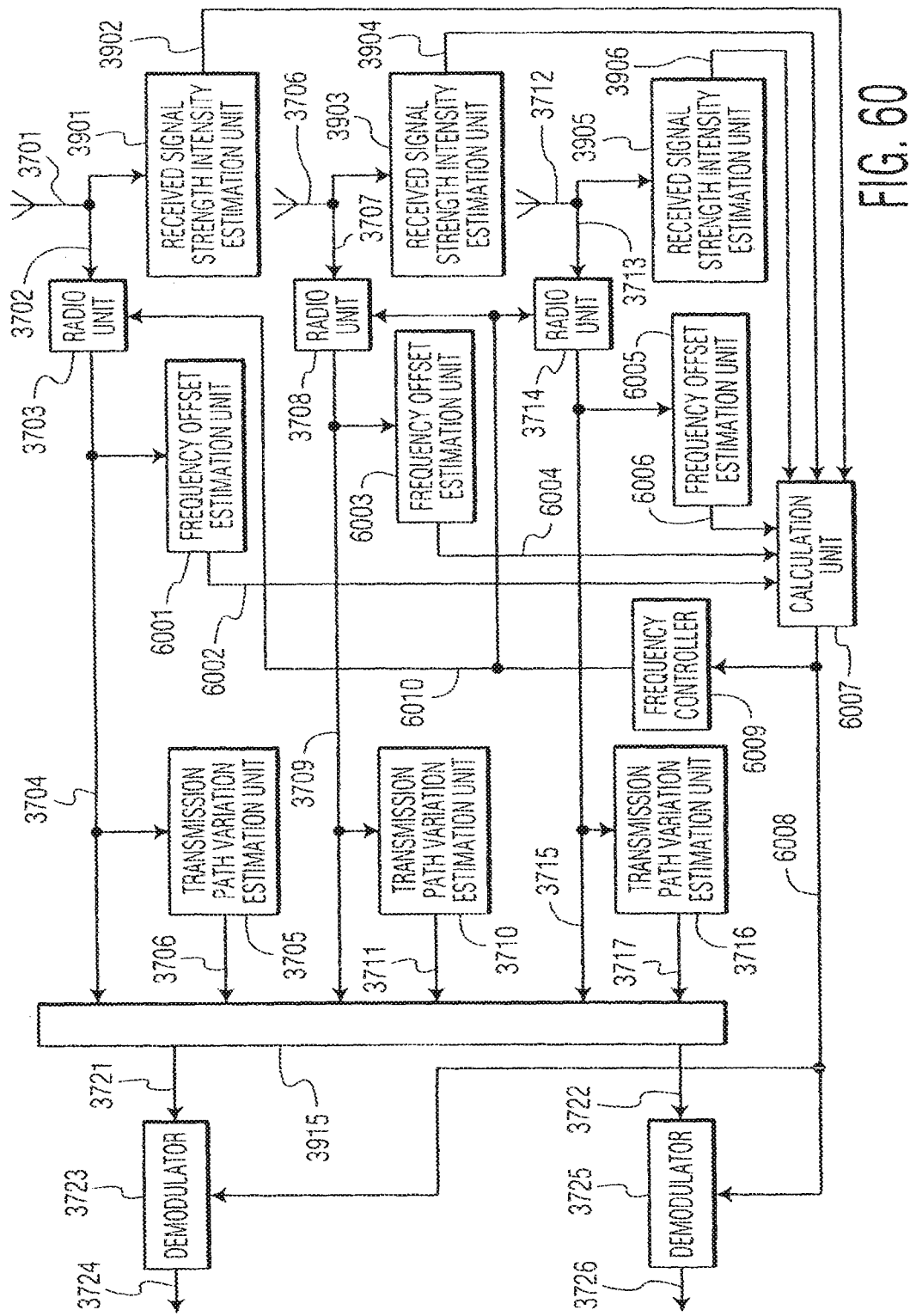
FIG. 60 shows a structure of a reception apparatus in accordance with the eleventh exemplary embodiment of the present invention.

FIG. 60 shows a structure of the reception apparatus in accordance with this embodiment, and the elements operating in a similar way to those in FIG. 37 or FIG. 39 have the same reference marks.

Frequency offset estimation unit 6001 receives reception quadrature baseband signal 3704, then estimates a frequency offset, and outputs frequency offset estimation signal 6002.

Frequency offset estimation unit 6003 receives reception quadrature baseband signal 3709, then estimates a frequency offset, and outputs frequency offset estimation signal 6004.

Frequency offset estimation unit 6005 receives reception quadrature baseband signal 3715, then estimates a frequency offset, and outputs frequency offset estimation signal 6006.

Calculation unit 6007 receives frequency offset signals 6002, 6004, 6006, and received signal strength intensity estimation signals 3902, 3904, 3906, then weights those signals with the received signal strength intensity, and averages the frequency offset signals, then outputs frequency offset estimation signal 6008 averaged.

Frequency controller 6009 receives averaged signal 6008, then outputs, e.g. signal 6010 to be a source signal of the radio unit.

Figure 61:
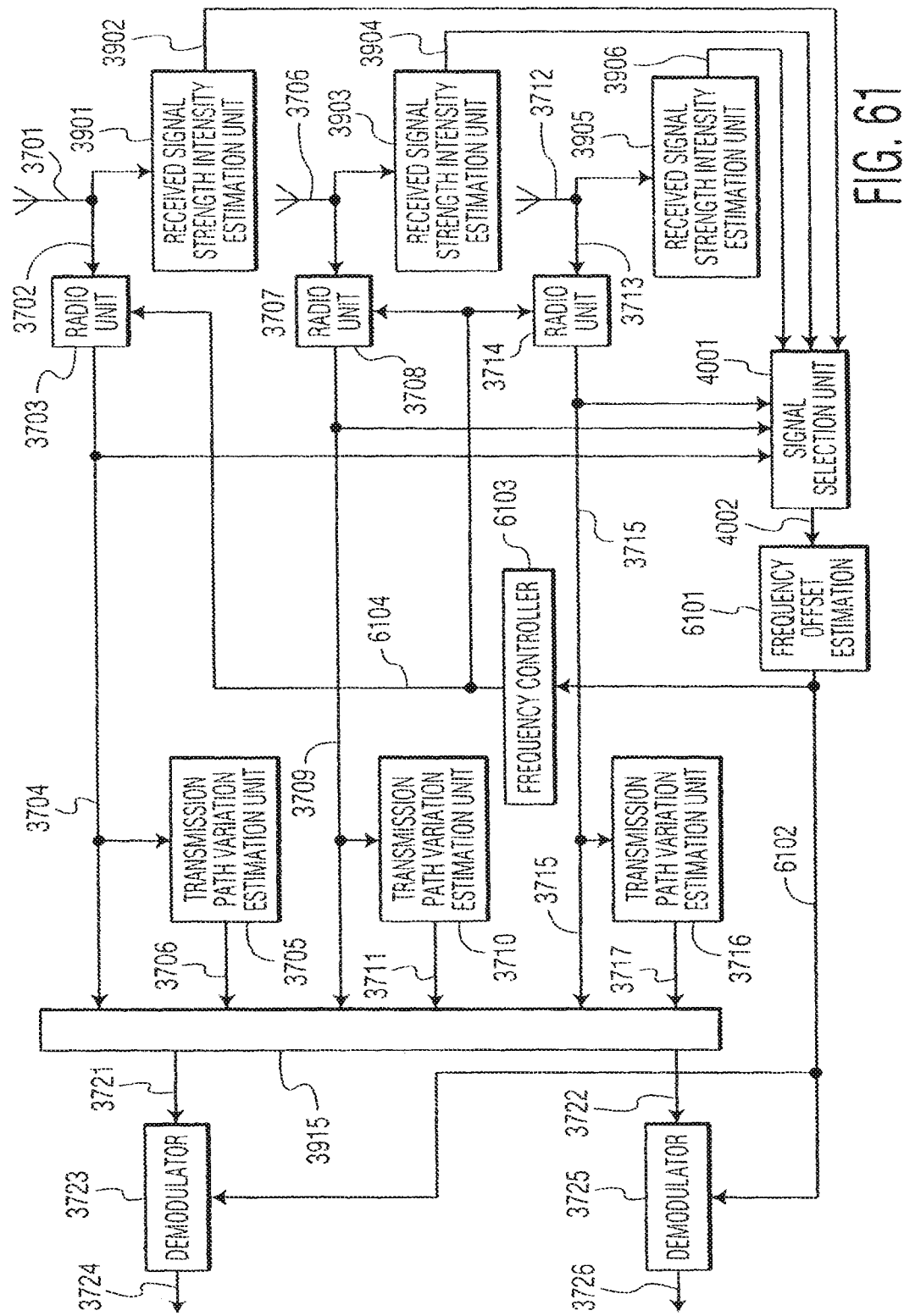
FIG. 61 shows a structure of a reception apparatus in accordance with the eleventh exemplary embodiment of the present invention.

FIG. 61 shows a structure of the reception apparatus in accordance with this embodiment, and the elements operating in a similar way to those in FIG. 37 or FIG. 39 have the same reference marks.

Frequency offset estimation unit 6101 receives a reception quadrature baseband signal selected, then estimates a frequency offset, and outputs frequency offset estimation signal 6012.

Frequency controller 6103 receives frequency offset estimation signal 6102, then outputs, e.g. signal 6104 to be a source signal of the radio unit.

Figure 62:
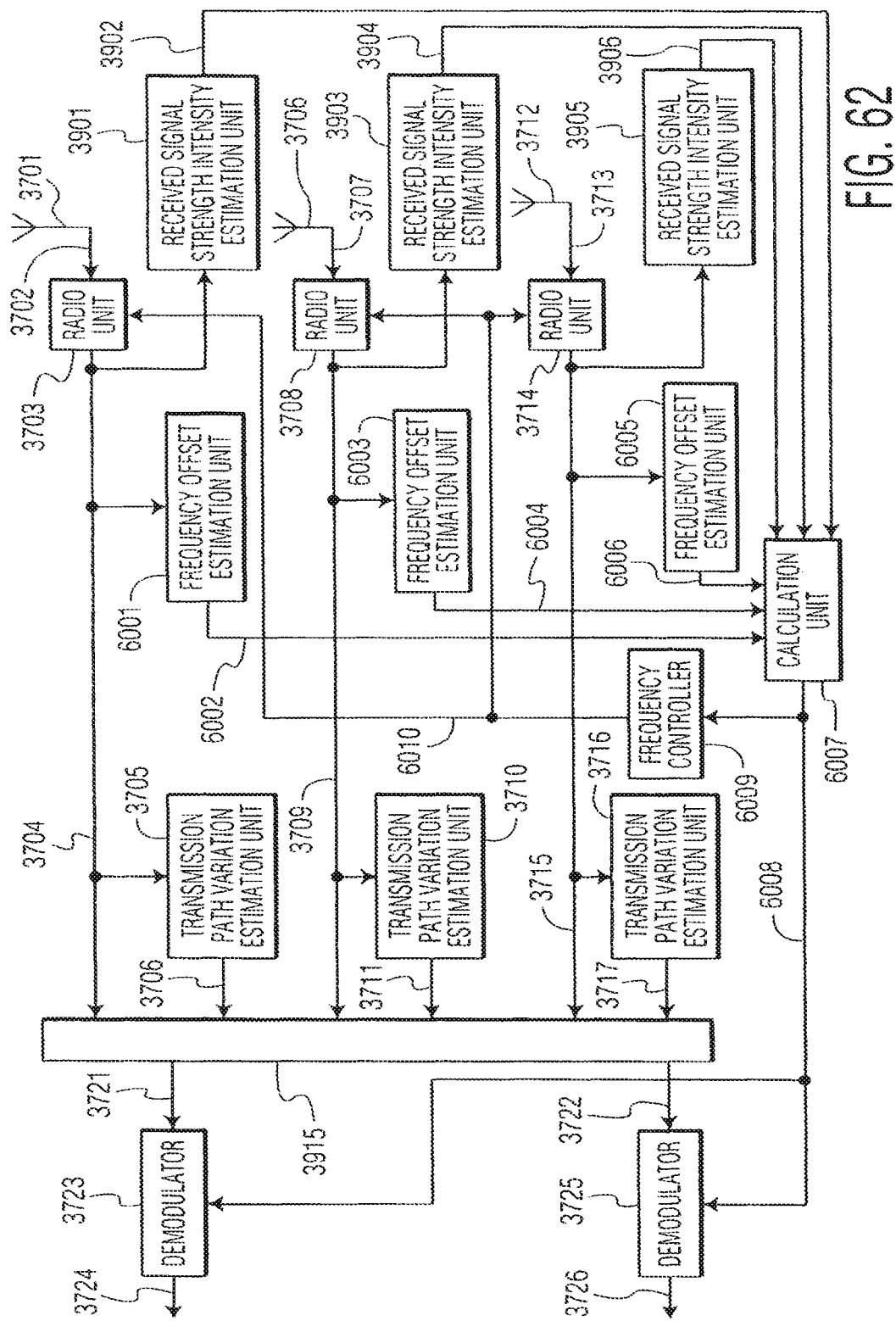
FIG. 62 shows a structure of a reception apparatus in accordance with the eleventh exemplary embodiment of the present invention.

FIG. 62 shows a structure of the reception apparatus in accordance with this embodiment, and the elements operating in a similar way to those in FIG. 37, FIG. 39 or FIG. 60 have the same reference marks.

Figure 63:
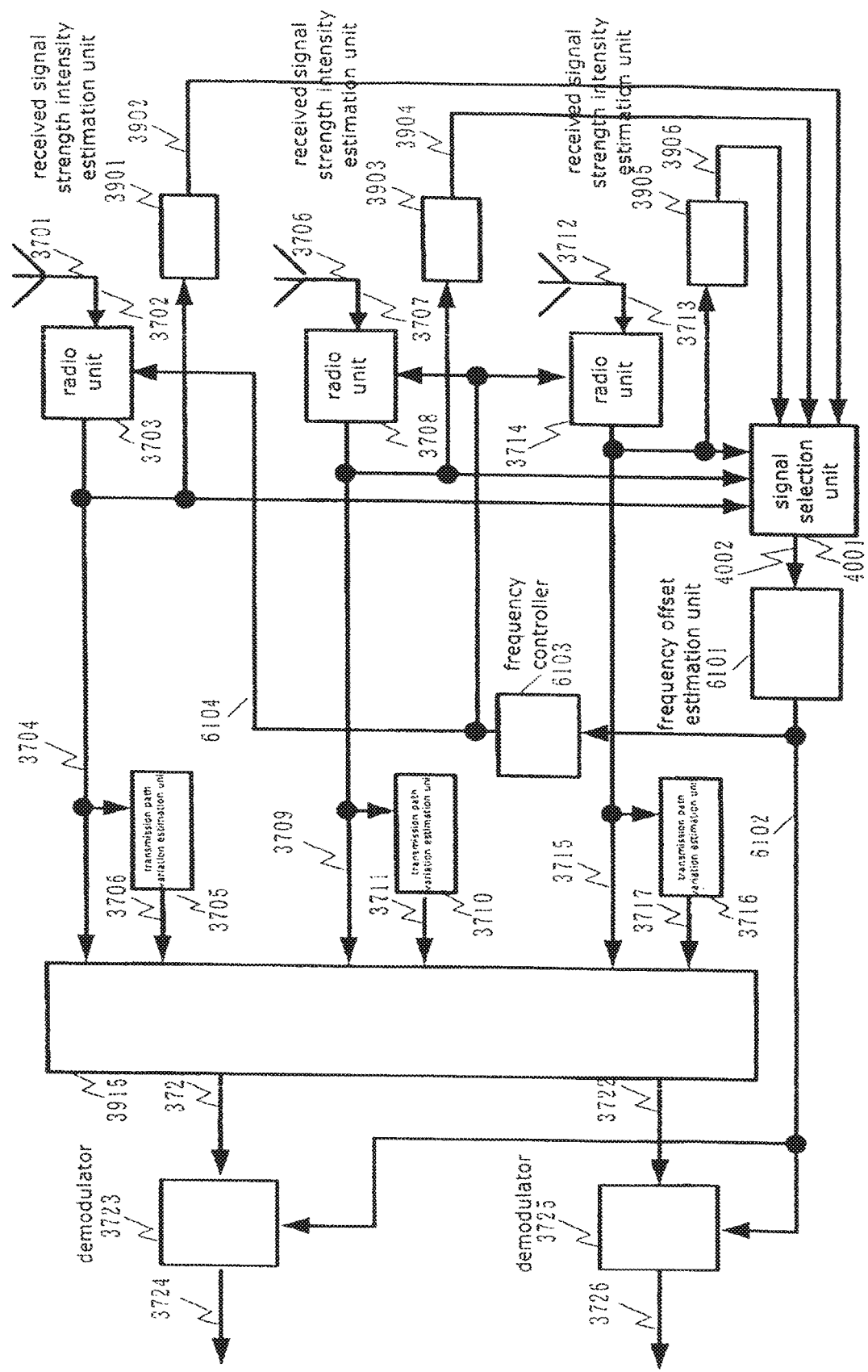
FIG. 63 shows a structure of a reception apparatus in accordance with the eleventh exemplary embodiment of the present invention.

FIG. 63 shows a structure of the reception apparatus in accordance with this embodiment, and the elements operating in a similar way to those in FIG. 37, FIG. 39, FIG. 40, or FIG. 61 have the same reference marks.

Figure 64:
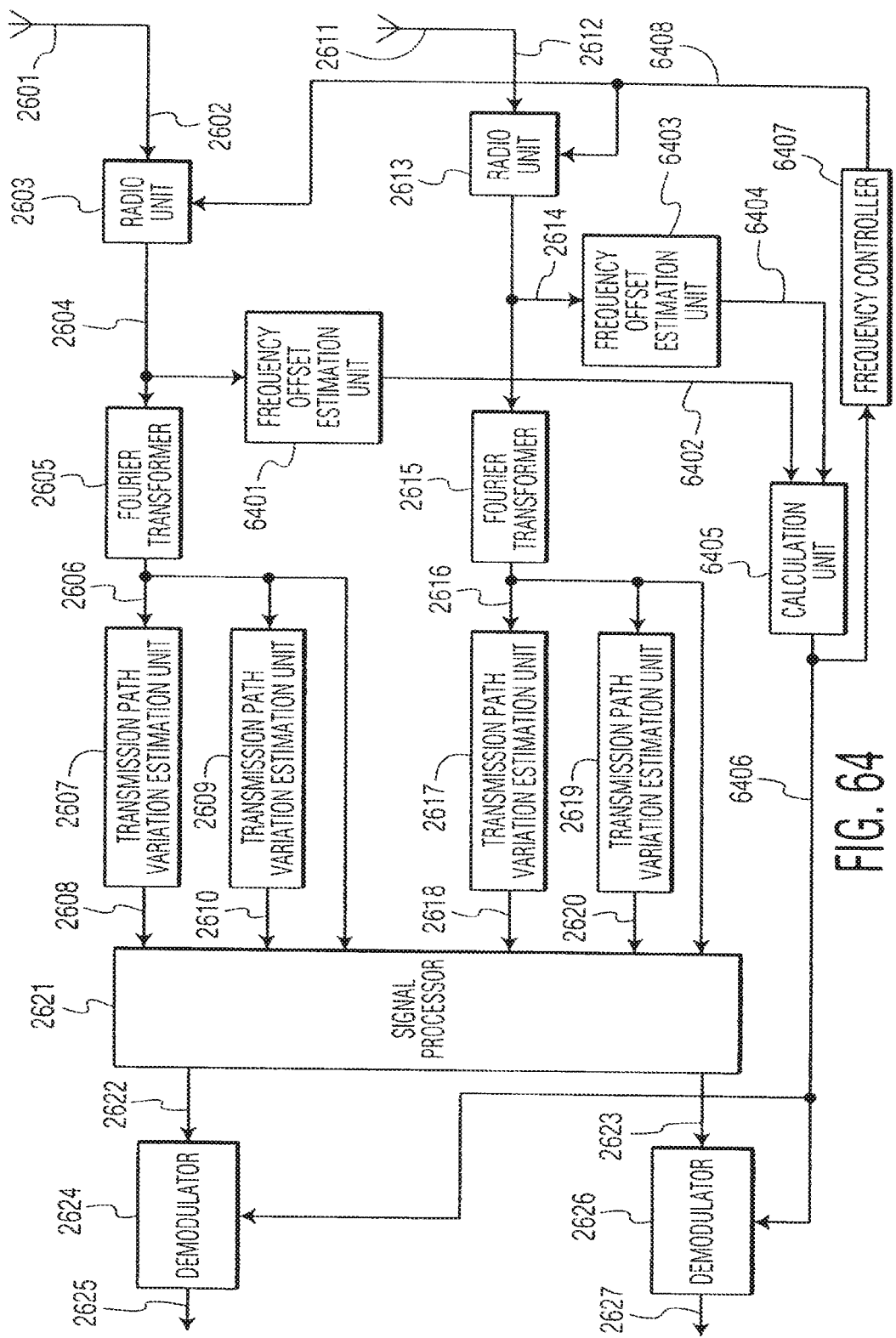
FIG. 64 shows a structure of a reception apparatus in accordance with the eleventh exemplary embodiment of the present invention.

FIG. 64 shows a structure of the reception apparatus in accordance with this embodiment, and the elements operating in a similar way to those in FIG. 26 have the same reference marks.

Frequency offset estimation unit 6401 receives reception quadrature baseband signal 2604, then estimates a frequency offset, and outputs frequency offset estimation signal 6402.

Frequency offset estimation unit 6403 receives reception quadrature baseband signal 2614, then estimates a frequency offset, and outputs frequency offset estimation signal 6404.

Calculation unit 6405 receives frequency offset signals 6402, 6404, then e.g. averages those signals, and outputs frequency offset estimation signal 6406 averaged.

Frequency controller 6407 receives averaged signal 6406, then outputs, e.g. signal 6408 to be a source signal of the radio unit.

Figure 65:
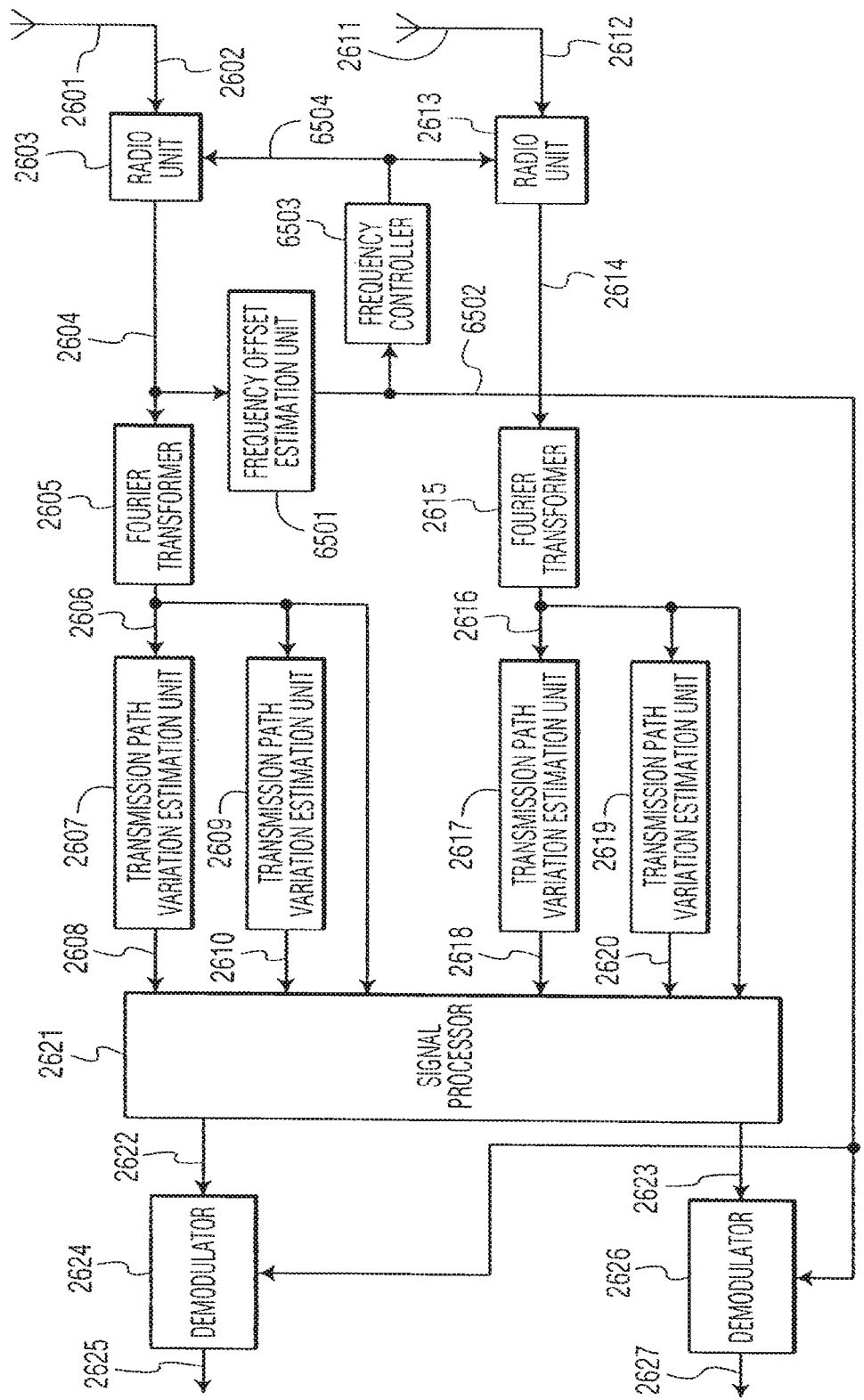
FIG. 65 shows a structure of a reception apparatus in accordance with the eleventh exemplary embodiment of the present invention.

FIG. 65 shows a structure of the reception apparatus in accordance with this embodiment, and the elements operating in a similar way to those in FIG. 26 have the same reference marks.

Frequency offset estimation unit 6501 receives reception quadrature baseband signal 2604, then estimates a frequency offset, and outputs frequency offset estimation signal 6502.

Frequency controller 6503 receives frequency offset estimation signal 6502, then outputs, e.g. signal 6504 to be a source signal of the radio unit.

Figure 66:
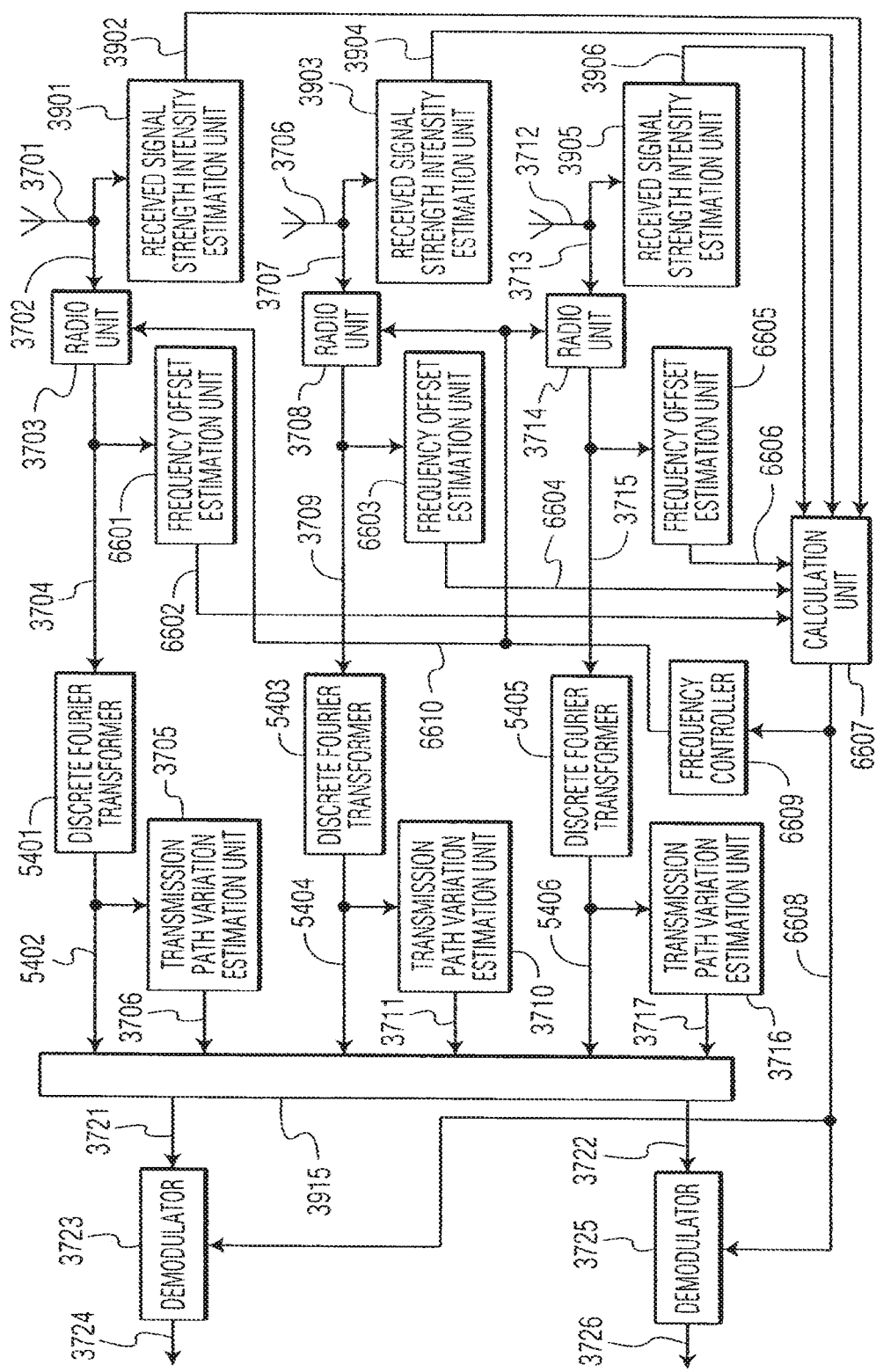
FIG. 66 shows a structure of a reception apparatus in accordance with the eleventh exemplary embodiment of the present invention.

FIG. 66 shows a structure of the reception apparatus in accordance with this embodiment, and the elements operating in a similar way to those in FIG. 37, FIG. 39, or FIG. 54 have the same reference marks.

Frequency offset estimation unit 6601 receives reception quadrature baseband signal 3704, then estimates a frequency offset, and outputs frequency offset estimation signal 6602.

Frequency offset estimation unit 6603 receives reception quadrature baseband signal 3709, then estimates a frequency offset, and outputs frequency offset estimation signal 6604.

Frequency offset estimation unit 6605 receives reception quadrature baseband signal 3715, then estimates a frequency offset, and outputs frequency offset estimation signal 6606.

Calculation unit 6607 receives frequency offset signals 6602, 6604, 6606, and received signal strength intensity estimation signals 3902, 3904, 3906, then weights those signals with the received signal strength intensity, and averages the frequency offset signals, then outputs frequency offset estimation signal 6608 averaged.

Frequency controller 6609 receives averaged signal 6608, then outputs, e.g. signal 6610 to be a source signal of the radio unit.

Figure 67:
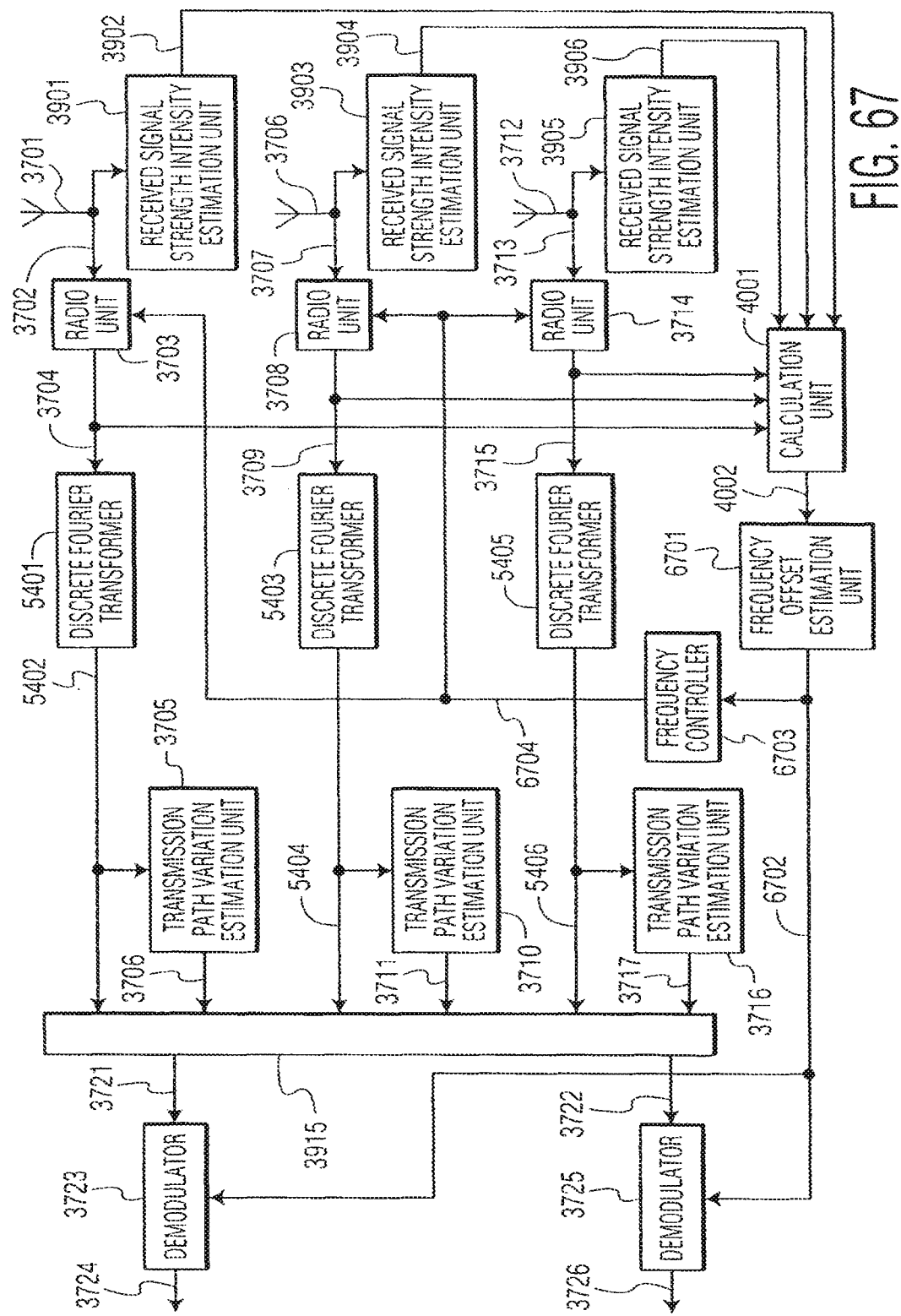
FIG. 67 shows a structure of a reception apparatus in accordance with the eleventh exemplary embodiment of the present invention.

FIG. 67 shows a structure of the reception apparatus in accordance with this embodiment, and the elements operating in a similar way to those in FIG. 37, FIG. 39, FIG. 40 or FIG. 54 have the same reference marks.

Frequency offset estimation unit 6701 receives reception quadrature baseband signal 4002 selected, then estimates a frequency offset, and outputs frequency offset estimation signal 6702.

Frequency controller 6703 receives frequency offset estimation signal 6702, then outputs, e.g. signal 6704 to be a source signal of the radio unit.

Figure 68:
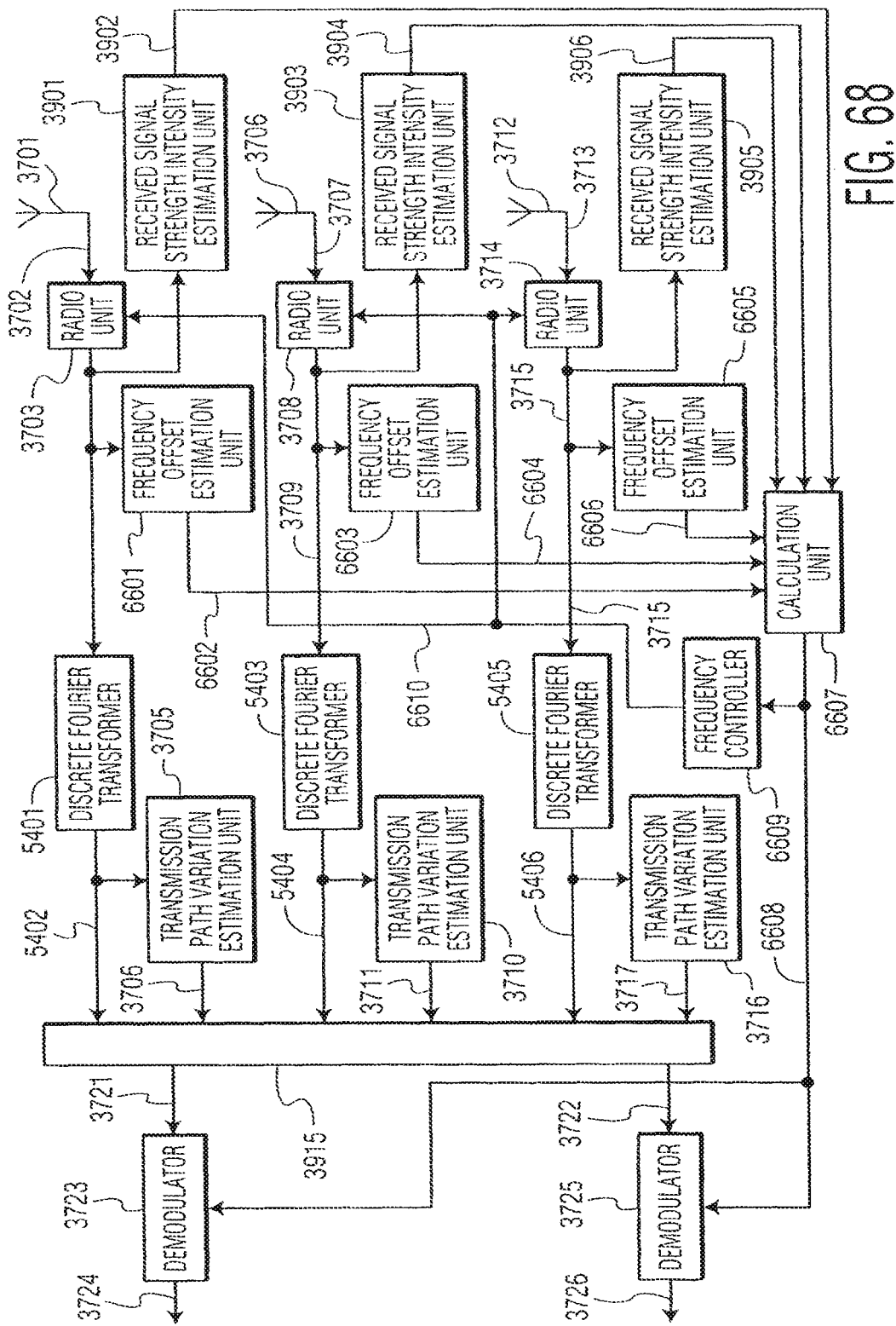
FIG. 68 shows a structure of a reception apparatus in accordance with the eleventh exemplary embodiment of the present invention.

FIG. 68 shows a structure of the reception apparatus in accordance with this embodiment, and the elements operating in a similar way to those in FIG. 37, FIG. 39, FIG. 54 or FIG. 66 have the same reference marks.

Figure 69:
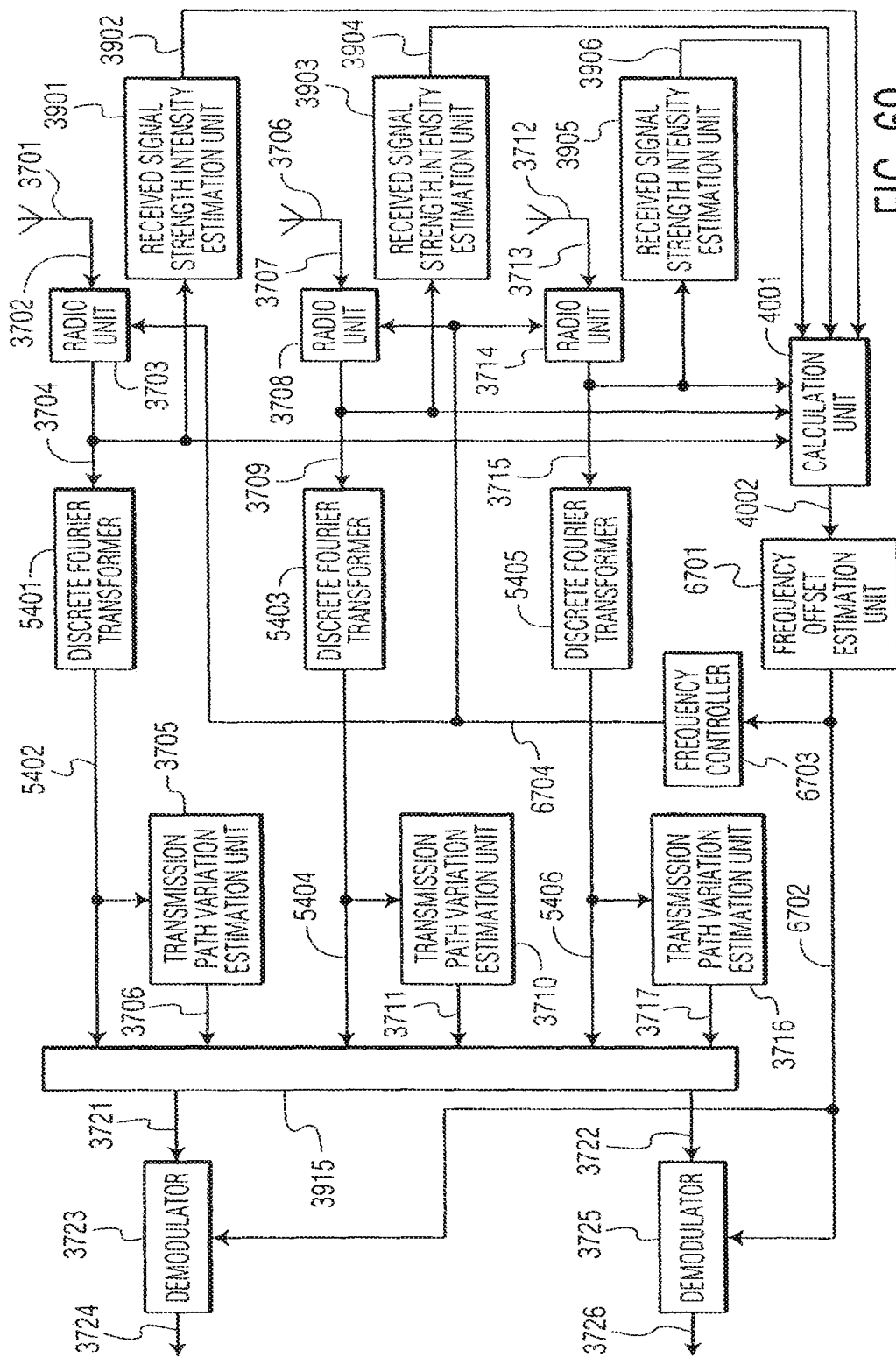
FIG. 69 shows a structure of a reception apparatus in accordance with the eleventh exemplary embodiment of the present invention.

FIG. 69 shows a structure of the reception apparatus in accordance with this embodiment, and the elements operating in a similar way to those in FIG. 37, FIG. 39, FIG. 40, FIG. 54 or FIG. 67 have the same reference marks.

Next, in the transmission method of transmitting modulation signals of a plurality of channels to the same frequency band from a plurality of antennas, a reception apparatus, which is applicable to a method of transmitting a signal including a control symbol, is described hereinafter.

Examples of the frame structure in accordance with this embodiment are shown in FIGS. 33, 34, 43, 44, 45, 50 and 51. The reception apparatus uses, e.g. a synchronous symbol, for estimating a frequency offset. In this case, the transmission apparatus has only one frequency source, so that signals transmitted from the respective antennas are synchronized in frequency with each other.

An operation of the reception apparatus shown in FIG. 58 is demonstrated hereinafter. Frequency offset estimation unit 5801 receives reception quadrature baseband signal 3715, then estimates a frequency offset from the synchronous symbol, and outputs a frequency offset estimation signal.

Demodulators 3723, 3725 removes the frequency offset from frequency offset estimation signal 5802 supplied.

Frequency controller 5803 receives frequency offset estimation signal 5802, then removes the frequency offset therefrom, and outputs source signal 5804 of the radio unit.

Next, operations of the reception apparatus shown in FIG. 59 different from those described in FIG. 58 are demonstrated. Calculation unit 5907 receives frequency offset estimation signals 5902, 5904, 5906, then averages those signals, and outputs frequency offset signal 5908 averaged. This averaging of the signals can produce a more accurate estimation of the frequency offset.

Next, operations of the reception apparatus shown in FIG. 60 different from those described in FIG. 58 are demonstrated. Calculation unit 6007 receives received signal strength intensity estimation signals 3902, 3904, 3906, and frequency offset estimation signals 6002, 6004, 6006, then weights those signals in response to the received signal strength intensity, and outputs a frequency offset estimation signal averaged. This operation allows increasing the reliability of the frequency offset estimation signal having strong received signal strength intensity, so that more accurate estimation of the frequency offset can be expected.

Next, operations of the reception apparatus shown in FIG. 61 different from those described in FIG. 58 are demonstrated. Signal selection unit 4001 outputs a reception quadrature baseband signal having strong received signal strength intensity as signal 4002, so that frequency offset estimation unit 6101 produces more accurate estimation of the frequency offset.

FIGS. 62, 63 differ from FIGS. 60, 61 in finding the received signal strength intensity from the reception quadrature baseband signal.

As discussed above, in the method of transmitting modulation signals of a plurality of channels to the same frequency band from a plurality of antennas, and in the reception apparatus used in the spread-spectrum communication method, the frequency offset can be removed.

FIG. 64 through FIG. 69 show structures of the reception apparatus used in OFDM transmission method, and the reception apparatus operates in a similar way to what are shown in FIG. 58 through FIG. 63.

In the method of transmitting modulation signals of a plurality of channels to the same frequency band from a plurality of antennas, and in the reception apparatus used in the OFDM transmission method, the frequency offset can be removed according to the foregoing structure and operation.

As a result, the frequency offset can be removed from both of the transmission apparatus and the reception apparatus.

In this embodiment, the frame structure is not limited to what is shown in FIG. 33, 34, 43, 44, 45, 50 or 51.

In the transmission apparatus and the reception apparatus, the source signal supplied to the radio unit can be commonly used by the respective radio units equipped to the respective antennas, so that the frequency offset can be commonly estimated to the plurality of antennas.

Similarly, in the transmission apparatus and the reception apparatus, production of modulation signals in the transmission apparatus as well as the source signal for synchronizing in the reception apparatus can be commonly used by the respective modulation signal generators and synchronizing units equipped to the respective antennas. As a result, time-synchronization can be done commonly to the plurality of antennas.

The expression of "antenna" in the previous description does not always mean a single antenna, but "antenna" can mean an antenna unit which is formed of a plurality of antennas.

The 11th exemplary embodiment, as discussed above, describes the transmission method of transmitting modulation signals of a plurality of channels to the same frequency band from a plurality of antennas, more particularly, the reception apparatus which is used in the method of transmitting a signal including a control symbol. The structure and operation discussed above allow increasing a data transmission rate, and allow the reception apparatus to remove frequency-offset.

Exemplary Embodiment 12

The 12th exemplary embodiment describes the following method and apparatus:

a communication method of transmitting a modulation signal to a receiver, who receives the modulation signal then estimates radio-wave propagation environment of respective antennas, and transmits the estimated information of the radio-wave propagation environment, then the communication method selecting one of the following transmission methods based on the estimated information:

a method of transmitting the modulation signals of a plurality of channels to the same frequency band from the plurality of antennas; or a method of transmitting the modulation signal of one channel from one antenna, and a radio communication apparatus using the foregoing communication method.

The 12th exemplary embodiment further describes the following method and apparatus:

a communication method of transmitting a modulation signal to a receiver, who receives the modulation signal then estimates radio-wave propagation environment of respective antennas, then the communication method sending the information which requires one of the following transmission methods based on the estimated information of the radio-wave propagation environment:

a method of transmitting the modulation signals of a plurality of channels to the same frequency band from the plurality of antennas, or a method of transmitting the modulation signal of one channel from one antenna;

then the communication method selecting, based on the requiring information, one of the foregoing two transmission methods, and a radio communication apparatus using the foregoing communication method.

Figure 70:
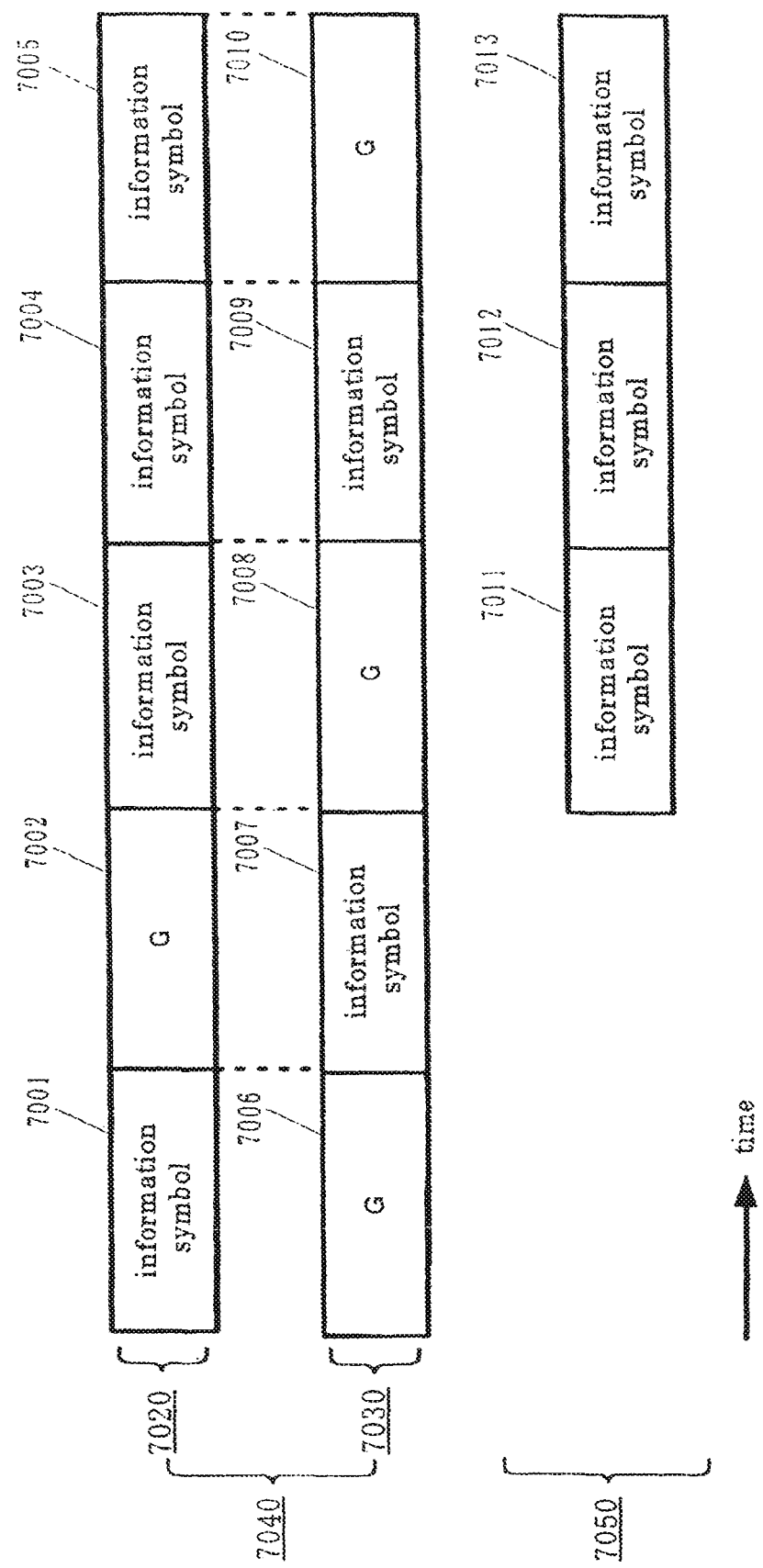
FIG. 70 shows a frame structure in accordance with a twelfth exemplary embodiment of the present invention.

FIG. 4 shows a placement of signal points in in-phase-quadrature (I-Q) plane. FIG. 70 shows a frame structure in accordance with this embodiment along a time axis, to be more specific, frame structure 7040 of a signal transmitted from a base station and frame structure 7050 of a signal transmitted from a terminal. As shown in FIG. 70, frame structure 7040 includes frame structure 7020 of channel A and frame structure 7030 of channel B.

Frame structure 7020 includes information symbols 7001, 7003, 7004, 7005, and guard symbol 7002 of the signal of channel A transmitted from the base station. Frame structure 7030 includes information symbols 7007, 7009, guard symbols 7006, 7008, 7010 of the signal of channel B transmitted from the base station. Frame structure 7050 includes information symbols 7011, 7012, 7013 of the signal transmitted from the terminal.

Figure 71:
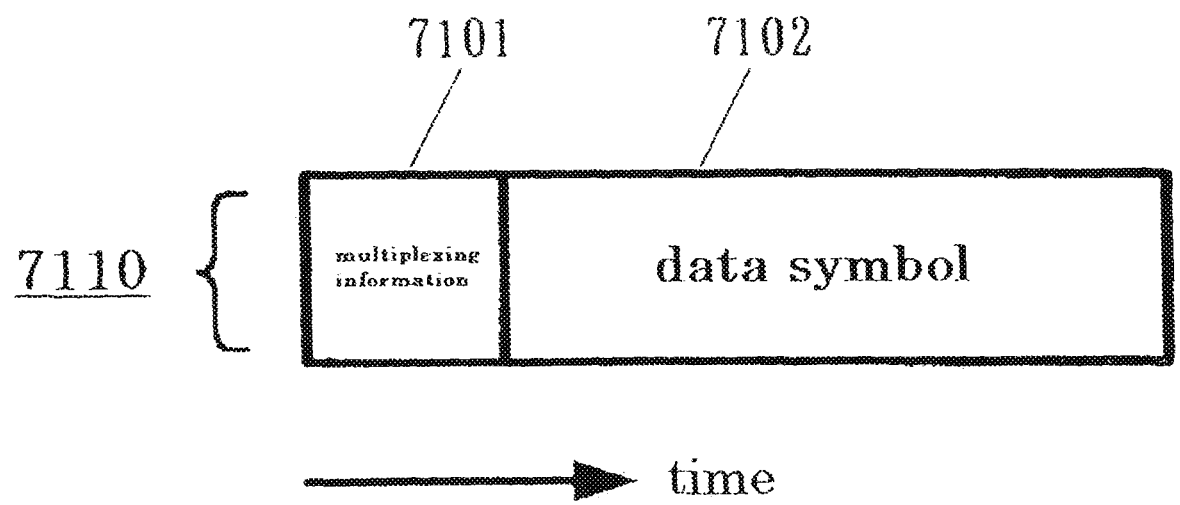
FIG. 71 shows a structure of an information symbol in accordance with the twelfth exemplary embodiment of the present invention.

FIG. 71 shows information symbol structure 7110 of channel A signal transmitted from the base station in accordance with this embodiment. Structure 7110 includes multiplex information symbol 7101 and data symbol 7102.

Figure 72:
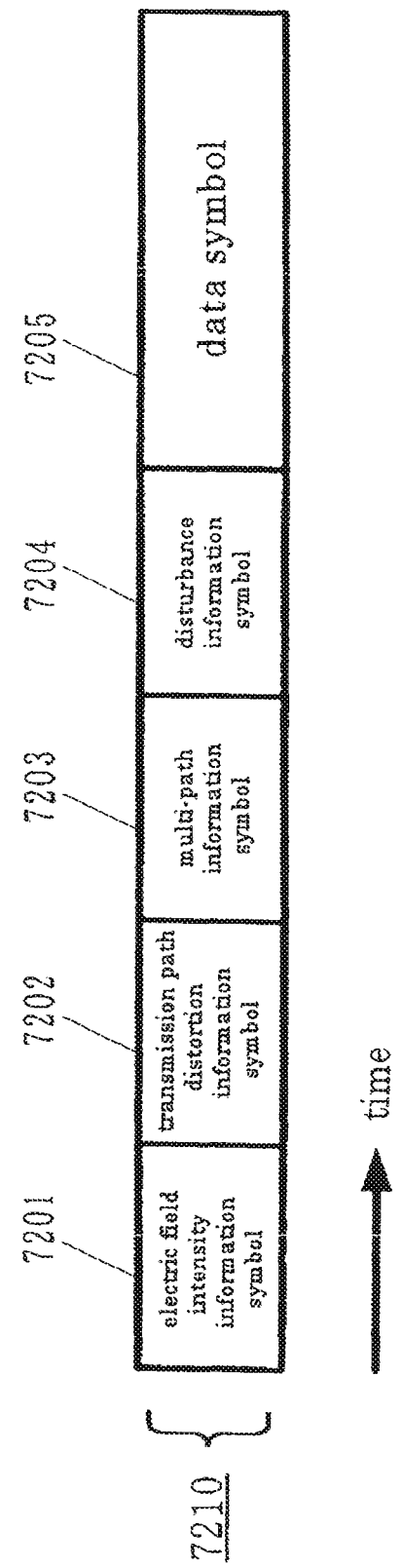
FIG. 72 shows a structure of an information symbol in accordance with the twelfth exemplary embodiment of the present invention.

FIG. 72 shows information symbol structure 7210 of a signal transmitted from the terminal in accordance with this embodiment. Structure 7210 includes received signal strength intensity information symbol 7201, transmission path variation information symbol 7202, multi-path information symbol 7203, disturbance information symbol 7204, and data symbol 7205.

Figure 73:
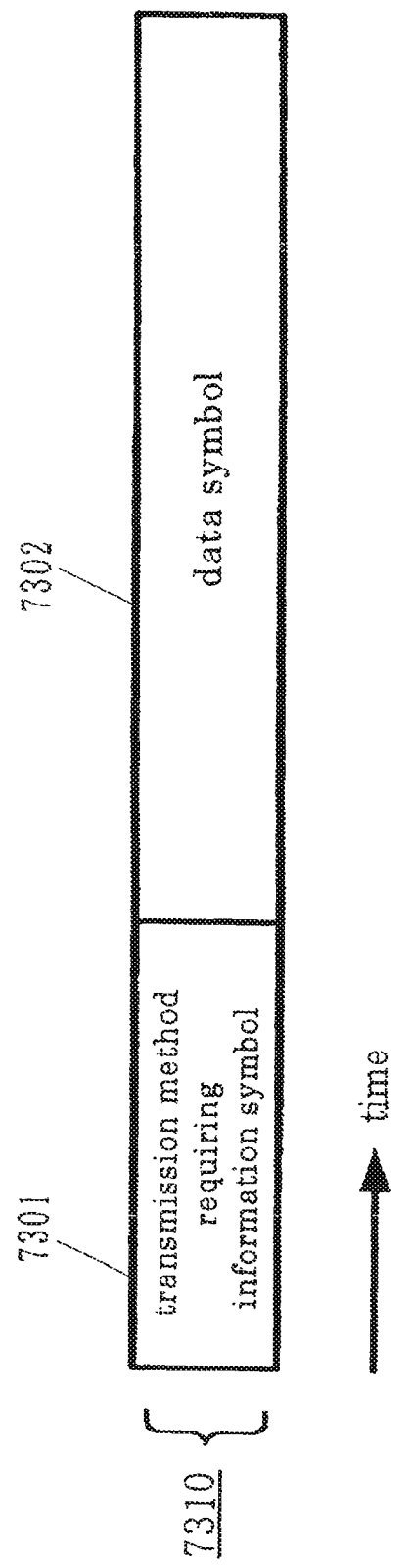
FIG. 73 shows a structure of an information symbol in accordance with the twelfth exemplary embodiment of the present invention.

FIG. 73 shows information symbol structure 7310 of a signal transmitted from the terminal in accordance with this embodiment. Structure 7310 includes transmission method requiring information symbol 7301, data symbol 7302.

Figure 74:
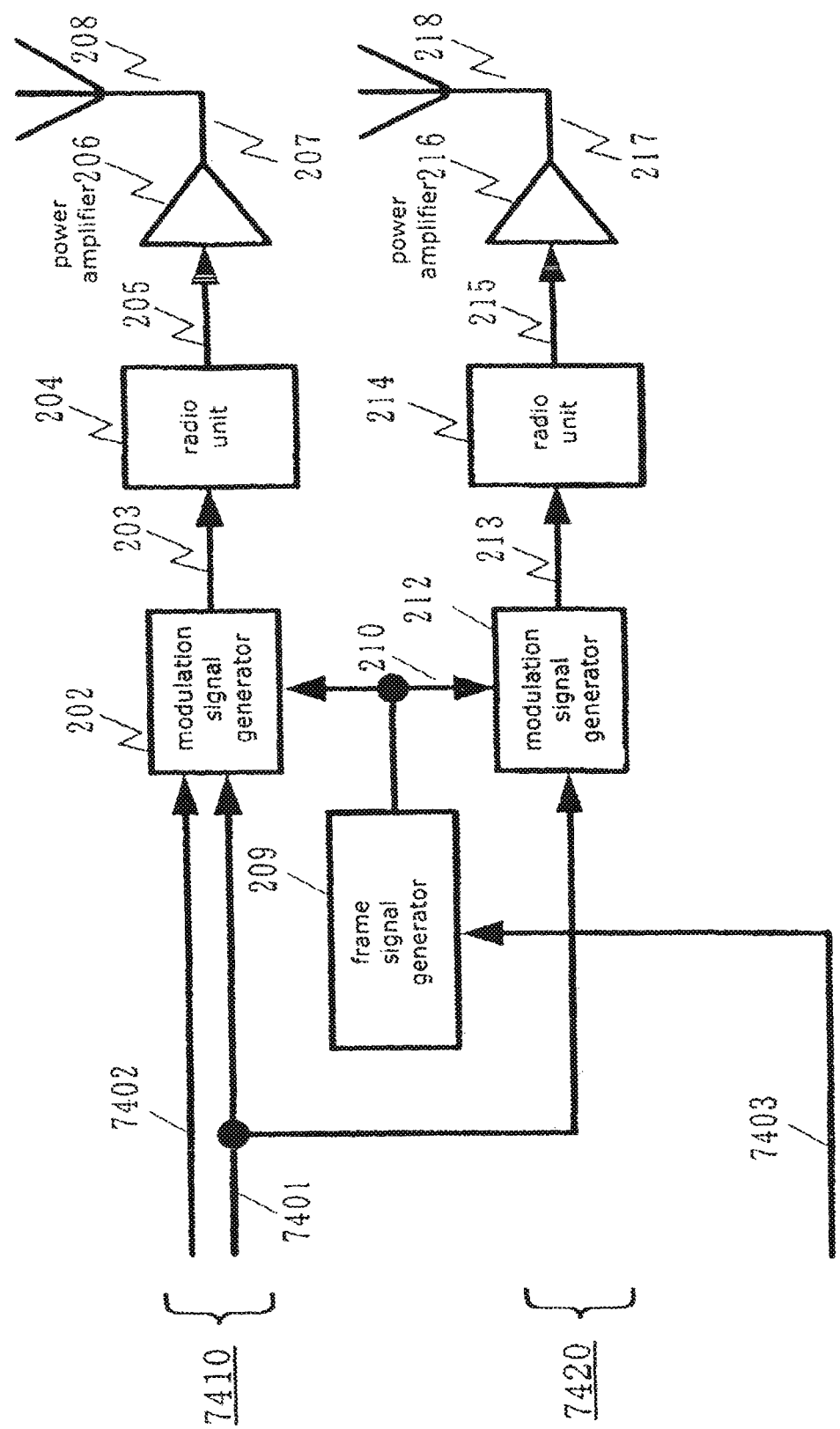
FIG. 74 shows a structure of a transmission apparatus in accordance with the twelfth exemplary embodiment of the present invention.

FIG. 74 shows a structure of a transmission apparatus at the base station in accordance with this embodiment. The apparatus includes channel A transmitter 7410, channel B transmitter 7420, and frame structure signal generator 209.

Channel A transmitter 7410 is formed of modulation signal generator 202, radio unit 204, power amplifier 206, and antenna 208.

Channel B transmitter 7420 is formed of modulation signal generator 212, radio unit 214, power amplifier 216, and antenna 218.

The elements operating in a similar way to those in FIG. 13 have the same reference marks.

Modulation signal generator 202 receives transmission digital signal 7401, multiplex information 7402, frame structure signal 210, and outputs modulation signal 203 in accordance with the frame structure.

Frame structure signal generator 209 receives transmission method determining information 7403, and outputs frame structure signal 210.

Modulation signal generator 212 receives transmission digital signal 7401 and frame structure signal 210, then outputs modulation signal 213.

Figure 75:
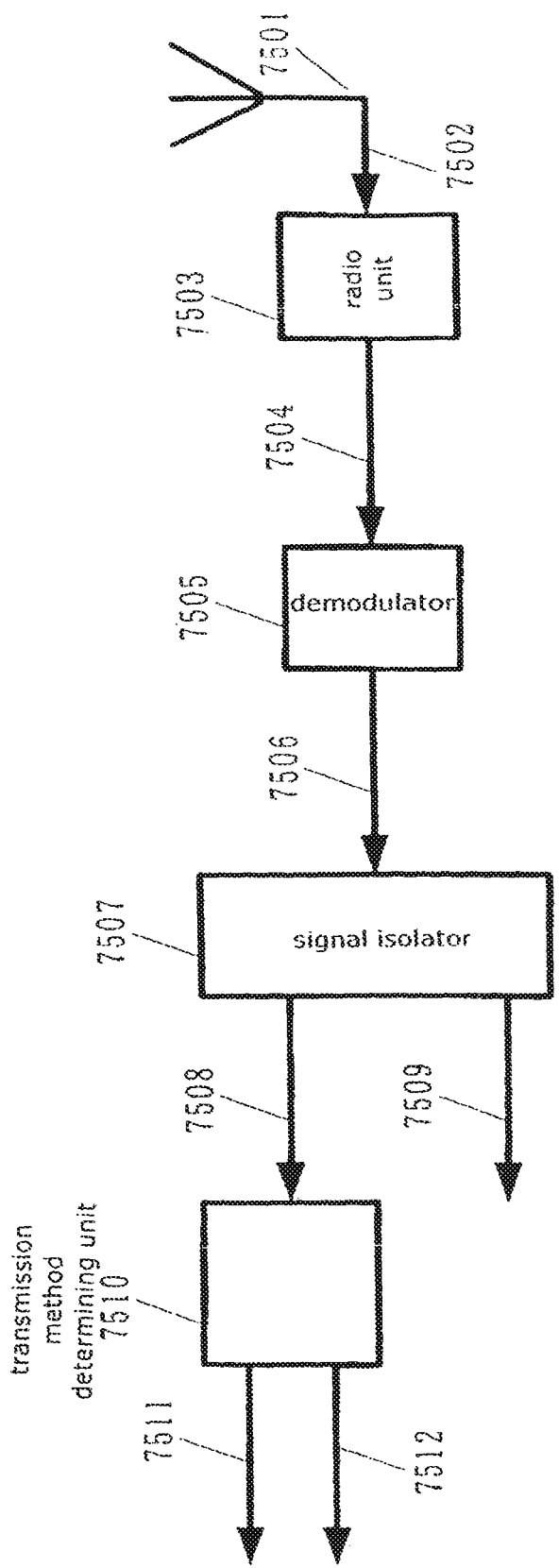
FIG. 75 shows a structure of a reception apparatus in accordance with the twelfth exemplary embodiment of the present invention.

FIG. 75 shows a structure of a reception apparatus at the base station, and its radio unit 7503 receives signal 7502 received by antenna 7501, then outputs reception quadrature baseband signal 7504.

Demodulator 7505 receives reception quadrature baseband signal 7504, then outputs reception digital signal 7506.

Signal isolator 7507 receives signal 7506, and outputs radio-wave propagation environmental information or transmission method requiring information 7508 and reception data 7509.

Transmission method determining unit 7510 receives radio-wave propagation environmental information or transmission method requiring information 7508, then outputs transmission method determining information 7511 and multiplex information 7512.

Figure 76:
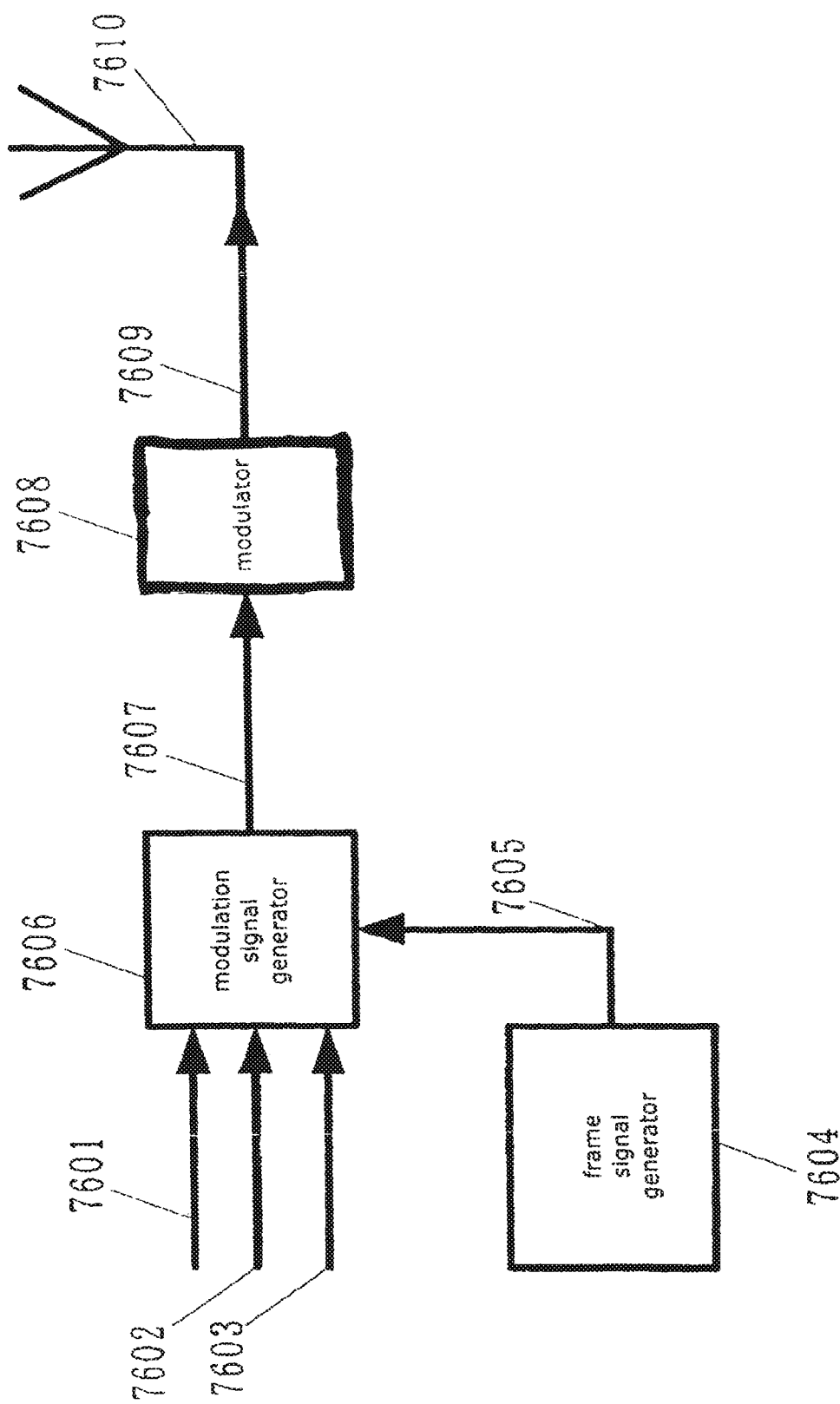
FIG. 76 shows a structure of a transmission apparatus in accordance with the twelfth exemplary embodiment of the present invention.

FIG. 76 shows a structure of a transmission apparatus at the terminal in accordance with this embodiment. Modulation signal generator 7606 receives transmission digital signal 7601, radio-wave propagation environment estimation signals 7602, 7603, and frame structure signal 7605, then outputs transmission quadrature baseband signal 7607.

Frame structure signal generator 7604 outputs frame structure signal 7605.

Modulator 7608 receives transmission quadrature baseband signal 7607, then outputs modulation signal 7609 from antenna 7610 as radio wave.

Figure 77:
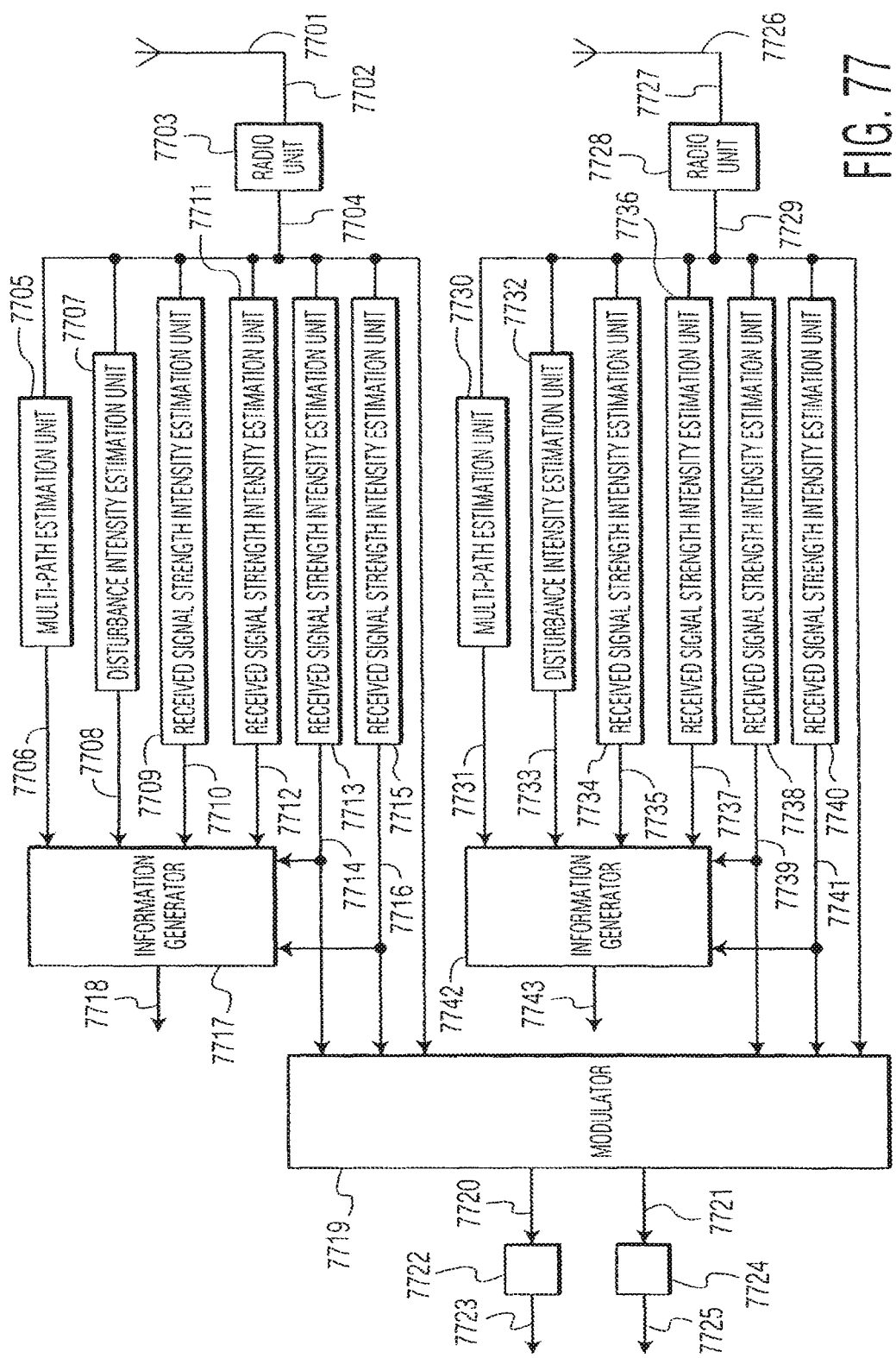
FIG. 77 shows a structure of a reception apparatus in accordance with the twelfth exemplary embodiment of the present invention.

FIG. 77 shows a structure of a reception apparatus at the terminal in accordance with this embodiment. Radio unit 7703 receives signal 7702 received by antenna 7701, then outputs reception quadrature baseband signal 7704.

Multi-path estimation unit 7705 receives signal 7704, and outputs multi-path estimation signal 7706.

Disturbance intensity estimation unit 7707 receives reception quadrature baseband signal 7704, then outputs disturbance intensity estimation signal 7708.

Received signal strength intensity estimation unit 7709 of channel A receives reception quadrature baseband signal 7704, then outputs received signal strength intensity estimation signal 7710 of channel A.

Received signal strength intensity estimation unit 7711 of channel B receives reception quadrature baseband signal 7704, then outputs received signal strength intensity estimation signal 7712 of channel B.

Transmission distortion estimation unit 7713 of channel A receives reception quadrature baseband signal 7704, then outputs transmission variation estimation signal 7714 of channel A.

Transmission distortion estimation unit 7715 of channel B receives reception quadrature baseband signal 7704, then outputs transmission variation estimation signal 7716 of channel B.

Information generator 7717 receives the following signals:

multi-path estimation signal 7706;

disturbance intensity estimation signal 7708;

received signal strength intensity estimation signal 7710 of channel A;

received signal strength intensity estimation signal 7712 of channel B;

transmission path variation estimation signal 7714 of channel A; and transmission path variation estimation signal 7716 of channel B, then generator 7717 outputs radio wave propagation environment estimation signal 7718.

Signal isolator 7719 receives the following signals:
reception quadrature baseband signals 7704, 7729;
transmission path variation estimation signals 7714, 7739 of channel A; and
transmission path variation estimation signal 7716, 7741 of channel B,
then isolator 7719 outputs reception quadrature baseband signals 7720, 7721 of channel A and channel B respectively.

Radio unit 7728 receives signal 7727 received by antenna 7726, then outputs reception quadrature baseband signal 7729.

Multi-path estimation unit 7730 receives reception quadrature baseband signal 7729, and outputs multi-path estimation signal 7731.

Disturbance intensity estimation unit 7732 receives reception quadrature baseband signal 7729, then outputs disturbance intensity estimation signal 7733.

Received signal strength intensity estimation unit 7734 of channel A receives reception quadrature baseband signal 7729, then outputs received signal strength intensity estimation signal 7735 of channel A.

Received signal strength intensity estimation unit 7736 of channel B receives reception quadrature baseband signal 7729, then outputs received signal strength intensity estimation signal 7737 of channel B.

Transmission distortion estimation unit 7738 of channel A receives reception quadrature baseband signal 7729, then outputs transmission variation estimation signal 7739 of channel A.

Transmission distortion estimation unit 7740 of channel B receives reception quadrature baseband signal 7729, then outputs transmission variation estimation signal 7741 of channel B.

Information generator 7742 receives the following signals:
multi-path estimation signal 7731;
disturbance intensity estimation signal 7733;
received signal strength intensity estimation signal 7735 of channel A;
received signal strength intensity estimation signal 7737 of channel B;
transmission path variation estimation signal 7739 of channel A; and
transmission path variation estimation signal 7741 of channel B,
then generator 7742 outputs radio wave propagation environment estimation signal 7743.

Figure 78:
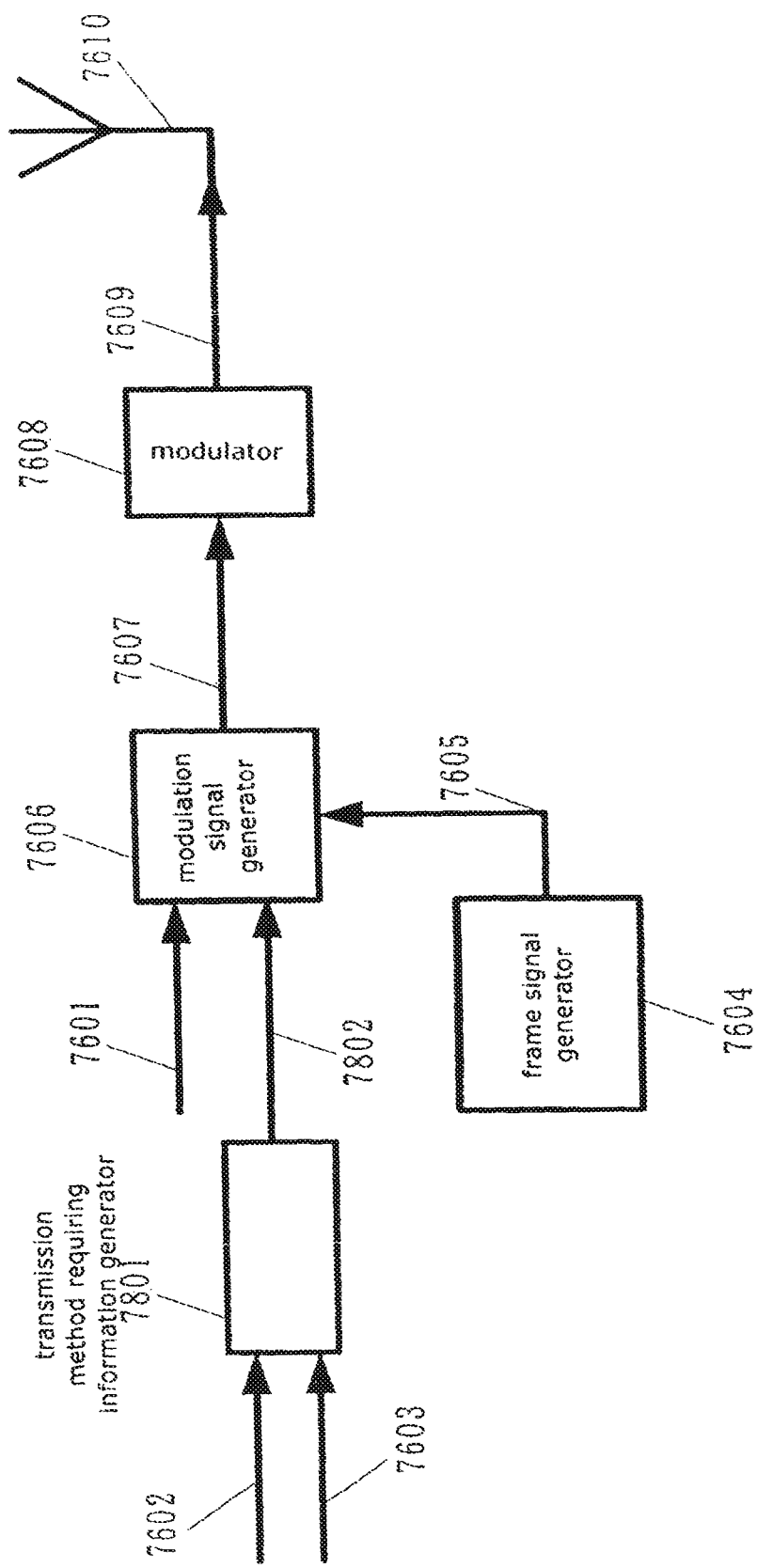
FIG. 78 shows a structure of a transmission apparatus in accordance with the twelfth exemplary embodiment of the present invention.

FIG. 78 shows a structure of a transmission apparatus at the terminal in accordance with this embodiment, and the elements operating in a similar way to those in FIG. 76 have the same reference marks.

Transmission method requiring information generator 7801 receives radio-wave propagation environmental information 7602, 7603, then outputs transmission method requiring information 7802.

FIG. 84A shows a frame structure of a signal transmitted from the base station in accordance with this embodiment, to be more specific, frame structure 8410 of channel A and frame structure 8420 of channel B.

FIG. 84B shows a frame structure of a signal transmitted from the terminal in accordance with this embodiment.

The base station transmits a modulation signal of OFDM method, and the frame structure includes guard symbol 8401 of the signal transmitted from the base station, information symbol 8402 of the signal transmitted from the base station, and information symbol 8403 of a signal transmitted from the terminal.

Next, the following communication method is demonstrated with reference to FIG. 4, and FIG. 70 through FIG. 77:

a communication method where a modulation signal is transmitted to a receiver, who receives the modulation signal, estimates radio-wave propagation environment of respective antennas, and outputs the estimated information of the radio-wave propagation environment, then the communication method selects one of the following transmission methods based on the estimated information:

a plurality of antennas transmit the modulation signals of a plurality of channels to the same frequency band based on the information, or one antenna transmits the modulation signal of one channel.

A radio communication apparatus using the foregoing communication method is also described hereinafter.

FIG. 74 shows the structure of the transmission apparatus at the base station. Frame structure signal generator 209 receives transmission method determining information 7403. Based on information 7403, generator 209 outputs, e.g. the information about one of the following frame structures as frame structure signal 210:

a transmission method where information symbol 7004 of channel A shown in FIG. 70 and the information symbol of channel B are multiplexed; and a transmission method where information symbol 7005 of channel A shown in FIG. 70 is transmitted; however, channel B has guard symbol 7010, so that they are not multiplexed.

Transmission determining information 7403 corresponds to output signal 7511 from transmission method determining unit 7510.

Modulation signal generator 202 receives transmission digital signal 7401, multiplex information 7402, and frame structure signal 210, then outputs modulation signal 203 of the information symbol. At this time, the information symbol is formed of multiplex information symbol 7101 and data symbol 7102, as shown in FIG. 71. Multiplex information symbol 7101 is a symbol of multiplex information 7402, and data symbol 7102 is transmission digital signal 7401. Multiplex information 7402 corresponds to output signal 7512 from the reception apparatus shown in FIG. 75 at the base station.

Modulation signal generator 212 receives transmission digital signal 7401, frame structure signal 210, and outputs modulation signal 213 of the guard symbol or the information symbol in response to frame structure signal 210, as shown in FIG. 70. At this time the modulation signal of the guard symbol corresponds to signal point 403 shown in FIG. 4.

FIG. 75 shows the structure of the reception apparatus at the base station. Signal isolator 7507 isolates the following signals in the frame structure shown in FIG. 72:
data symbol 7205;
received signal strength intensity information symbol 7201 corresponding to the radio-wave propagation environmental information;
transmission path variation information symbol 7202;
multi-path information symbol 7203; and
disturbance information symbol 7204.

Signal isolator 7507 then outputs the information of data symbol 7205 as reception data 7509, also outputs symbols 7201, 7202, 7203 and 7204 as radio-wave propagation environmental information 7508.

Transmission method determining unit 7510 receives information 7508, and based on this information 7508, selects the communication method which selects one of the following transmission methods:

a method of transmitting modulation signals of a plurality of channels to the same frequency band from a plurality of antennas; or a method of transmitting a modulation signal of one channel from one antenna.

Determining unit 7510 then outputs the information of the transmission methods as transmission method determining information 7511 and multiplex information 7512.

FIG. 76 shows the transmission apparatus at the terminal. The apparatus receives transmission digital signal 7601, radio-wave propagation environment estimation signals 7602, 7603, and frame structure signal 7605. According to the frame structure shown in FIG. 72, signal 7601 is treated as data symbol 7205, signals 7602, 7603 are treated as received signal strength intensity information symbol 7201, transmission path variation information symbol 7202, multi-path information symbol 7203, and disturbance information symbol 7204. Then the transmission apparatus outputs modulation signal 7606. Radio-wave propagation estimation signals 7602, 7603 correspond to radio-wave propagation environment estimation signals 7718, 7743 of the reception apparatus shown in FIG. 77 at the terminal.

FIG. 77 shows the structure of the reception apparatus at the terminal. Information generator 7717 receives the following signals:

multi-path estimation signal 7706;

disturbance intensity estimation signal 7708;

received signal strength intensity estimation signal 7710 of channel A signals;

received signal strength intensity estimation signal 7712 of channel B signals;

transmission path variation estimation signal 7714 of channel A; and transmission path variation estimation signal 7716 of channel B.

Generator 7717 then outputs radio-wave propagation environment estimation signal 7718 corresponding to the information of received signal strength intensity information symbol 7201, transmission path variation information symbol 7202, multi-path information symbol 7203, and disturbance information symbol 7204 shown in FIG. 72.

In a similar way to the foregoing operation, information generator 7742 receives the following signals:

multi-path estimation signal 7731;

disturbance intensity estimation signal 7733;

received signal strength intensity estimation signal 7735 of channel A signals;

received signal strength intensity estimation signal 7737 of channel B signals;

transmission path variation estimation signal 7739 of channel A; and transmission path variation estimation signal 7741 of channel B.

Generator 7742 then outputs radio-wave propagation environment estimation signal 7743 corresponding to the information of received signal strength intensity information symbol 7201, transmission path variation information symbol 7202, multi-path information symbol 7203, and disturbance information symbol 7204 shown in FIG. 72.

In conclusion, depending on a radio-wave propagation environment, the transmission method of transmitting modulation signals of a plurality of channels to the same frequency band from a plurality of antennas can be switched to/from the transmission method of transmitting modulation signals of a plurality of channels without multiplexing to the same frequency band. This operation can improve the quality of information.

In the foregoing operation, radio-wave propagation environment estimation signals 7718, 7743 correspond to signals 7602, 7603 of the transmission apparatus shown in FIG. 76 at the terminal.

Next, an operation at starting a communication is demonstrated hereinafter. When the communication starts, the base station transmits modulation signals by the transmission method of transmitting modulation signals of a plurality of channels to the same frequency band from a plurality of antennas. At this time, if the terminal is not suitable for the foregoing transmission method, the quality of reception data is lowered.

In order to avoid this problem, when a communication to the terminal starts, the base station transmits modulation signals of a plurality of channels without multiplexing to the same frequency band as symbols 7001, 7006, and symbols 7002, 7007 shown in FIG. 70.

Frame structure signal generator 209 shown in FIG. 74 outputs frame structure signal 210 in which the following frame structure is prepared: When a communication to the terminal starts, modulations signals of a plurality of channels are transmitted, without being multiplexed, to the same frequency band as symbols 7001, 7006 and symbols 7002, 7007 shown in FIG. 70.

The reception apparatus shown in FIG. 77 at the terminal estimates a radio-wave propagation environment from the reception signal of symbols 7001, 7007 transmitted from the base station, then generates radio-wave propagation environment estimation signals 7718, 7743.

The transmission apparatus shown in FIG. 76 at the terminal transmits estimation signals 7718, 7743 with information symbols 7011, 7012 shown in FIG. 70.

The reception apparatus shown in FIG. 75 at the terminal selects one of the following transmission methods based on the radio-wave propagation environment estimation information included in information symbol 7011 which is a part of the signal transmitted from transmission apparatus shown in FIG. 76 at the terminal:

a method of transmitting modulation signals of a plurality of channels to the same frequency band from a plurality of antennas; or a method of transmitting modulation signals of a plurality of channels without being multiplexed to the same frequency band. In the case of, e.g. a fine environment for the radio-wave propagation, the modulation signals of the plurality of channels are transmitted from the plurality of antennas such as information symbols 7004, 7009.

As discussed above, when the communication to the terminal starts, modulation signals of a plurality of channels are transmitted without being multiplexed to the same frequency band, thereby improving the information quality.

In the foregoing discussion, a modulation signal indicating that the terminal requires a communication to the base station can be transmitted at the beginning. When the base station uses the OFDM transmission method, what is discussed above can be also used.

Next, a communication method, which selects one of the following transmission methods, and a radio communication apparatus using this communication method are described hereinafter with reference to FIGS. 4, 70, 71, 73, 74, 75, 77 and 78. When a modulation signal is transmitted to a receiver, who receives the modulation signal and estimates radio-wave propagation environments of respective antennas, the communication method selects one of the following transmission methods based on the estimation:

a method of transmitting information that requires one of the following two methods, and based on the information, this method selects one of the transmission methods below:

a method of transmitting modulation signals of a plurality of channels to the same frequency band from a plurality of antennas; or a method of transmitting a modulation signal of one channel from one antenna.

FIG. 74 shows the structure of the transmission apparatus at the base station. Frame structure signal generator 209 receives transmission method determining information 7403. Based on information 7403, generator 209 outputs, e.g. the information about one of the following frame structures as frame structure signal 210:

a frame structure of a transmission method where information symbol 7004 of channel A shown in FIG. 70 and the information symbol of channel B are multiplexed; or a frame structure of a transmission method where information symbol 7005 of channel A shown in FIG. 70 is transmitted; however, channel B has guard symbol 7010, so that they are not multiplexed.

Transmission determining information 7403 corresponds to output signal 7511 from transmission method determining unit 7510.

Modulation signal generator 202 receives transmission digital signal 7401, multiplex information 7402, and frame structure signal 210, then outputs modulation signal 203 of the information symbol. At this time, the information symbol is formed of multiplex information symbol 7101 and data symbol 7102, as shown in FIG. 71. Multiplex information symbol 7101 is a symbol of multiplex information 7402, and data symbol 7102 is transmission digital signal 7401. Multiplex information 7402 corresponds to output signal 7512 from the reception apparatus shown in FIG. 75 at the base station.

Modulation signal generator 212 receives transmission digital signal 7401, frame structure signal 210, and outputs modulation signal 213 of the guard symbol or the information symbol in response to frame structure signal 210, as shown in FIG. 70. At this time the modulation signal of the guard symbol corresponds to signal point 403 shown in FIG. 4.

FIG. 75 shows the structure of the reception apparatus. Signal isolator 7507 isolates data symbol 7302 from transmission method requiring information symbol 7301 in the frame structure shown in FIG. 73, then outputs the information of data symbol 7205 as reception data 7509, and information symbol 7301 as transmission method requiring information 7509.

Transmission method determining unit 7510 receives information 7508, then selects a communication method which selects one of the transmission method of transmitting modulation signals of a plurality of channels to the same frequency band from a plurality of antennas, or a transmission method of transmitting a modulation signal of one channel from one antenna. Determining unit 7510 outputs the information about the transmission method selected as transmission method determining information 7511 and multiplex information 7512.

FIG. 78 shows the structure of the transmission apparatus at the terminal. Transmission method requiring information generator 7801 receives radio-wave propagation environment estimation signals 7602, 7603. In response to those signals generator 7801 outputs a communication method which selects one of the following two transmission methods as transmission request information 7802:

in the case of, e.g. a fine environment for the radio-wave propagation, the transmission method of transmitting modulation signals of a plurality of channels to the same frequency band from a plurality of antennas.

in the case of, e.g. a bad environment for the radio-wave propagation, the transmission method of transmitting a modulation signal of one channel from one antenna.

Modulation signal generator 7606 receives transmission digital signal 7601, frame structure signal 7605, and transmission request information 7802, and modulates signal 7601 and information 7802 according to the frame structure shown in FIG. 73, then outputs transmission quadrature baseband signal 7607. Radio-wave propagation environment estimation signals 7602, 7603 correspond to radio-wave propagation environment estimation signals 7718, 7743 of the reception apparatus shown in FIG. 77 at the terminal.

FIG. 77 shows the structure of the reception apparatus at the terminal. Information generator 7717 receives the following signals:

multi-path estimation signal 7706;
disturbance intensity estimation signal 7708;
received signal strength intensity estimation signal 7710 of channel A signals;
received signal strength intensity estimation signal 7712 of channel B signals;
transmission path variation estimation signal 7714 of channel A; and
transmission path variation estimation signal 7716 of channel B,
then generator 7717 outputs radio wave propagation environment estimation signal 7718.

In a similar way to the foregoing operation, information generator 7742 receives the following signals:

multi-path estimation signal 7731;
disturbance intensity estimation signal 7733;
received signal strength intensity estimation signal 7735 of channel A signals;
received signal strength intensity estimation signal 7737 of channel B signals;
transmission path variation estimation signal 7739 of channel A; and
transmission path variation estimation signal 7743 of channel B,
then generator 7742 outputs radio wave propagation environment estimation signal 7743.

Radio wave propagation environment estimation signals 7718, 7743 correspond to signals 7602, 7603 of the transmission apparatus shown in FIG. 78 at the terminal.

In conclusion, depending on a radio-wave propagation environment, the transmission method of transmitting modulation signals of a plurality of channels to the same frequency band from a plurality of antennas can be switched to/from the transmission method of transmitting modulation signals of a plurality of channels without multiplexing to the same frequency band. This operation can increase the quality of information.

Next, an operation at starting a communication is demonstrated hereinafter. When the communication starts, the base station transmits modulation signals by the transmission method of transmitting modulation signals of a plurality of channels to the same frequency band from a plurality of antennas. At this time, if the terminal is not suitable for the foregoing transmission method, the quality of reception data is lowered.

In order to avoid this problem, when a communication to the terminal starts, the base station transmits modulation signals of a plurality of channels without multiplexing to the same frequency band as symbols 7001, 7006, and symbols 7002, 7007 shown in FIG. 70.

Frame structure signal generator 209 shown in FIG. 74 outputs frame structure signal 210 in which the following frame structure is prepared: When a communication to the terminal starts, modulation signals of a plurality of channels are transmitted, without being multiplexed, to the same frequency band as symbols 7001, 7006 and symbols 7002, 7007 shown in FIG. 70.

The reception apparatus shown in FIG. 77 at the terminal estimates a radio-wave propagation environment from the reception signal of symbols 7001, 7007 transmitted from the base station, then generates radio-wave propagation environment estimation signals 7718, 7743.

Transmission method requiring information generator 7801 of the transmission apparatus shown in FIG. 78 at the terminal receives radio-wave propagation environment estimation signals 7718, 7743 which estimate the environment from the reception signal of symbols 7001, 7007 transmitted from the base station. Generator 7801 then selects one of the following two transmission methods:

a method of transmitting modulation signals of a plurality of channels to the same frequency band from a plurality of antennas; or a method of transmitting modulation signals of a plurality of channels without being multiplexed to the same frequency band. Generator 7801 outputs transmission request information 7802, which is transmitted in the structure of the information symbol of the transmission signal shown in FIG. 73 in accordance with, e.g. information symbol 7011 shown in FIG. 70.

The reception apparatus shown in FIG. 75 at the terminal selects one of the following transmission methods based on the transmission method requiring information symbol included in information symbol 7011 which is a part of the signal transmitted from transmission apparatus shown in FIG. 78 at the terminal:

a method of transmitting modulation signals of a plurality of channels to the same frequency band from a plurality of antennas; or a method of transmitting modulation signals of a plurality of channels without being multiplexed to the same frequency band.

As discussed above, when the communication to the terminal starts, modulation signals of a plurality of channels are transmitted without being multiplexed to the same frequency band, thereby improving the information quality.

In the foregoing discussion, a modulation signal indicating that the terminal requires a communication to the base station can be transmitted at the beginning.

In this embodiment, what is discussed previously is applicable to any one of the following methods: single carrier method, spread-spectrum communication method, CDMA method (multiplexing method). In the case of using any one of those methods, the transmission apparatus needs a spread unit, and the reception apparatus needs an inverse-spread unit.

Figure 84:
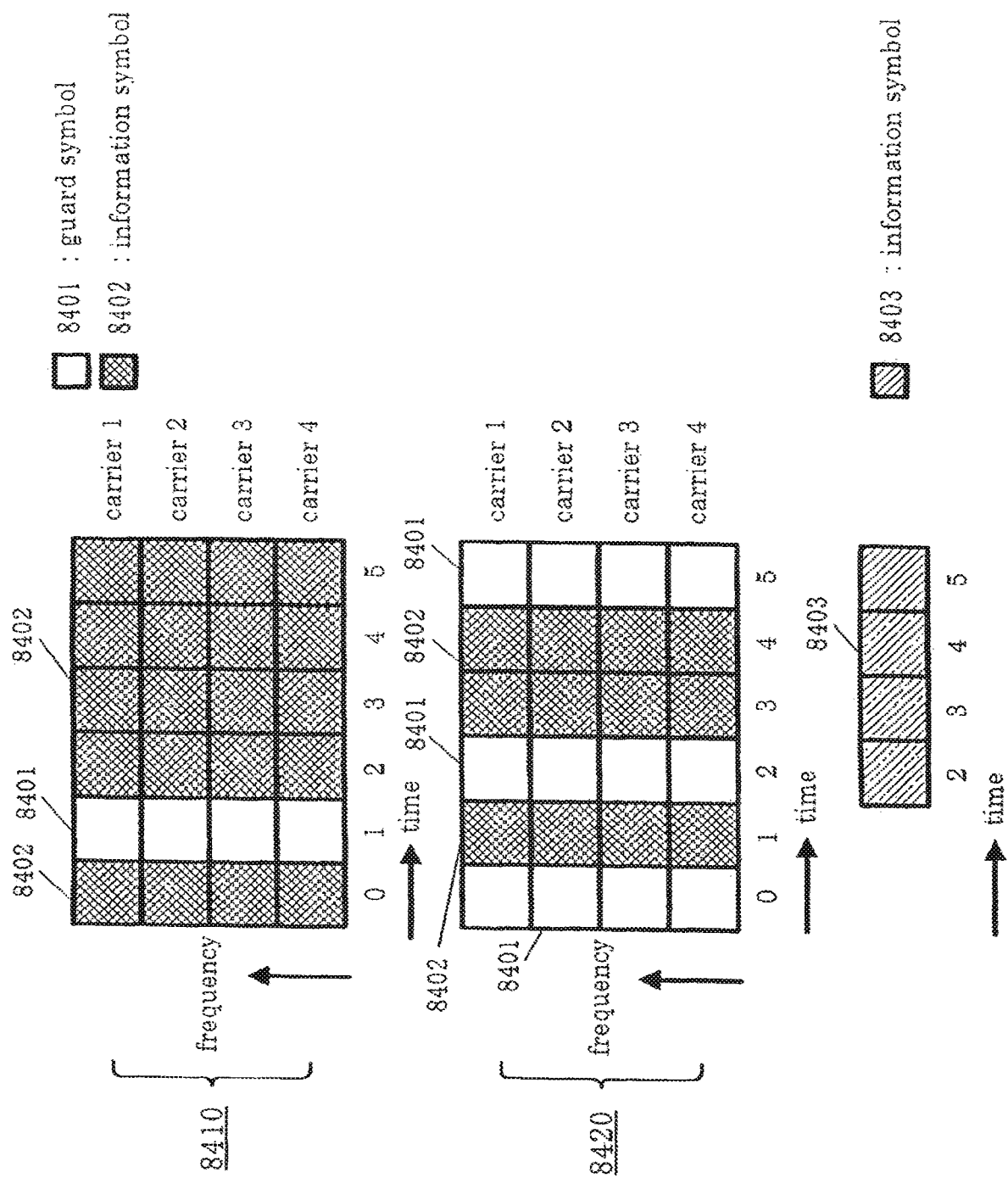
FIG. 84A shows a frame structure of a transmission signal from a base station in accordance with the twelfth exemplary embodiment of the present invention.
FIG. 84B shows a frame structure of the transmission signal from a terminal in accordance with the twelfth exemplary embodiment of the present invention.

Hereinafter the case, where OFDM method among others is employed, is described. FIG. 84 shows a frame structure when the base station transmits signals by OFDM method. The transmission apparatus at the base station transmits a modulation signal of channel A at time 0 (see the frame structure 8410), and a modulation signal of channel B at time 1 (see the frame structure 8420). The terminal receives the modulation signal transmitted by the base station at time 0 as well as the modulation signal transmitted by the base station at time 1. The terminal then estimates a radio-wave propagation environment such as multi-path, disturbance signal electric field intensity, electric field intensities of channels A and B respectively, and transmission path variations of channels A and B respectively. The terminal then transmits such radio-wave propagation environment estimation information or transmission request information, which requests one of the following transmission methods, to the base station:

a method of transmitting modulation signals of a plurality of channels to the same frequency band from a plurality of antennas; or a method of transmitting modulation signals of a plurality of channels without being multiplexed to the same frequency band.

The base station determines the transmission method based on the foregoing radio-wave propagation environment estimation information or the transmission request information. In the case of a fine environment for the radio wave propagation, channel A and channel B are multiplexed for transmission such as at time 3 and time 4 shown in FIG. 84A. In the case of a bad environment, a modulation signal of channel A only is transmitted such as at time 5 in FIG. 84A. In those cases, the transmission apparatus and the reception apparatus at the base station and the terminal can be structured as shown in FIG. 74 through FIG. 78, which are described in reference to the frame structure shown in FIG. 70. What is discussed above is also applicable to the case where a signal of the spread-spectrum communication method is modulated by OFDM method.

This embodiment refers to the case where two channels are multiplexed, or being switched to the case where one channel is used without being multiplexed; however, this example does not limit the embodiment. For instance, in the case where three channels can be multiplexed to the same frequency band, the transmission apparatus at the base station switches the number of multiplexing between 1-3 channels.

The expression of "antenna" in the previous description does not always mean a single antenna, but "antenna" can mean an antenna unit which is formed of a plurality of antennas.

The 12th exemplary embodiment, as discussed above, proves that the following method and apparatus are achievable:

a communication method of transmitting a modulation signal to a receiver, which receives the modulation signal then estimates the radio-wave propagation environment of respective antennas, and transmits the estimated information of the radio-wave propagation environment, then the communication method selecting one of the following transmission methods based on the estimated information:

a method of transmitting the modulation signals of a plurality of channels to the same frequency band from the plurality of antennas; or a method of transmitting the modulation signal of one channel from one antenna, and a radio communication apparatus using the foregoing communication method.

This operation and apparatus allow switching between the foregoing two transmission methods depending on the radio-wave propagation environment. As a result, the information can be transmitted more accurately.

Exemplary Embodiment 13

The 13th exemplary embodiment describes the following method, by which modulation signals of a plurality of spread-spectrum communication methods can be transmitted:

a communication method where a modulation signal of a transmission method, by which a control channel is transmitted, is transmitted to a receiver, who receives the modulation signal, estimates radio-wave propagation environment of respective antennas from reception signals of the control channel, and transmits the estimated information of the radio-wave propagation environment, then the communication method selects one of the following transmission methods based on the estimated information:

a method of transmitting the modulation signals of a plurality of data channels of the plurality of spread-spectrum communication methods to the same frequency band from a plurality of antennas, or a method of transmitting the modulation signal of one data channel of one spread-spectrum communication method from one antenna. The 13th embodiment also describes a radio communication apparatus using the foregoing communication method.

The 13th exemplary embodiment further describes the following method, by which modulation signals of a plurality of spread-spectrum communication methods can be transmitted:

a communication method where a modulation signal of the transmission method, by which a control channel is transmitted, is transmitted to a receiver, who receives the modulation signal, estimates radio-wave propagation environment of respective antennas from reception signals of the control channel, then the communication method sends the information which requires one of the following transmission methods based on the estimated information of the radio-wave propagation environment:

a method of transmitting the modulation signals of a plurality of data channels of the plurality of spread-spectrum communication methods to the same frequency band from a plurality of antennas, or a method of transmitting the modulation signal of a data channel of one spread-spectrum communication method from one antenna;

then the communication method selects, based on the requiring information, one of the foregoing two transmission methods, and a radio communication apparatus using the foregoing communication method is also described.

FIG. 4 shows a placement of signal points on the in-phase-quadrature (I-Q) plane.

FIG. 73 shows a structure of an information symbol at a terminal in accordance with this embodiment.

FIG. 75 shows a structure of a reception apparatus at a base station in accordance with this embodiment.

FIG. 76 shows a structure of a transmission apparatus at the terminal in accordance with this embodiment.

FIG. 78 shows a structure of a transmission apparatus at the terminal in accordance with this embodiment.

Figure 79:
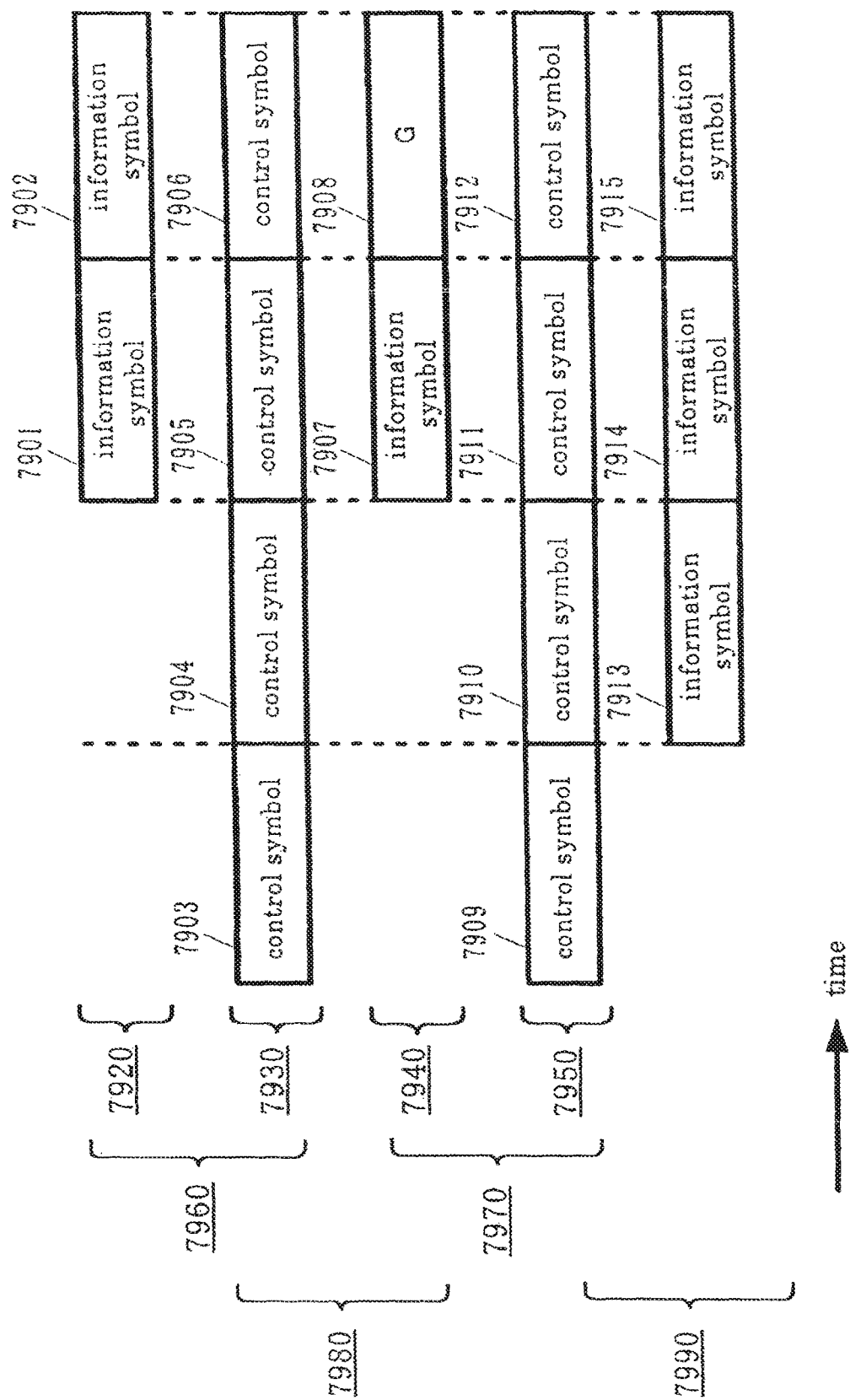
FIG. 79 shows a frame structure in accordance with a thirteenth exemplary embodiment of the present invention.

FIG. 79 shows a frame structure along a time axis in accordance with this embodiment, to be more specific, frame structure 7980 of a signal transmitted from the base station and frame structure 7990 of a signal transmitted from the terminal. One example of frame structure 7980 includes the following frames:

frame structure 7960 of spread-spectrum communication method A, where frame structure 7960 is formed of data channel 7920 and control channel 7930, and frame structure 7970 of spread-spectrum communication method B, where frame structure 7970 is formed of data channel 7940 and control channel 7950.

Frame structure 7920 includes information symbols 7901, 7902. Frame structure 7930 includes control symbols 7903, 7904, 7905, and 7906 of method A.

Frame structure 7940 includes information symbols 7907, guard symbol 7908. Frame structure 7950 includes control symbols 7909, 7910, 7911, and 7912 of method B.

Information symbols 7913, 7914, and 7915 belong to the signal transmitted from the terminal.

Figure 80:
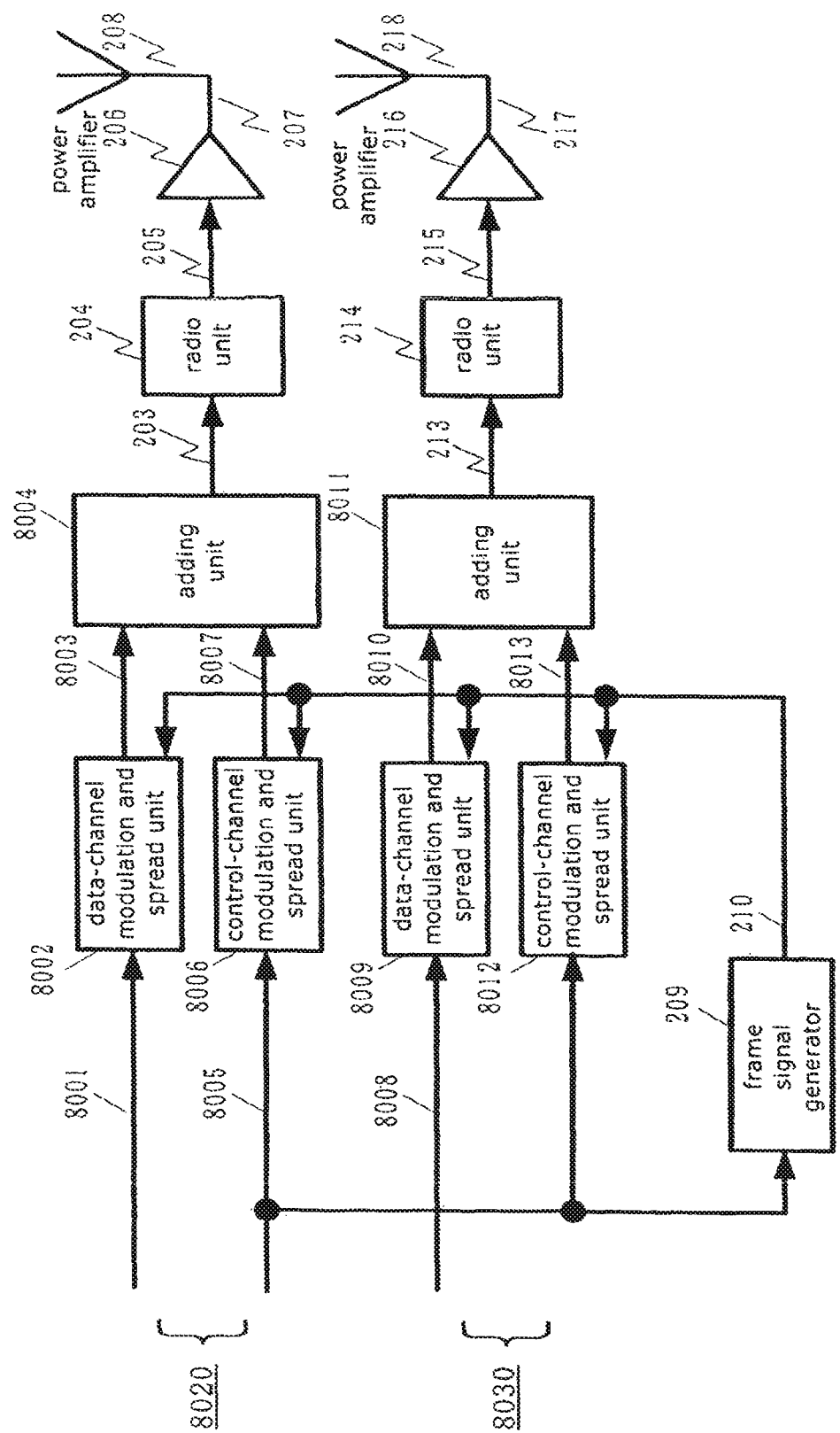
FIG. 80 shows a structure of a transmission apparatus in accordance with the thirteenth exemplary embodiment of the present invention.

FIG. 80 shows a structure of the transmission apparatus at the base station in accordance with this embodiment. The apparatus includes transmitters 8020 and 8030 responsible for spread-spectrum communication methods A and B respectively, and frame structure signal generator 209.

Transmitter 8020 of method A includes data-channel modulation and spread unit 8002, control-channel modulation and spread unit 8006, adding unit 8004, radio unit 204, power amplifier 206, and antenna 208.

Transmitter 8030 of method B includes data-channel modulation and spread unit 8009, control-channel modulation and spread unit 8012, adding unit 8011, radio unit 214, power amplifier 216, and antenna 218.

The elements operating in a similar way to those in FIG. 2 have the same reference marks.

Data-channel modulation and spread unit 8002 receives transmission digital signal 8001, frame structure signal 210, and outputs transmission quadrature baseband signal 8003 of the data channel of method A.

Control-channel modulation and spread unit 8006 receives transmission method determining information 8005, frame structure signal 210, and outputs transmission quadrature baseband signal 8010 of the control channel of method A.

Adding unit 8004 receives base-band signals 8003 of data channel and 8010 of control channel, then adds those signals together, thereby outputting transmission quadrature baseband signal 203.

Data-channel modulation and spread unit 8009 receives transmission digital signal 8008, frame structure signal 210, then outputs transmission quadrature baseband signal 8010 of the data channel of method B.

Control-channel modulation and spread unit 8012 receives transmission method determining information 8005, frame structure signal 210, then outputs transmission quadrature baseband signal 8013 of the control channel of method B.

Adding unit 8011 receives base-band signals 8010 of data channel and 8013 of control channel, then adds those signals together, thereby outputting transmission quadrature baseband signal 213.

Frame structure signal generator 209 receives transmission method determining information 8005, then outputs frame structure signal 210.

Figure 81:
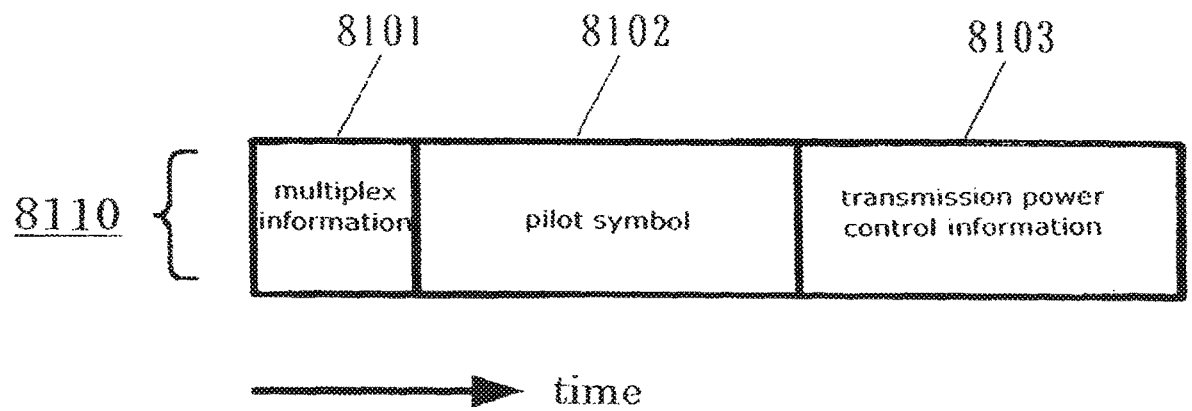
FIG. 81 shows a structure of a control symbol in accordance with the thirteenth exemplary embodiment of the present invention.

FIG. 81 shows a structure of control symbol 8110, and details a structure of control symbols 7903, 7904, 7905, 7906, 7909, 7910, 7911, and 7912 shown in FIG. 79.

Control symbol 8110 includes multiplex information 8101, pilot symbol 8102, and transmission power control information 8103.

Figure 82:
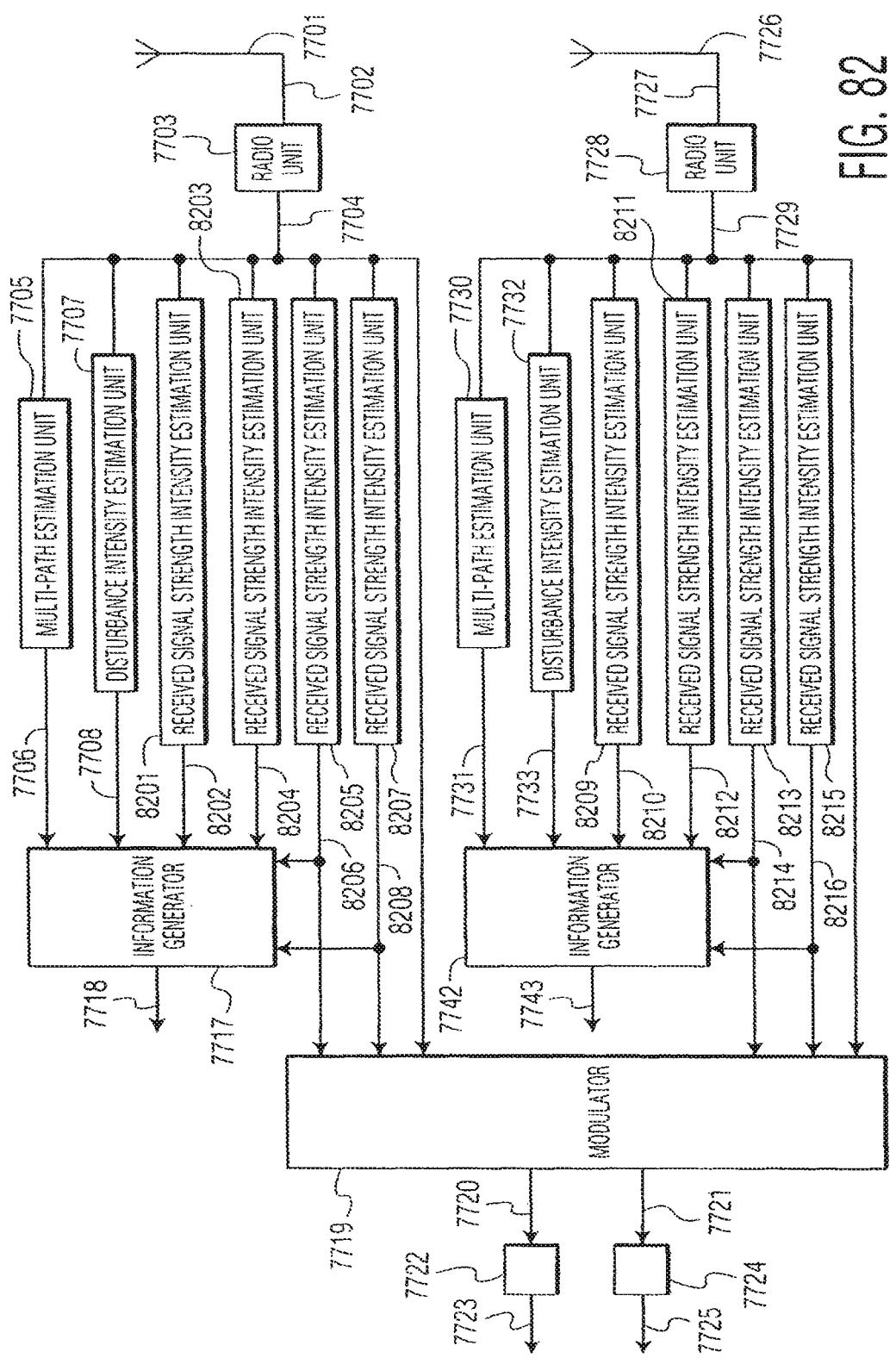
FIG. 82 shows a structure of a reception apparatus in accordance with the thirteenth exemplary embodiment of the present invention.

FIG. 82 shows a structure of a reception apparatus at the terminal in accordance with this embodiment, and the elements operating in a similar way to those in FIG. 77 have the same reference marks.

Received signal strength intensity estimation unit 8201 of method A receives reception quadrature baseband signal 7704, and outputs received signal strength intensity estimation signal 8202 of method A.

Received signal strength intensity estimation unit 8203 of method B receives reception quadrature baseband signal 7704, and outputs received signal strength intensity estimation signal 8204 of method B.

Transmission path variation estimation unit 8205 of method A receives reception quadrature baseband signal 7704, and outputs transmission path variation estimation signal 8206 of method A.

Transmission path variation estimation unit 8207 of method B receives reception quadrature baseband signal 7704, and outputs transmission path variation estimation signal 8208 of method B.

Information generator 7717 receives the following signals:
- multi-path estimation signal 7706;
- disturbance intensity estimation signal 7708;
- received signal strength intensity estimation signal 8202 of method A signals;
- received signal strength intensity estimation signal 8204 of method B signals;
- transmission path variation estimation signal 8206 of method A; and
- transmission path variation estimation signal 8208 of method B, then generator 7717 outputs radio wave propagation environment estimation signal 7718.

Received signal strength intensity estimation unit 8209 of method A receives reception quadrature baseband signal 7729, and outputs electric field intensity estimation signal 8210 of method A.

Received signal strength intensity estimation unit 8211 of method B receives reception quadrature baseband signal 7729, and outputs electric field intensity estimation signal 8212 of method B.

Transmission path variation estimation unit 8213 of method A receives reception quadrature baseband signal 7729, and outputs transmission path variation estimation signal 8214 of method A.

Transmission path variation estimation unit 8215 of method B receives reception quadrature baseband signal 7729, and outputs transmission path variation estimation signal 8216 of method B.

Information generator 7742 receives the following signals:
- multi-path estimation signal 7731;
- disturbance intensity estimation signal 7733;
- received signal strength intensity estimation signal 8210 of method A signals;
- received signal strength intensity estimation signal 8212 of method B signals;
- transmission path variation estimation signal 8214 of method A; and
- transmission path variation estimation signal 8216 of method B, then generator 7742 outputs radio wave propagation environment estimation signal 7743.

Figure 83:
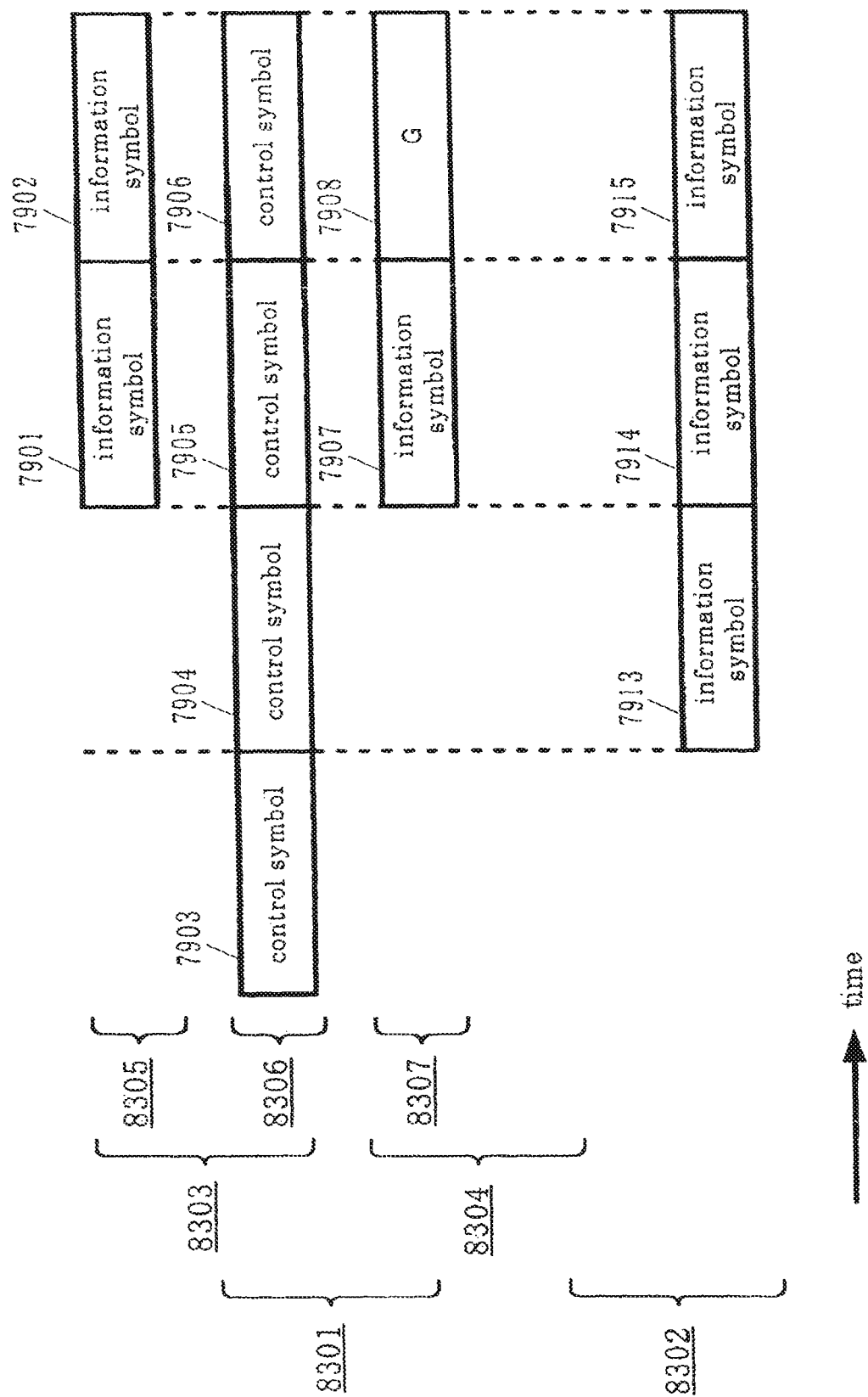
FIG. 83 shows a frame structure in accordance with the thirteenth exemplary embodiment of the present invention.

FIG. 83 shows a frame structure in accordance with this embodiment, to be more specific, frame structure 8301 of a signal transmitted from the base station, and frame structure 8302 of a signal transmitted from the terminal. An example of frame structure 8301 includes frame structure 8303 of method A, where structure 8303 is formed of data channel 8305 and control channel 8306, and frame structure 8304 of method B, where structure 8304 is formed only data channel 8307.

Figure 85:
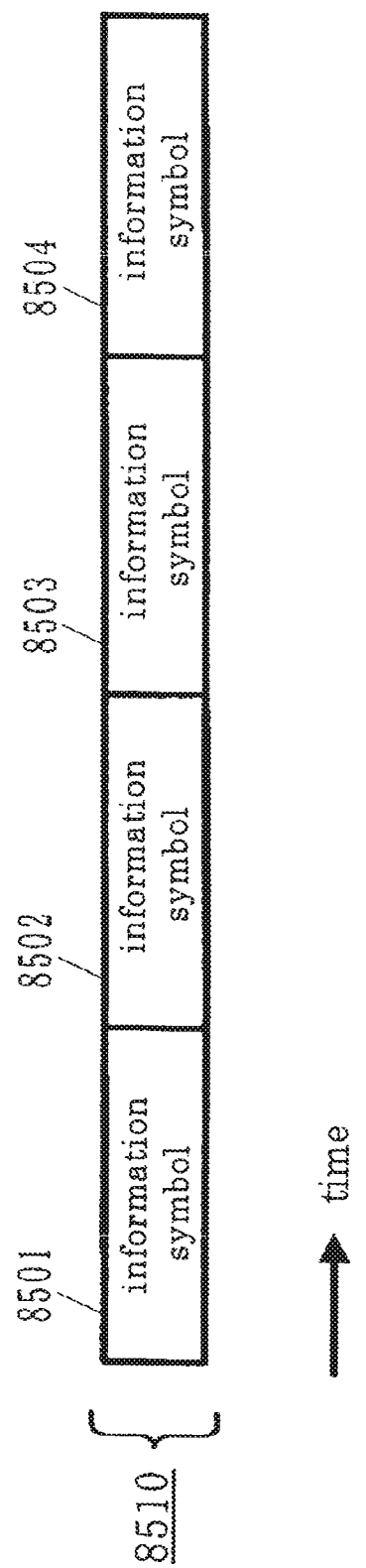
FIG. 85 shows a structure of a control symbol in accordance with the thirteenth exemplary embodiment of the present invention.

FIG. 85 shows a structure of a control symbol of control channel 8510 when the base station transmits a signal of spread-spectrum communication method by OFDM method. Control channel 8510 includes control symbols 8501 through 8504 along a time axis.

Figure 86:
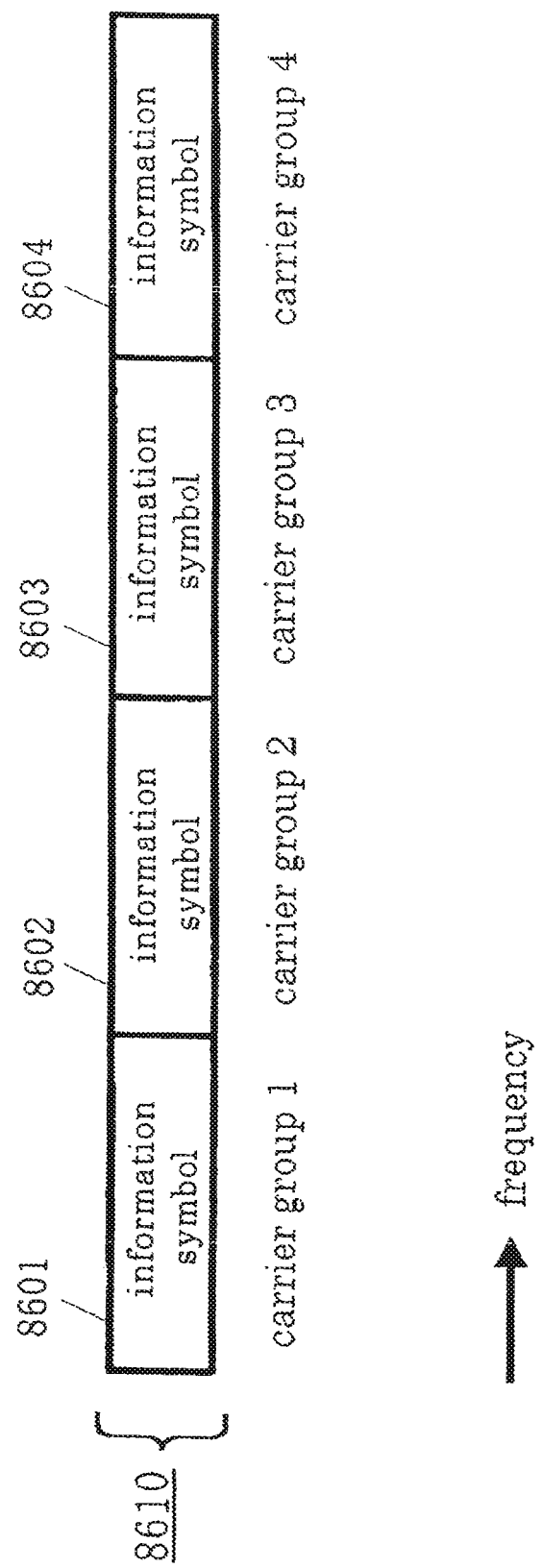
FIG. 86 shows a structure of a control symbol in accordance with the thirteenth exemplary embodiment of the present invention.
Figure 87:
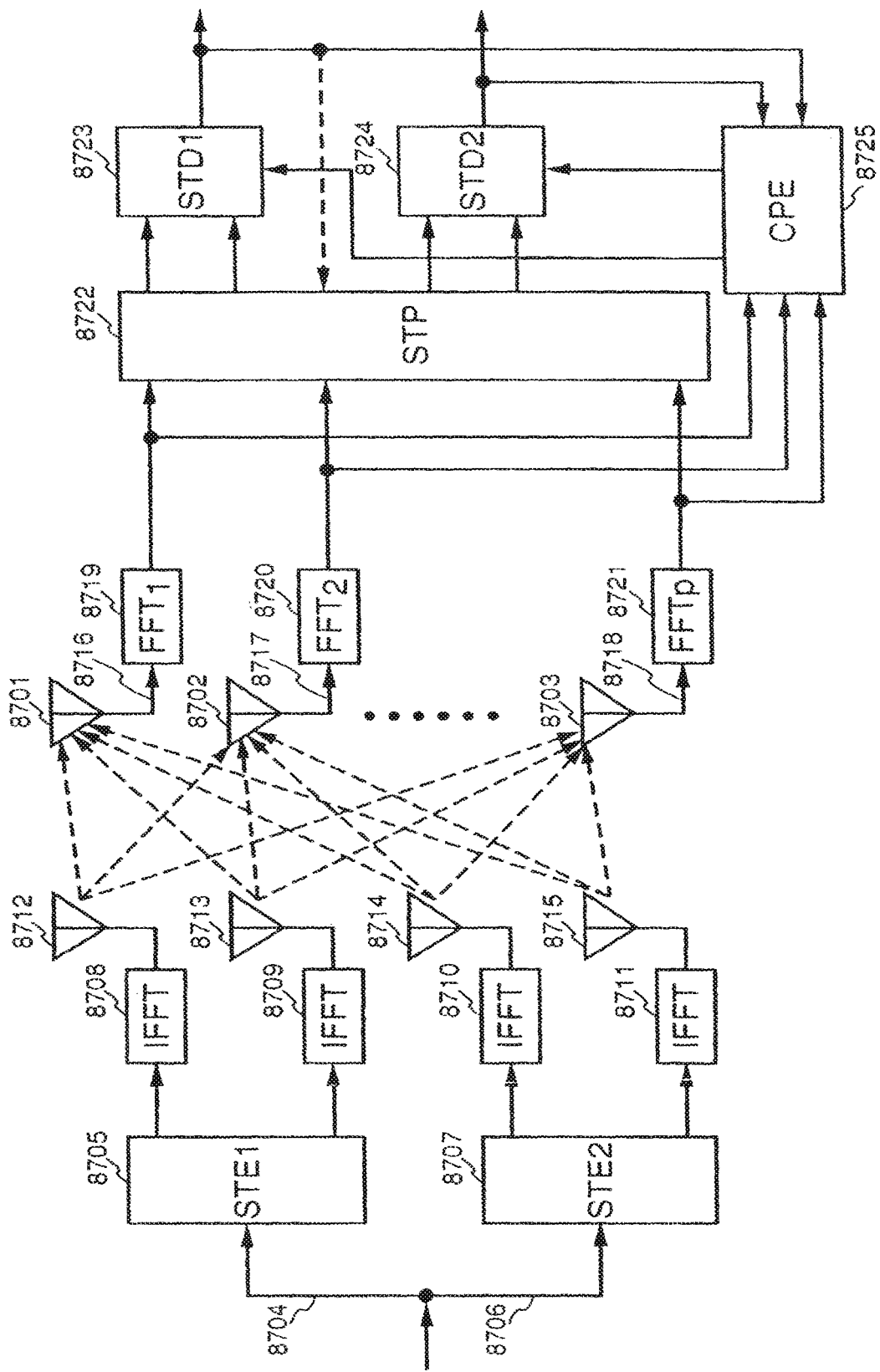
FIG. 87 shows a block diagram illustrating parts of a conventional MIMO-OFDM system.

FIG. 86 shows a structure of a control symbol of control channel 8610 when the base station transmits a signal of spread-spectrum communication method by OFDM method. Control channel 8610 includes control symbols 8601 through 8604 along a frequency axis.

Next, the following method, by which modulation signals of a plurality of spread-spectrum communication methods can be transmitted, is described with reference to FIGS. 4, 72, 75, 76, 79, 80, 81, and 82:

a communication method where a modulation signal of a transmission method, which transmits a control channel, is transmitted to a receiver, who receives the modulation signal, estimates radio-wave propagation environment of respective antennas from reception signals of the control channel, and transmits the estimated information of the radio-wave propagation environment, then the communication method selects one of the following transmission methods based on the estimated information:

a method of transmitting the modulation signals of a plurality of data channels of the plurality of spread-spectrum communication methods to the same frequency band from a plurality of antennas, or a method of transmitting the modulation signal of one data channel of one spread-spectrum communication method from one antenna. A radio communication apparatus using the foregoing communication method is also described hereinafter.

FIG. 80 shows a structure of the transmission apparatus at the base station. Frame structure signal generator 209 receives transmission method determining information 8005, and based on information 8005, outputs the following frame structure information about one of the following two transmission methods as frame structure signal 210:

a method, where, e.g. information symbol 7901 of method A and information symbol 7907 of method B shown in FIG. 79 are multiplexed together; or a method, where, information symbol 7902 of method A is transmitted; however, method B has guard symbol 7908, so that they are not multiplexed.

Transmission method determining information 8005 corresponds to reception apparatus 7511 shown in FIG. 75 at the base station.

Data-channel modulation and spread unit 8002 receives transmission digital signal 8001, frame structure signal 210, then outputs transmission quadrature baseband signal 8003 of method A.

Data-channel modulation and spread unit 8009 receives transmission digital signal 8008, frame structure signal 210, then in response to frame structure signal 210, outputs base-band signal 8010 of method B of the guard symbol or the information symbol as shown in FIG. 79. At this time, the modulation signal of the guard symbol is indicated by signal point 403 shown in FIG. 4.

Control channel modulation and spread unit 8006 receives transmission method determining information 8005, then outputs transmission quadrature baseband signal 8007 containing the control information for the control channel which includes, as shown in FIG. 81, multiplex information 8101, pilot symbol 8102, and transmission power control information 8103.

In a similar way to what is discussed above, control channel modulation and spread unit 8012 receives transmission method determining information 8005, then outputs transmission quadrature baseband signal 8013 containing the control information for the control channel which includes, as shown in FIG. 81, multiplex information 8101, pilot symbol 8102, and transmission power control information 8103.

Multiplex information 8101 shown in FIG. 81 works as a symbol for notifying one of the following transmission methods to the terminal:

a method of multiplexing method A and method B together; or a transmission method of transmitting method A only.

FIG. 75 shows a structure of the reception apparatus of the base station. Signal isolator 7507 isolates data symbol 7205 from the following elements corresponding to the radio-wave propagation environment information:

received signal strength intensity information symbol 7201;

transmission path variation information symbol 7202;

multi-path information symbol 7203; and disturbance information symbol 7204.

Isolator 7507 then outputs the information of data symbol 7205 as reception data 7509. Isolator 7507 also outputs the information of foregoing symbols 7201 through 7204 as radio-wave propagation environment estimation information 7508.

Transmission method determining unit 7510 receives radio-wave propagation environmental information, and based on this information, selects one of the following transmission methods:

a method of transmitting modulation signals of data channels of a plurality of spread-spectrum communication methods to the same frequency band from a plurality of antennas; or a method of transmitting a modulation signal of a data channel of one spread-spectrum communication method to the same frequency band from one antenna.

Determining unit 7510 then outputs the information about the transmission method as transmission method determining information 7511 and multiplex information 7512.

FIG. 76 shows the structure of the transmission apparatus at the terminal. The apparatus receives transmission digital signal 7601, radio-wave propagation environment estimation signals 7602, 7603, and frame structure signal 7604. According to the frame structure shown in FIG. 72, signal 7601 is treated as data symbol 7205, signals 7602, 7603 are treated as received signal strength intensity information symbol 7201, transmission path variation information symbol 7202, multi-path information symbol 7203, and disturbance information symbol 7204. Then the transmission apparatus outputs modulation signal 7606. Radio-wave propagation estimation signals 7602, 7603 correspond to radio-wave propagation environment estimation signals 7718, 7743 of the reception apparatus shown in FIG. 82 at the terminal.

FIG. 82 shows a structure of the reception apparatus at the terminal. Received signal strength intensity estimation unit 8201 of method A receives reception quadrature baseband signal 7704, and estimates a received signal strength intensity from, e.g. a component of the control channel shown in FIG. 79 of method A of reception quadrature baseband signal 7704. Estimation unit 8201 then outputs received signal strength intensity estimation signal 8202 of method A.

Received signal strength intensity estimation unit 8203 of method B receives reception quadrature baseband signal 7704, and estimates a received signal strength intensity from, e.g. a component of the control channel shown in FIG. 79 of method B of reception quadrature baseband signal 7704. Estimation unit 8203 then outputs received signal strength intensity estimation signal 8204 of method B.

Transmission path variation estimation unit 8205 of method A receives reception quadrature baseband signal 7704, and estimates a transmission path variation from, e.g. a component of the control channel shown in FIG. 79 of method A, then outputs transmission path variation estimation signal 8206 of method A.

Transmission path variation estimation unit 8207 of method B receives reception quadrature baseband signal 7704, and estimates a transmission path variation from, e.g. a component of the control channel shown in FIG. 79 of method B, then outputs transmission path variation estimation signal 8208 of method B.

Information generator 7717 receives the following signals:

multi-path estimation signal 7706;

disturbance intensity estimation signal 7708;

received signal strength intensity estimation signal 8202 of method A signals;

received signal strength intensity estimation signal 8204 of method B signals;

transmission path variation estimation signal 8206 of method A; and transmission path variation estimation signal 8208 of method B, then generator 7717 outputs radio wave propagation environment estimation signal 7718 corresponding to the information of received signal strength intensity information symbol 7201, transmission path variation information symbol 7202, multi-path information symbol 7203, and disturbance information symbol 7204 shown in FIG. 72.

Received signal strength intensity estimation unit 8209 of method A receives reception quadrature baseband signal 7729, and estimates a received signal strength intensity from, e.g. a component of the control channel shown in FIG. 79 of method A of reception quadrature baseband signal 7729. Estimation unit 8209 then outputs received signal strength intensity estimation signal 8210 of method A.

Received signal strength intensity estimation unit 8211 of method B receives reception quadrature baseband signal 7729, and estimates a received signal strength intensity from, e.g. a component of the control channel shown in FIG. 79 of method B of reception quadrature baseband signal 7729. Estimation unit 8211 then outputs received signal strength intensity estimation signal 8212 of method B.

Received signal strength intensity estimation unit 8213 of method A receives reception quadrature baseband signal 7729, and estimates a received signal strength intensity from, e.g. a component of the control channel shown in FIG. 79 of method A of reception quadrature baseband signal 7729. Estimation unit 8213 then outputs received signal strength intensity estimation signal 8214 of method A.

Received signal strength intensity estimation unit 8215 of method B receives reception quadrature baseband signal 7729, and estimates a received signal strength intensity from, e.g. a component of the control channel shown in FIG. 79 of method B of reception quadrature baseband signal 7729. Estimation unit 8215 then outputs received signal strength intensity estimation signal 8216 of method B.

Information generator 7742 receives the following signals:
multi-path estimation signal 7731;
disturbance intensity estimation signal 7733;
received signal strength intensity estimation signal 8210 of method A signals;
received signal strength intensity estimation signal 8212 of method B signals;
transmission path variation estimation signal 8214 of method A; and
transmission path variation estimation signal 8216 of method B, then generator 7742 outputs radio wave propagation environment estimation signal 7743 corresponding to the information of received signal strength intensity information symbol 7201, transmission path variation information symbol 7202, multi-path information symbol 7203, and disturbance information symbol 7204 shown in FIG. 72.

The foregoing discussion proves that a switch between the following two transmission methods improves the information quality:
a method of transmitting modulation signals of data channels of a plurality of spread-spectrum communication methods to the same frequency band from a plurality of antennas; and
a method of transmitting a modulation signal of a data channel of one spread-spectrum communication method to the same frequency band from one antenna.

Radio-wave propagation environment estimation signals 7718, 7743 correspond to signals 7602, 7603 of the transmission apparatus shown in FIG. 76 at the terminal.

Next, an operation at the start of a communication is described hereinafter. At the start of the communication, if the base station transmits modulation signals of data channels of a plurality of spread-spectrum communication methods to the same frequency band from a plurality of antennas, the terminal does not suit to this transmission method because of, e.g. a bad radio-wave propagation environment. In this case, the quality of reception data is lowered.

The transmission signal from the base station is then prepared such that neither information symbols of method A nor information symbols of method B shown in FIG. 79 exist. For instance, no plural data channels exist at the same frequency band, such as the time of control symbol 7903 of method A and control symbol 7909 of method B, and the time of control symbol 7904 of method A and control symbol 7913 of method B as shown in FIG. 79.

Frame structure signal generator 209 shown in FIG. 80 prepares a frame structure at the start of a communication with the terminal such that no plural data channels exist at the same frequency band, such as the time of control symbol 7903 of method A and control symbol 7909 of method B, and the time of control symbol 7904 of method A and control symbol 7913 of method B as shown in FIG. 79. Generator 209 then outputs this frame structure as frame structure signal 210.

The reception apparatus shown in FIG. 82 at the terminal estimates a radio-wave propagation environment from the following signals, then outputs radio-wave propagation estimation signals 7718, 7743:
control symbol 7903 of method A and control symbol 7909 of method B of the transmission signal from the base station shown in FIG. 80; and
control symbol 7904 of method A and control symbol 7913 of method B of the transmission signal from the base station shown in FIG. 80.

Transmission apparatus shown in FIG. 76 at the terminal estimates a radio-wave propagation environment from the following signals, then outputs radio-wave propagation estimation signals 7718, 7743 with information symbols 7913, 7914 shown in FIG. 79:
control symbol 7903 of method A and control symbol 7909 of method B of the transmission signal from the base station; and
control symbol 7904 of method A and control symbol 7913 of method B of the transmission signal from the base station.

The reception apparatus shown in FIG. 75 at the base station determines one of the following transmission methods based on the radio-wave propagation environment estimation information included in information symbol 7913, an element of the transmission signal from the transmission apparatus shown in FIG. 76 at the terminal:
a method of transmitting modulation signals of data channels of a plurality of spread-spectrum communication methods to the same frequency band from a plurality of antennas; or
a method of transmitting a modulation signal of a data channel of one spread-spectrum communication method to the same frequency band from one antenna.

Then in the case of a fine environment for radio-wave propagation, modulation signals of data channels of a plurality of spread-spectrum communication methods are transmitted to the same frequency band from a plurality of antennas such as information symbols 7901, 7907.

The foregoing discussion proves that the preparation of no data channels of plural spread-spectrum communication methods existing at the same frequency band at the start of a communication with the terminal can improve the quality of information.

In the foregoing description, a modulation signal indicating that the terminal requires a communication with the base station can be transmitted at the beginning.

Next, the following method, by which modulation signals of a plurality of spread-spectrum communication methods can be transmitted, is described with reference to FIGS. 4, 73, 75, 78, 79, 80, 81, and 82:
a communication method where a modulation signal of the transmission method, which transmits a control channel, is transmitted to a receiver, who receives the modulation signal then estimates radio-wave propagation environment of respective antennas from reception signals of the control channel, then the communication method sends the information which requires one of the following transmission methods based on the estimated information of the radio-wave propagation environment:
a method of transmitting the modulation signals of a plurality of data channels of the plurality of spread-spectrum communication methods to the same frequency band from a plurality of antennas, or
a method of transmitting the modulation signal of a data channel of one spread-spectrum communication method from one antenna;
then the communication method selects, based on the requiring information, one of the foregoing two transmission methods, and
a radio communication apparatus using the foregoing communication method is also described.

FIG. 80 shows the structure of the transmission apparatus at the base station. Frame structure signal generator 209 receives transmission method determining information 8005, and based on information 8005, outputs the following frame structure information about one of the following two transmission methods as frame structure signal 210:

a transmission method, where, e.g. information symbol 7901 of method A and information symbol 7907 of method B shown in FIG. 79 are multiplexed together; or a transmission method, where, information symbol 7902 of method A is transmitted; however, method B has guard symbol 7908, so that they are not multiplexed.

Transmission method determining information 8005 corresponds to reception apparatus 7511 shown in FIG. 75 at the base station.

Data-channel modulation and spread unit 8002 receives transmission digital signal 8001, frame structure signal 210, then outputs transmission quadrature baseband signal 8003 of method A.

Data-channel modulation and spread unit 8009 receives transmission digital signal 8008, frame structure signal 210, then in response to frame structure signal 210, outputs base-band signal 8010 of method B of the guard symbol or the information symbol as shown in FIG. 79. At this time, the modulation signal of the guard symbol corresponds to signal point 403 shown in FIG. 4.

Control channel modulation and spread unit 8006 receives transmission method determining information 8005, then outputs transmission quadrature baseband signal 8007 containing the control information for the control channel which includes, as shown in FIG. 81, multiplex information 8101, pilot symbol 8102, and transmission power control information 8103.

In a similar way to what is discussed above, control channel modulation and spread unit 8012 receives transmission method determining information 8005, then outputs transmission quadrature baseband signal 8013 containing the control information for the control channel which includes, as shown in FIG. 81, multiplex information 8101, pilot symbol 8102, and transmission power control information 8103.

Multiplex information 8101 shown in FIG. 81 works as a symbol for notifying one of the following transmission methods to the terminal:

a method of multiplexing method A and method B together; or a method of transmitting method A only.

FIG. 75 shows a structure of the reception apparatus of the base station. Signal isolator 7507 isolates data symbol 7302 from transmission method requiring information symbol 7301, then isolator 7507 outputs the information of data symbol 7302 as reception data 7509, and outputs also the information of transmission method requiring symbol 7301 as transmission request information 7508.

Transmission method determining unit 7510 receives transmission request information 7508, and based on this information, selects one of the following transmission methods:

a method of transmitting modulation signals of data channels of a plurality of spread-spectrum communication methods to the same frequency band from a plurality of antennas; or a method of transmitting a modulation signal of a data channel of one spread-spectrum communication method to the same frequency band from one antenna.

Determining unit 7510 then outputs the information about the transmission method as transmission method determining information 7511 and multiplex information 7512.

FIG. 78 shows the structure of the transmission apparatus at the terminal. Transmission method requiring information generator 7801 receives radio-wave propagation environment estimation signals 7602, 7603, then outputs transmission method requiring information 7802. Modulation signal generator 7606 receives transmission digital signal 7601, transmission request information 7802, and frame structure signal 7605, and outputs modulation signal 7607 according to the frame structure shown in FIG. 73. Radio-wave propagation environment estimation signals 7602, 7603 correspond to estimation signals 7718, 7743 of the reception apparatus shown in FIG. 82 at the terminal.

FIG. 82 shows the structure of the reception apparatus at the terminal. Received signal strength intensity estimation unit 8201 of spread-spectrum communication method A receives reception quadrature baseband signal 7704, and estimates a received signal strength intensity from, e.g. a component of the control channel shown in FIG. 79 of method A of reception quadrature baseband signal 7704. Estimation unit 8201 then outputs received signal strength intensity estimation signal 8202 of method A.

Received signal strength intensity estimation unit 8203 of spread-spectrum communication method B receives reception quadrature baseband signal 7704, and estimates a received signal strength intensity from, e.g. a component of the control channel shown in FIG. 79 of method B of reception quadrature baseband signal 7704. Estimation unit 8203 then outputs received signal strength intensity estimation signal 8204 of method B.

Transmission path variation estimation unit 8205 of method A receives reception quadrature baseband signal 7704, and estimates a transmission path variation from, e.g. a component of the control channel of method A shown in FIG. 79, then outputs transmission path variation estimation signal 8206 of method A.

Transmission path variation estimation unit 8207 of method B receives reception quadrature baseband signal 7704, and estimates a transmission path variation from, e.g. a component of the control channel of method B shown in FIG. 79, then outputs transmission path variation estimation signal 8208 of method B.

Information generator 7717 receives the following signals:

multi-path estimation signal 7706;

disturbance intensity estimation signal 7708;

received signal strength intensity estimation signal 8202 of method A signals;

received signal strength intensity estimation signal 8204 of method B signals;

transmission path variation estimation signal 8206 of method A; and transmission path variation estimation signal 8208 of method B, then generator 7717 outputs radio wave propagation environment estimation signal 7718 corresponding to the information of received signal strength intensity information symbol 7201, transmission path variation information symbol 7202, multi-path information symbol 7203, and disturbance information symbol 7204 shown in FIG. 72.

Received signal strength intensity estimation unit 8209 of method A receives reception quadrature baseband signal 7729, and estimates a received signal strength intensity from, e.g. a component of the control channel shown in FIG. 79 of method A of reception quadrature baseband signal 7729. Estimation unit 8209 then outputs received signal strength intensity estimation signal 8210 of method A.

Received signal strength intensity estimation unit 8211 of method B receives reception quadrature baseband signal 7729, and estimates a received signal strength intensity from, e.g. a component of the control channel shown in FIG. 79 of method B of reception quadrature baseband signal 7729. Estimation unit 8211 then outputs received signal strength intensity estimation signal 8212 of method B.

Received signal strength intensity estimation unit 8213 of method A receives reception quadrature baseband signal 7729, and estimates a received signal strength intensity from, e.g. a component of the control channel shown in FIG. 79 of method A of reception quadrature baseband signal 7729. Estimation unit 8213 then outputs received signal strength intensity estimation signal 8214 of method A.

Received signal strength intensity estimation unit 8215 of method B receives reception quadrature baseband signal 7729, and estimates a received signal strength intensity from, e.g. a component of the control channel shown in FIG. 79 of method B of reception quadrature baseband signal 7729. Estimation unit 8215 then outputs received signal strength intensity estimation signal 8216 of method B.

Information generator 7742 receives the following signals:

multi-path estimation signal 7731;

disturbance intensity estimation signal 7733;

received signal strength intensity estimation signal 8210 of method A signals;

received signal strength intensity estimation signal 8212 of method B signals;

transmission path variation estimation signal 8214 of method A; and transmission path variation estimation signal 8216 of method B, then generator 7742 outputs radio wave propagation environment estimation signal 7743 corresponding to the information of received signal strength intensity information symbol 7201, transmission path variation information symbol 7202, multi-path information symbol 7203, and disturbance information symbol 7204 shown in FIG. 72.

The foregoing discussion proves that a switch between the following two transmission methods improves the information quality:

a method of transmitting modulation signals of data channels of a plurality of spread-spectrum communication methods to the same frequency band from a plurality of antennas; and a method of transmitting a modulation signal of a data channel of one spread-spectrum communication method to the same frequency band from one antenna.

Radio-wave propagation environment estimation signals 7718, 7743 correspond to signals 7602, 7603 of the transmission apparatus shown in FIG. 76 at the terminal.

Next, an operation at the start of a communication is described hereinafter. At the start of the communication, if the base station transmits modulation signals of data channels of a plurality of spread-spectrum communication methods to the same frequency band from a plurality of antennas, the terminal does not suit to this transmission method because of, e.g. a bad radio-wave propagation environment. In this case, the quality of reception data is lowered.

The transmission signal from the base station is then prepared such that neither information symbols of method A nor information symbols of method B shown in FIG. 79 exist. For instance, no plural data channels exist at the same frequency band, such as the time of control symbol 7903 of method A and control symbol 7909 of method B, and the time of control symbol 7904 of method A and control symbol 7913 of method B as shown in FIG. 79.

Frame structure signal generator 209 shown in FIG. 80 prepares a frame structure at the start of a communication with the terminal such that no plural data channels exist at the same frequency band, such as the time of control symbol 7903 of method A and control symbol 7909 of method B, and the time of control symbol 7904 of method A and control symbol 7913 of method B as shown in FIG. 79. Generator 209 then outputs this frame structure as frame structure signal 210.

The reception apparatus shown in FIG. 82 at the terminal estimates a radio-wave propagation environment from the following signals, then outputs radio-wave propagation estimation signals 7718, 7743:

control symbol 7903 of method A and control symbol 7909 of method B of the transmission signal from the base station shown in FIG. 80; and control symbol 7904 of method A and control symbol 7913 of method B of the transmission signal from the base station shown in FIG. 80.

Transmission method requiring information generator 7801 of the transmission apparatus shown in FIG. 78, based on radio-wave propagation environment estimation signals 7718 and 7743 discussed above, transmits information which requires one of the following transmission methods as the transmission request information with information symbols 7913, 7914 shown in FIG. 79:

a method of transmitting modulation signals of data channels of a plurality of spread-spectrum communication methods to the same frequency band from a plurality of antennas; or a method of transmitting a modulation signal of a data channel of one spread-spectrum communication method to the same frequency band from one antenna.

The reception apparatus shown in FIG. 75 at the base station determines one of the following transmission methods based on the radio-wave propagation environment estimation information included in information symbol 7913, which is an element of the transmission signal from the transmission apparatus shown in FIG. 76 at the terminal:

a method of transmitting modulation signals of data channels of a plurality of spread-spectrum communication methods to the same frequency band from a plurality of antennas; or a method of transmitting a modulation signal of a data channel of one spread-spectrum communication method to the same frequency band from one antenna.

Then the modulation signals of the transmission method determined are transmitted from the antenna.

The foregoing discussion proves that the preparation of no data channels of plural spread-spectrum communication methods existing at the same frequency band at the start of a communication with the terminal can improve the quality of information.

In the foregoing description, a modulation signal indicating that the terminal requires a communication with the base station can be transmitted at the beginning.

In the foregoing description, as shown in FIG. 79, the control channel exists in both of spread-spectrum communication methods A and B; however, e.g. this embodiment is applicable to the case where the control channel exits only in method A, as shown in FIG. 83. In this case, the transmission apparatus in FIG. 80 does not have control channel modulation and spread unit 8012 of method B.

This embodiment refers to the case where the number of spread-spectrum communication methods to be multiplexed are switched between two channels and one channel; however, this example does not limit the embodiment. For instance, in the case where three methods can be multiplexed to the same frequency band, the transmission apparatus at the base station switches the number of multiplexing between 1-3 methods.

This embodiment is also applicable to the case where signals of a spread-spectrum communication method is modulated by OFDM method. A structure of a control symbol of a spread-spectrum communication method transmitted from the base station in this case is shown in FIGS. 85 and 86. In FIG. 85, the control symbols are spread on the time axis, while they are spread on the frequency axis in FIG. 86. Information symbols are also spread either on a time axis or a frequency axis as shown in FIGS. 85 and 86, so that they are multiplexed to signals of the control channels. The transmission apparatus and the reception apparatus both at the base station and the terminal can be formed of elements described in FIGS. 75, 76, 78, 80 and 82 which are referred to the frame structure shown in FIG. 70.

In this embodiment, one data channel per method A or method B is used for the description purpose; however, the number of data channels is not limited to one, and plural data channels are applicable to this embodiment. Codes to be used for spread or inverse-spread of spread-spectrum communication methods A and B can be identical to each other or different from each other.

The expression of "antenna" in the previous description does not always mean a single antenna, but "antenna" can mean an antenna unit which is formed of a plurality of antennas.

The previous discussion refers to the following method, by which modulation signals of a plurality of spread-spectrum communication methods can be transmitted:

the communication method where a modulation signal of a transmission method, which transmits a control channel, is transmitted to a receiver, who receives the modulation signal then estimates radio-wave propagation environment of respective antennas from reception signals of the control channel, and transmits the estimated information of the radio-wave propagation environment, then the communication method selects one of the following transmission methods based on the estimated information:

a method of transmitting the modulation signals of a plurality of data channels of the plurality of spread-spectrum communication methods to the same frequency band from a plurality of antennas, or a method of transmitting the modulation signal of one data channel of one spread-spectrum communication method from one antenna. The previous discussion also refers to the radio communication apparatus using the foregoing communication method.

The discussion above also describes the method below, by which modulation signals of a plurality of spread-spectrum communication methods can be transmitted:

the communication method where a modulation signal of the transmission method, which transmits a control channel, is transmitted to a receiver, who receives the modulation signal then estimates radio-wave propagation environment of respective antennas from reception signals of the control channel, then the communication method sends the information which requires one of the transmission methods below based on the information of the estimated radio-wave propagation environment:

a method of transmitting the modulation signals of a plurality of data channels of the plurality of spread-spectrum communication methods to the same frequency band from a plurality of antennas, or a method of transmitting the modulation signal of a data channel of one spread-spectrum communication method from one antenna;

then the communication method selects, based on the requiring information, one of the foregoing two transmission methods.

The discussion above also refers to the radio communication apparatus using the communication method. In conclusion, the methods and the apparatuses discussed above allow transmitting information more accurately.

INDUSTRIAL APPLICABILITY

The present invention is useful for a transmission and reception method by which modulation signals of a plurality of channels are multiplexed to the same frequency band. The present invention allows estimating channels accurately and with ease for demultiplexing multiplexed modulation signals received by a reception apparatus.

The invention claimed is:

1. A radio transmission apparatus comprising:
   circuitry configured to:
   determine information indicative of an estimated communications channel condition;
   generate, based on the information indicative of the estimated communications channel condition, a single modulation signal or a plurality of modulation signals; and
   transmit, based on the generation of the single modulation signal or the plurality of modulation signals, the single modulation signal from a first antenna or the plurality of modulation signals from the first antenna and a second antenna,
   wherein the plurality of modulation signals include different information from each other and are transmitted over an identical frequency band and at an identical temporal point, and
   wherein the single modulation signal and the plurality of modulation signals contain parameter information indicating a number of modulation signals transmitted at the same time.

2. The radio transmission apparatus of claim 1, wherein the information indicative of the estimated communications channel condition is estimated based on a modulation signal transmitted when a communication starts.

3. The radio transmission apparatus of claim 1, wherein the determination of the information indicative of the estimated communications channel condition comprises receipt, from a communications partner device, of the information indicative of the estimated communications channel condition.

4. The radio transmission apparatus of claim 1, wherein the circuitry is further configured to receive, from a communications partner device, parameter information indicative of the number of modulation signals transmitted at the same time.

5. A transmission method comprising:
   determining information indicative of an estimated communications channel condition;
   generating, based on the information indicative of the estimated communications channel condition, a single modulation signal or a plurality of modulation signals; and
   transmitting, based on the generation of the single modulation signal or the plurality of modulation signals, the single modulation signal from a first antenna or the plurality of modulation signals from the first antenna and a second antenna,
   wherein the plurality of modulation signals include different information from each other and are transmitted over an identical frequency band and at an identical temporal point, and wherein the single modulation signal and the plurality of modulation signals contain parameter information indicating a number of modulation signals transmitted at the same time.

6. The transmission method of claim 5, wherein a modulation signal is transmitted when a communication starts and is used in estimating the estimated communications channel condition.

7. The radio transmission method of claim 5, wherein determining the information indicative of the estimated communications channel condition comprises receiving, from a communications partner device, the information indicative of the estimated communications channel condition.

8. The radio transmission method of claim 5, further comprising receiving, from a communications partner device, parameter information indicative of number of modulation signals transmitted at the same time.

* * * * *